US006778810B1

(12) United States Patent
Anderson

(10) Patent No.: US 6,778,810 B1
(45) Date of Patent: Aug. 17, 2004

(54) METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES

(75) Inventor: Paul R. Anderson, Hermosa Beach, CA (US)

(73) Assignee: The DirectTV Group, Inc., El Segundo, CA (US)

( * ) Notice: Subject to any disclaimer, the term of this patent is extended or adjusted under 35 U.S.C. 154(b) by 0 days.

(21) Appl. No.: 09/480,089

(22) Filed: Jan. 10, 2000

Related U.S. Application Data

(60) Provisional application No. 60/169,005, filed on Dec. 3, 1999.

(51) Int. Cl.[7] .......................... H04B 7/185; H01Q 1/36; H01Q 3/00; H01Q 21/00; G01S 1/08

(52) U.S. Cl. .................... 455/12.1; 455/12.1; 455/3.02; 455/13.1; 342/359; 342/379; 343/844; 343/895

(58) Field of Search .............................. 455/12.1, 13.3, 455/3.02, 283; 342/37, 379, 359, 360; 343/777, 844, 895, 840

(56) References Cited

U.S. PATENT DOCUMENTS

| | | | |
|---|---|---|---|
| 3,176,301 | A | 3/1965 | Wellons et al. |
| 3,430,244 | A | 2/1969 | Bartlett et al. |
| 3,706,999 | A | 12/1972 | Tocquec et al. |
| 3,936,837 | A | 2/1976 | Coleman et al. |

(List continued on next page.)

FOREIGN PATENT DOCUMENTS

| | | |
|---|---|---|
| EP | 1083720 A2 | 3/2001 |

OTHER PUBLICATIONS

Berrou et al., *Near Shannon Limit Error–Correcting Coding And Decoding: Turbo–Codes*(1), in Proc. ICC'93, Geneva, Switzerland, May 1993, pp. 1064–1070.

Before the Federal Communications Commision, In the Matter of: Amendment of Part 2 and 25 of the Commission's Rules to Permit Operation of NGSO FSS Systems Co–Frequency with GSO and Terrestrial System in the Ku–Band Frequency Range.

(List continued on next page.)

*Primary Examiner*—Vivian Chin
*Assistant Examiner*—Yuwen Pan
(74) *Attorney, Agent, or Firm*—John A. Crook; Georgann S. Grunebach

(57) ABSTRACT

An apparatus for simultaneously receiving a first signal from a non-terrestrial source and a second signal from a terrestrial source on the same or overlapping channels using a receive antenna with posteriorly-directed sidelobes is disclosed. The apparatus comprises at least one terrestrial transmitter transmitting information on at least one frequency simultaneously usable by at least one satellite transmitting to a satellite receive antenna having a sensitivity characterizable by a primary sensitive axis directed substantially at satellite. The terrestrial transmitter includes a azimuthal gain characteristic directed substantially away from the Earth's Equator. In an alternative embodiment, the terrestrial transmitter is disposed at a location defining a vector angularly displaced from the primary sensitive axis by an angle of less than 90 degrees. A method of transmitting information is also disclosed. In this method the information is transmitted on at least one frequency simultaneously usable by at least one satellite transmitting to a satellite receive antenna having a sensitivity characterizable by a primary sensitive axis directed substantially at the satellite and a posterior secondary sensitive axis. The method is performed by transmitting the information from a terrestrially-based transmitter to a terrestrial receive antenna in a direction substantially away from the Equator.

46 Claims, 35 Drawing Sheets

U.S. PATENT DOCUMENTS

| | | | | |
|---|---|---|---|---|
| 4,263,599 | A | | 4/1981 | Bielli et al. |
| 4,380,014 | A | | 4/1983 | Howard |
| 4,660,045 | A | | 4/1987 | Clark |
| 4,803,495 | A | | 2/1989 | Monser et al. |
| 5,187,491 | A | | 2/1993 | Schuss et al. |
| 5,317,328 | A | | 5/1994 | Allen |
| 5,422,913 | A | | 6/1995 | Wilkinson |
| 5,483,663 | A | | 1/1996 | Tawil |
| 5,495,258 | A | * | 2/1996 | Muhlhauser et al. ........ 343/753 |
| 5,584,047 | A | * | 12/1996 | Tuck ......................... 455/13.1 |
| 5,625,640 | A | | 4/1997 | Palmer et al. |
| 5,761,605 | A | | 6/1998 | Tawil et al. |
| 5,870,439 | A | | 2/1999 | Ben-Efraim et al. |
| 5,905,474 | A | | 5/1999 | Ngai et al. |
| 5,955,783 | A | | 9/1999 | Ben-Efraim et al. |
| 5,959,590 | A | | 9/1999 | Sanford et al. |
| 5,959,592 | A | | 9/1999 | Petruzzelli |
| 6,041,224 | A | | 3/2000 | Wada |
| 6,091,931 | A | | 7/2000 | Ben Efraim et al. |
| 6,134,282 | A | | 10/2000 | Ben Efraim et al. |
| 6,208,834 | B1 | * | 3/2001 | Tawil et al. ............... 455/3.02 |
| 6,353,490 | B1 | | 3/2002 | Singer et al. |
| 2001/0019942 | A1 | | 9/2001 | Tawil et al. |
| 2002/0016157 | A1 | | 2/2002 | Arsenault et al. |
| 2002/0025005 | A1 | | 2/2002 | Onggosanusi et al. |
| 2002/0032908 | A1 | | 3/2002 | Booth |

OTHER PUBLICATIONS

Amendment of the Commision's Rules to Authorize Subsidiary Terrestrial Use of the 12.2–12.7 GHz Band by Direct Broadcast Satellite Licensees and their Affiliates; and. Applications of Broadware USA, PDC Broadband Corporation, and Satellite Receivers, Ltd. to Provide A Fixed Service in the 12.2–12.7 GHz Band.

*Comments of AT&T Corp.*, Mar. 12, 2001, 24 pp.

Rizzi, Peter A., *Microwave Engineering, Passive Circuits*, Prentice Hall, title page and pp. 229–234.

* cited by examiner

FIG. 3B: Polar Plot of Satellite Receive Antenna Sensitivity
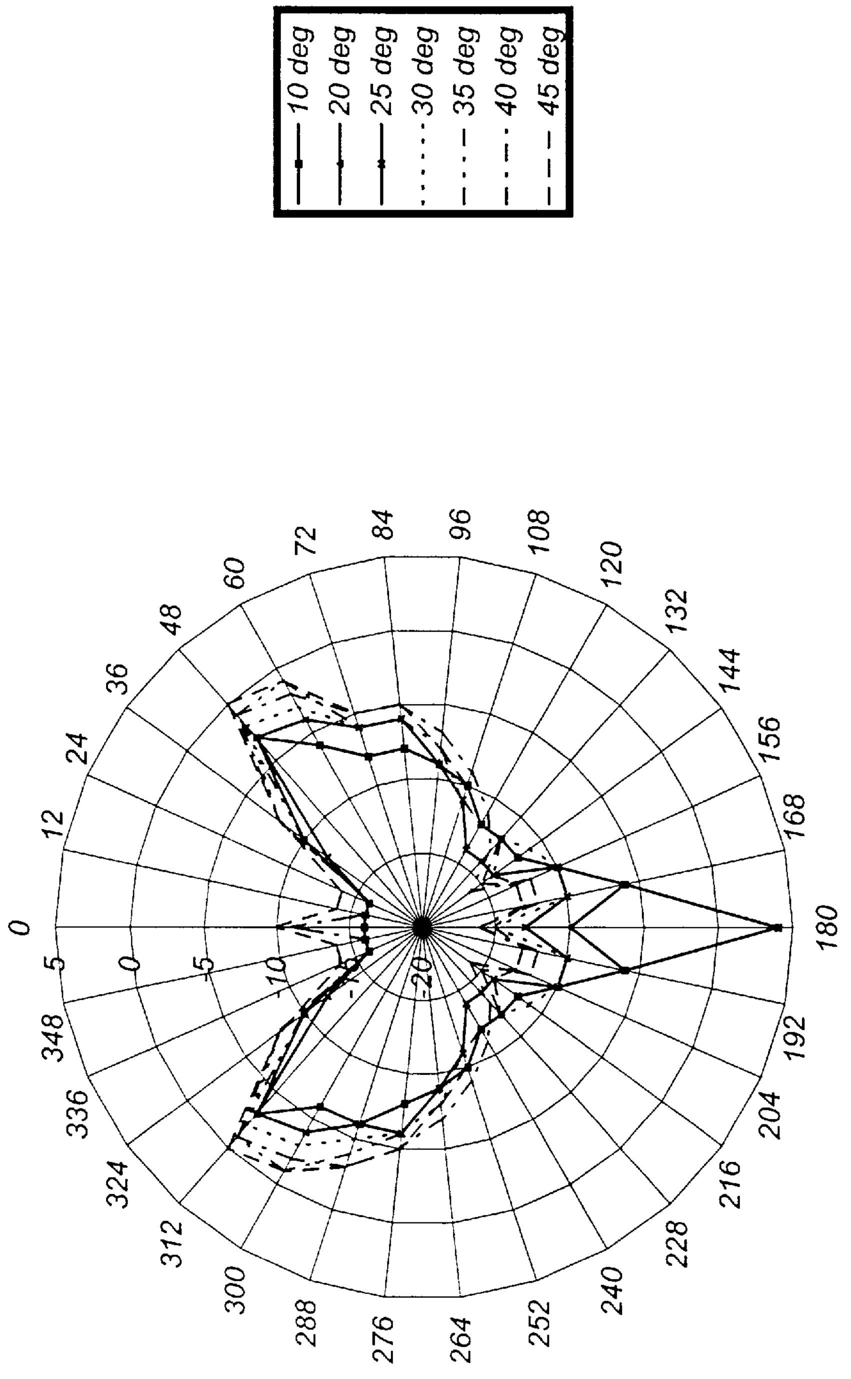

NORTHERLY-TRANSMITTING TERRESTRIAL TRANSMITTER RELATIVE ANTENNA GAIN

Interference Zone for Northerly-Directed Terrestrial Transmissions

METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES

CROSS REFERENCE TO RELATED APPLICATIONS

This application claims benefit of U.S. Provisional Application No. 60/169,005, filed Dec. 3, 1999 by Paul R. Anderson, and entitled "METHOD AND APPARATUS FOR MITIGATING INTERFERENCE FROM TERRESTRIAL BROADCASTS SHARING THE SAME CHANNEL WITH SATELLITE BROADCASTS USING AN ANTENNA WITH POSTERIOR SIDELOBES," which application is hereby incorporated by reference herein.

BACKGROUND OF THE INVENTION

1. Field of the Invention

The present invention relates to systems and methods receiving broadcast signals, and in particular to a system and method for receiving simultaneous terrestrial and satellite broadcasts sharing the same channel using an antenna with posterior sidelobes and anterior nulls.

2. Description of the Related Art

It has been proposed to cooperatively share the current Broadcast Satellite Service (BSS) frequency bands to allow additional programming material to be transmitted to BSS users or subscribers using the same frequency bands as currently used by BSS satellites. This is implemented through the use of terrestrial based transmitters to transmit the additional programming.

One such system is disclosed in U.S. Pat. No. 5,761,605, issued to Tawil et al. on Jun. 2, 1998, which patent is hereby incorporated by reference herein. This patent describes a system in which transmissions from the terrestrial transmitter are received by a second antenna at the user's premises that faces in the opposite azimuthal direction from the BSS satellite receive antenna.

Fundamental to any such system, including the system disclosed in the '605 patent, is that the isolation between the signals from the terrestrial source and the satellite source must be sufficient to prevent interference. While the foregoing system applies to simultaneous channel sharing between satellite and terrestrial transmitters, it requires a BSS satellite ground antenna having highly directional, monocular sensitivity characteristics in order to realize low interference levels. Such antennae can be difficult and expensive to design and produce. Further, it is impractical to replace or modify the several million BSS satellite receive antennae now in use which do not have the desired highly-directional monocular sensitivity. Thus, any simultaneous use of the BSS bandwidth for terrestrial transmissions according to the '605 patent would cause large areas of unacceptably high interference with existing systems.

What is needed is a system and method that provides significantly improved interference isolation to provide simultaneous channel sharing without requiring a satellite ground antenna (e.g. a BSS antenna) with highly directional sensitivity characteristics. Preferably, such a system and method would permit terrestrial re-use of the subject BSS broadcast frequencies, with reduced and more acceptable potential interference levels, particularly when used with standard BSS antennae already in widespread use. The present invention satisfies that need.

SUMMARY OF THE INVENTION

To address the requirements described above, the present invention discloses a method and apparatus for simultaneously receiving a first signal from a non-terrestrial source and a second signal from a terrestrial source on the same or overlapping channels.

In one embodiment, the apparatus comprises at least one terrestrial transmitter transmitting information on at least one frequency simultaneously usable by at least one satellite transmitting to a satellite receive antenna having a sensitivity characterizable by a primary sensitive axis directed substantially at the satellite. The terrestrial transmitter includes an azimuthal gain characteristic directed substantially away from the Earth's Equator. In another embodiment, the terrestrial transmitter is disposed at a location defining a vector angularly displaced from the primary sensitive axis by an angle of less than 90 degrees.

In still another embodiment, the apparatus comprises a terrestrial receive antenna for receiving a first signal from a terrestrial transmitter on a frequency usable by at least one satellite transmitting to a satellite receive antenna having a sensitivity characterizable by a primary sensitive axis directed substantially at the satellite. The terrestrial receive antenna includes a primary sensitive axis directed substantially in the direction of the Earth's Equator. In another embodiment, the terrestrial receive antenna sensitive axis is displaced away from the satellite receive antenna primary sensitive axis by an offset angle of less than 90 degrees.

In yet another embodiment, the present invention includes a first antenna having a sensitivity characteristic with a plurality of lobes and nulls therebetween and a second antenna having a sensitivity characteristic with a plurality of lobes and nulls therebetween. The first antenna includes an anteriorly arranged main lobe and one or more posteriorly arranged sidelobes. At least one of the lobes of the first antenna is directed substantially at the non-terrestrial source and at least one of the nulls of the first antenna is directed substantially at the terrestrial source so that the first antenna receives the first signal from the non-terrestrial source, while substantially rejecting the second signal from the terrestrial source. At least one of the second antenna nodes is directed substantially at the terrestrial source so that the second antenna may receive the second signal. In one embodiment, to further enhance isolation between the first signal and the second signal, the second antenna is directed so that in addition to the foregoing, one of the second antenna nulls is directed substantially at the non-terrestrial source.

The present invention is also embodied in a method of transmitting information on at least one frequency simultaneously usable by at least one satellite transmitting to a satellite receive antenna having a sensitivity characterizable by a primary sensitive axis directed substantially at the satellite and a posterior secondary sensitive axis. The method is performed by transmitting the information from a terrestrially-based transmitter to a terrestrial receive antenna in a direction substantially away from the Equator. In another embodiment, the invention is embodied by a method for receiving information transmitted on at least one frequency simultaneously usable by at least one satellite transmitting to a satellite receive antenna having a sensitivity characterizable by a primary sensitive axis directed substantially at the satellite, and a posterior secondary sensitive axis. In this embodiment, the method is performed by receiving the information with a terrestrial receive antenna from a terrestrially-based transmitter transmitting the information in a direction substantially away from the Equator.

BRIEF DESCRIPTION OF THE DRAWINGS

Referring now to the drawings in which like reference numbers represent corresponding parts throughout:

FIGS. 3A and 3B are diagrams showing a sensitivity characteristic of a representative satellite receive antenna 106, illustrating a posterior sidelobe sensitivity;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
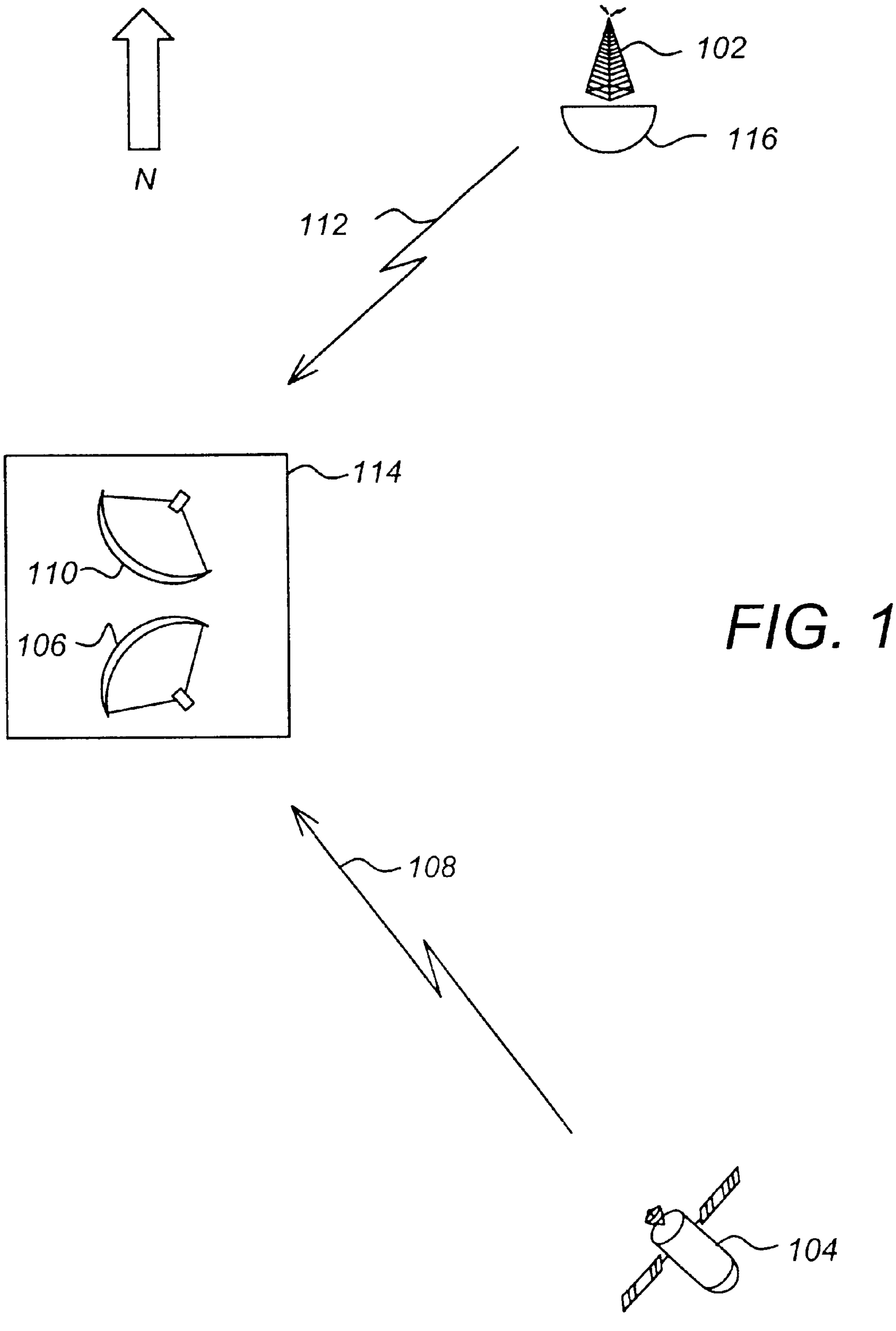
FIG. 1 is a diagram illustrating the general relationship between a terrestrial transmitter, a satellite or other non-terrestrial transmitter, and the orientation of a subscriber's satellite receive antenna to receive the satellite signal transmitted by the satellite and a second antenna to receive the terrestrial signal transmitted by the terrestrial transmitter.

FIG. 1 is a diagram illustrating the general relationship between a terrestrial transmitter 102, a satellite or other non-terrestrial transmitter 104, and the orientation of a subscriber's satellite receive antenna 106 to receive the satellite signal 108 transmitted by the satellite transmitter 104 and a second antenna 110 to receive the terrestrial signal 112 transmitted by the terrestrial transmitter 102. Typically, the satellite transmitter 104 is disposed in a geosynchronous or geostationary orbit, but the present invention can be practiced with satellite transmitters in other orbits as well. For example, in principle, the present invention can be practiced with two potentially interfering terrestrial transmission networks, so long as those networks comply with the geometrical relationships between transmitters described herein.

Depending on the sensitivity and rejection characteristics of the satellite receive antenna 106 and the sensitivity characteristic 116 used to transmit the terrestrial signal 112, the terrestrial signal 112 may impinge on the satellite receive antenna 106, whether or not the terrestrial receive antenna 110 is present. This terrestrial signal 112 will be detected by satellite receive antenna 106 as determined by the sensitivity or gain characteristic of the satellite receive antenna 106 in the direction of the terrestrial transmitter 102, and the received power flux density level of the interfering terrestrial signal 112 at the subscriber premises.

Some portion of the satellite signal 108 also impinges on the terrestrial receive antenna 110, whether or not the satellite receive antenna 106 is present. This satellite signal 108 is detected by the terrestrial receive antenna 110 as determined by the sensitivity or gain characteristic of the terrestrial receive antenna 110 in the direction of the satellite transmitter 104, and the received power flux density level of the interfering satellite signal at the subscriber premises 114.

One approach to reduce the above-described signal interference is to use a satellite receive and terrestrial receive antennae 106 and 110 with highly directional gain characteristics. For example, U.S. Pat. No. 5,761,605 relies on the use of a satellite receive antenna 106 with a "maximum directional reception range" $d_{max}$ as measured from the satellite receive antenna center line. In this approach, the satellite receive antenna 106 is designed so that only signals inside the directional reception range can be received, and signals outside of this reception range cannot be received by the satellite receive antenna 106. The difficulty with this approach is that antennae with such characteristics are difficult to design and produce inexpensively.

Figure 2:
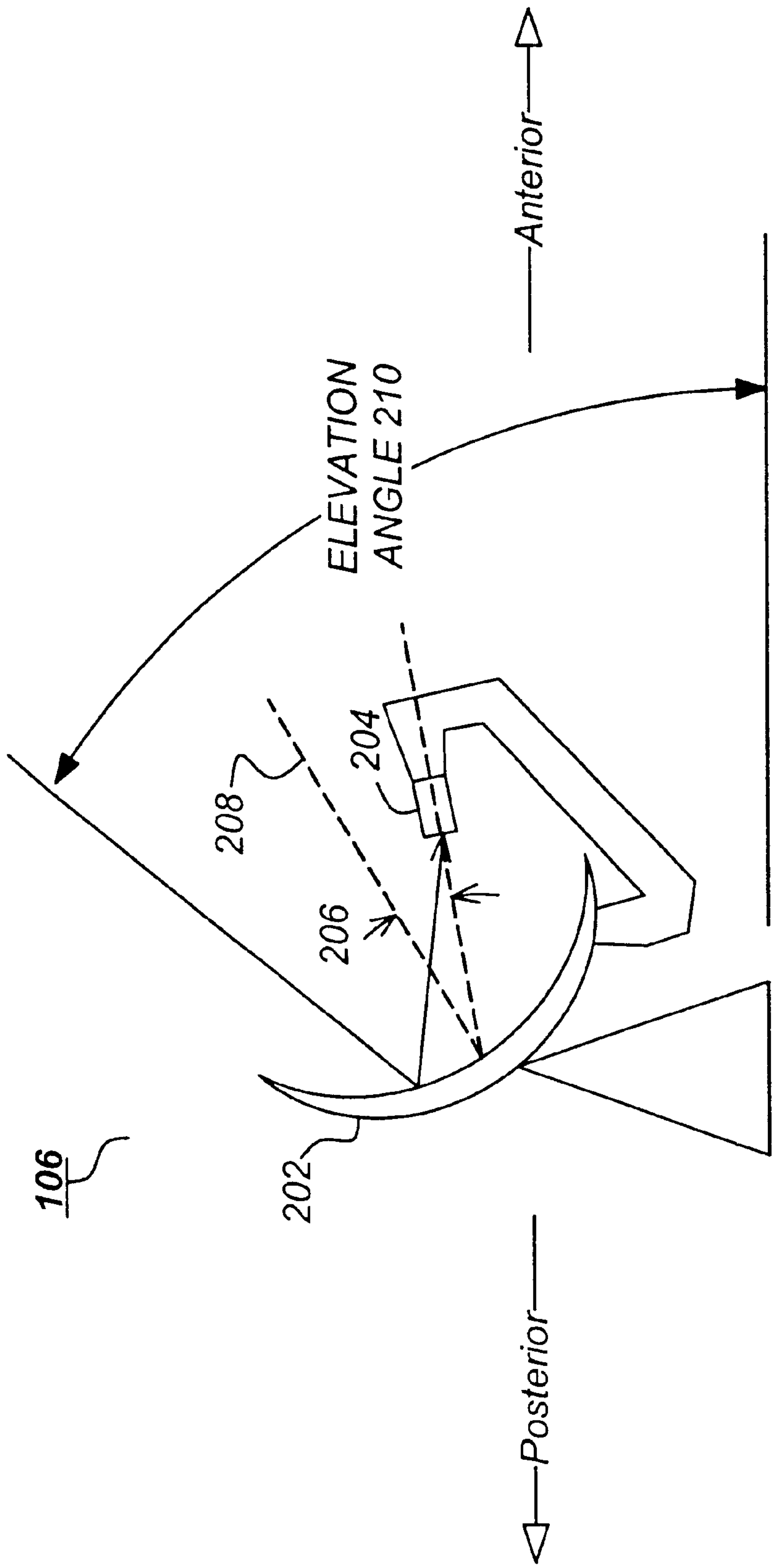
FIG. 2 is a diagram of one embodiment of the satellite receive antenna.

FIG. 2 is a diagram of one embodiment of the satellite receive antenna 106. The satellite receive antenna 106 includes a parabolic reflector 202, which reflects and focuses the energy from the satellite transmitter 104 on a low noise block converter (LNB) 204 disposed at a 22.5 degree angle 206 from the centerline 208 of the reflector 202. This angle positions the LNB 204 out of the way to minimize attenuation of the incoming signal along the antenna centerline or boresight. The shape of the parabolic reflector 202 includes a slightly ovoid shape to account for the offset.

The polar sensitivity characteristic of the satellite receive antenna 106 is a function of a number of interrelated physical and electrical antenna characteristics. These characteristics include, among other things, the sensitivity characteristics and physical location of the LNB 204 relative to the reflector 202, and the shape of the surface of the reflector 202.

For example, the LNB 204 may be disposed closer to the surface of the reflector 202, but the focus of the parabolic reflector 202 (and hence its external surface contour) must be changed to account for this modified LNB location. Further, the beamwidth of the sensitive axis of the LNB 204 must be modified to achieve the desired antenna sensitivity. Similarly, the LNB 204 may be placed farther away from the reflector 202, and other antenna 106 parameters must be modified to reflect this difference.

To maximize the antenna sensitivity along its centerline 208, it is desirable that the beamwidth of the sensitive axis of the LNB 204 be wide enough to accept signals from as much of the reflector 202 surface as possible, including the outer periphery. At the same time, if the beamwidth of the LNB 204 is too wide (exceeding the periphery of the reflector 202), spillover from behind the reflector 202 can be received by the LNB 204. In such cases, the sensitivity characteristic of the antenna 106 will include sidelobes in the posterior (rear) side of the antenna 106 having a significant sensitivity.

Figure 3A:
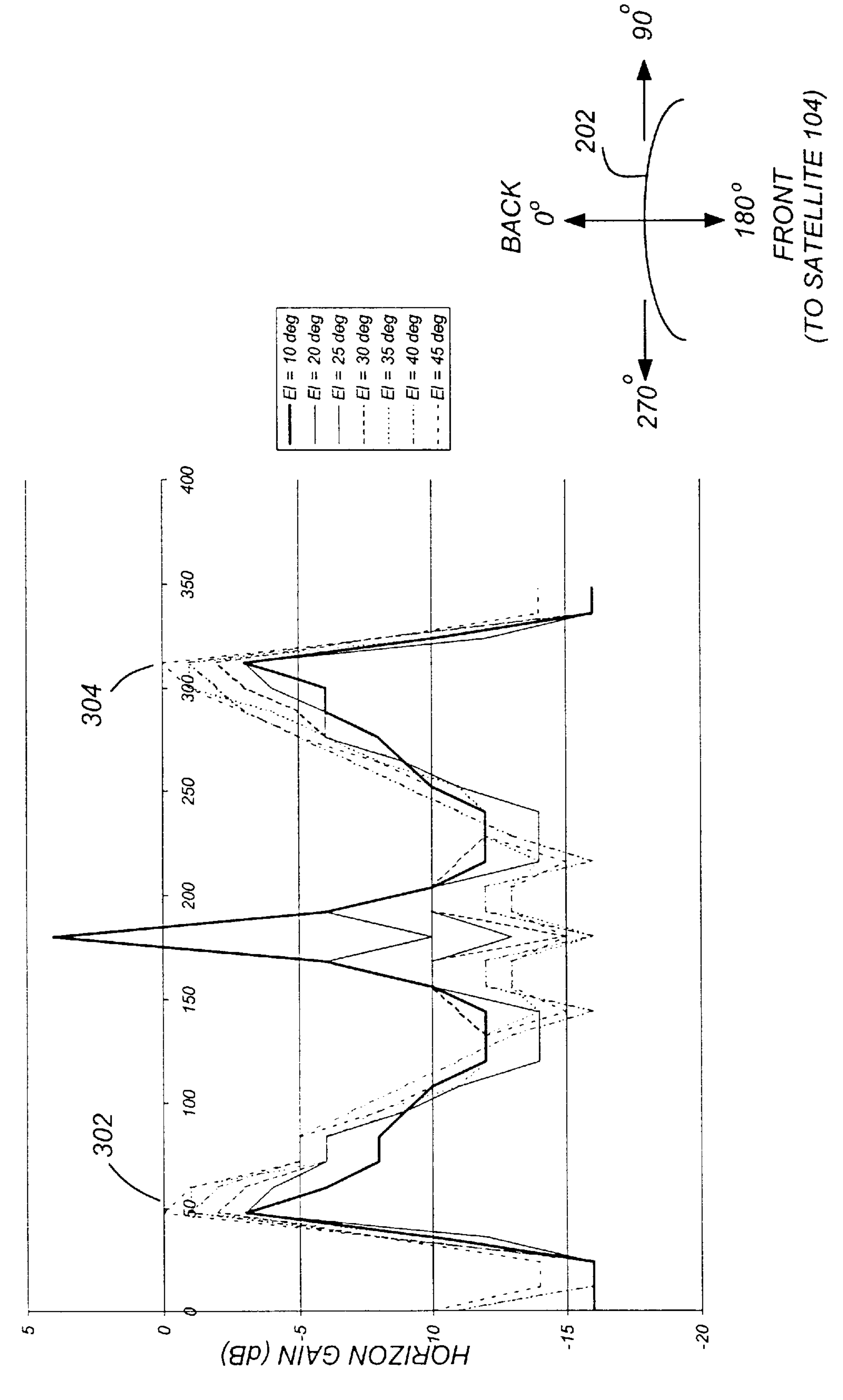

FIGS. 3A and 3B are diagrams showing a sensitivity characteristic of a representative satellite receive antenna 106, illustrating the aforementioned posterior sidelobe sensitivity. FIG. 3B is a polar plot. Each curve represents the antenna gain of the satellite receive antenna 106 at the horizon. FIGS. 3A and 3B are important when determining the amount of interference that will be received from terrestrial transmitters. Each curve shows the gain for different satellite receiver antenna 106 elevation angles. The elevation angle will change as a function of ground receive antenna location and the location of the desired satellite.

The sensitivity characteristic shown in FIGS. 3A and 3B show that for all elevation angles, the antenna gain response is relatively high for sidelobes at 302 and 304 angles of 50 degrees on either side of the back antenna centerline (at locations corresponding to approximately 50 degrees 302 and 310 degrees 304). At these angles, the antenna gain is approximately 0 dBi, due at least on part, to spillover from the LNB 204. Thus, interference sources located behind the antenna will be received by the antenna at the indicated significant gain levels.

Figure 4A:
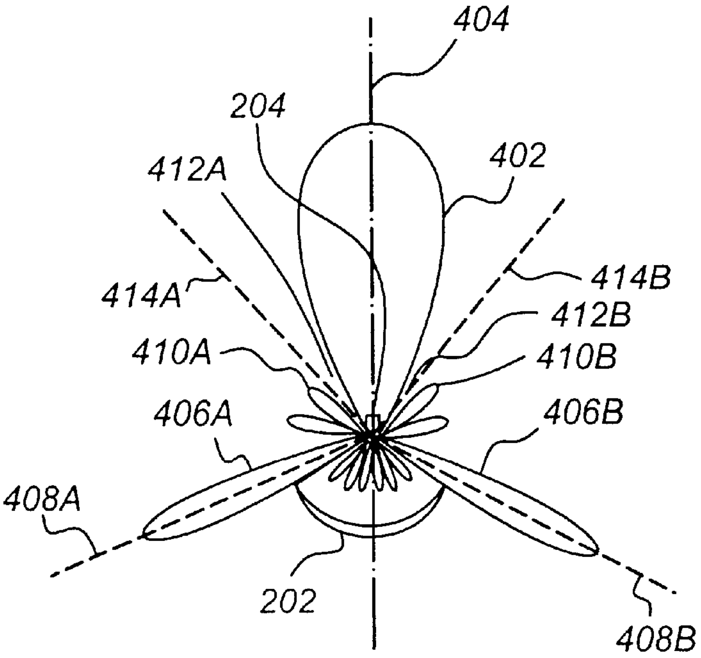
FIGS. 4A and 4B are diagrams depicting the sensitivity characteristic of a representative satellite receive antenna.
Figure 4B:
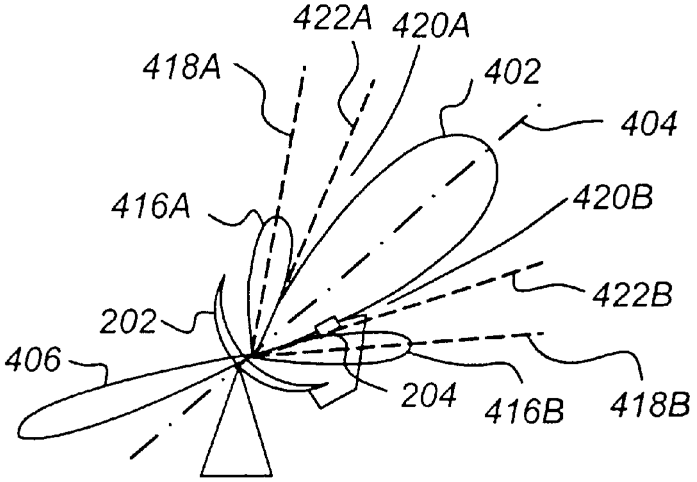

FIGS. 4A and 4B are diagrams depicting the sensitivity characteristic of a representative satellite receive antenna 106. FIG. 4A depicts an azimuthal slice of the antenna characteristic, while FIG. 4B shows a slice along the elevation direction at a zero azimuth angle.

FIG. 4A discloses an azimuthal sensitivity characteristic including an anteriorly-disposed main lobe 402 substantially aligned along a primary sensitive axis 404, and a plurality of sidelobes 410A, 410B, 406A, and 406B. Nulls such as null 412A and null 412B are disposed between the sidelobes 410A, 410B, 406A, and 406B. Nulls 412A and 412B are disposed substantially along null axes 414A and 414B. Posterior sidelobes 406A and 406B are substantially along secondary sensitive axes 408A and 408B, respectively. As described above, the posterior sidelobes 406A and 406B are the result of satellite receive antenna design compromises, resulting, among other things, in spillover from the rear of the reflector 202 to the LNB 204.

FIG. 4B discloses an elevation sensitivity characteristic including the main lobe 402, sidelobes 416A and 416B substantially along sidelobe axes 418A and 418B. Nulls 422A and 422B are disposed along null axes 422A and 422B, respectively, between the main lobe 402 and the sidelobes 416A and 416B, as well as between other sidelobes not illustrated. The depictions of the main 402 and sidelobes in FIGS. 4A and 4B above are intended to be representative depictions of the polar sensitivity characteristic of a satellite receive antenna 106 by which the present invention may be practiced. The present invention could be practiced with antennae having sensitivity characteristics with different lobes and null patters with suitable modification.

Figure 5:
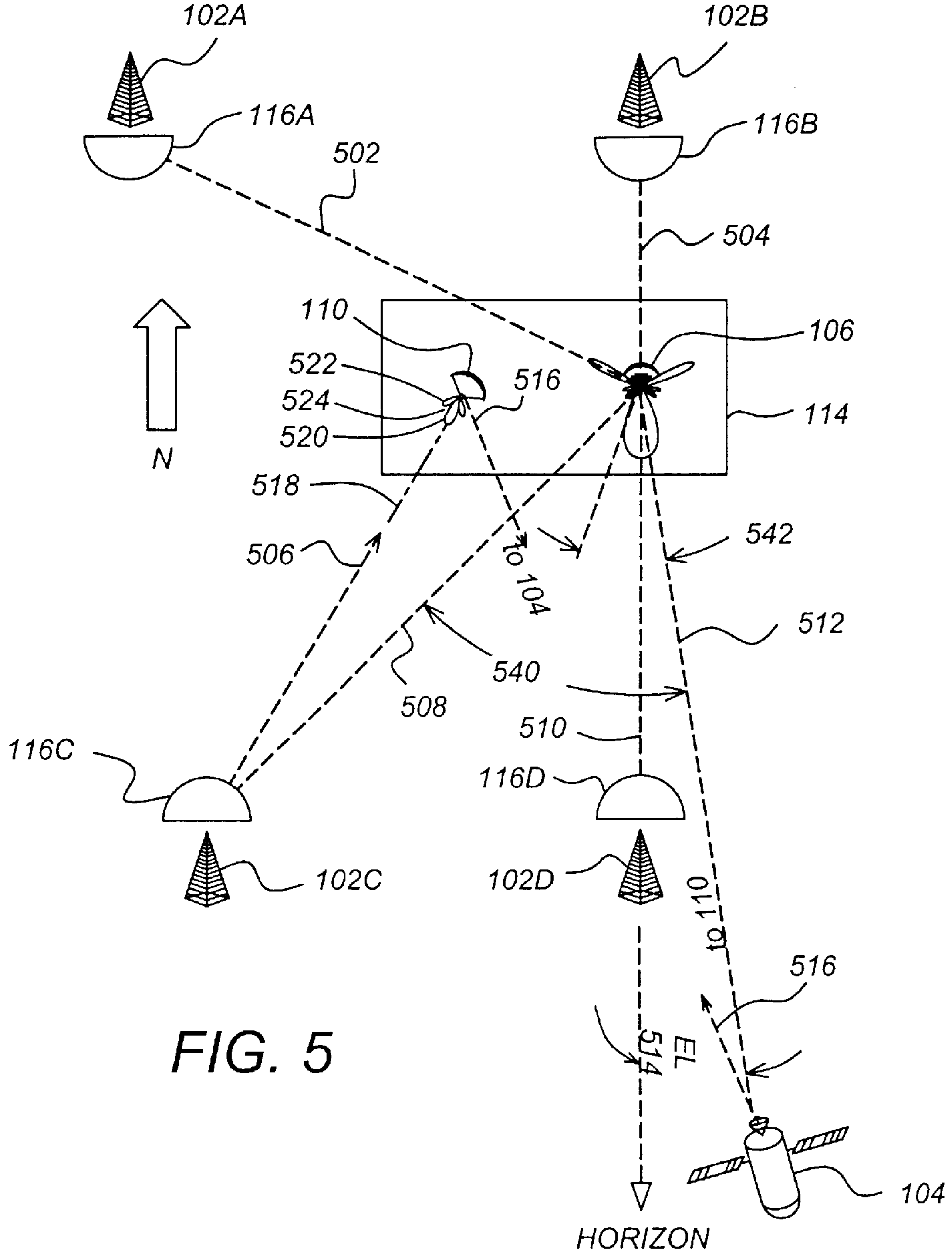
FIG. 5 is a diagram illustrating the application of a foregoing satellite receive antenna in a channel sharing broadcast system.

FIG. 5 is a diagram illustrating the application of a satellite receive antenna 106 with the foregoing characteristics in a channel sharing broadcast system. As can be seen in FIG. 5, antennae with the foregoing sensitivity characteristics are unusable with the system disclosed in the Tawil disclosure, because the terrestrial transmitters 102 are placed behind the satellite receive antennae 106 where they will impinge on the posteriorly-directed satellite receive antenna sidelobes 408A and 408B (i.e. interfering signals broadcast from terrestrial transmitter along path 502). Consequently, the Tawil system requires a satellite receive antenna that has no significant posterior sidelobes 406. This can be accomplished by designing the satellite receive antenna with a narrower beamwidth LNB feed portion (and hence, reduced sensitivity), a resized or reshaped antenna reflector 202, or other costly modification. Such modification will likely result in a loss of satellite receive antenna 106 performance (for example, reduced sensitivity or greater main lobe beamwidth). The present invention avoids this difficulty by advantageous disposition of the terrestrial transmitter 102, as described herein.

Returning to FIGS. 3A and 3B, for an interference source located in front of the satellite receive antenna 106, the worst case or highest relative gain at the horizon (where a terrestrial transmitter 102 would be located) occurs at angles very close to the front antenna centerline 208 (reference angles depicted in FIGS. 3A and 3B as near 180 degrees). Note, however, that the gain values near reference angles of 180 degrees are only troublesome for an elevation angle of about 10 degrees (or, equivalently, 10 degrees below the front antenna centerline 208). That is, at an elevation angle of 10°, the gain of the antenna at a 180° reference angle (the front of the antenna) is greater than the gain at reference angles of about 50° (at 312) and at about 310° (at 304). At higher elevation angles, the gain of the satellite receive antenna at the 180° reference angle is in fact significantly lower that the gain seen off the back of the antenna at the 50° and 310° reference angles. This is because at sufficiently high elevation angles, the interfering source is being received at an angle sufficiently far away from the main beam of the antenna that there is sufficient isolation. At elevation angles of 10 degrees and below, the interfering source is within the main lobe of the antenna and isolation becomes poor.

For satellite receive antennae 106 with the foregoing characteristics, the interference regions for all but the lowest elevation angles is reduced when the terrestrial transmitter 102 or other interference source is located in front of the satellite receive antenna 106, not behind the satellite receive antenna 106 as is the case with the high-directivity antennae used in the Tarwil patent.

FIG. 5 also depicts a channel sharing system which is usable with satellite receive antennae 106 without a highly directive monocular antenna gain characteristic. Here, terrestrial transmitter 102C having azimuthal gain characteristics 116C broadcasts the second signal along path 506 to the terrestrial receive antenna 110, as desired. The terrestrial receive antenna 110 includes a primary sensitive axis 518 defined by the terrestrial receive antenna main lobe 520, which is directed substantially at the terrestrial transmitter 102C. The terrestrial receive antenna 110 also includes one or more sidelobes 522 with null regions 524 between the main lobe 520 and the sidelobes 522. Typically, there are a plurality of sidelobes 522 on either side of the main lobe 520, each having additional nulls or null regions therebetween.

Unfortunately, the terrestrial transmitter 102C also transmits the second signal to the satellite receive antenna 106 along path 508. However, in this channel sharing system, the terrestrial transmitters 102A–102D (hereinafter alternatively referred to as terrestrial transmitter(s) 102) are disposed so that the offset angle 540 of their transmissions from the axis defined by the path 512 are greater than a particular offset angle 542 from the axis defined by path 512. This offset angle (which can be defined in terms of an elevation component and an azimuth component) depends on the beamwidth of the main lobe of the satellite receive antenna 106. So long as the terrestrial transmitters are disposed so that the offset angle in azimuth and elevation is greater than the effective beamwidth of the satellite receive antenna 106, sufficient isolation can be realized. It is also noted that, for the continental United States (CONUS), these low elevation angles are only associated with two narrow azimuth ranges, one near 105° (almost due East), and one near 225° (almost due West). Conversely, the significant posterior side lobes are a significant factor over a much wider azimuth range.

In one embodiment of the invention, the terrestrial transmitter can be disposed anywhere in front of the satellite receive antenna 106 (including directly in front of it), so long as a minimum elevation angle is maintained. When the sensitivity characteristic of the satellite receive antenna 106 in the direction of terrestrial transmitter 102C is either in a null or in one of the low sensitivity lobes, the second signal is greatly attenuated when compared to the signal received from the satellite transmitter 104, thus providing improved isolation between the first signal from the satellite transmitter 104 and the second signal from the terrestrial transmitter 102C. Similarly, terrestrial transmitter 102D, also undesirably transmits the second signal to the satellite receive antenna 106. However, since the satellite receive antenna 106 is elevated by elevation angle 514, terrestrial transmitter 102D is substantially aligned with null axis 422B, and thus, within null 420B. Hence, the signal from terrestrial transmitter 102D transmitted along path 510 is sufficiently attenuated so that the second signal from the terrestrial transmitter 102D does not interfere with the first signal transmitted along path 512. The main lobe 402 (and hence the primary axis 404), however, is substantially aligned with the path 512 to the satellite transmitter 104. Hence, the satellite receive antenna 106 will receive a strong signal from this source.

Hence, unlike the system disclosed in the Tawil patent, which requires the use of a satellite receive antenna 106 with a highly directive monocular antennae gain characteristic, the present system is usable with a satellite receive antenna 106 described by a sensitivity characteristic which may include significant posteriorly-disposed sidelobes. Since transmission paths (508 and 510) from all of the potentially interfering transmitters (102C–102D respectively) are at sufficient offset angle (determined by the combination of the azimuth offset component and the elevation offset component of the angle between the satellite receive antenna 106 and the terrestrial transmitter 102), interference is minimized.

As can be seen by the foregoing, all but the lowest elevation angles create smaller interference zones when the interference source is located in front of, and not behind, the satellite receive antenna 106. For the Northern Hemisphere, this means that the preferred direction for a potentially interfering terrestrial transmission is from a southerly direction so that the transmissions are received on the anterior side (but below the main beam 402) of the satellite receive antenna 106.

This technique can be applied in either hemisphere. For example, for use in the Southern Hemisphere, the terrestrial transmission system is designed to transmit in a southerly direction so that the interference source is in front of the satellite receive antennas which face north. This concept is also extendable to use with other overlapping transmission channels where there is a desire to minimize interference between terrestrial transmissions and satellite transmissions.

In one embodiment of the present invention, elevation angle 514 is selected to be at least approximately 10 degrees. This value provides a reasonable angular distance from the main lobe, while making the most of the transmitting satellite coverage. For 45 cm diameter satellite receive antennae 106, elevation angles below 10 degrees are at the edge of coverage for a satellite transmitter 104 because the satellite receive antennae 106 appear (from the satellite transmitter's perspective) to be very close to the limb of the Earth.

In another embodiment of the present invention, the terrestrial receive antenna 110 can also be described by a polar sensitivity characteristic having lobes and nulls. The terrestrial receive antenna 110 can be aligned so that one of the nulls of the terrestrial receive antenna is substantially aligned with an axis 516 between the terrestrial receive antenna 110 and the satellite transmitter 104, while a lobe (preferably the main lobe) of the terrestrial receive antenna is substantially aligned with an axis 506 between the terrestrial receive antenna 110 and the terrestrial transmitter 102C.

Satellite transmitters 104 are typically designed such that the transmitted power levels fall off from higher to significantly lower values at the edge of the primary coverage area, allowing transmitted power to be concentrated on this primary coverage area. Because of this reduced transmitted power at edge of coverage, larger (and typically more expensive) ground receive antennas are required to receive these signals. These larger antennas have greater gain and smaller beamwidths. Thus, they provide increased isolation to in-line terrestrial transmitters relative to the isolation that could be achieved with 45 cm antennas. This improved isolation compensates for the reduced vertical separation angle between any in-line terrestrial transmitters and the beam peak, and should tend to maintain the advantage of northerly directed transmissions over southerly-directed transmissions for some range of elevation angles below 10 degrees.

As described above, the present invention describes a system which can cooperatively share the current Broadcast Satellite Service (BSS) frequency bands to allow additional programming material to be transmitted to BSS users or subscribers using the same frequency bands as currently used by BSS satellites. Further, the present invention achieves this goal without requiring expensive specially designed satellite receive antennae 106.

Although not necessary to practice the present invention the terrestrial receive antenna 110 may be disposed proximate the satellite receive antenna 106. For example, the terrestrial receive antenna 110 and the satellite receive antenna 106 may be attached to the same support structure, or installed on different portions of the customer's residence. However, it is noted that in the general case, the transmit receive antenna 110 will be used by different customers than the satellite receive antenna 106, and generally, will not be located proximate the satellite receive antenna.

Interference Comparison Between Southerly-Directed Terrestrial Transmissions and Northerly-Directed Terrestrial Transmissions FIG. 5 presents two terrestrial transmission systems. The first (southerly transmitting) system includes transmitters 102A and 102B on a posterior side of the satellite receive antenna 106 to transmit the second signal to the terrestrial receive antenna 110, whereas the second (northerly transmitting) system includes transmitters 102C and 102D on an anterior side of the satellite receive antenna 106 to transmit the second signal to the terrestrial receive antenna 110).

A useful yardstick to measure the performance of the two systems depicted in FIG. 5 is to determine the size of the interference zones for each system. In this context, the interference zone is defined as the minimum separation distance that must be maintained between the terrestrial transmitter 102 and the satellite receive antenna 106 in order to maintain a pre-defined level of interference between the signals. While the present invention reduces the size of these "interference zones," they are not entirely eliminated. Hence, even with the substantially improved performance offered by the present invention, satellite communications will be negatively affected by the use of the channel-sharing terrestrial transmission system. An interference zone analysis is presented below.

Figure 6:
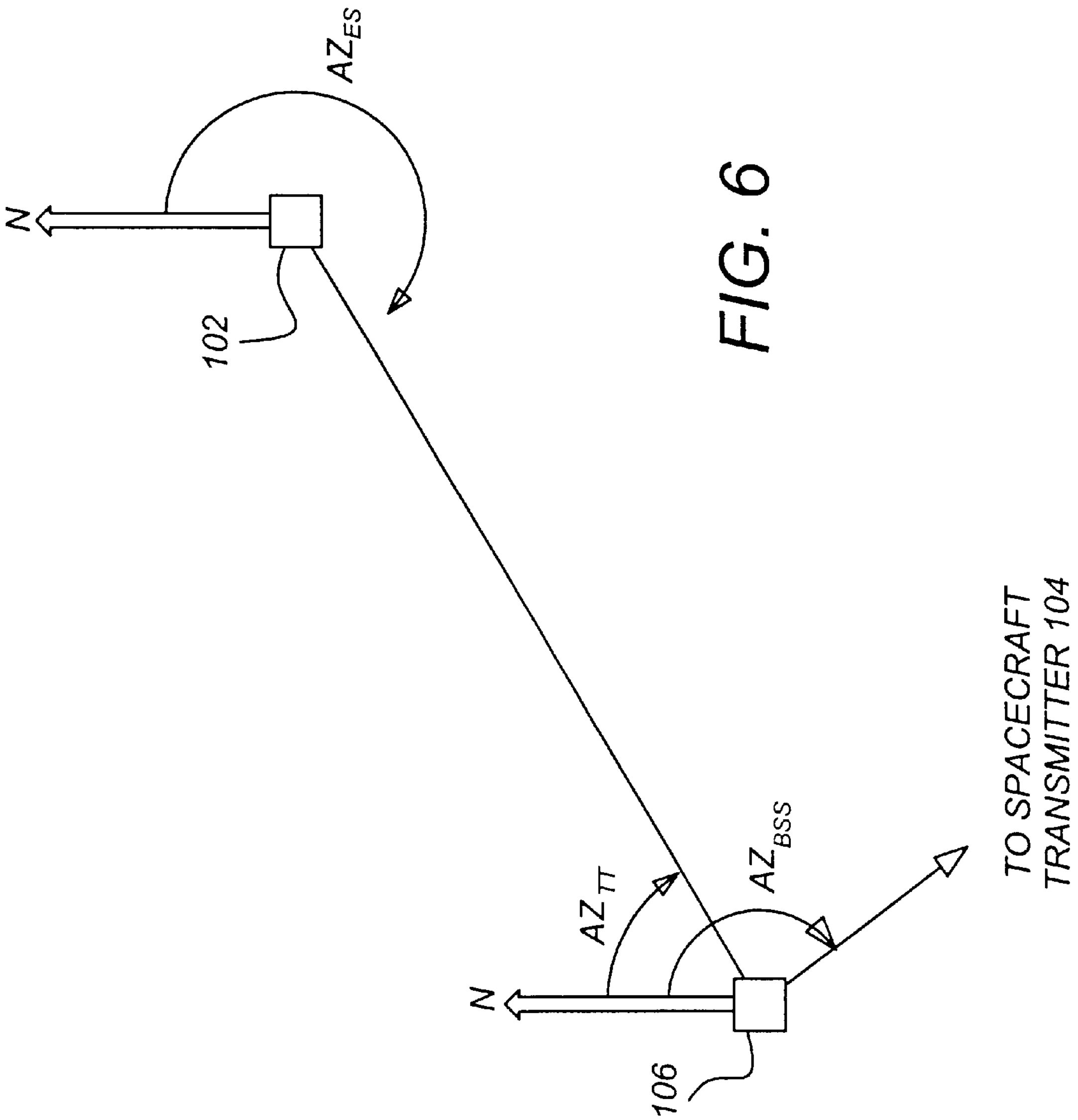
FIG. 6 is an illustration showing a coordinate system.

FIG. 6 is an illustration showing a coordinate system used in the calculations for the example that follows. Here, $Az_{ES}$: Azimuth angle from the terrestrial transmitter 102 to the satellite receive antenna 106. This is shown in column B of Tables 1, 4, and 7, and column O of Tables 5 and 7.

$Az_{TT}$: $Az_{TT}=Az_{ES}-180°$ $Az_{BSS}$: Azimuth angle of the satellite transmitter 104 from the satellite receive antenna 106. This is shown in "Sat Az Angle" (Row 110) of Table 1.

$d_{ES}$: Satellite receive antenna 106 to terrestrial transmitter 102 separation distance. This is shown in Table 2, rows 2, 3, and 6, and Table 4, row 11.

In order to calculate the size of interference zones for both a northerly transmitting system and a southerly transmitting system, it is important to determine for each possible azimuth angle to the terrestrial source the worst case gain of the satellite receive antenna 106. The satellite receive antenna 106 must be protected from interference when it is pointing to any visible portion of the geosynchronous arc down to some minimum elevation angle.

Figure 7A:
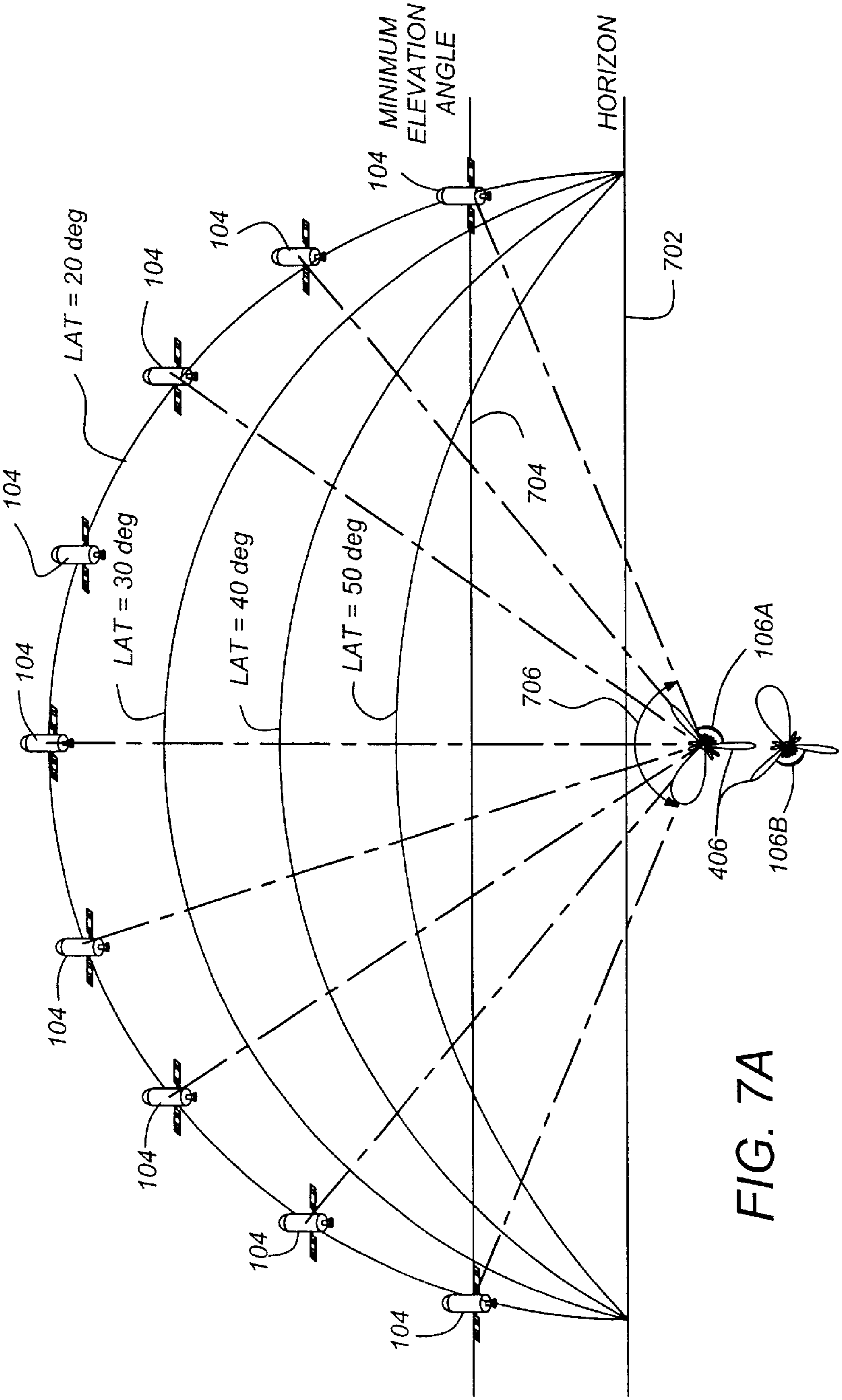
FIG. 7A is a diagram showing a geometrical relationship between a satellite receive antenna and a plurality of satellite transmitters in a geosynchronous orbit around the Earth.

FIG. 7A is a diagram showing a geometrical relationship between a satellite receive antenna 106 and a plurality of satellite transmitters 104 in a geosynchronous orbit around the Earth. To enable line-of-sight communications, the satellite transmitter 104 must be above the horizon 702. Additionally, to account for atmospheric attenuation, terrestrial obstructions and other effects, there is a minimum elevation angle 704 below which communications between the satellite transmitter 104 and the satellite receive antenna 106 are effectively precluded. The maximum elevation of the arc of the geosynchronous orbit of the satellites 104 depends upon the latitude of the satellite receive antenna 106 location. At lower latitudes (e.g. those near the Tropic of Cancer), the satellite transmitter 104 may be disposed at a high elevation angle, while at higher latitudes (those near the Arctic Circle), the satellite transmitter 104 may never be far from the horizon 702. As can be seen, each satellite receive antenna can be expected to be directed at any of the satellite transmitters 104.

Figure 7B:
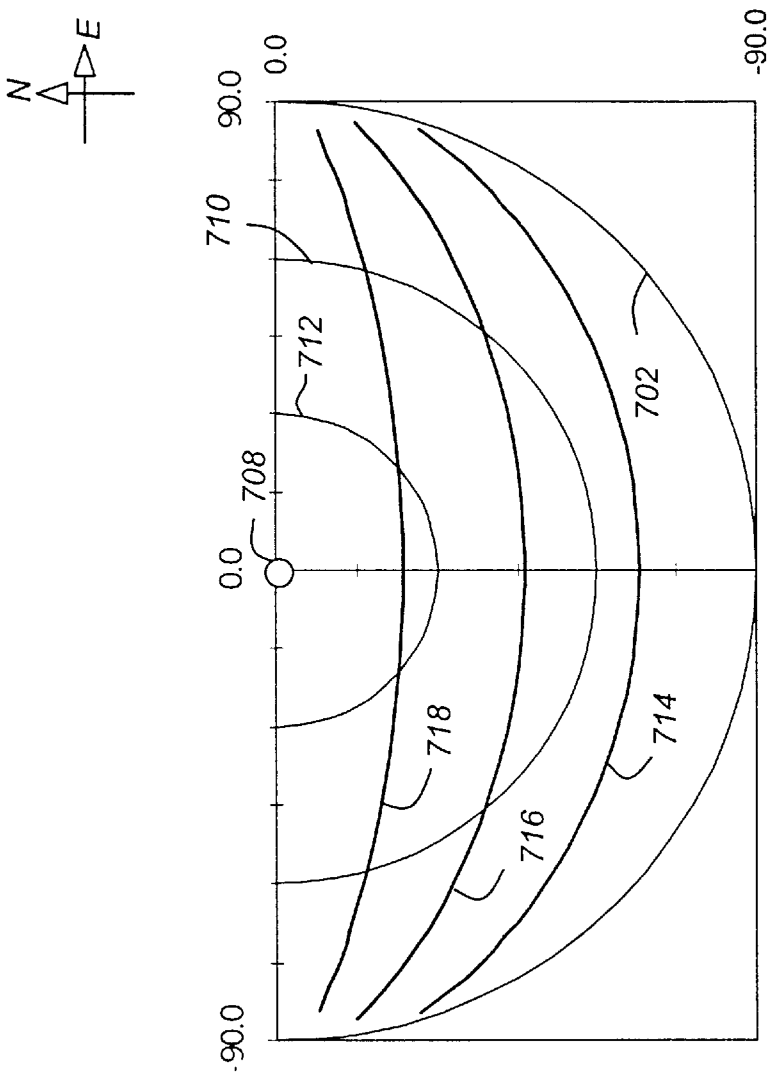
FIG. 7B is a plot of the azimuth and elevation view angles toward the geosynchronous arc at different satellite receive antenna location latitudes.

FIG. 7B is a plot of the azimuth and elevation view angles toward the geosynchronous arc at different satellite receive antenna 106 location latitudes. These view angles were computed using equations (4) and (5) above. In FIG. 7B, the horizon is represented by the outside semicircle 702, and the center point 708 represents the sky directly overhead the satellite receive antenna 106. Semicircle 710 and 712 represent elevation angles of 60° and 30°, respectively. Plots 714, 716, and 718 indicate views of the geosynchronous arc for a satellite receive antenna 106 located at 60°, 40°, and 20° North latitude, respectively.

For each possible geometric alignment of the terrestrial transmitter 102, satellite receive antenna 106 and satellite transmitter 104, the worst case (highest satellite receive antenna 106 gain sensitivity at the horizon in the direction of the terrestrial transmitter 102) is calculated. This is equivalent to the maximum gain of the satellite receive antenna 106 at the horizon 702 at any given azimuth angle 706 from an easternmost elevation angle (e.g. with the satellite receive antenna disposed as in 106A) to a westernmost minimum elevation angle (e.g. with the satellite receive antenna disposed as in 106B), thus providing the worst case potential for interference for all possible orientations of the satellite receive antenna 106. This result can be used to compute a minimum separation distance to determine the interference zones, and also to quantify the required azimuthal transmission characteristic of the terrestrial transmitters.

Figure 8:
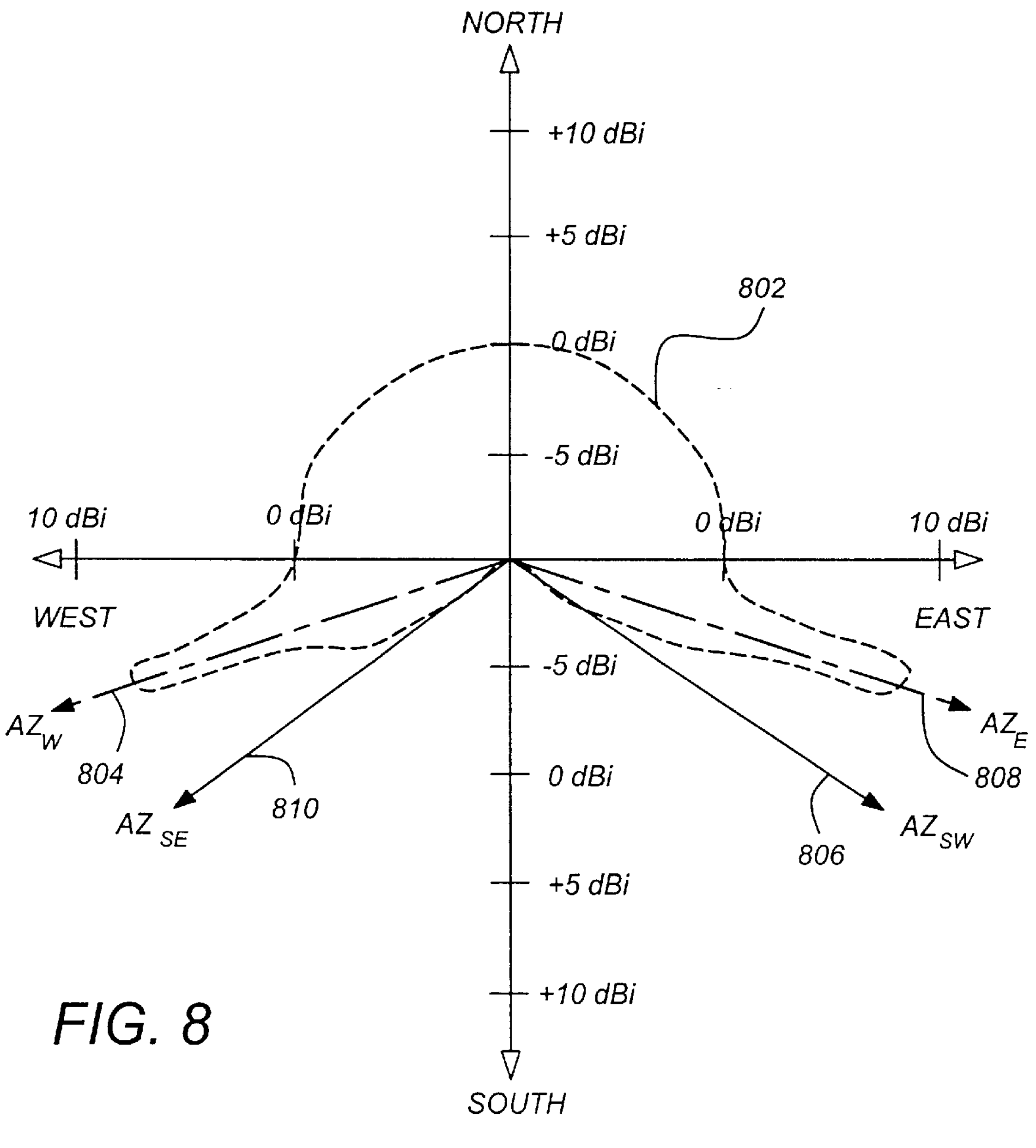
FIG. 8 is a diagram of the generalized maximum gain of a typical satellite receive antenna at the horizon as the azimuth angle of the satellite receive antenna is swept across a geosynchronous arc.

FIG. 8 is a diagram of the generalized maximum gain of a typical satellite receive antenna 106 at the horizon as the azimuth angle of the satellite receive antenna 106 is swept from position 106A to 106B. $AZ_E$ 808 represents the easternmost satellite receive antenna 106 pointing angle in the Northern Hemisphere for a given minimum elevation. $AZ_W$ 804 represents the westernmost antenna pointing in the Northern Hemisphere for the same minimum elevation. $AZ_{SW}$ 806 represents the azimuthal direction of the highest gain for a posterior spillover lobe 406 when the main lobe 402 is aligned along $AZ_W$ 804. $AZ_{SE}$ 810 is the azimuthal direction of the highest gain for a posterior spillover lobe 406 when the main lobe 402 is aligned along $AZ_E$ 808. Note that the angular location of the gain characteristic 802 of the posterior satellite receive antenna lobes 406 causes a unique characteristic in which the greatest isolation from terrestrial transmissions is in the southerly direction, at an angles from $AZ_{SE}$ 810 to $AZ_{SW}$ 806.

Figure 9A:
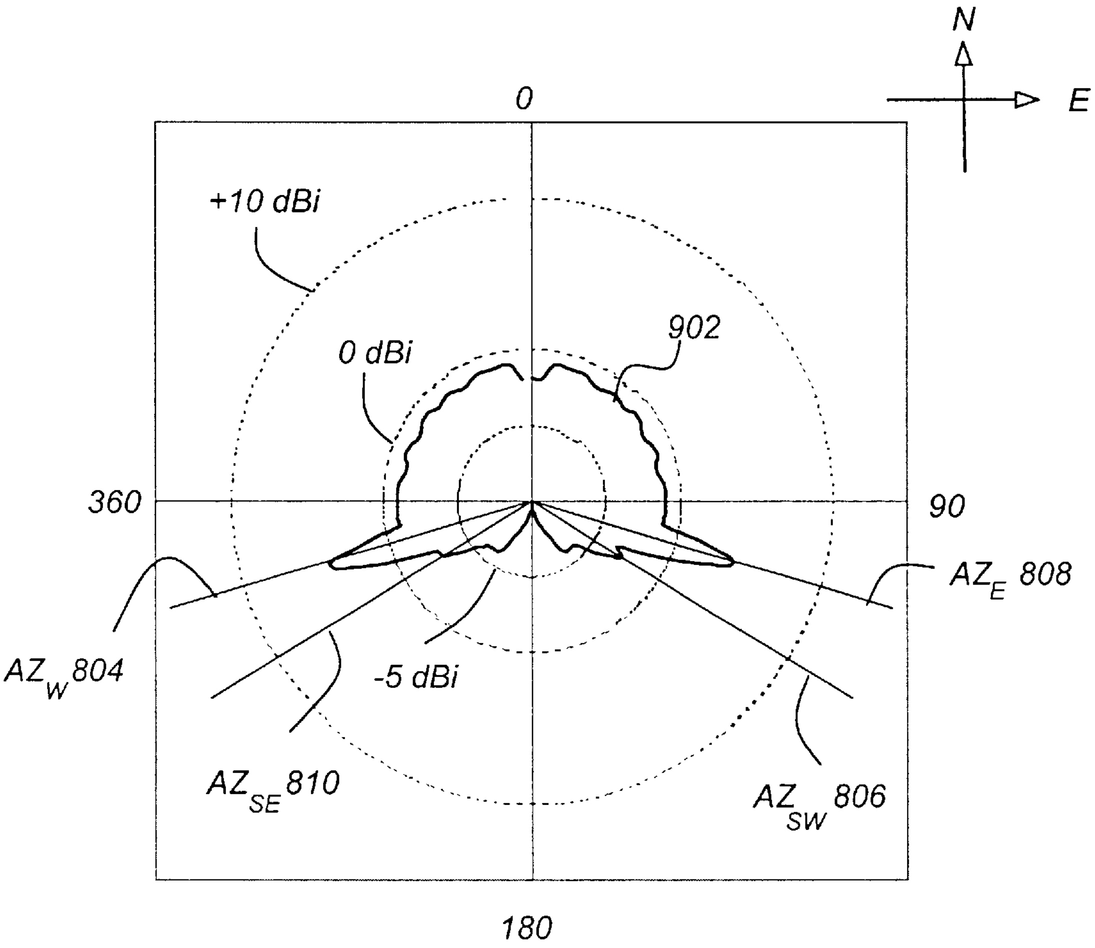
FIGS. 9A–9D are plots of the worst case satellite receive antenna gain at the horizon for different satellite receive antenna latitudes.

FIG. 9A is a plot of the worst case satellite receive antenna 106 gain at the horizon 702 for a satellite receive antenna 106 at a location at 40° N latitude, and for a minimum elevation angle of 10° above the horizon 702. The approximate values for $AZ_E$ 808, $AZ_{SW}$ 806, $AZ_{SE}$, 810 and $AZ_W$ 804 are as follows:

$AZ_E=106.4°$ $AZ_{SW}=121.6°$ $AZ_{SE}$=238.4°

$AZ_W$=253.6°

Figure 9B:
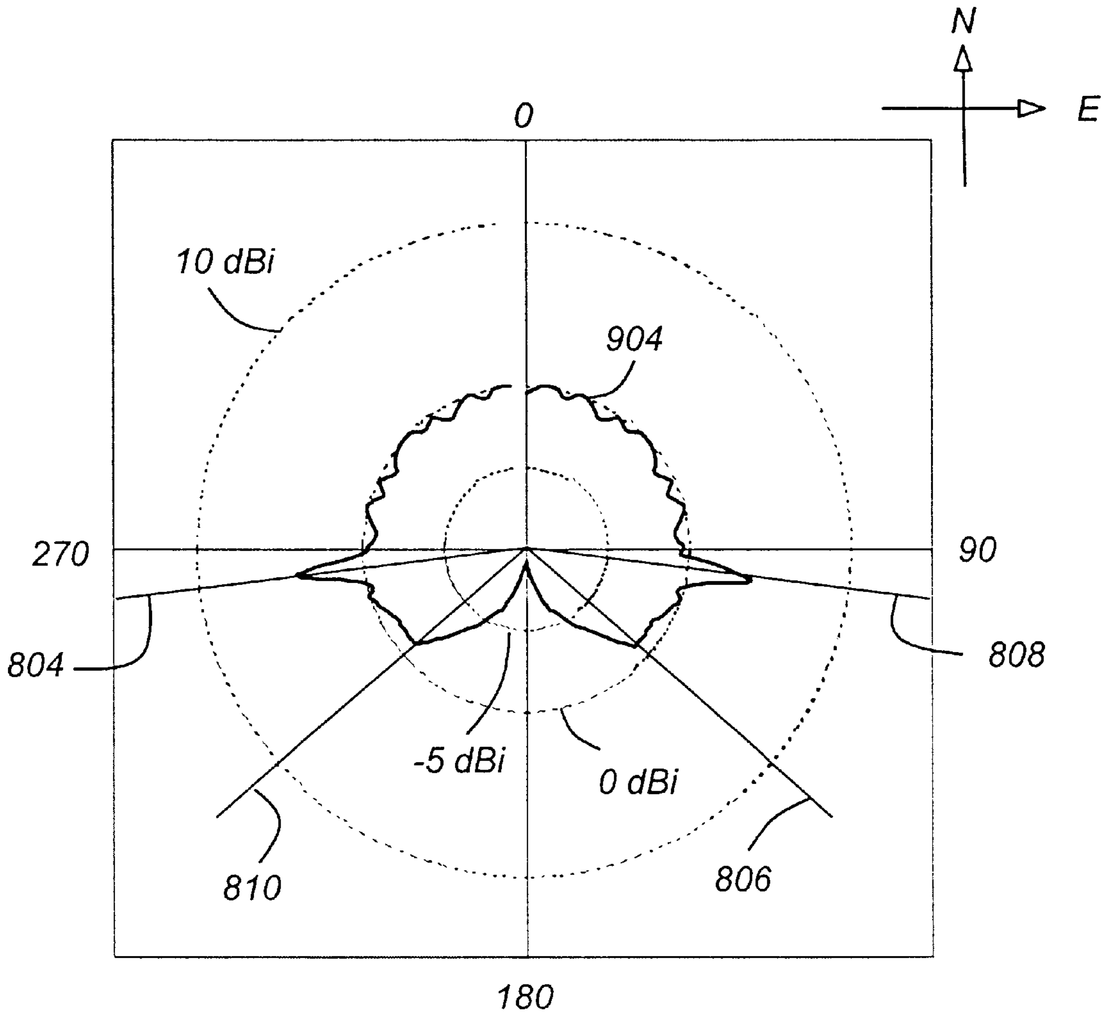

FIG. 9B is a plot of the worst case satellite receive antenna 106 gain at the horizon 702 for a satellite receive antenna 106 at a location at 20° N latitude, and for a minimum elevation angle of 10° above the horizon 702. The approximate values for $AZ_E$ 808, $AZ_{SW}$ 806, $AZ_{SE}$, 810 and $AZ_W$ 804 are as follows:

$AZ_E$=97°

$AZ_{SW}$=131°

$AZ_{SE}$=229°

$AZ_W$=263°

Figure 9C:
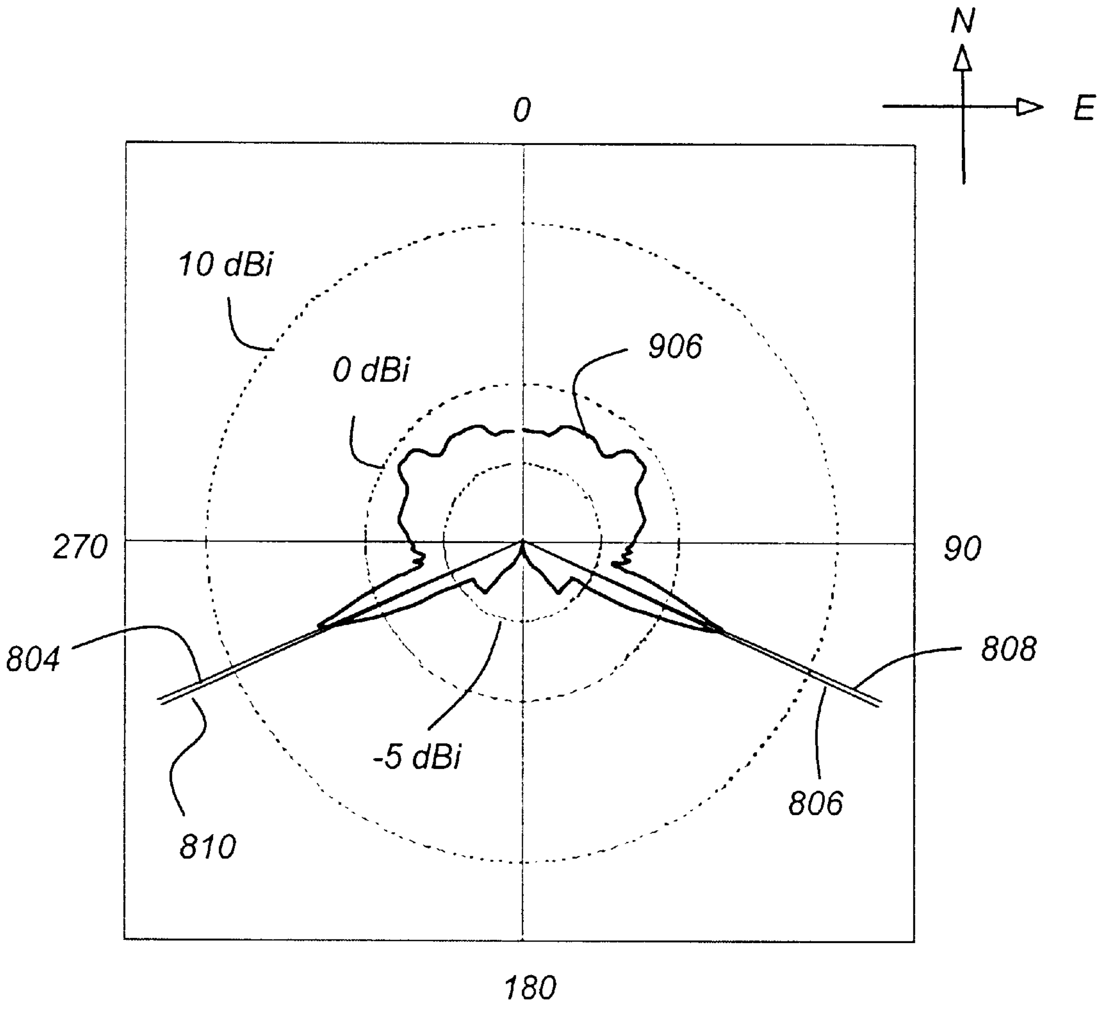

FIG. 9C is a plot of the worst case satellite receive antenna 106 gain at the horizon 702 for a satellite receive antenna 106 at a location at 50° N latitude, and for a minimum elevation angle of 10° above the horizon 702. The approximate values for $AZ_E$ 808, $AZ_{SW}$ 806, $AZ_{SE}$, 810 and $AZ_W$ 804 are as follows:

$AZ_E$=113.6°

$AZ_{SW}$=114.4°

$AZ_{SE}$=245.6°

$AZ_W$=246.4°

Figure 9D:
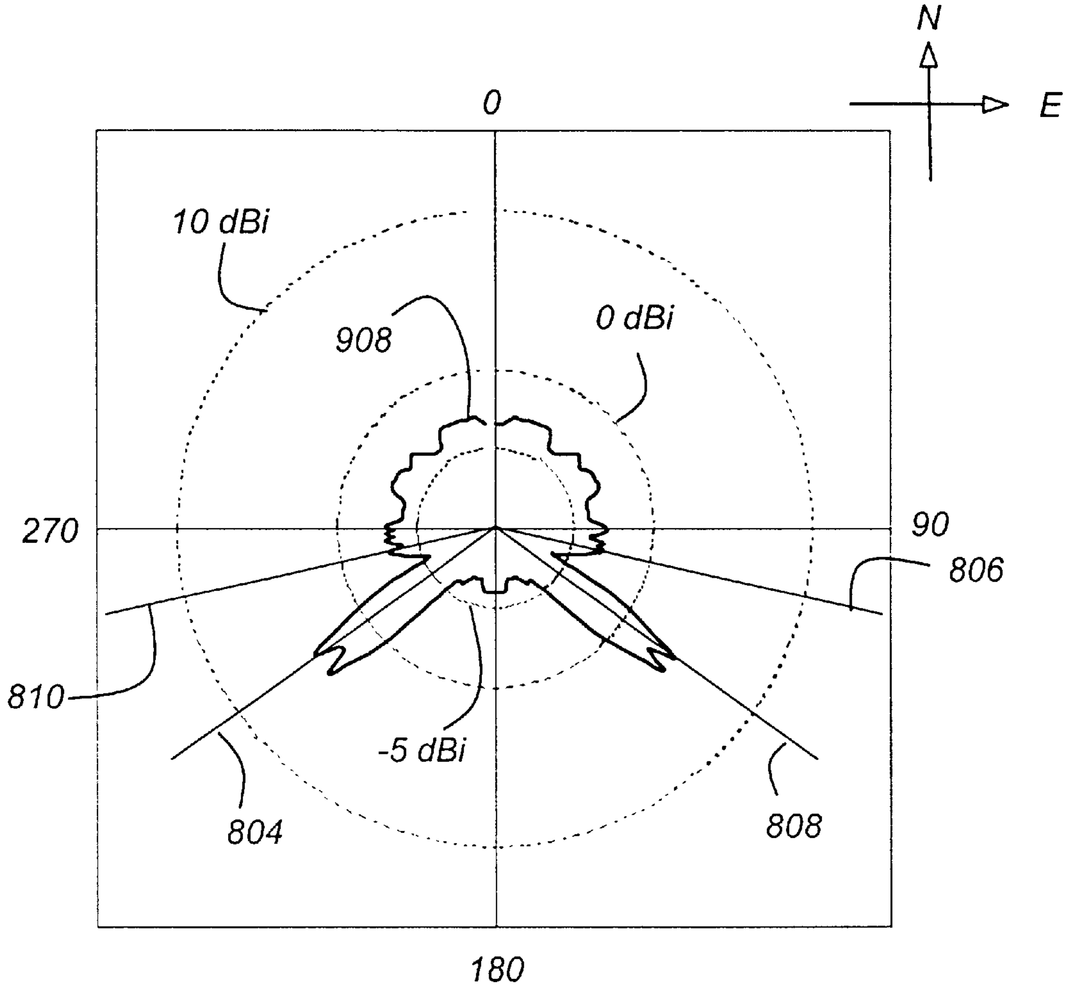

FIG. 9D is a plot of the worst case satellite receive antenna 106 gain at the horizon 702 for a satellite receive antenna 106 at a location at 60° N latitude, and for a minimum elevation angle of 10° above the horizon 702. The approximate values for $AZ_E$ 808, $AZ_{SW}$ 806, $AZ_{SE}$, 810 and $AZ_W$ 804 are as follows:

$AZ_E$=125.5°

$AZ_{SW}$=102.5°

$AZ_{SE}$=257.5°

$AZ_W$=234.5°

These results were generated using the sensitivity characteristic for a typical offset feed parabolic reflector 45 cm satellite receive antenna 106, having the characteristics shown in FIGS. 3A and 3B. Table 1, presented in the appendix, illustrates the computations used to generate the results shown in FIGS. 9A–9D. The last three columns of Table 1 (labeled AL, AM, and AN), describe the maximum horizon gain of the satellite receive antenna 106 for minimum elevation angles restricted to 15, 10, and 5 degrees, respectively. This calculation is performed as a function of both the relative difference in longitude between the location of the satellite receive antenna 106 and the location of the satellite transmitter 104, and the relative azimuth angle from the terrestrial transmitter 102 to the satellite receive antenna 106 ($Az_{ES}$).

Each interior column in Table 1 represents a specific longitudinal difference between the location of the satellite receive antenna 106 and satellite transmitter 104. The elevation angle from the satellite receive antenna 106 to the satellite transmitter 104 is different for each column, and the value is shown in degrees at the bottom of the Table. Each interior row in Table 1 represents a different azimuth angle from the terrestrial transmitter 102 towards the satellite receive antenna 106.

The entry at the intersection of each interior row and column represents the horizon gain of the satellite receive antenna 106 as calculated for a particular geometry and for a particular elevation angle to the satellite transmitter 104. Rows 110 and 111 in Table 1 provide the particular azimuth and elevation angles in degrees. For the purposes of example, the horizon gain is chosen from the horizon gain antenna pattern closest in elevation angle to the true elevation angle.

The worst case (maximum) horizon gain for each row (i.e., each selected azimuth angle from the terrestrial transmitter 102) is then noted and recorded in the rightmost columns of the Table (columns AL-AN). This is the gain value that is used in the separation distance calculation to protect reception of a satellite receive antenna 106 to all considered locations of satellite transmitters located along that particular radial line from the terrestrial transmitter 102.

From FIG. 9A, it is apparent that the maximum satellite receive antenna 106 gain is minimized for northerly directed terrestrial transmitter 102 transmissions between the angles $AZ_{SE}$ 810 and $AZ_{SW}$ 806. Note that over a significant angular range, the maximum gain values for northerly directed terrestrial transmissions are significantly lower than are seen for southerly directed transmissions, providing increased isolation to interference sources.

Table 2 illustrates the terrestrial transmitter 102 vertical (elevation) sensitivity characteristic, which is used in the calculations that follow.

Interference Analysis for a Southerly-Transmitting Terrestrial Transmitter

Figure 10:
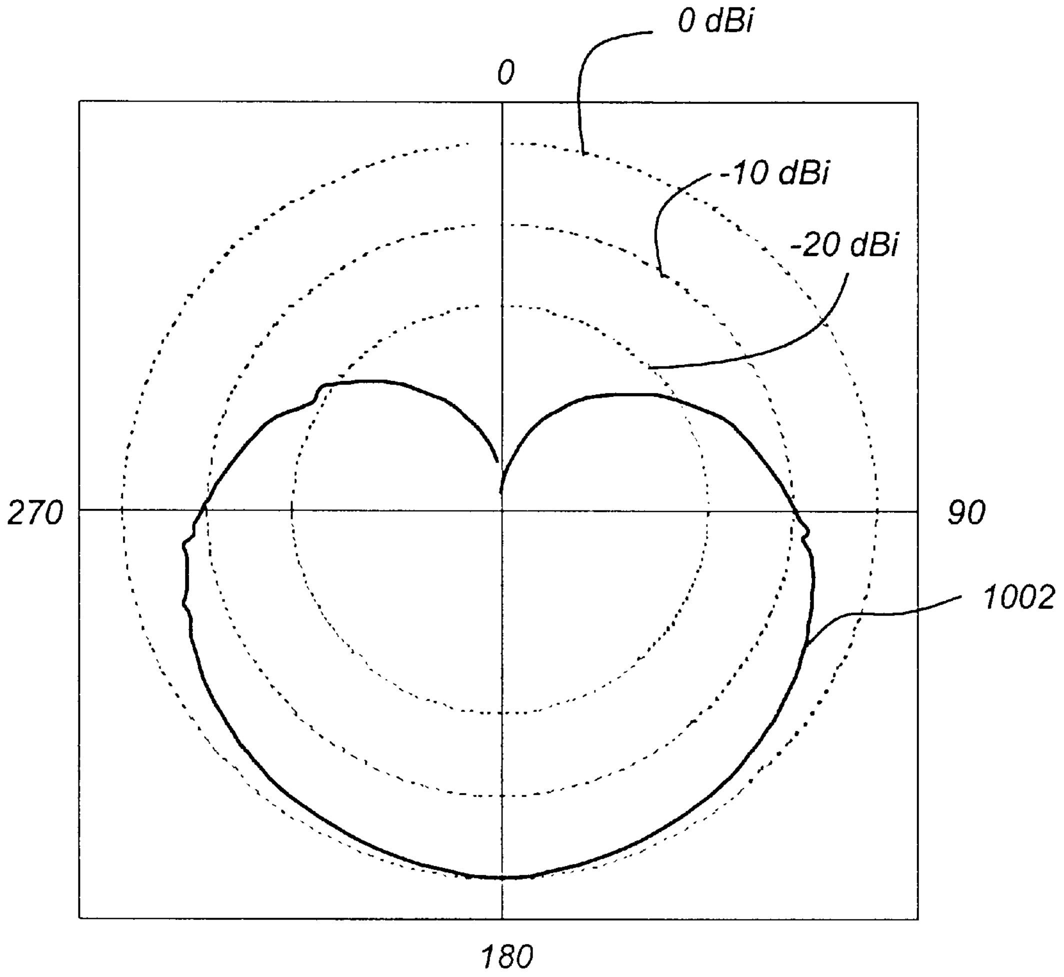
FIG. 10 is a plot of a horizontal sensitivity characteristic for an exemplary Southerly-transmitting terrestrial transmitter.

FIG. 10 is a plot of the horizontal (azimuthal) sensitivity characteristic 1002 for a southerly-transmitting terrestrial transmitter 102. This sensitivity characteristic is analogous to the sensitivity characteristics 116A and 116B of FIG. 5.

Table 3 presents a path loss calculation as a function of the distance from the terrestrial transmitter 102. The equation used to derive path loss values, which can be expressed in decibels (dB) is:

$$PL = -10\log[4\pi\{(d_s)^2 + (h_{TT})^2\}] + 10\log\left[\frac{\lambda^2}{4\pi}\right] \text{ in dB} \tag{1}$$

wherein λ=the wavelength of the transmissions, $d_s$ is the separation distance, and $h_{TT}$ is the height of the terrestrial transmitter 102 above the location of the satellite receive antenna 106.

Table 4, shows a computation of the isotropic signal received at the satellite receive antenna 106 as a function of distance from the terrestrial transmitter 102 and the azimuth angle from that transmitter. This was computed using the terrestrial transmitter antenna characteristics shown in FIG. 10 and the vertical sensitivity characteristic shown in Table 2. The isotropic signal strength is the power that would be seen at the output port of an omnidirectional receive antenna with exactly 0 dB of gain.

Note that since the transmitter antenna provides the greatest sensitivity at 180 degrees, the results presented in Table 4 refers to southerly directed transmissions. The equation used to derive the $RSS_i$ value is as follows:

$$RSS_i=P+L+A+G_{TP}+G_{TH}+G_{TV}+PL \text{ in dB} \tag{2}$$

wherein P represents the terrestrial transmitter 102 power in dBW, L represents line losses from the terrestrial transmitter 102 to the satellite receive antenna 106 in dB, A represents atmospheric losses in dB, $G_{TP}$ represents the terrestrial transmitter antenna peak gain in dB, $G_{TH}$ represents the terrestrial transmitter antenna relative horizontal gain in dB, and $G_{TV}$ represents the terrestrial transmitter antenna relative vertical gain in dB.

Table 5 provides a calculation of the threshold or trigger value of $RSS_i$ that exceeds a given interference criteria. For purposes of this example and for an isotropic receive antenna with a gain of 0 dBi, the threshold interfering signal level is set at −152.1 dBW. Where the horizon gain of the satellite receive antenna 106 is different from 0 dBi, this gain difference must be taken into account. The "BSS Ant Gain" column (column P) of Table 5 is the maximum horizon gain for a satellite receive antenna 106 at the azimuth angles indicated in column O. This column comes directly from column AM of Table 1. The value in this column is subtracted from the $RSS_i$ threshold or trigger value to arrive at the $RSS_i$ value needed to protect the satellite receive antenna 106. These results are shown in the rightmost column of Table 5.

Given the threshold $RSS_i$ value calculated in Table 5, each row in Table 5 can be examined to identify the minimum satellite receive antenna 106 separation distance at which the $RSS_i$ level falls below the corresponding threshold value. This is repeated for each row in the Table, representing a range of azimuth angles from the terrestrial transmitter 102 to the satellite receive antenna.

Figure 11:
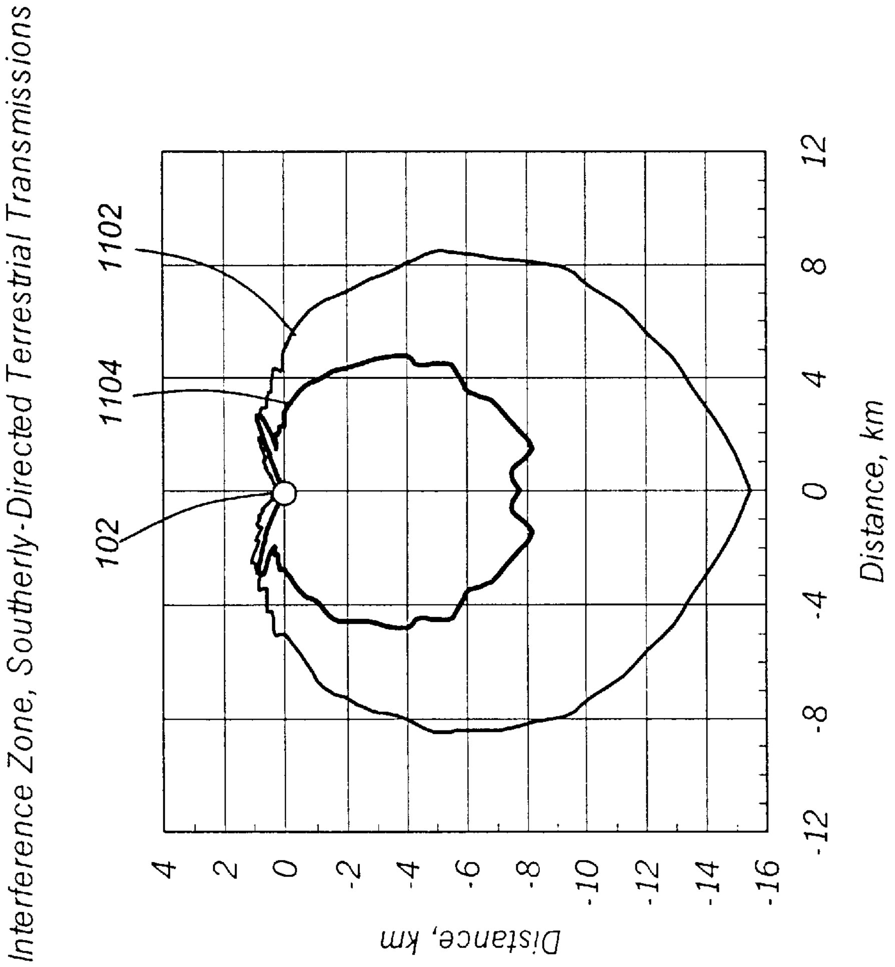
FIG. 11 is a diagram illustrating an interference zone for the exemplary Southerly-transmitting terrestrial transmitter.

FIG. 11 illustrates the results of this above analysis. A terrestrial transmitter 102 is located at the point indicated. The outer curve 1102 represents the service area of the terrestrial transmissions. For this example, the service area is assumed to require a minimum terrestrial signal strength of −158.7 dBW.

The inner curve 1104 in FIG. 11 represents the required minimum separation distance for satellite receive antenna 106. Inside of this curve 1104 the interfering signal level to a satellite receive antenna 106 is above the calculated $RSS_i$ threshold level, and unacceptable levels of interference result.

Interference Analysis for a Northerly Transmitting Terrestrial Transmitter

The same calculation can be performed for northerly-directed terrestrial transmissions. This calculation uses the same parameters for satellite receive antenna 106 gain sensitivity patterns, terrestrial transmitter antenna 102 gain patterns and power, required service area signal strength, and interference threshold criteria. The only difference is that the terrestrial transmissions are now directed substantially away from the Equator (in the Northern Hemisphere, in a Northerly direction instead of a Southerly direction, and in the Southern Hemisphere, in a Southerly direction instead of a Northerly direction).

Figure 12:
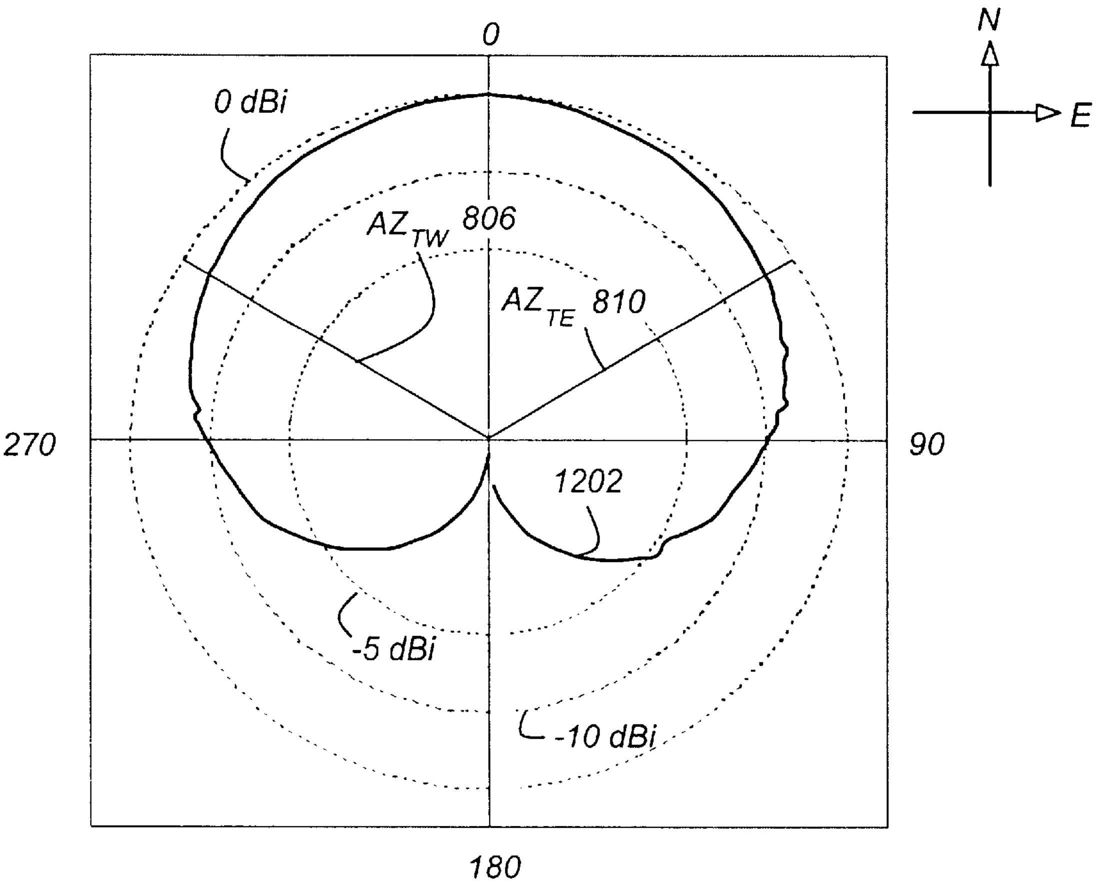
FIG. 12 is a plot illustrating the terrestrial transmitter horizontal gain characteristic for an exemplary Northerly-transmitting terrestrial transmitter.

FIG. 12 is a plot illustrating the terrestrial transmitter horizontal gain characteristic for a northerly transmitting terrestrial transmitter such as transmitters 102C and 102D in FIG. 5. The illustrated sensitivity characteristic is analogous to the sensitivity characteristic 116C and 116D of FIG. 5. A comparison with FIG. 10 shows that this pattern has the same shape but the azimuth angle for peak gain (0 dB relative gain) is at zero degrees, or at 0° North. The terrestrial transmitter antenna 102 vertical gain pattern is the same as that shown in Table 2.

Table 6 shows a path loss calculation for northerly directed transmissions. This table is the same as Table 3 except that the terrestrial transmitter 102 to satellite receive antenna 106 azimuth angle has been adjusted for the northerly directed transmissions.

Table 7 provides a calculation of received isotropic signal strength. The Table is similar to Table 4 but presents the result for northerly-directed transmissions. The equation used to derive the $RSS_i$ value is the same as described above for Table 4.

Table 8 provides the calculation of the threshold or trigger value of $RSS_i$ that exceeds the same interference criteria used in the derivation of FIG. 11. The "BSS Ant Gain" column (column P) is the maximum horizon gain for a satellite receive antenna 106 at each of the indicated azimuth angles. The data in this column comes directly from the column AM of Table 1. The value in this column is subtracted from the $RSS_i$ threshold or trigger value to arrive at the $RSS_i$ value needed to protect the satellite receive antenna 106. These results are shown in the rightmost column of Table 8.

Note that the values in the rightmost column of Table 8 are significantly higher overall than the values in the rightmost column of Table 5. This means that the separation distances can be shorter for northerly-directed transmissions, resulting in a smaller interference zone.

Figure 13A:
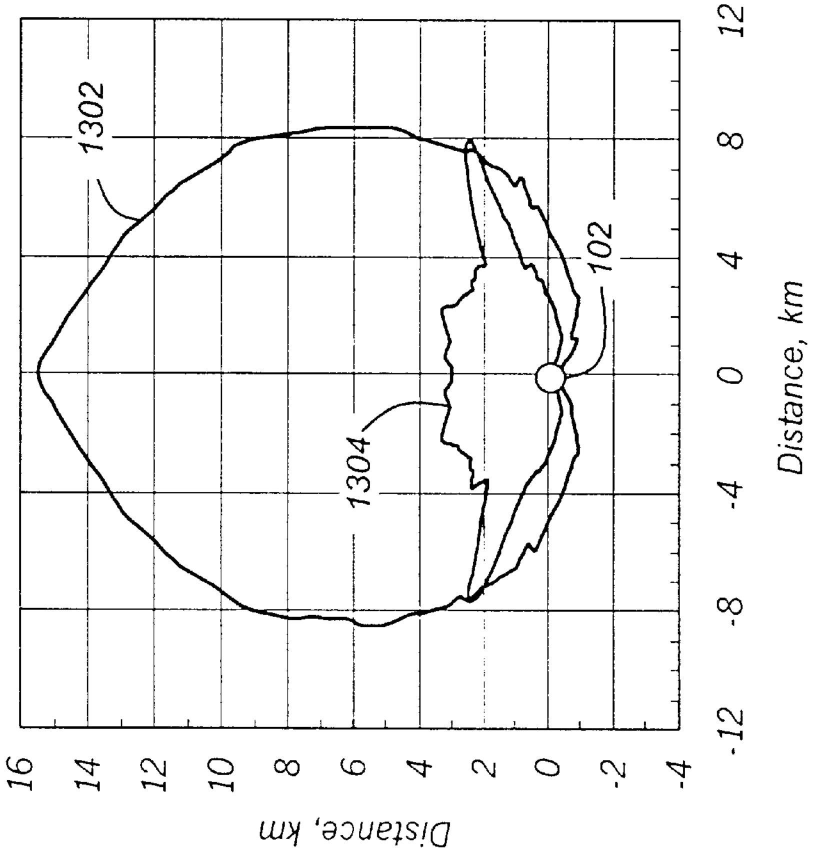
FIG. 13A is a plot illustrating an interference zone for the exemplary Northerly-transmitting terrestrial transmitter.

FIG. 13A illustrates the result of applying the $RSS_i$ threshold values calculated in Table 8 to the calculated $RSS_i$ values as a function of distance from the terrestrial transmitter (Table 7). Note that the shape of the service area is inverted from that in FIG. 11, and this is a result of the northerly directed terrestrial transmissions.

The outer curve 1302 of FIG. 13A, as it did in FIG. 11, represents the service area of the terrestrial transmissions. Similarly, the inner curve 1304 in FIG. 13A represents the required minimum separation distance for a satellite receive antenna 106. The interference zone enclosed by the line 1304 defined by the minimum separation distance is significantly smaller than the corresponding zone in FIG. 11. For this example, the area of the interference zone for southerly-directed transmissions is approximately 36 square kilometers. The area of the interference zone for northerly-directed transmissions (FIG. 10) is approximately 16 square kilometers, less than half the area of that required for southerly directed transmissions.

As the foregoing discussion illustrates, the use of northerly-directed terrestrial transmissions significantly minimizes interference from terrestrial transmitters 102 in the satellite receive antenna 106. The foregoing analysis can be extended to further refine these results to determine the optimal horizontal sensitivity characteristic of the terrestrial transmitter 102.

Figure 13B:
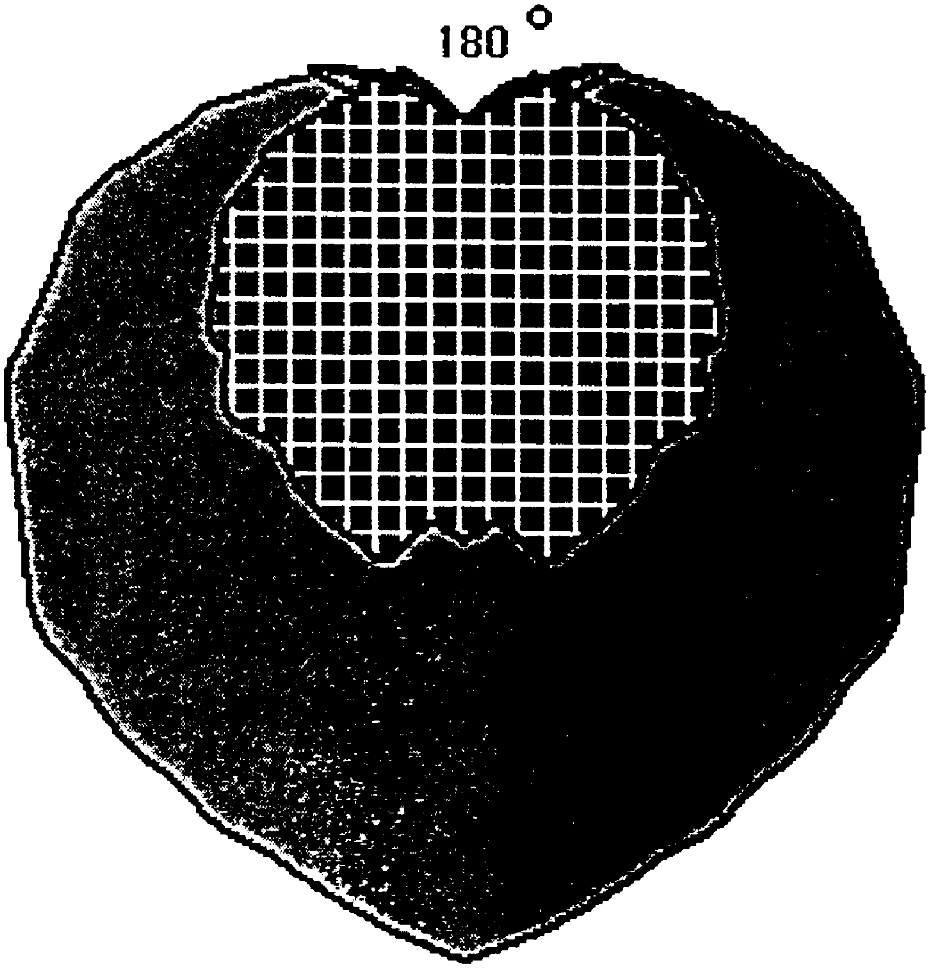
FIGS. 13B–13G are plots illustrating the relative size of the interference zone and the service area for varying terrestrial transmitter transmitting directions.
Figure 13C:
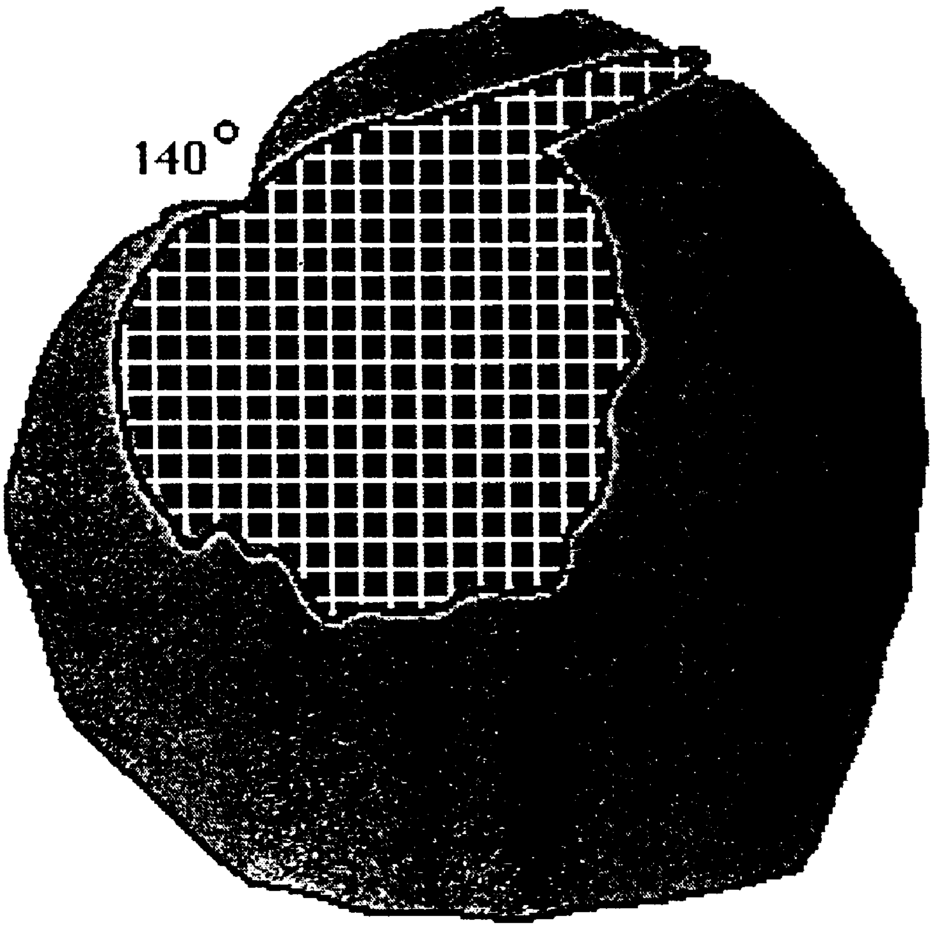
Figure 13D:
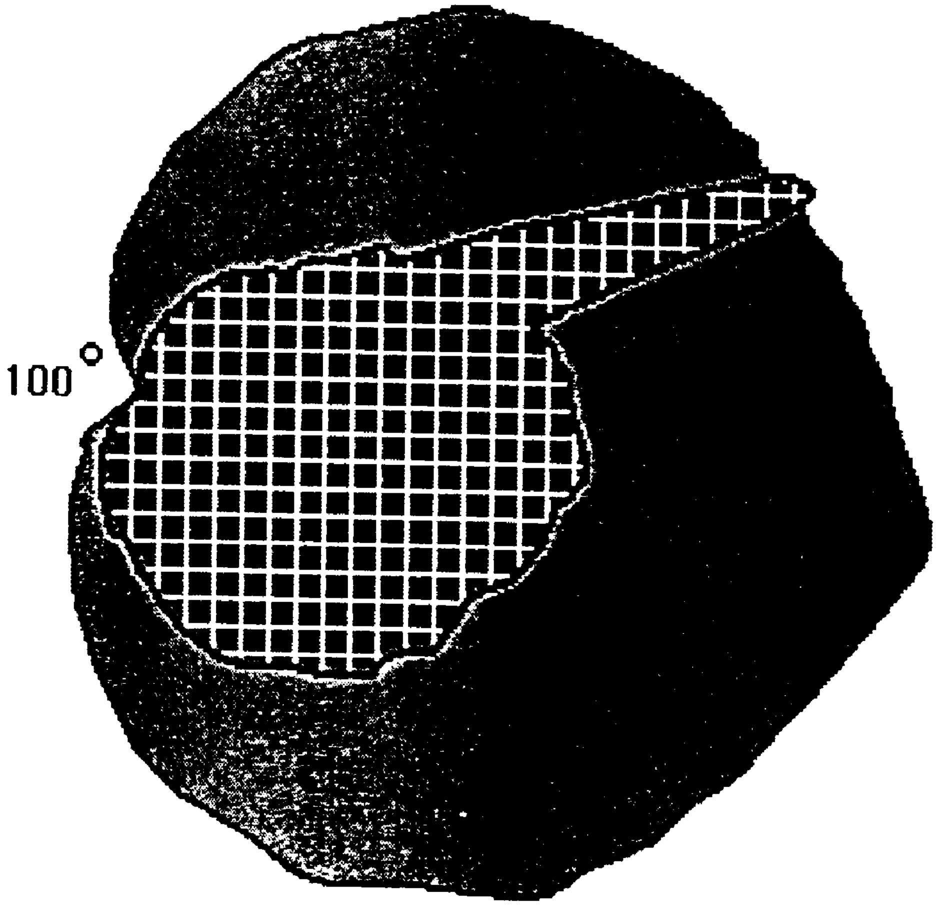
Figure 13E:
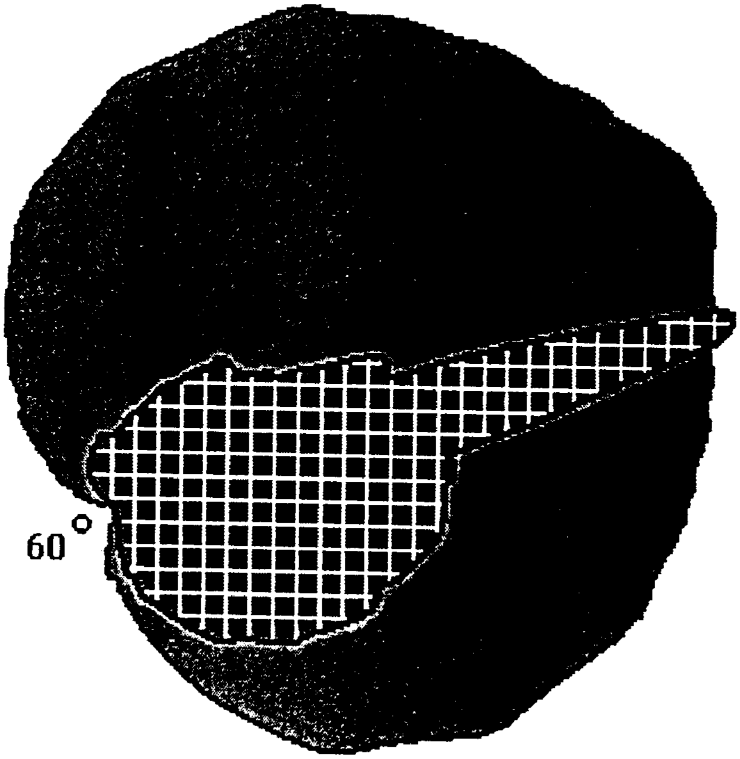
Figure 13F:
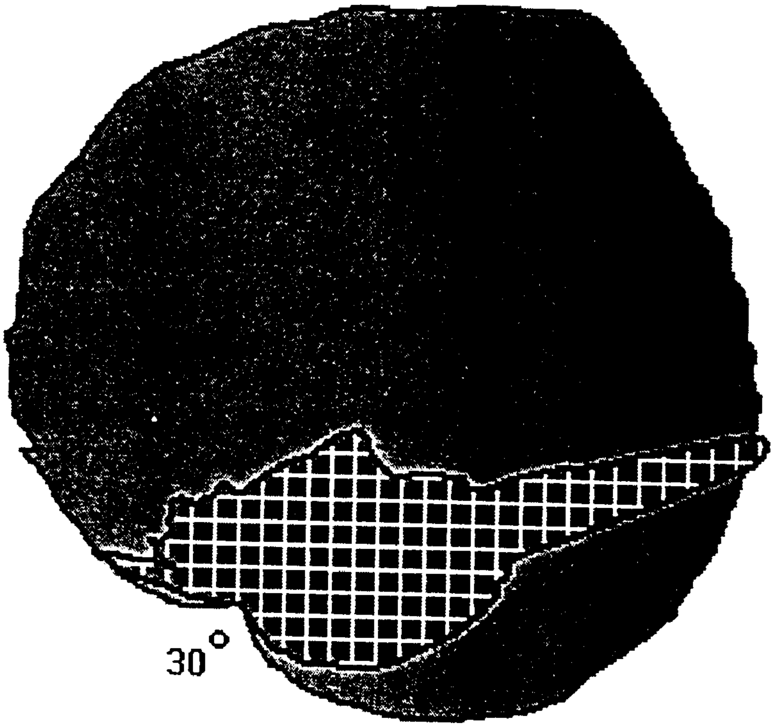
Figure 13G:
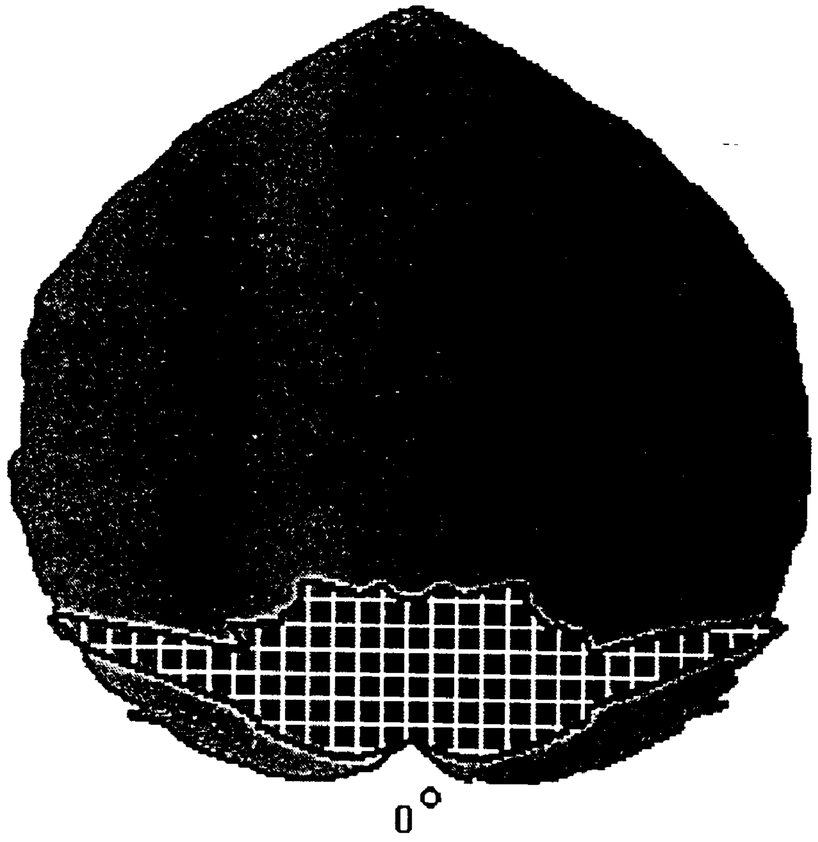
Figure 13H:
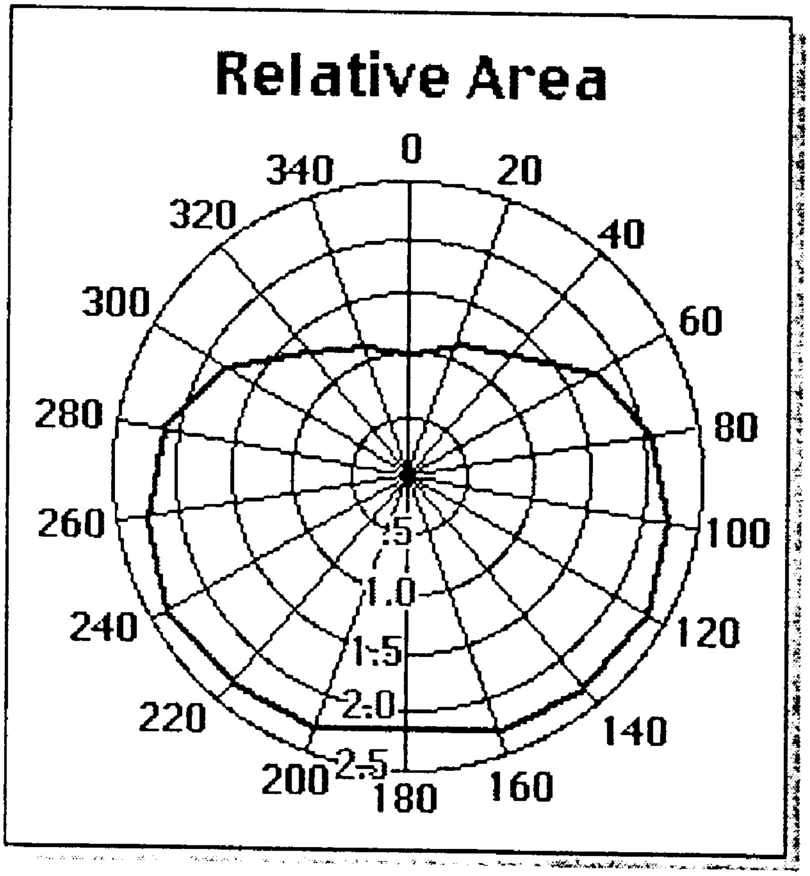
FIG. 13H is a polar plot summarizing the results shown in FIGS. 13B–13G.

FIGS. 13B–13H are diagrams illustrating the relationship between the direction of the transmissions from the terrestrial transmitter 102, and the size and shape of the resulting interference zone. FIG. 13B shows the relationship between the service area and the interference zone for southerly-directed transmissions (180°). FIG. 13C shows the relationship between the service area and the interference zone for transmissions directed southeasterly at a 140° angle. FIG. 13D shows the relationship between the service area and the interference zone for transmissions directed east-by-southeasterly at a 100° angle. FIG. 13E shows the relationship between the service area and the interference zone for transmissions directed east-by-north-easterly at a 60° angle. FIG. 13F shows the relationship between the service area and the interference zone for transmissions directed in a northeasterly direction at a 30° angle. FIG. 13G shows the relationship between the service area and the interference zone for transmissions directed in a northerly 0° angle. Note that the interference zone for northerly directed transmissions is about one-half as large in area as the interference zone for southerly directed transmissions. FIG. 13H is a polar plot which summarizes the results of FIGS. 13B–13G by showing the relative area of the interference zone according to the transmission angle of the terrestrial transmitter 102.

Note that the interference zone can be further reduced in size by selecting the horizontal sensitivity characteristic of the terrestrial transmitter 102 to limit the angle of transmission so that the small "wings" of the interference zone are substantially excluded. As can be seen by comparing FIGS. 13B and 13G, this technique is especially well suited to a system with terrestrial transmissions in a generally northerly direction. This is discussed more fully below.

Optimal Terrestrial Transmitter Horizontal Sensitivity Characteristic

The foregoing results can be improved even more by limiting the transmissions from the terrestrial transmitter to be within specific azimuthal angular limits.

Figure 14:
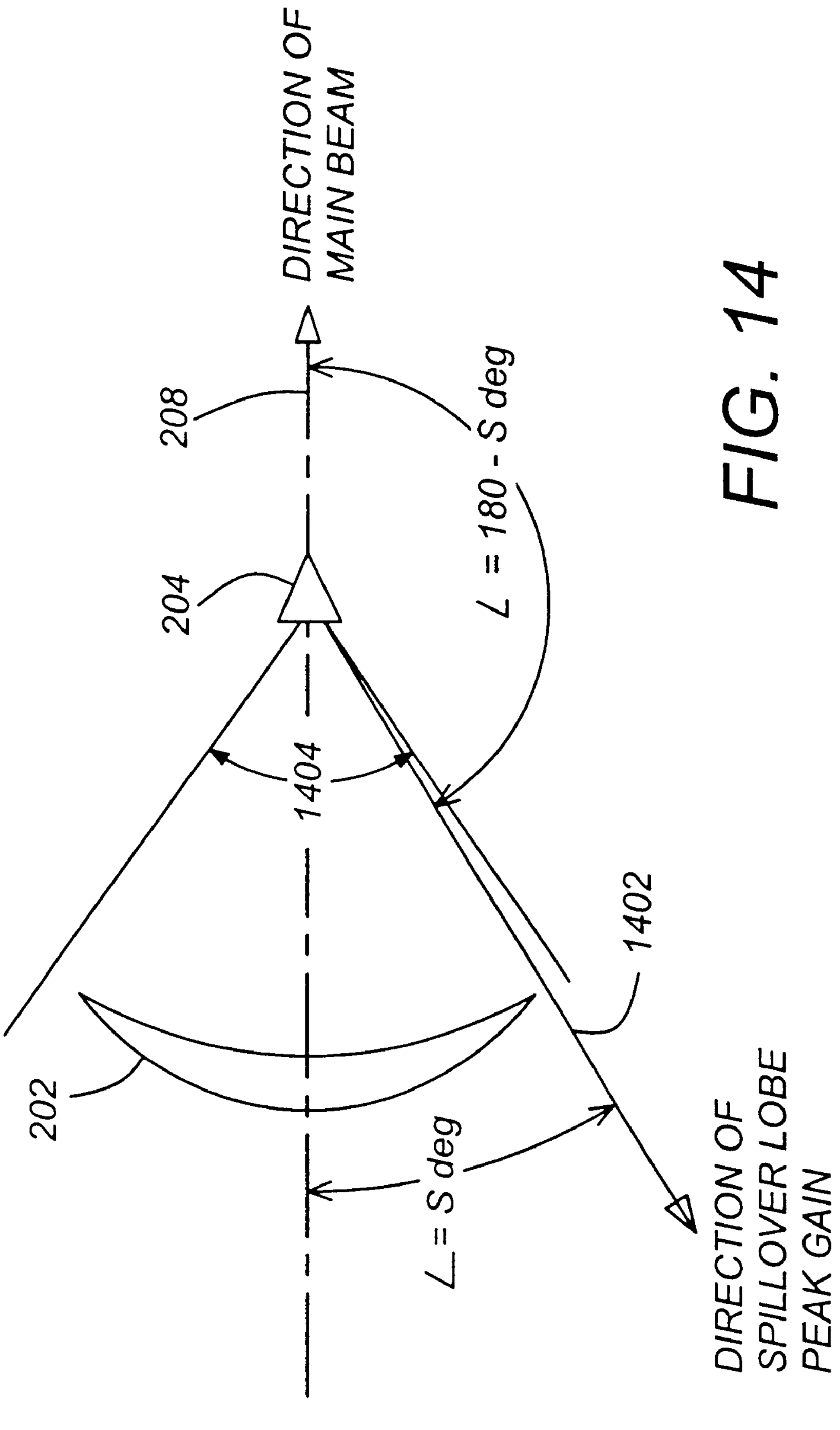
FIG. 14 is a diagram showing the satellite receive antenna spillover lobe geometry.

FIG. 14 is a diagram showing the satellite receive antenna spillover lobe 406 geometry. As described earlier, the source of the satellite receive antenna spillover lobe 406 is the relationship between the beamwidth 1404 of the LNB 204, the diameter of the reflector 202, and the distance of the LNB 204 from the reflector 202. When the beamwidth of the LNB 204 exceeds the diameter of the reflector 202, RF energy from behind the reflector 202 can be sensed by the LNB 204. This allows the satellite receive antenna 106 to have a gain characteristic with significant posterior lobes 406. As shown in FIG. 14, the peak of the posterior side lobe (or spillover lobe 406) is at an angle 180°−S degrees from the satellite receive antenna 106 boresight 208, where S represents the angle (in degrees) between the rear-facing portion of the antenna centerline 206 and the peak of the posterior side lobe 406 in direction 2402.

Given that $AZ_E$, and $AZ_W$ the following relationships can be established $$AZ_{SE}=AZ_E+(180°-S), \text{ and} \tag{3a}$$

$$AZ_{SW}=AZ_W°-(180-S). \tag{3b}$$

Because the shape of the worst case horizon gain characteristic 802 shown in FIG. 8, it is preferred to direct transmissions from the terrestrial transmitters 102 in a direction such that they are directed at the satellite receive antenna 106 between $AZ_{SE}$ 810 and $AZ_{SW}$ 806.

Figure 15A:
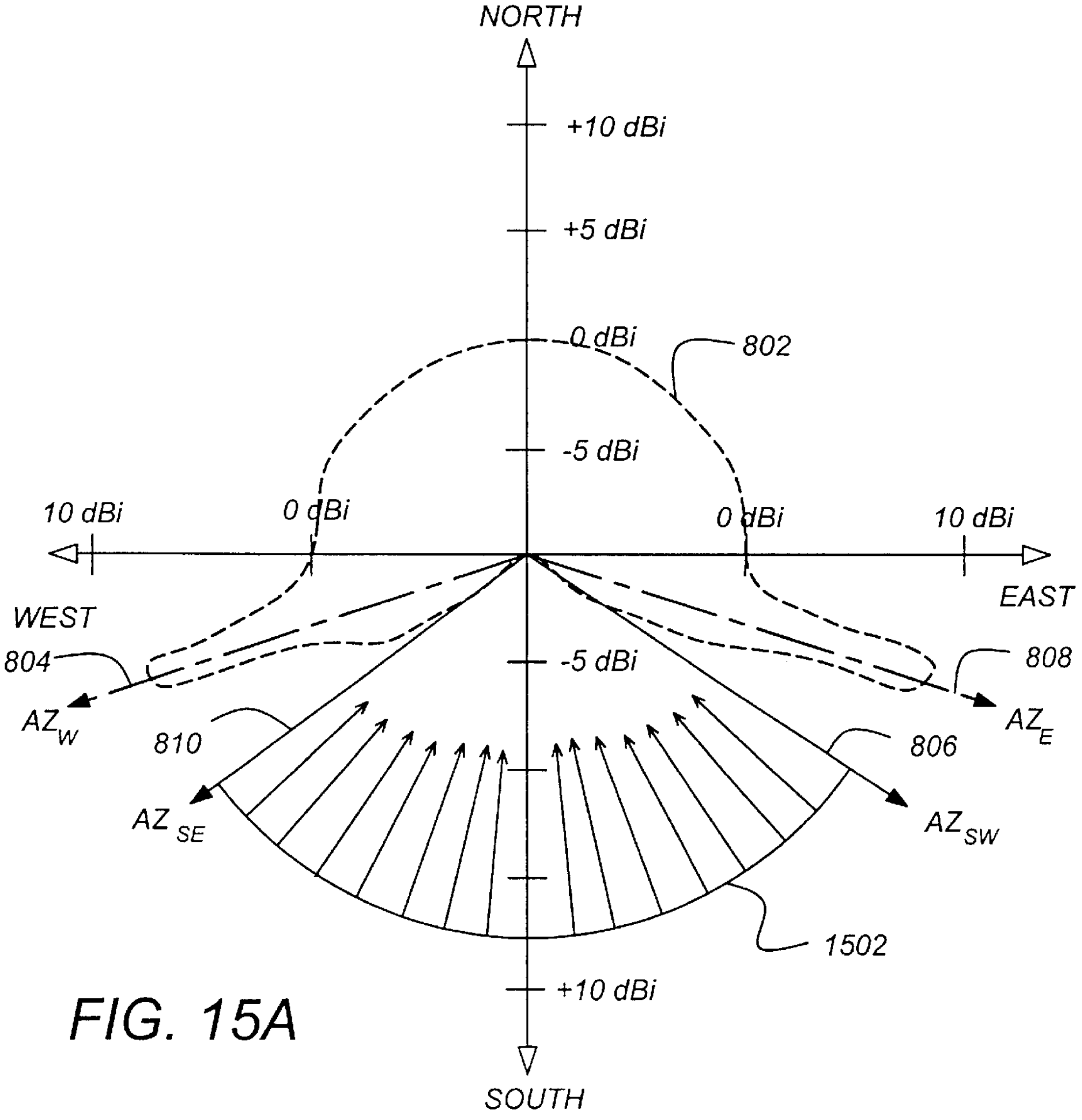
FIGS. 15A and 15B are diagrams showing the locus of generally preferred directions for terrestrial transmissions.

FIG. 15A is a diagram showing the locus of generally preferred directions 1502 for terrestrial transmissions relative to the satellite receive antenna 106 (located at the origin).

Figure 15B:
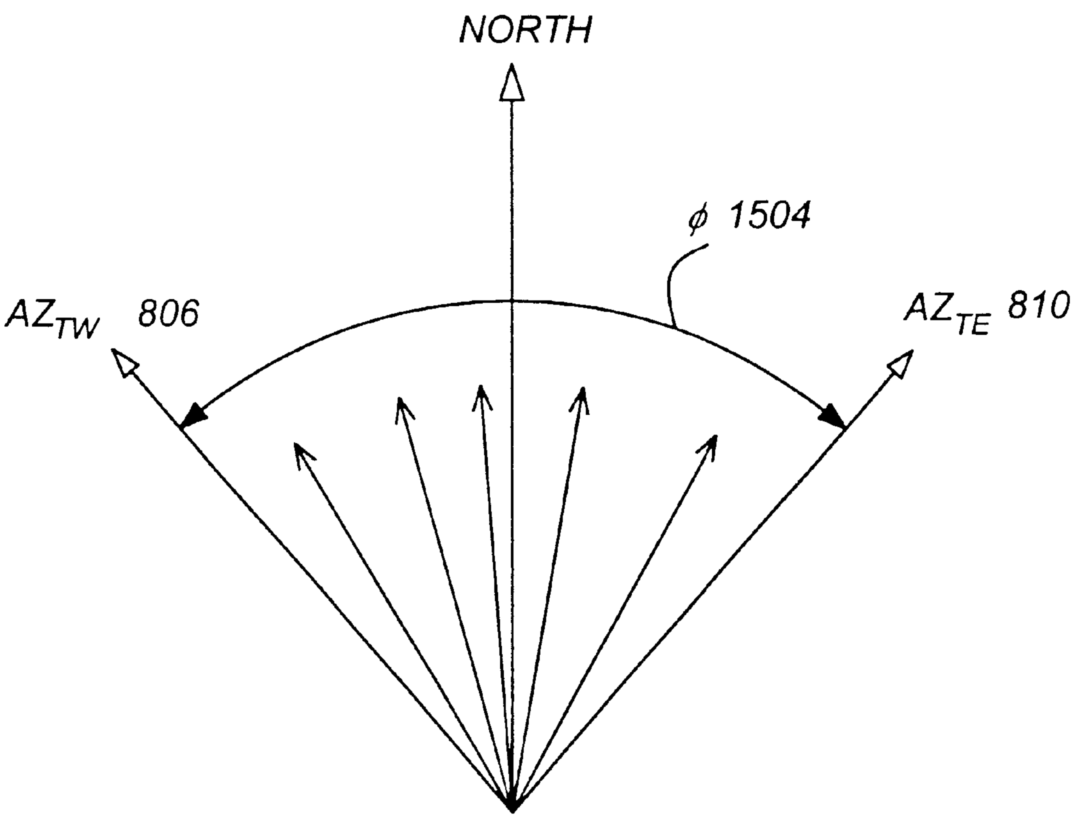

FIG. 15B is a diagram showing the locus of generally preferred directions 1504 for terrestrial transmissions relative to the terrestrial transmitter 102.

The foregoing can be generalized to determine $AZ_{SE}$ and $AZ_{SW}$ for different satellite receive antenna 106 location latitudes and minimum elevation angles $\epsilon_{min}$ as follows.

Figure 16A:
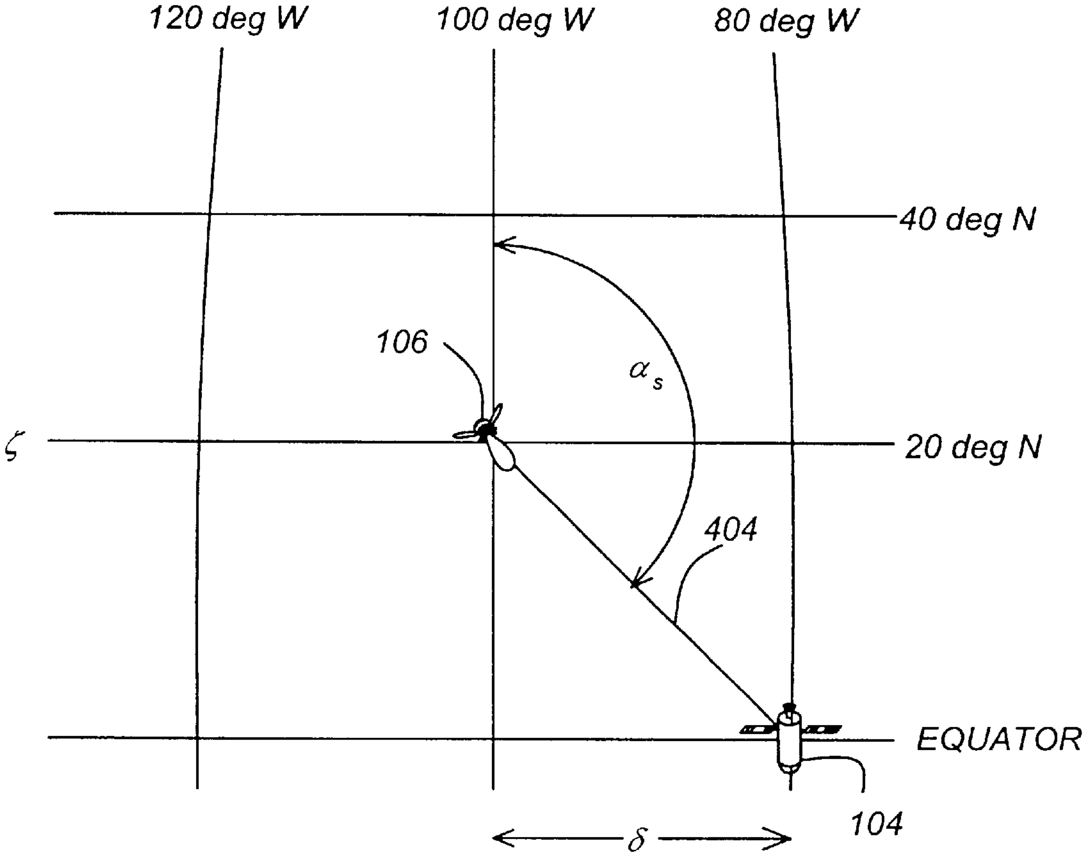
FIGS. 16A and 16B are diagrams showing the geometry for the elevation angle $\epsilon_s$ and azimuth angle $\alpha_s$ of the satellite receive antenna with its primary sensitive axis directed at the satellite transmitter.
Figure 16B:
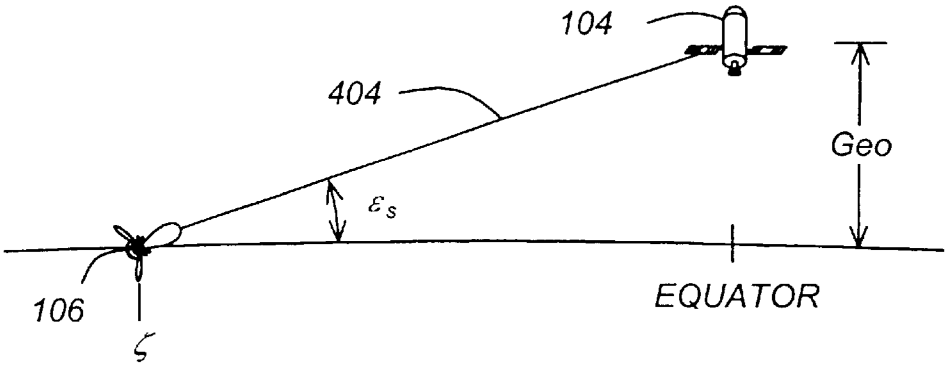

FIGS. 16A and 16B are diagrams showing the geometry for the elevation angle $\epsilon_s$ and azimuth angle $\alpha_s$ of the satellite receive antenna 106 with its primary sensitive axis 404 directed at the satellite transmitter 104.

Assuming satellite transmitters 104 are in orbits with a substantially zero inclination (i=0), the elevation angle $\epsilon_s(\delta)$ and azimuth angle $\alpha_s$ (δ) of the satellite receive antenna 106 with its primary sensitive axis 404 directed at the satellite transmitter 104 can be shown to be $$\varepsilon_s(\delta)=\arcsin\left[\frac{K\cos\psi_s(\delta)-1}{[1+K^2-2K\cos\psi_s(\delta)]^{\frac{1}{2}}}\right], \text{ and} \tag{4}$$

-continued $$\alpha_s(\delta)=\arccos\left[-\frac{\cos\psi_s\sin\zeta}{\sin\psi_s\cos\zeta}\right], \tag{5}$$

where

ψ=arccos [cos ζ cos δ] (great circle arc);

ζ=Earth station latitude (latitude of the location of the satellite receive antenna 106;

δ=longitude difference (Δ) between the location of the satellite transmitter 104 and the satellite receive antenna 106; and K=radius of the orbit of the satellite transmitter 104/radius of the Earth≈6.62.

Using the above relationships, $AZ_{SE}$ or $AZ_{SW}$ can be determined from $AZ_E$ or $AZ_W$, respectively. $AZ_E$ is a function of the latitude of the satellite receive antenna location ζ and the minimum allowed elevation angle $\epsilon_{s,min}$ of the satellite receive antenna 106. In other words, $AZ_E=f(\epsilon_{s,min}, \zeta)$. To find $AZ_{SE}$ for a given latitude ζ, different values of the longitude difference δ are tried until $\epsilon_{s,min}$ reaches the desired value $$\varepsilon_{s,\min}=\arcsin\left[\frac{K\cos\zeta\cos\delta-1}{(1+K^2-2K\cos\zeta\cos\delta)^{\frac{1}{2}}}\right]. \tag{6}$$

Table 9 shows the longitude difference δ for satellite receive antenna 106 locations from 0 to 70 degrees North, and for minimum satellite receive antenna 106 minimum elevation angles of 5, 10, and 15 degrees.

Once the longitude difference δ is known, one can solve for the easternmost azimuth angle corresponding to the specified minimum elevation angle, using equation (5). The result of the foregoing computation of $AZ_E$, including the interim computation of the great circle arc $\psi_s$ is shown in Tables 10 and 11. Given the easternmost AZ angle of the satellite receive antenna 106, the preferred easternmost AZ angle for significant terrestrial transmitter 102 transmissions can be computed. $AZ_{SE}$ can be computed from the equation (3a). Recalling the diagram presented in FIG. 15A, it can be seen that terrestrial transmissions should approach the satellite receive antenna 106 between the $AZ_{SE}$ radial 810 and the $AZ_{SW}$ radial 806. The azimuth angle of a terrestrial transmitter 102 pointing along $AZ_{TE}$ and toward the satellite receive antenna 106 is $$\begin{aligned} AZ_{TE} &= AZ_{SE}-180° \\ &= [AZ_E+180°-S]-180° \\ &= AZ_E-S \end{aligned} \tag{7}$$

Table 12 presents values for $AZ_{TE}$ for a typical 45 cm offset feed parabolic satellite receive antenna 106 corresponding to the Table 10. Similarly, the value for $AZ_{TW}$ is $$AZ_{TW}=360°-AZ_{TE}. \tag{8}$$

Hence, the preferred azimuthal angular limits (as illustrated generically in FIG. 15B) for transmissions from the terrestrial transmitter 102 are as shown in the Table 13.

Table 14 presents the angular extent φ 1504 of these transmissions between the limits $AZ_{TE}$ and $AZ_{TW}$.

Figure 17:
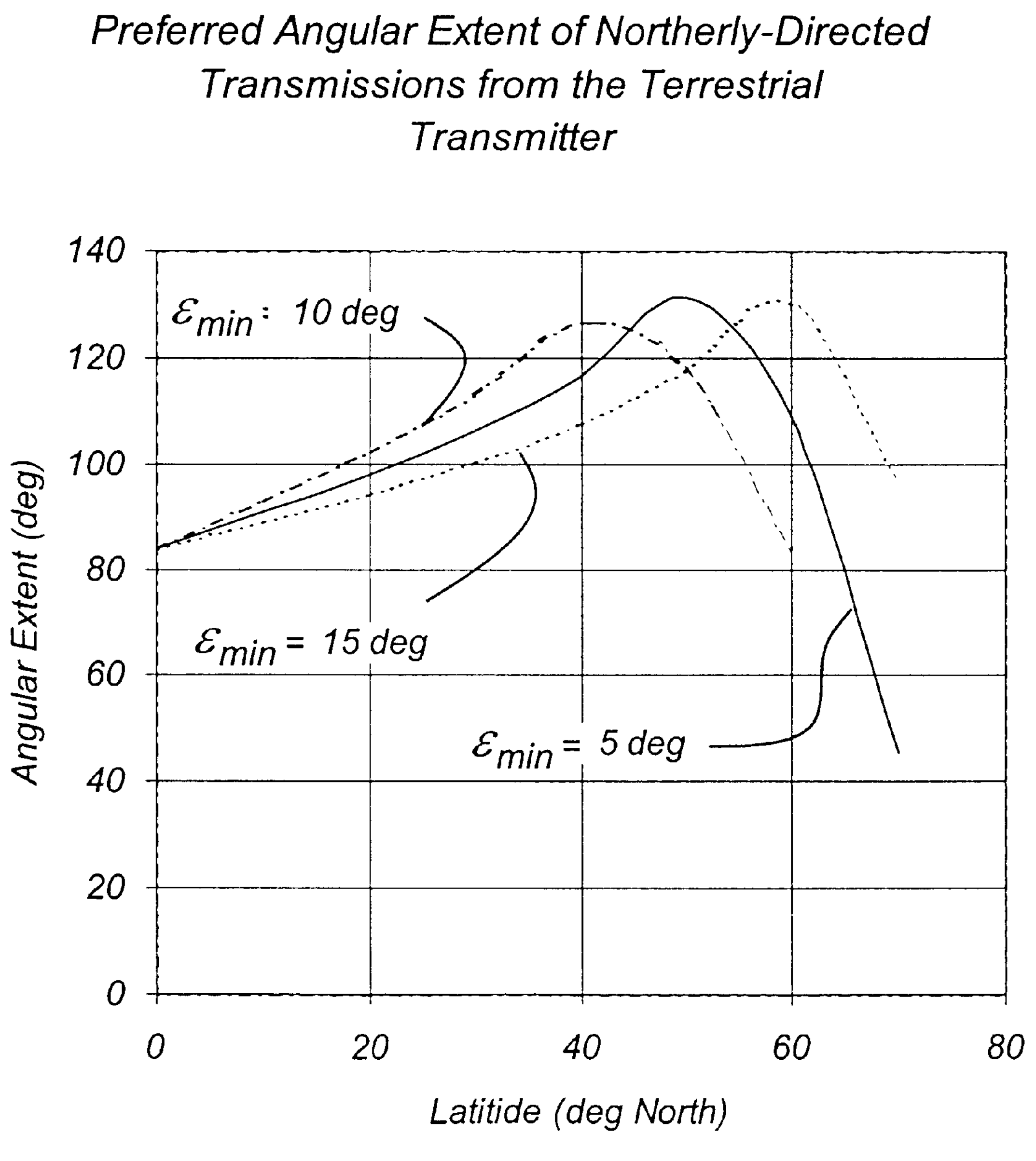
FIG. 17 is a plot showing the preferred angular extent of Northerly-directed transmissions from the terrestrial transmitter.

FIG. 17 is a plot showing the preferred angular extent of Northerly-directed transmissions from the terrestrial transmitter. Examination of FIG. 17 (and of FIGS. 9A–9D)

reveals that the worst case gain region falls between $AZ_{SE}$ and $AZ_{SW}$ for latitudes of 20° N, 40° N, and 50° N, with the angular extent varying from 98° at 20° N to 131° at 50° N. However, as the latitude of the satellite receive antenna 106 increases, $AZ_E$ 808 crosses $AZ_{SW}$ 806 and $AZ_W$ 804 crosses $AZ_{SE}$ 810, the main beam gain associated with $AZ_E$ 808 and $AZ_W$ 804 become the limiting factors, and the size of the least sensitive region begins to decline.

Figure 18A:
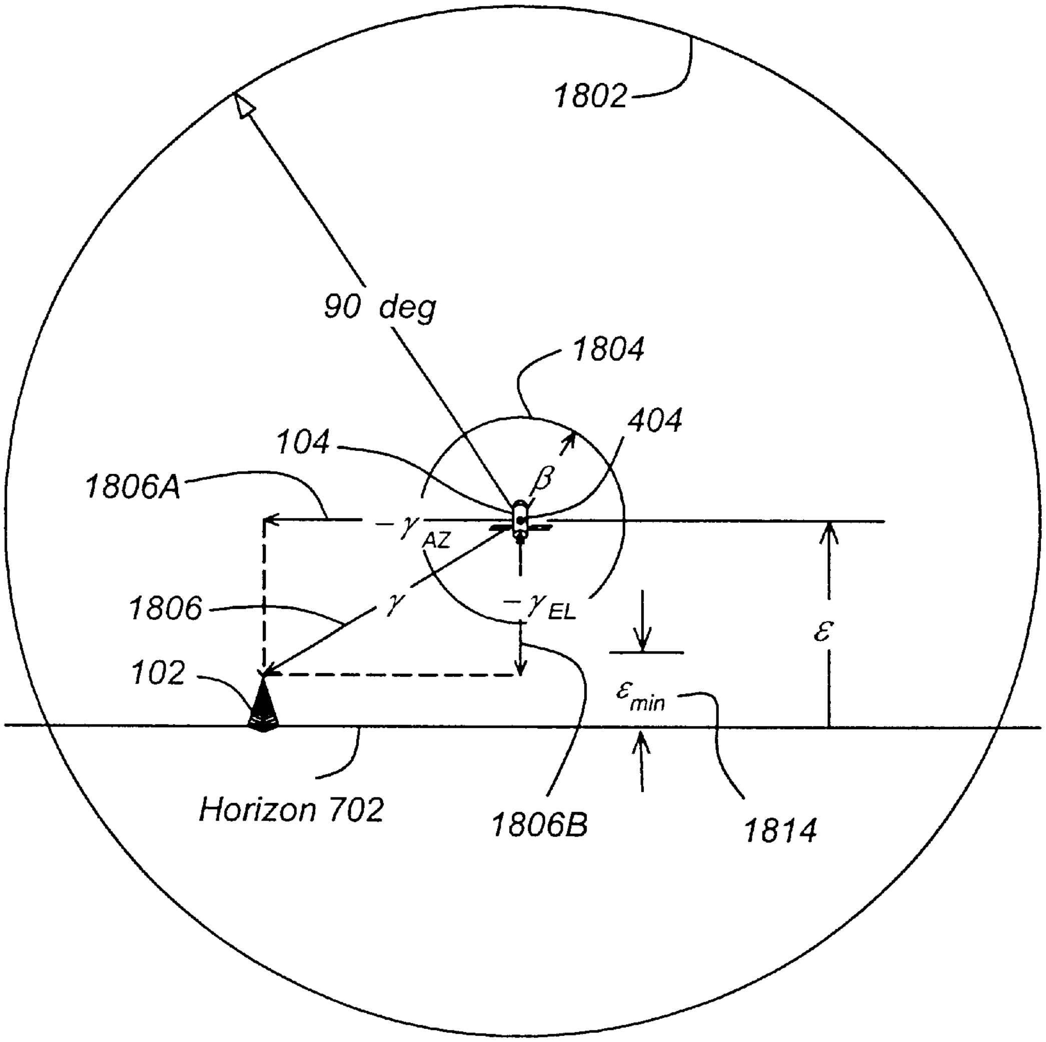
FIGS. 18A–18D are diagrams illustrating relevant geometrical relationships in one embodiment of the present invention, from the perspective of the satellite receive antenna viewing the satellite transmitter and the terrestrial transmitter.
Figure 18B:
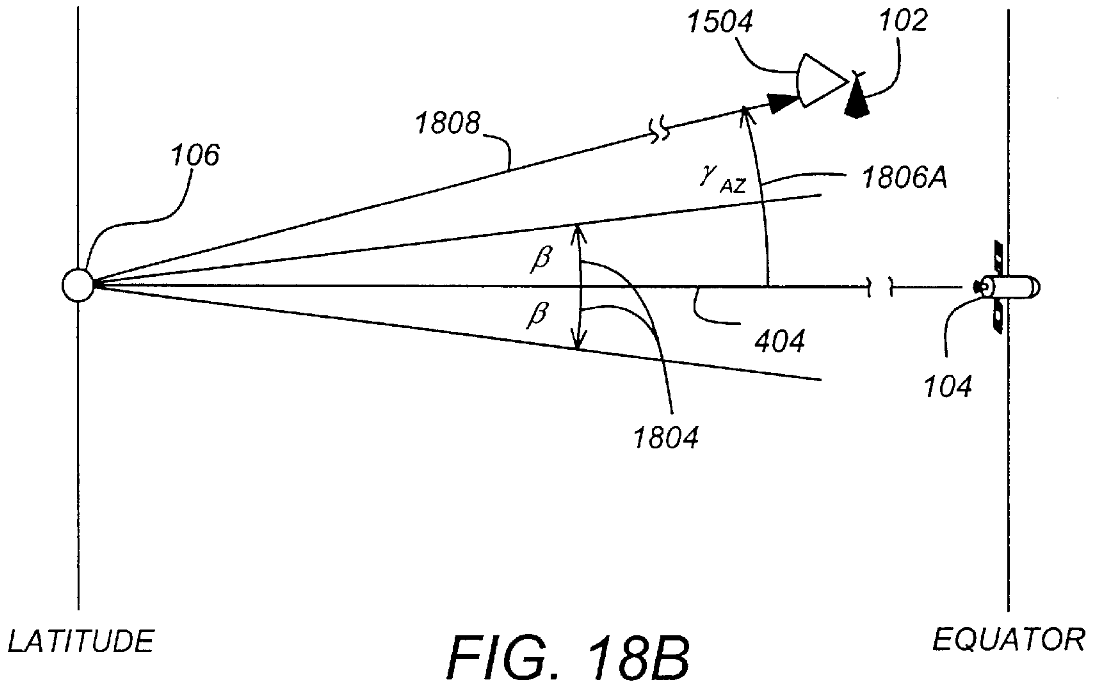
Figure 18C:
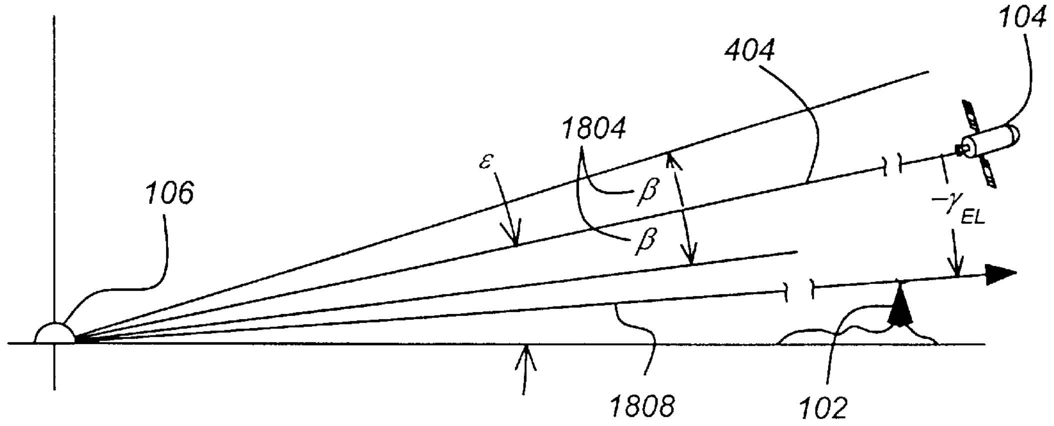

FIGS. 18A–18C are diagrams illustrating relevant geometrical relationships in one embodiment of the present invention, from the perspective of the satellite receive antenna 106 viewing the satellite transmitter 104 and the terrestrial transmitter 102. In this illustration, the primary sensitive axis 404 of the satellite receive antenna 106 is directed substantially at the satellite transmitter 104. The satellite transmitter 104 is disposed at an elevation angle $\epsilon$ greater than the minimum elevation angle $\epsilon_{min}$. The satellite receive antenna 106 can be characterized by an effective beamwidth 1804 having an angular extent $\beta$ substantially described by the main lobe 404. The terrestrial transmitter 102 is disposed at a location defining a vector 1808 angularly displaced from the primary sensitive axis 404 of the satellite receive antenna 106 by an offset angle $\gamma$, having a first component and a second component, wherein the first component is the azimuth component $\gamma_{AZ}$ which extends from −90° to 90° (e.g., $\gamma_{AZ} \in (-90°, 90°)$, and an elevation component $\gamma_{EZ}$ which extends from −90° to 90° (e.g., $\gamma_{EZ} \in (-90°, 90°)$). In one embodiment of the present invention, $\gamma_{EZ}$ is set to a value greater than $\beta$, and $\gamma_{AZ}$ can be any angle between −90° and 90°. In another embodiment of the invention, $\gamma_{AZ}$ is further limited to further minimize interference. As described above, interference can be reduced by limiting the azimuthal gain characteristic 1504 of the terrestrial transmitter 102. In such cases, to assure that the terrestrial receive antenna 110 can receive signals from the terrestrial transmitter 102, the terrestrial transmitter is disposed so that $\gamma_{AZ}$ is limited to smaller angles. Consistent with the analysis presented above, this angular limitation on $\gamma_{AZ}$ is a function of minimum elevation angle $\epsilon_{min}$ and the latitude $\zeta$ of the satellite receive antenna 106.

Figure 18D:
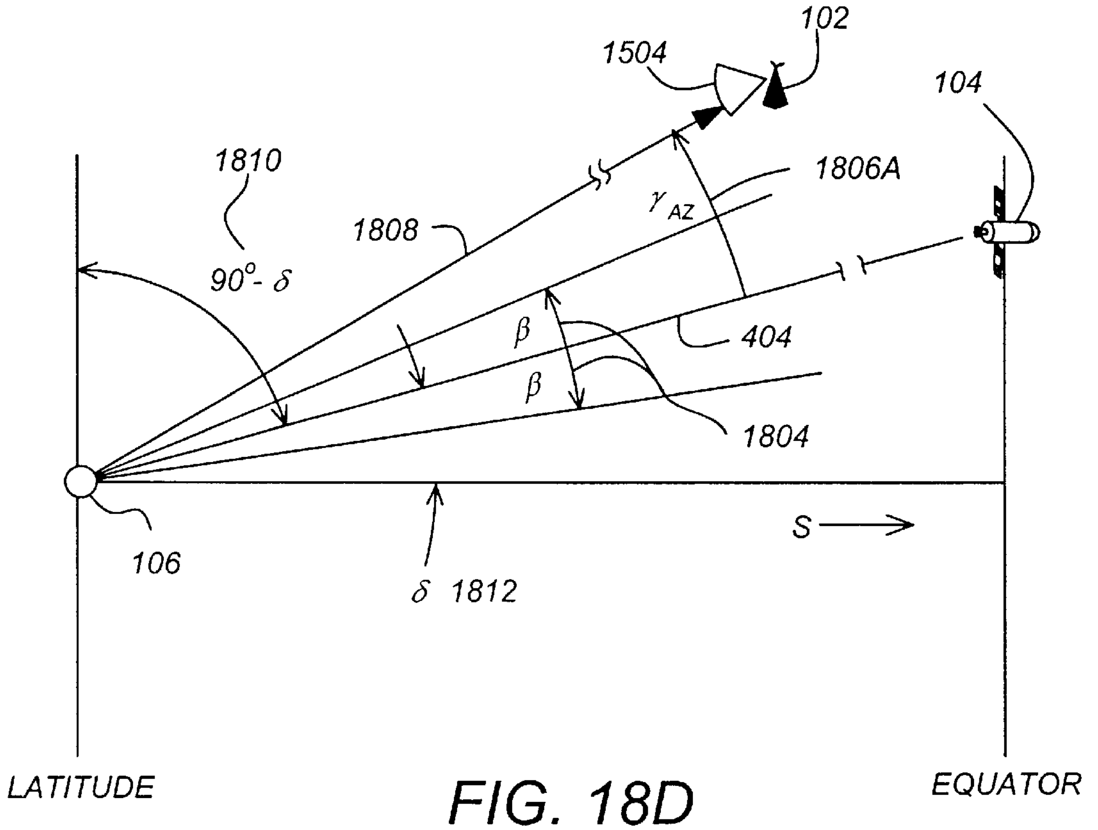

FIG. 18D is a diagram illustrating a geometrical relationship between the satellite receive antenna 106, the satellite transmitter 104, and the terrestrial transmitter 102. In this case, the satellite is not located directly due South from the satellite receive antenna 106 (as was the case illustrated in FIG. 18B). Instead, the angle between the satellite receive antenna 106 and the satellite transmitter 104 is displaced from due South by an angle $\delta$ 1812. In this case, the angle defined by a vector between the satellite receive antenna 106 and the satellite 104 and a line of constant latitude 1810 is described as 90°−$\delta$.

Figure 19:
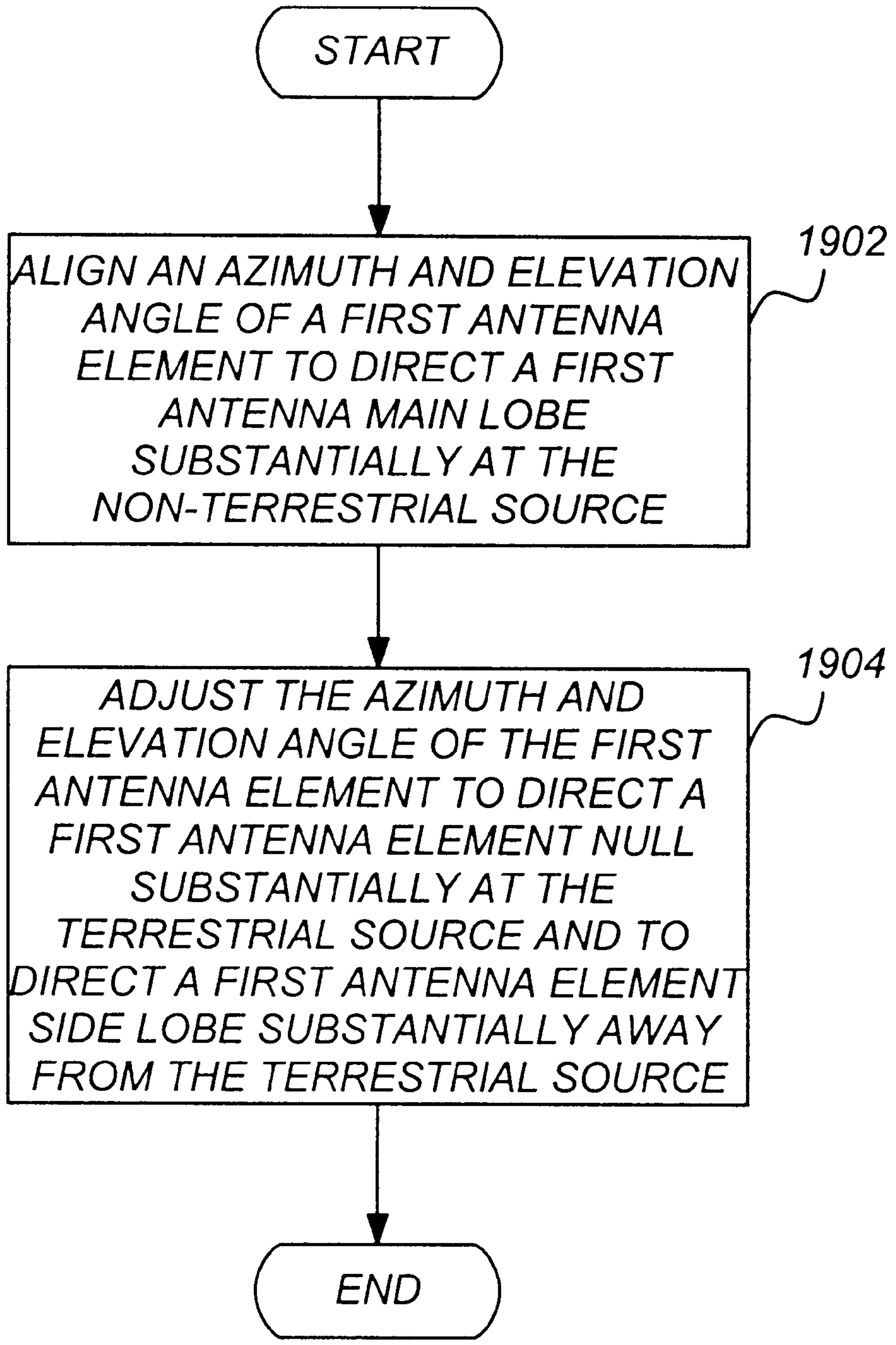
FIGS. 19 and 20 are flow charts presenting illustrative process steps used to practice embodiments of the present invention.

FIG. 19 is a flow chart presenting illustrative process steps used to practice one embodiment of the present invention. Block 1902 illustrates the step of aligning an azimuth and elevation angle of a first antenna such as the satellite receive antenna 106 to direct a first antenna main lobe substantially at a non-terrestrial source such as the satellite transmitter 104. Then, the azimuth and elevation angle of the first antenna are adjusted to direct a null of the first antenna substantially at the terrestrial source and to direct a first antenna sidelobe substantially away from the terrestrial source. The foregoing azimuth and elevation angles can be adjusted independently, or the antenna can be set to be aligned the main lobe with the non-terrestrial source, then rotated to minimize interference from terrestrial transmitters 102.

Figure 20:
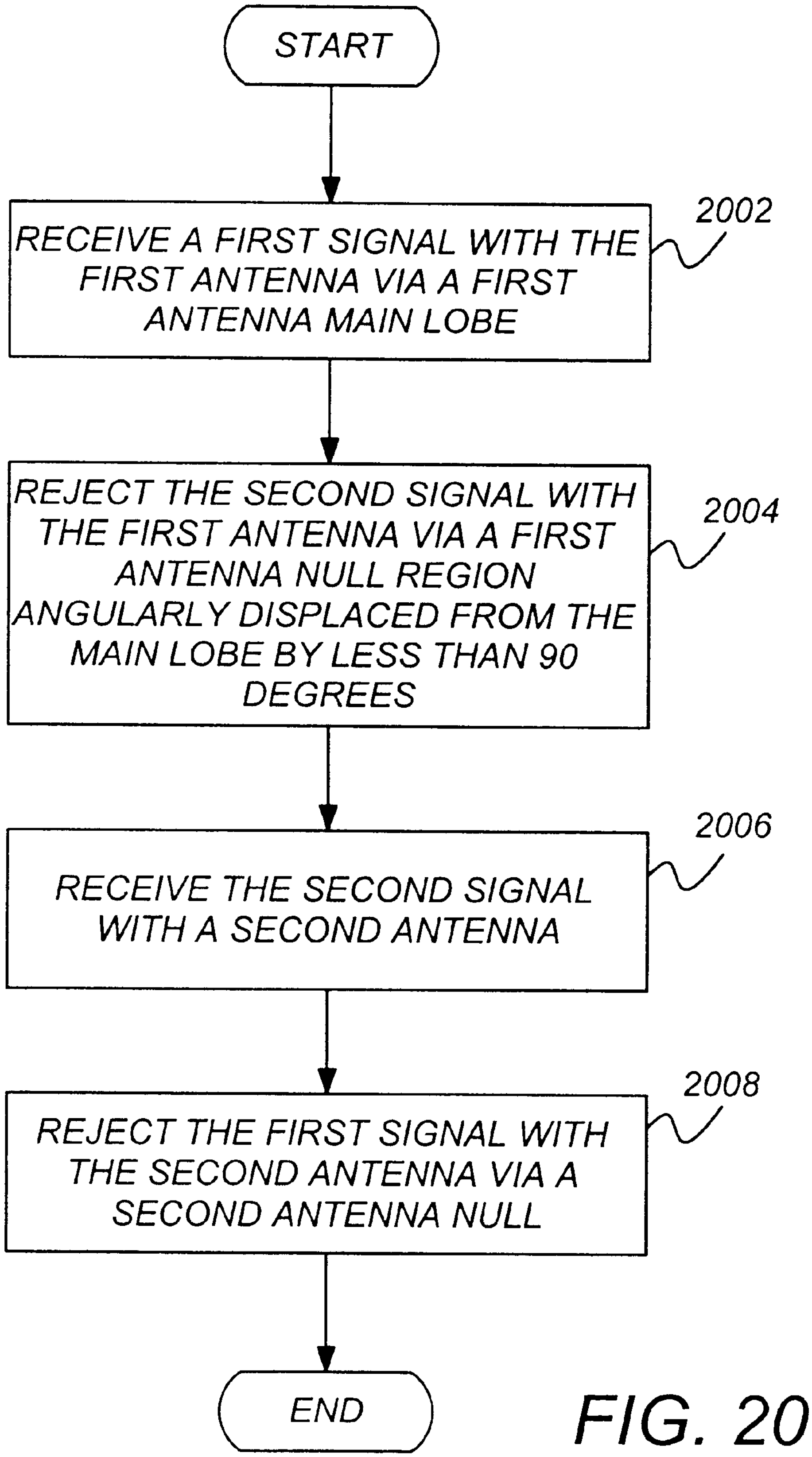

FIG. 20 is a flow chart presenting illustrative process steps used to practice one embodiment of the present invention. Block 2002 illustrates the step of receiving a first signal with the first antenna via a first antenna main lobe. Block 2004 presents the step of rejecting (i.e. sufficiently attenuating) the second signal with the first antenna via a first antenna null angularly displaced from the main lobe by less than 90 degrees. In one embodiment, the second signal is attenuated via a first antenna gain characteristic that is close enough to a null to prevent interference, but not necessarily coincident with a null. Block 2006 illustrates the step of receiving the second signal with a second antenna. In one embodiment, the first signal can also be rejected by the second antenna using a second antenna null. The foregoing steps can be performed in any order, but are preferably performed substantially simultaneously, to permit simultaneous reception of different signals on the same channel.

Conclusion

This concludes the description of the preferred embodiments of the present invention. In summary, the present invention discloses a method and apparatus for simultaneously receiving a first signal from a non-terrestrial source and a second signal from a terrestrial source on the same or overlapping channels.

The apparatus comprises at least one terrestrial transmitter transmitting information on at least one frequency simultaneously usable by at least one satellite transmitting to a satellite receive antenna having a sensitivity characterizable by a primary sensitive axis directed substantially at the satellite. The terrestrial transmitter includes a azimuthal gain characteristic directed substantially away from the Earth's Equator. In an alternative embodiment, the terrestrial transmitter is disposed at a location defining a vector angularly displaced from the primary sensitive axis by an angle of less than 90 degrees.

A method of transmitting information has also been disclosed. In this method the information is transmitted on at least one frequency simultaneously usable by at least one satellite transmitting to a satellite receive antenna having a sensitivity characterizable by a primary sensitive axis directed substantially at the satellite and a posterior secondary sensitive axis. The method is performed by transmitting the information from a terrestrially-based transmitter to a terrestrial receive antenna in a direction substantially away from the Equator.

The foregoing description of the preferred embodiment of the invention has been presented for the purposes of illustration and description. It is not intended to be exhaustive or to limit the invention to the precise form disclosed. Many modifications and variations are possible in light of the above teaching.

For example, in the foregoing discussion, mention is made of lobes and nulls in the satellite receive antenna 106 and the terrestrial receive antenna 110. It should be understood, that the antenna nulls do not necessarily reflect a region of zero antenna sensitivity. In practice, some residual sensitivity exists, even at the antenna null points. Hence, such nulls include regions where the gain of the antenna is such that the relevant signal is essentially rejected. Further, it should be noted that although the foregoing invention has been described in terms of a satellite receive antenna 106 and a terrestrial receive antenna 110 disposed proximate thereto, it is possible and perhaps desirable in some instances to fashion both antennae from a single structure with shared components. Hence, the satellite receive antenna 106 and the terrestrial receive antenna 110 can be broadly described as antennas, which may or may not share structural components. For example it is possible to design a dual feed antenna with a single reflector (perhaps of a more complex shape) to implement the foregoing invention.

Further, in the foregoing description, mention is made of frequency sharing between the terrestrial and non-terrestrial transmission networks. However, it is understood that there exist transmission networks using modulation techniques such as code division multiple access (CDMA), in which frequency sharing can be described in terms of channel sharing.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

Appendix

TABLE 1

| | A | B | C | D | E | F | G | H | I | J | K | L | M |
|---|---|---|---|---|---|---|---|---|---|---|---|---|---|
| 1 | | 40 | | Earth Station Latitude, deg | | | | | | | | | |
| 2 | | 150 | | HAGL of Northpoint Transmitter | | | | | | | | | |
| 3 | | | | | | | Difference in Longitude, Degrees | | | | | | |
| 4 | 1 | | 1 | 1 | 5 | 5 | 10 | 10 | 15 | 15 | 20 | 20 | 25 |
| 5 | 2 | Great Circle, radians | 0.698 | 0.698 | 0.703 | 0.703 | 0.716 | 0.716 | 0.738 | 0.738 | 0.767 | 0.767 | 0.803 |
| 6 | 3 | Sat E1 Angle, radians | 0.763 | 0.763 | 0.758 | 0.758 | 0.743 | 0.743 | 0.719 | 0.719 | 0.686 | 0.686 | 0.647 |
| 7 | 4 | Sat Az Angle, radians | 3.114 | 3.169 | 3.006 | 3.277 | 2.874 | 3.409 | 2.747 | 3.537 | 2.626 | 3.657 | 2.514 |
| 8 | | NPt E5 to BSS E5 Az Angle degrees | | | | | BSS Rcv Antenna Gain (Horizon) | | | | | | |
| 9 | | 180 | 11.8 | 11.8 | 14.3 | 14.3 | 16.0 | 16.0 | 16.0 | 16.0 | 12.0 | 12.0 | 10.0 |
| 10 | | 185 | 13.5 | 12.7 | 16.0 | 11.8 | 16.0 | 15.2 | 13.3 | 16.0 | 9.3 | 16.0 | 13.0 |
| 11 | | 190 | 14.0 | 14.3 | 16.0 | 11.8 | 14.7 | 13.5 | 10.7 | 16.0 | 5.7 | 16.0 | 15.0 |
| 12 | | 195 | 16.0 | 16.0 | 16.0 | 14.3 | 12.0 | 11.0 | 6.8 | 14.3 | 3.3 | 16.0 | 16.0 |
| 13 | | 200 | 16.0 | 16.0 | 13.3 | 16.0 | 8.0 | 12.7 | 4.5 | 11.8 | 1.2 | 15.2 | 16.0 |
| 14 | | 205 | 14.7 | 16.0 | 10.7 | 16.0 | 5.7 | 15.2 | 1.0 | 11.8 | 1.5 | 12.7 | 15.2 |
| 15 | | 210 | 10.7 | 13.3 | 8.8 | 16.0 | 2.2 | 16.0 | 1.3 | 14.3 | 2.0 | 11.0 | 13.5 |
| 16 | | 215 | 8.0 | 9.3 | 4.5 | 13.3 | 1.2 | 16.0 | 1.8 | 16.0 | 2.3 | 13.5 | 11.0 |
| 17 | | 220 | 4.5 | 6.8 | 1.0 | 10.7 | 1.7 | 16.0 | 2.2 | 16.0 | 2.8 | 15.2 | 12.7 |
| 18 | | 225 | 2.2 | 3.3 | 1.3 | 6.8 | 2.0 | 12.0 | 2.7 | 16.0 | 3.3 | 16.0 | 15.2 |
| 19 | | 230 | 1.3 | 1.0 | 1.8 | 4.5 | 2.5 | 9.3 | 3.0 | 13.3 | 4.3 | 16.0 | 16.0 |
| 20 | | 235 | 1.7 | 1.5 | 2.2 | 1.0 | 2.8 | 5.7 | 4.0 | 10.7 | 5.0 | 14.7 | 16.0 |
| 21 | | 240 | 2.2 | 1.8 | 2.7 | 1.3 | 3.7 | 3.3 | 4.7 | 6.8 | 6.0 | 12.0 | 16.0 |
| 22 | | 245 | 2.5 | 2.3 | 3.0 | 1.8 | 4.3 | 1.2 | 5.7 | 4.5 | 6.7 | 8.0 | 13.0 |
| 23 | | 250 | 3.0 | 2.7 | 4.0 | 2.2 | 5.3 | 1.5 | 6.3 | 1.0 | 7.7 | 5.7 | 11.0 |
| 24 | | 255 | 3.7 | 3.3 | 4.7 | 2.7 | 6.0 | 7.0 | 7.3 | 1.3 | 8.3 | 2.2 | 7.0 |
| 25 | | 260 | 4.7 | 4.0 | 5.7 | 3.0 | 7.0 | 2.3 | 8.0 | 1.8 | 9.3 | 1.2 | 4.0 |
| 26 | | 265 | 5.3 | 5.0 | 6.3 | 4.0 | 7.7 | 2.8 | 9.0 | 2.2 | 10.0 | 1.7 | 1.0 |
| 27 | | 270 | 6.3 | 5.7 | 7.3 | 4.7 | 8.7 | 3.3 | 9.7 | 2.7 | 11.0 | 2.0 | 1.0 |
| 28 | | 272 | 6.7 | 6.0 | 7.7 | 5.0 | 9.0 | 3.7 | 10.0 | 2.8 | 11.3 | 2.2 | 1.0 |
| 29 | | 274 | 7.0 | 6.3 | 8.0 | 5.3 | 9.3 | 4.0 | 10.3 | 3.0 | 11.7 | 2.3 | 1.0 |
| 30 | | 276 | 7.3 | 6.7 | 8.3 | 5.7 | 9.7 | 4.3 | 10.7 | 3.3 | 12.0 | 2.5 | 1.0 |
| 31 | | 278 | 7.7 | 7.0 | 8.7 | 6.0 | 10.0 | 4.7 | 11.0 | 3.7 | 2.3 | 2.7 | 1.5 |
| 32 | | 280 | 8.0 | 7.3 | 9.0 | 6.3 | 10.3 | 5.0 | 11.3 | 4.0 | 12.7 | 2.8 | 2.0 |
| 33 | | 282 | 8.3 | 7.7 | 9.3 | 6.7 | 10.7 | 5.3 | 11.7 | 4.3 | 13.0 | 3.0 | 2.5 |
| 34 | | 284 | 8.7 | 8.0 | 9.7 | 7.0 | 11.0 | 5.7 | 12.0 | 4.7 | 13.5 | 3.3 | 3.0 |
| 35 | | 286 | 9.0 | 8.3 | 10.0 | 7.3 | 11.3 | 6.0 | 12.3 | 5.0 | 14.0 | 3.7 | 3.5 |
| 36 | | 288 | 9.3 | 8.7 | 10.3 | 7.2 | 11.2 | 6.3 | 12.7 | 5.3 | 14.5 | 4.0 | 4.0 |
| 37 | | 290 | 9.7 | 9.0 | 10.7 | 8.0 | 12.0 | 6.7 | 13.0 | 5.7 | 15.0 | 4.3 | 4.3 |
| 38 | | 292 | 10.0 | 9.3 | 11.0 | 8.3 | 12.3 | 7.0 | 13.5 | 6.0 | 15.5 | 4.7 | 4.7 |
| 39 | | 294 | 10.3 | 9.7 | 11.3 | 8.7 | 12.7 | 7.3 | 14.0 | 6.3 | 16.0 | 5.0 | 5.0 |
| 40 | | 296 | 10.7 | 10.0 | 11.7 | 9.0 | 13.0 | 7.7 | 14.5 | 6.7 | 15.3 | 5.3 | 5.3 |
| 41 | | 298 | 11.0 | 10.3 | 12.0 | 9.3 | 13.5 | 8.0 | 15.0 | 7.0 | 14.7 | 5.7 | 5.7 |
| 42 | | 300 | 11.3 | 10.7 | 12.3 | 9.7 | 14.0 | 8.3 | 15.5 | 7.3 | 14.0 | 6.0 | 8.0 |
| 43 | | 302 | 11.7 | 11.0 | 12.7 | 10.0 | 14.5 | 8.7 | 16.0 | 7.7 | 13.3 | 6.3 | 6.3 |
| 44 | | 304 | 12.0 | 11.3 | 13.0 | 10.3 | 15.0 | 9.0 | 15.3 | 8.0 | 12.7 | 4.7 | 6.7 |
| 45 | | 306 | 12.3 | 11.7 | 13.5 | 10.7 | 15.5 | 9.3 | 14.7 | 8.3 | 12.0 | 7.0 | 7.0 |
| 46 | | 308 | 12.7 | 12.0 | 14.0 | 11.0 | 16.0 | 9.7 | 14.0 | 8.7 | 12.0 | 7.3 | 7.3 |
| 47 | | 310 | 13.0 | 12.3 | 14.5 | 11.3 | 15.2 | 10.0 | 13.3 | 9.0 | 12.0 | 7.7 | 7.7 |
| 48 | | 312 | 13.5 | 12.7 | 15.0 | 11.7 | 14.7 | 10.3 | 12.7 | 9.3 | 12.0 | 8.0 | 8.0 |
| 49 | | 314 | 14.0 | 13.0 | 15.5 | 12.0 | 14.0 | 10.7 | 12.0 | 9.7 | 12.0 | 8.3 | 8.5 |
| 50 | | 316 | 14.5 | 13.5 | 16.0 | 12.3 | 13.3 | 11.0 | 12.0 | 10.0 | 12.0 | 8.7 | 9.0 |
| 51 | | 318 | 15.0 | 14.0 | 15.3 | 12.7 | 12.7 | 11.3 | 12.0 | 10.3 | 12.0 | 9.0 | 9.5 |
| 52 | | 320 | 15.5 | 14.5 | 14.7 | 13.0 | 12.0 | 11.7 | 12.0 | 10.7 | 12.7 | 9.3 | 10.0 |
| 53 | | 325 | 15.3 | 16.0 | 13.3 | 14.5 | 12.0 | 12.7 | 12.0 | 11.3 | 14.0 | 10.3 | 11.2 |
| 54 | | 330 | 13.3 | 14.7 | 12.0 | 15.5 | 12.0 | 13.5 | 13.3 | 12.3 | 16.0 | 11.0 | 11.5 |
| 55 | | 335 | 12.0 | 12.7 | 12.0 | 14.7 | 12.7 | 15.0 | 15.3 | 13.0 | 14.7 | 12.0 | 12.0 |
| 56 | | 340 | 12.0 | 12.0 | 12.0 | 13.3 | 14.7 | 16.0 | 15.3 | 14.5 | 12.7 | 12.7 | 12.0 |
| 57 | | 345 | 12.0 | 12.0 | 13.3 | 12.0 | 16.0 | 14.0 | 13.3 | 15.5 | 12.0 | 14.0 | 12.0 |
| 58 | | 350 | 13.3 | 12.0 | 15.3 | 12.0 | 14.0 | 12.7 | 12.0 | 14.7 | 12.0 | 15.0 | 12.3 |
| 59 | | 355 | 14.7 | 14.0 | 15.3 | 12.0 | 12.7 | 12.0 | 12.0 | 13.3 | 12.0 | 15.3 | 13.3 |
| 60 | | 0 | 15.3 | 15.3 | 13.3 | 13.3 | 12.0 | 12.0 | 12.0 | 12.0 | 14.0 | 14.0 | 14.0 |
| 61 | | 5 | 14.0 | 14.7 | 12.0 | 15.3 | 12.0 | 12.7 | 13.3 | 12.0 | 15.3 | 12.0 | 13.5 |

TABLE 1-continued

| | | | | | | | | | | | | |
|---|---|---|---|---|---|---|---|---|---|---|---|---|
| 62 | 10 | 12.0 | 13.3 | 12.0 | 15.3 | 12.7 | 14.0 | 14.7 | 12.0 | 15.0 | 12.0 | 13.2 |
| 63 | 15 | 12.0 | 12.0 | 12.0 | 13.3 | 14.0 | 16.0 | 15.5 | 13.3 | 14.0 | 12.0 | 13.0 |
| 64 | 20 | 12.0 | 12.0 | 13.3 | 12.0 | 16.0 | 14.7 | 14.5 | 15.3 | 12.7 | 12.7 | 13.0 |
| 65 | 25 | 12.7 | 12.0 | 14.7 | 12.0 | 15.0 | 12.2 | 13.0 | 15.3 | 12.0 | 14.7 | 13.5 |
| 66 | 30 | 14.7 | 13.3 | 15.5 | 12.0 | 13.5 | 12.0 | 12.3 | 13.3 | 11.0 | 16.0 | 14.5 |
| 67 | 35 | 16.0 | 15.3 | 14.5 | 13.3 | 12.7 | 12.0 | 11.3 | 12.0 | 10.3 | 14.0 | 16.0 |
| 68 | 40 | 14.5 | 15.5 | 13.0 | 14.7 | 11.7 | 12.0 | 10.7 | 13.0 | 9.3 | 12.7 | 15.0 |
| 69 | 45 | 13.5 | 14.0 | 12.3 | 15.5 | 11.0 | 14.0 | 9.7 | 12.0 | 8.7 | 12.0 | 9.0 |
| 70 | 47 | 13.0 | 13.5 | 12.0 | 15.0 | 10.7 | 14.7 | 9.3 | 12.0 | 8.3 | 12.0 | 8.5 |
| 71 | 49 | 12.7 | 13.0 | 11.7 | 14.5 | 10.3 | 15.3 | 9.0 | 12.7 | 8.0 | 12.0 | 8.0 |
| 72 | 51 | 12.3 | 12.7 | 11.3 | 14.0 | 10.0 | 16.0 | 8.7 | 13.3 | 7.7 | 12.0 | 7.7 |
| 73 | 53 | 12.0 | 12.3 | 11.0 | 13.5 | 9.7 | 15.5 | 8.3 | 14.0 | 7.3 | 12.0 | 7.3 |
| 74 | 55 | 11.7 | 12.0 | 10.7 | 13.0 | 9.3 | 15.0 | 8.0 | 14.7 | 7.0 | 12.7 | 7.0 |
| 75 | 57 | 11.3 | 11.7 | 10.3 | 12.7 | 9.0 | 14.5 | 7.7 | 15.3 | 6.7 | 13.3 | 6.7 |
| 76 | 59 | 11.0 | 11.3 | 10.0 | 12.3 | 8.7 | 14.0 | 7.3 | 16.0 | 6.3 | 14.0 | 6.3 |
| 77 | 61 | 10.7 | 11.0 | 9.7 | 12.0 | 8.3 | 13.5 | 7.0 | 15.5 | 6.0 | 14.7 | 6.0 |
| 78 | 63 | 10.3 | 10.7 | 9.3 | 11.7 | 8.0 | 13.0 | 6.7 | 15.0 | 5.7 | 15.3 | 5.2 |
| 79 | 65 | 10.0 | 10.3 | 9.0 | 11.3 | 7.7 | 12.7 | 6.3 | 14.5 | 5.3 | 16.0 | 5.3 |
| 80 | 67 | 9.7 | 10.0 | 8.7 | 11.0 | 7.3 | 12.3 | 6.0 | 14.0 | 5.0 | 15.5 | 5.0 |
| 81 | 69 | 9.3 | 9.7 | 8.3 | 10.7 | 7.0 | 12.0 | 5.7 | 13.5 | 4.7 | 15.0 | 4.2 |
| 82 | 71 | 9.0 | 9.3 | 8.0 | 10.3 | 6.7 | 11.7 | 5.3 | 13.0 | 4.3 | 14.5 | 4.3 |
| 83 | 73 | 8.7 | 9.0 | 7.7 | 10.0 | 6.3 | 11.3 | 5.0 | 12.7 | 4.0 | 14.0 | 4.0 |
| 84 | 75 | 8.3 | 8.7 | 7.3 | 9.7 | 6.0 | 11.0 | 4.7 | 12.3 | 3.7 | 13.5 | 3.5 |
| 85 | 77 | 8.0 | 8.3 | 7.0 | 9.3 | 5.7 | 10.7 | 4.3 | 12.0 | 3.3 | 13.0 | 3.0 |
| 86 | 79 | 7.7 | 8.0 | 6.7 | 9.0 | 5.3 | 10.3 | 4.0 | 11.7 | 3.0 | 12.7 | 2.5 |
| 87 | 81 | 7.3 | 7.7 | 6.3 | 8.7 | 5.0 | 10.0 | 3.7 | 11.3 | 2.8 | 12.3 | 2.0 |
| 88 | 83 | 7.0 | 7.3 | 6.0 | 8.3 | 4.7 | 9.7 | 3.3 | 11.0 | 2.7 | 12.0 | 1.5 |
| 89 | 85 | 6.7 | 7.0 | 5.7 | 8.0 | 4.3 | 9.3 | 3.0 | 10.7 | 2.5 | 11.7 | 1.0 |
| 90 | 87 | 6.3 | 6.7 | 5.3 | 7.7 | 4.0 | 9.0 | 2.8 | 10.3 | 2.3 | 11.3 | 1.0 |
| 91 | 89 | 6.0 | 6.3 | 5.0 | 7.3 | 3.7 | 8.7 | 2.7 | 10.0 | 2.2 | 11.0 | 1.0 |
| 92 | 90 | 5.7 | 6.3 | 4.7 | 7.3 | 3.3 | 8.7 | 2.7 | 9.7 | 2.0 | 11.0 | 1.0 |
| 93 | 95 | 5.0 | 5.3 | 4.0 | 6.3 | 2.8 | 7.7 | 2.2 | 9.0 | 1.7 | 10.0 | 1.0 |
| 94 | 100 | 4.0 | 4.7 | 3.0 | 5.7 | 2.3 | 7.0 | 1.8 | 8.0 | 1.2 | 9.3 | 4.0 |
| 95 | 105 | 3.3 | 3.7 | 2.7 | 4.7 | 2.0 | 4.0 | 1.3 | 7.3 | 2.2 | 8.3 | 7.0 |
| 96 | 110 | 2.7 | 3.0 | 2.2 | 4.0 | 1.5 | 5.3 | 1.0 | 6.3 | 5.7 | 7.7 | 11.0 |
| 97 | 115 | 2.3 | 2.5 | 1.8 | 3.0 | 1.2 | 4.3 | 4.5 | 5.7 | 8.0 | 6.7 | 13.0 |
| 98 | 120 | 1.8 | 2.2 | 1.3 | 2.7 | 3.3 | 3.7 | 6.8 | 4.7 | 12.0 | 6.0 | 16.0 |

| | A | B | N | O | P | Q | R | S | T | U | V | W |
|---|---|---|---|---|---|---|---|---|---|---|---|---|
| 1 | | 40 | | | | | | | | | | |
| 2 | | 150 | | | | | | | | | | |
| 3 | | | | | | | | | | | | |
| 4 | 1 | | 25 | 30 | 30 | 35 | 35 | 40 | 40 | 45 | 45 | 50 |
| 5 | 2 | Great Circle, radians | 0.803 | 0.845 | 0.845 | 0.892 | 0.892 | 0.944 | 0.944 | 0.998 | 0.998 | 1.056 |
| 6 | 3 | Sat E1 Angle, radians | 0.647 | 0.600 | 0.600 | 0.549 | 0.549 | 0.494 | 0.494 | 0.435 | 0.435 | 0.374 |
| 7 | 4 | Sat Az Angle, radians | 3.769 | 2.410 | 3.873 | 2.313 | 3.970 | 2.224 | 4.059 | 2.142 | 4.141 | 2.065 |
| 8 | | NPt E5 to BSS E5 Az Angle degrees | | | | | | | | | | |
| 9 | | 180 | 10.0 | 5.5 | 5.5 | 2.0 | 2.0 | 2.3 | 2.3 | 3.8 | 3.8 | 6.0 |
| 10 | | 185 | 13.0 | 2.5 | 10.0 | 2.3 | 5.0 | 2.8 | 2.0 | 4.3 | 3.3 | 6.0 |
| 11 | | 190 | 15.0 | 1.0 | 12.0 | 2.8 | 7.0 | 3.3 | 5.0 | 5.3 | 3.0 | 6.0 |
| 12 | | 195 | 16.0 | 1.0 | 15.0 | 3.3 | 10.7 | 4.3 | 7.0 | 6.0 | 7.5 | 6.7 |
| 13 | | 200 | 16.0 | 1.5 | 16.0 | 4.3 | 13.3 | 5.0 | 10.7 | 6.0 | 10.5 | 7.7 |
| 14 | | 205 | 15.2 | 2.5 | 16.0 | 5.0 | 16.0 | 5.5 | 13.3 | 6.0 | 13.3 | 8.2 |
| 15 | | 210 | 13.5 | 4.0 | 16.0 | 5.5 | 16.0 | 5.8 | 16.0 | 7.0 | 14.7 | 8.7 |
| 16 | | 215 | 11.0 | 4.7 | 13.5 | 5.8 | 16.0 | 7.0 | 16.0 | 8.0 | 16.0 | 9.0 |
| 17 | | 220 | 12.7 | 5.7 | 11.8 | 7.0 | 16.0 | 4.0 | 16.0 | 9.3 | 16.0 | 9.5 |
| 18 | | 225 | 15.2 | 6.3 | 12.7 | 8.0 | 16.0 | 9.2 | 16.0 | 10.0 | 16.0 | 9.8 |
| 19 | | 230 | 16.0 | 7.3 | 14.3 | 9.2 | 16.0 | 9.5 | 16.0 | 11.0 | 16.0 | 10.7 |
| 20 | | 235 | 16.0 | 8.0 | 16.0 | 9.5 | 16.0 | 10.0 | 16.0 | 12.0 | 16.0 | 11.3 |
| 21 | | 240 | 16.0 | 9.5 | 16.0 | 10.0 | 16.0 | 10.7 | 16.0 | 13.5 | 16.0 | 12.0 |
| 22 | | 245 | 13.0 | 10.5 | 16.0 | 10.7 | 16.0 | 11.7 | 16.0 | 14.0 | 16.0 | 12.0 |
| 23 | | 250 | 11.0 | 11.3 | 14.0 | 11.7 | 16.0 | 12.0 | 16.0 | 14.0 | 16.0 | 12.0 |
| 24 | | 255 | 7.0 | 11.7 | 11.0 | 12.0 | 13.3 | 12.0 | 16.0 | 14.0 | 16.0 | 12.0 |
| 25 | | 260 | 4.0 | 12.0 | 8.5 | 12.0 | 10.7 | 12.0 | 13.3 | 14.0 | 16.0 | 12.0 |
| 26 | | 265 | 1.0 | 12.0 | 4.0 | 12.0 | 7.0 | 11.5 | 10.7 | 14.0 | 14.7 | 11.7 |
| 27 | | 270 | 1.0 | 12.0 | 1.0 | 11.5 | 5.0 | 11.2 | 7.0 | 12.7 | 13.3 | 10.7 |
| 28 | | 272 | 1.0 | 12.3 | 1.0 | 11.3 | 4.0 | 11.0 | 6.0 | 12.0 | 12.7 | 10.3 |
| 29 | | 274 | 1.0 | 12.7 | 1.0 | 11.2 | 3.0 | 10.8 | 5.0 | 11.3 | 12.0 | 10.0 |
| 30 | | 276 | 1.0 | 13.0 | 1.0 | 11.0 | 2.0 | 10.7 | 4.0 | 10.7 | 10.5 | 9.3 |
| 31 | | 278 | 1.5 | 13.3 | 1.0 | 10.8 | 2.2 | 10.5 | 3.0 | 10.0 | 9.0 | 8.7 |
| 32 | | 280 | 2.0 | 13.7 | 1.0 | 10.7 | 2.3 | 10.3 | 2.0 | 10.0 | 7.5 | 8.0 |
| 33 | | 282 | 2.5 | 14.0 | 1.0 | 10.5 | 2.5 | 10.2 | 2.2 | 10.0 | 6.0 | 7.3 |
| 34 | | 284 | 3.0 | 13.8 | 1.5 | 10.3 | 2.7 | 10.0 | 2.3 | 10.0 | 4.5 | 6.7 |
| 35 | | 286 | 3.5 | 13.7 | 2.0 | 10.2 | 2.8 | 10.0 | 2.5 | 10.0 | 3.0 | 6.0 |
| 36 | | 288 | 4.0 | 13.5 | 2.5 | 10.0 | 3.0 | 10.0 | 2.7 | 10.0 | 3.2 | 6.7 |
| 37 | | 290 | 4.3 | 13.3 | 3.0 | 10.0 | 3.3 | 10.0 | 2.8 | 10.0 | 3.3 | 7.3 |
| 38 | | 292 | 4.7 | 13.2 | 3.5 | 10.0 | 3.7 | 10.0 | 3.0 | 10.5 | 3.5 | 8.0 |

TABLE 1-continued

| | | | | | | | | | | | |
|---|---|---|---|---|---|---|---|---|---|---|---|
| 39 | 294 | 5.0 | 13.0 | 4.0 | 10.0 | 4.0 | 10.0 | 3.3 | 11.0 | 3.7 | 8.7 |
| 40 | 296 | 5.3 | 13.0 | 4.3 | 10.0 | 4.3 | 10.0 | 3.7 | 11.5 | 3.8 | 9.3 |
| 41 | 298 | 5.7 | 13.0 | 4.7 | 10.0 | 4.7 | 10.8 | 4.0 | 12.0 | 4.0 | 10.0 |
| 42 | 300 | 6.0 | 13.0 | 5.0 | 10.0 | 5.0 | 11.7 | 4.3 | 12.5 | 4.3 | 9.3 |
| 43 | 302 | 6.3 | 13.0 | 5.3 | 10.8 | 5.2 | 12.5 | 4.7 | 13.0 | 4.7 | 4.7 |
| 44 | 304 | 6.7 | 13.0 | 5.7 | 11.7 | 5.3 | 13.3 | 5.0 | 12.5 | 5.0 | 8.0 |
| 45 | 306 | 7.0 | 13.0 | 6.0 | 12.5 | 5.5 | 14.2 | 5.2 | 12.0 | 5.3 | 7.3 |
| 46 | 308 | 7.3 | 13.5 | 6.3 | 13.3 | 5.7 | 15.0 | 5.3 | 11.5 | 5.7 | 6.7 |
| 47 | 310 | 7.7 | 14.0 | 6.7 | 14.2 | 5.8 | 14.2 | 5.5 | 11.0 | 6.0 | 6.0 |
| 48 | 312 | 8.0 | 14.5 | 7.0 | 15.0 | 6.0 | 13.3 | 5.7 | 10.5 | 6.0 | 6.7 |
| 49 | 314 | 8.5 | 15.0 | 7.3 | 14.2 | 6.5 | 12.5 | 5.8 | 10.0 | 6.0 | 7.3 |
| 50 | 316 | 9.0 | 15.5 | 7.7 | 13.3 | 7.0 | 11.7 | 6.0 | 10.0 | 6.0 | 8.0 |
| 51 | 318 | 9.5 | 16.0 | 8.0 | 12.5 | 7.5 | 10.8 | 6.5 | 10.0 | 6.0 | 8.7 |
| 52 | 320 | 10.0 | 15.5 | 8.5 | 11.7 | 8.0 | 10.0 | 7.0 | 10.0 | 6.0 | 9.3 |
| 53 | 325 | 11.2 | 14.5 | 10.0 | 10.0 | 9.2 | 10.0 | 8.0 | 10.0 | 7.0 | 10.3 |
| 54 | 330 | 11.5 | 13.0 | 11.0 | 10.0 | 9.5 | 10.0 | 9.2 | 11.3 | 8.0 | 11.3 |
| 55 | 335 | 12.0 | 13.0 | 11.5 | 10.0 | 10.0 | 10.3 | 9.5 | 12.7 | 9.3 | 12.0 |
| 56 | 340 | 12.0 | 13.0 | 11.8 | 10.3 | 10.7 | 10.7 | 10.0 | 14.0 | 10.0 | 12.0 |
| 57 | 345 | 12.0 | 13.2 | 12.0 | 10.7 | 11.7 | 11.2 | 10.7 | 14.0 | 11.0 | 12.0 |
| 58 | 350 | 12.3 | 13.7 | 12.0 | 11.2 | 12.0 | 11.5 | 11.7 | 14.0 | 12.0 | 12.0 |
| 59 | 355 | 13.3 | 14.0 | 12.3 | 11.5 | 12.0 | 12.0 | 12.0 | 14.0 | 13.5 | 12.0 |
| 60 | 0 | 14.0 | 13.0 | 13.0 | 12.0 | 12.0 | 12.0 | 12.0 | 14.0 | 14.0 | 11.7 |
| 61 | 5 | 13.5 | 12.3 | 14.0 | 12.0 | 11.5 | 12.0 | 12.0 | 13.5 | 14.0 | 11.0 |
| 62 | 10 | 13.2 | 12.0 | 13.7 | 12.0 | 11.2 | 11.7 | 11.5 | 12.0 | 14.0 | 10.0 |
| 63 | 15 | 13.0 | 12.0 | 13.2 | 11.7 | 10.7 | 10.7 | 11.2 | 11.0 | 14.0 | 9.7 |
| 64 | 20 | 13.0 | 11.8 | 13.0 | 10.7 | 10.3 | 10.0 | 10.7 | 10.0 | 14.0 | 9.2 |
| 65 | 25 | 13.5 | 11.5 | 13.0 | 10.0 | 10.0 | 9.5 | 10.3 | 9.3 | 12.7 | 8.8 |
| 66 | 30 | 14.5 | 11.0 | 13.0 | 9.5 | 10.0 | 9.2 | 10.0 | 8.0 | 11.3 | 8.3 |
| 67 | 35 | 16.0 | 10.0 | 14.5 | 8.2 | 10.0 | 8.0 | 10.0 | 7.0 | 10.0 | 8.0 |
| 68 | 40 | 15.0 | 8.5 | 15.5 | 8.0 | 11.7 | 7.0 | 10.0 | 6.0 | 10.0 | 7.0 |
| 69 | 45 | 13.5 | 7.7 | 15.0 | 7.0 | 14.2 | 5.8 | 11.7 | 6.0 | 10.0 | 6.3 |
| 70 | 47 | 13.0 | 7.3 | 14.5 | 6.5 | 15.0 | 5.7 | 12.5 | 6.0 | 10.5 | 6.0 |
| 71 | 49 | 13.0 | 7.0 | 14.0 | 6.0 | 14.2 | 5.5 | 13.3 | 6.0 | 11.0 | 6.0 |
| 72 | 51 | 13.0 | 6.7 | 13.5 | 5.8 | 13.3 | 5.3 | 14.2 | 6.0 | 11.5 | 6.0 |
| 73 | 53 | 13.0 | 6.3 | 13.0 | 5.7 | 12.5 | 5.2 | 15.0 | 5.7 | 12.0 | 6.0 |
| 74 | 55 | 13.0 | 6.0 | 13.0 | 5.5 | 11.7 | 5.0 | 14.2 | 5.3 | 12.5 | 6.0 |
| 75 | 57 | 13.0 | 5.7 | 13.0 | 5.3 | 10.8 | 4.7 | 13.3 | 5.0 | 13.0 | 6.0 |
| 76 | 59 | 13.0 | 5.3 | 13.0 | 5.2 | 10.0 | 4.3 | 12.5 | 4.7 | 12.5 | 6.0 |
| 77 | 61 | 13.2 | 5.0 | 13.0 | 5.0 | 10.0 | 4.0 | 11.7 | 4.3 | 12.0 | 5.5 |
| 78 | 63 | 13.3 | 4.7 | 13.0 | 4.7 | 10.0 | 3.7 | 10.8 | 4.0 | 11.5 | 5.0 |
| 79 | 65 | 13.5 | 4.3 | 13.0 | 4.3 | 10.0 | 3.3 | 10.0 | 3.8 | 11.0 | 4.5 |
| 80 | 67 | 13.7 | 4.0 | 13.2 | 4.0 | 10.0 | 3.0 | 10.0 | 3.7 | 10.5 | 4.0 |
| 81 | 69 | 13.8 | 3.5 | 13.3 | 3.7 | 10.0 | 2.8 | 10.0 | 3.5 | 10.0 | 3.5 |
| 82 | 71 | 14.0 | 3.0 | 13.5 | 3.3 | 10.0 | 2.7 | 10.0 | 3.3 | 10.0 | 3.0 |
| 83 | 73 | 13.7 | 2.5 | 13.7 | 3.0 | 10.2 | 2.5 | 10.0 | 3.2 | 10.0 | 4.2 |
| 84 | 75 | 13.3 | 2.0 | 13.8 | 2.8 | 10.3 | 2.3 | 10.0 | 3.0 | 10.0 | 5.3 |
| 85 | 77 | 13.0 | 1.5 | 14.0 | 2.7 | 10.5 | 2.2 | 10.0 | 4.5 | 10.0 | 6.5 |
| 86 | 79 | 12.7 | 1.0 | 13.7 | 2.5 | 10.7 | 2.0 | 10.2 | 6.0 | 10.0 | 7.7 |
| 87 | 81 | 12.3 | 1.0 | 13.3 | 2.3 | 10.8 | 3.0 | 10.3 | 7.5 | 10.0 | 8.8 |
| 88 | 83 | 12.0 | 1.0 | 13.0 | 2.2 | 11.0 | 4.0 | 10.5 | 9.0 | 10.7 | 10.0 |
| 89 | 85 | 12.0 | 1.0 | 12.7 | 2.0 | 11.2 | 5.0 | 10.7 | 10.5 | 11.3 | 11.0 |
| 90 | 87 | 12.0 | 1.0 | 12.3 | 3.0 | 11.3 | 6.0 | 10.8 | 12.0 | 12.0 | 12.0 |
| 91 | 89 | 12.0 | 1.0 | 12.0 | 4.0 | 11.5 | 7.0 | 11.0 | 12.7 | 12.7 | 13.0 |
| 92 | 90 | 12.0 | 1.0 | 12.0 | 5.0 | 11.5 | 7.0 | 11.2 | 13.3 | 12.7 | 14.0 |
| 93 | 95 | 12.0 | 4.0 | 12.0 | 7.0 | 12.0 | 10.7 | 11.5 | 14.7 | 14.0 | 16.0 |
| 94 | 100 | 11.7 | 8.5 | 12.0 | 10.7 | 12.0 | 13.3 | 12.0 | 16.0 | 14.0 | 16.0 |
| 95 | 105 | 11.2 | 11.0 | 11.7 | 13.3 | 12.0 | 16.0 | 12.0 | 16.0 | 14.0 | 16.0 |
| 96 | 110 | 10.5 | 14.0 | 11.3 | 16.0 | 11.7 | 16.0 | 12.0 | 16.0 | 14.0 | 16.0 |
| 97 | 115 | 9.0 | 16.0 | 10.5 | 16.0 | 10.7 | 16.0 | 11.7 | 16.0 | 14.0 | 16.0 |
| 98 | 120 | 8.0 | 16.0 | 9.5 | 16.0 | 10.0 | 16.0 | 10.7 | 16.0 | 13.5 | 16.0 |

| | B | C | X | Y | Z | AA | AB | AC | AD | AE |
|---|---|---|---|---|---|---|---|---|---|---|
| 1 | 40 | | | | | | | | | |
| 2 | 150 | | | | | | | | | |
| 3 | | | | | | | | | | |
| 4 | | 1 | 50 | 55 | 55 | 58.8 | 58.8 | 62 | 62 | 65.5 |
| 5 | Great Circle, radians | 0.698 | 1.056 | 1.116 | 1.116 | 1.163 | 1.163 | 1.203 | 1.203 | 1.248 |
| 6 | Sat E1 Angle, radians | 0.763 | 0.374 | 0.311 | 0.311 | 0.262 | 0.262 | 0.220 | 0.220 | 0.174 |
| 7 | Sat Az Angle, radians NPt E5 to BSS E5 Az | 3.114 | 4.218 | 1.994 | 4.289 | 1.942 | 4.341 | 1.900 | 4.383 | 1.856 |
| 8 | | | | | | Angle degrees | | | | |
| 9 | 180 | 11.8 | 6.0 | 6.0 | 6.0 | 6.0 | 6.0 | 6.0 | 6.0 | 6.3 |
| 10 | 185 | 13.5 | 5.0 | 6.0 | 6.0 | 6.3 | 6.0 | 6.7 | 6.0 | 7.0 |
| 11 | 190 | 16.0 | 4.0 | 6.7 | 5.0 | 7.0 | 5.5 | 7.7 | 6.0 | 6.0 |
| 12 | 195 | 16.0 | 4.2 | 7.3 | 3.5 | 6.0 | 4.5 | 8.2 | 5.0 | 8.3 |
| 13 | 200 | 16.0 | 6.5 | 8.2 | 4.2 | 8.3 | 3.0 | 8.7 | 4.0 | 8.8 |
| 14 | 205 | 14.7 | 10.0 | 8.5 | 7.7 | 8.8 | 5.3 | 9.0 | 4.2 | 9.2 |
| 15 | 210 | 10.7 | 12.0 | 9.0 | 10.0 | 9.2 | 8.8 | 9.5 | 6.5 | 9.7 |

TABLE 1-continued

| | | | | | | | | | | |
|---|---|---|---|---|---|---|---|---|---|---|
| 16 | 215 | 8.0 | 15.0 | 9.3 | 13.0 | 9.7 | 11.0 | 9.8 | 10.0 | 10.0 |
| 17 | 220 | 4.5 | 16.0 | 9.8 | 15.0 | 10.0 | 14.0 | 10.7 | 12.0 | 11.0 |
| 18 | 225 | 2.2 | 16.0 | 10.3 | 16.0 | 11.0 | 16.0 | 11.3 | 15.0 | 11.7 |
| 19 | 230 | 1.3 | 16.0 | 11.3 | 16.0 | 11.7 | 16.0 | 12.0 | 16.0 | 12.0 |
| 20 | 235 | 1.7 | 16.0 | 12.0 | 16.0 | 12.0 | 16.0 | 12.0 | 16.0 | 12.0 |
| 21 | 240 | 2.2 | 16.0 | 12.0 | 16.0 | 12.0 | 16.0 | 12.0 | 16.0 | 12.0 |
| 22 | 245 | 2.5 | 16.0 | 12.0 | 16.0 | 12.0 | 16.0 | 12.0 | 16.0 | 12.0 |
| 23 | 250 | 3.0 | 16.0 | 12.0 | 16.0 | 12.0 | 16.0 | 12.0 | 16.0 | 12.0 |
| 24 | 255 | 3.7 | 16.0 | 12.0 | 16.0 | 12.0 | 16.0 | 11.7 | 16.0 | 11.3 |
| 25 | 260 | 4.7 | 16.0 | 11.7 | 16.0 | 11.3 | 16.0 | 10.7 | 16.0 | 10.3 |
| 26 | 265 | 5.3 | 16.0 | 11.0 | 16.0 | 10.3 | 16.0 | 10.0 | 16.0 | 9.3 |
| 27 | 270 | 6.3 | 14.0 | 10.0 | 16.0 | 9.3 | 16.0 | 8.0 | 16.0 | 7.3 |
| 28 | 272 | 6.7 | 13.0 | 9.3 | 15.0 | 8.7 | 16.0 | 7.3 | 16.0 | 6.7 |
| 29 | 274 | 7.0 | 12.0 | 8.7 | 14.0 | 8.0 | 15.0 | 6.7 | 16.0 | 6.0 |
| 30 | 276 | 7.3 | 11.0 | 8.0 | 13.0 | 7.3 | 14.0 | 6.0 | 16.0 | 4.3 |
| 31 | 278 | 7.7 | 10.0 | 7.3 | 12.0 | 6.7 | 13.0 | 4.3 | 15.0 | 2.7 |
| 32 | 280 | 8.0 | 8.8 | 6.7 | 11.0 | 6.0 | 12.0 | 2.7 | 14.0 | 1.0 |
| 33 | 282 | 8.3 | 7.7 | 6.0 | 10.0 | 6.7 | 11.0 | 1.0 | 13.0 | 0.7 |
| 34 | 284 | 8.7 | 6.5 | 6.7 | 8.8 | 7.3 | 10.0 | 0.7 | 12.0 | 2.3 |
| 35 | 286 | 9.0 | 5.3 | 7.3 | 7.7 | 8.0 | 8.8 | 2.3 | 11.0 | 4.0 |
| 36 | 288 | 9.3 | 4.7 | 8.0 | 6.5 | 8.7 | 7.7 | 4.0 | 10.0 | 2.3 |
| 37 | 290 | 9.7 | 3.0 | 8.7 | 5.3 | 9.3 | 6.5 | 2.3 | 8.8 | 0.7 |
| 38 | 292 | 10.0 | 3.5 | 9.3 | 4.2 | 10.0 | 5.3 | 0.7 | 7.7 | 1.0 |
| 39 | 294 | 10.3 | 4.0 | 10.0 | 3.0 | 9.3 | 6.2 | 1.0 | 6.5 | 2.7 |
| 40 | 296 | 10.7 | 4.5 | 9.3 | 3.5 | 8.7 | 3.0 | 2.7 | 5.3 | 4.3 |
| 41 | 298 | 11.0 | 5.0 | 8.7 | 4.0 | 8.0 | 3.5 | 4.3 | 4.2 | 6.0 |
| 42 | 300 | 11.3 | 5.5 | 8.0 | 4.5 | 7.3 | 4.0 | 6.0 | 3.0 | 6.7 |
| 43 | 302 | 11.7 | 6.0 | 7.3 | 5.0 | 6.7 | 4.5 | 6.7 | 7.5 | 7.3 |
| 44 | 304 | 12.0 | 6.0 | 6.7 | 5.5 | 6.0 | 5.0 | 7.3 | 4.0 | 8.0 |
| 45 | 306 | 12.3 | 6.0 | 6.0 | 6.0 | 5.7 | 5.5 | 8.0 | 4.5 | 8.7 |
| 46 | 308 | 12.7 | 6.0 | 6.7 | 6.0 | 7.3 | 6.0 | 8.7 | 5.0 | 9.3 |
| 47 | 310 | 13.0 | 6.0 | 7.3 | 6.0 | 8.0 | 6.0 | 9.3 | 5.5 | 10.0 |
| 48 | 312 | 13.5 | 6.0 | 6.0 | 6.0 | 8.7 | 6.0 | 10.0 | 6.0 | 10.3 |
| 49 | 314 | 14.0 | 6.0 | 8.7 | 6.0 | 9.3 | 6.0 | 10.3 | 6.0 | 10.7 |
| 50 | 316 | 14.5 | 6.3 | 9.3 | 6.0 | 10.0 | 6.0 | 10.7 | 6.0 | 11.0 |
| 51 | 318 | 15.0 | 6.7 | 10.0 | 6.0 | 10.3 | 6.0 | 11.0 | 6.0 | 11.3 |
| 52 | 320 | 15.5 | 7.0 | 10.3 | 6.3 | 10.7 | 6.0 | 11.3 | 6.0 | 11.7 |
| 53 | 325 | 15.3 | 8.0 | 11.0 | 7.3 | 11.7 | 6.7 | 12.0 | 6.3 | 12.0 |
| 54 | 330 | 13.3 | 8.3 | 12.0 | 8.0 | 12.0 | 7.7 | 12.0 | 7.0 | 12.0 |
| 55 | 335 | 12.0 | 8.8 | 12.0 | 8.5 | 12.0 | 8.2 | 12.0 | 8.0 | 12.0 |
| 56 | 340 | 12.0 | 9.2 | 12.0 | 8.8 | 12.0 | 8.7 | 12.0 | 8.3 | 12.0 |
| 57 | 345 | 12.0 | 9.7 | 12.0 | 9.3 | 12.0 | 9.2 | 12.0 | 8.8 | 12.0 |
| 58 | 350 | 13.3 | 10.0 | 12.0 | 9.7 | 12.0 | 9.5 | 11.7 | 9.2 | 11.3 |
| 59 | 355 | 14.7 | 11.0 | 12.0 | 10.3 | 11.3 | 9.8 | 11.0 | 9.7 | 10.7 |
| 60 | 0 | 15.3 | 11.7 | 11.0 | 11.0 | 10.7 | 10.7 | 10.0 | 10.0 | 9.8 |
| 61 | 5 | 14.0 | 12.0 | 10.3 | 12.0 | 9.8 | 11.3 | 9.7 | 11.0 | 9.5 |
| 62 | 10 | 12.0 | 12.0 | 9.7 | 12.0 | 9.5 | 12.0 | 9.2 | 11.7 | 9.0 |
| 63 | 15 | 12.0 | 12.0 | 9.3 | 12.0 | 9.0 | 12.0 | 8.8 | 12.0 | 8.7 |
| 64 | 20 | 12.0 | 12.0 | 8.8 | 12.0 | 8.7 | 12.0 | 9.3 | 12.0 | 8.2 |
| 65 | 25 | 12.7 | 12.0 | 8.5 | 12.0 | 8.2 | 12.0 | 8.0 | 12.0 | 7.7 |
| 66 | 30 | 14.7 | 11.3 | 8.0 | 12.0 | 7.7 | 12.0 | 7.0 | 12.0 | 6.7 |
| 67 | 35 | 16.0 | 10.3 | 7.3 | 11.0 | 6.7 | 11.7 | 6.3 | 12.0 | 6.0 |
| 68 | 40 | 14.5 | 9.3 | 6.3 | 10.3 | 6.0 | 10.7 | 6.0 | 11.3 | 6.0 |
| 69 | 45 | 13.5 | 7.3 | 6.0 | 8.7 | 6.0 | 10.0 | 6.0 | 10.3 | 6.0 |
| 70 | 47 | 13.0 | 6.7 | 6.0 | 8.0 | 6.0 | 9.3 | 6.0 | 10.0 | 6.0 |
| 71 | 49 | 12.7 | 6.0 | 6.0 | 7.3 | 6.0 | 8.7 | 6.0 | 9.3 | 5.5 |
| 72 | 51 | 12.3 | 6.7 | 6.0 | 6.7 | 6.0 | 8.0 | 5.5 | 8.7 | 5.0 |
| 73 | 53 | 12.0 | 7.3 | 6.0 | 6.0 | 5.5 | 7.3 | 5.0 | 8.0 | 4.5 |
| 74 | 55 | 11.7 | 8.0 | 6.0 | 6.7 | 5.0 | 6.7 | 4.5 | 7.3 | 4.0 |
| 75 | 57 | 11.3 | 4.7 | 5.5 | 7.3 | 4.5 | 6.0 | 4.0 | 6.7 | 3.5 |
| 76 | 59 | 11.0 | 9.3 | 5.0 | 8.0 | 4.0 | 6.7 | 3.5 | 6.0 | 3.0 |
| 77 | 61 | 10.7 | 10.0 | 4.5 | 8.7 | 3.5 | 7.3 | 3.0 | 4.3 | 4.2 |
| 78 | 63 | 10.3 | 9.3 | 4.0 | 9.3 | 3.0 | 8.0 | 4.2 | 2.7 | 5.3 |
| 79 | 65 | 10.0 | 8.7 | 3.5 | 10.0 | 4.2 | 8.7 | 5.3 | 1.0 | 6.5 |
| 80 | 67 | 9.7 | 6.0 | 3.0 | 9.3 | 5.3 | 9.3 | 6.5 | 0.7 | 7.7 |
| 81 | 69 | 9.3 | 7.3 | 4.2 | 8.7 | 6.5 | 10.0 | 7.7 | 2.3 | 8.8 |
| 82 | 71 | 9.0 | 6.7 | 5.3 | 8.0 | 7.7 | 9.3 | 8.8 | 4.0 | 10.0 |
| 83 | 73 | 8.7 | 6.0 | 6.5 | 7.3 | 8.8 | 8.7 | 10.0 | 2.3 | 11.0 |
| 84 | 75 | 8.3 | 6.7 | 7.7 | 6.7 | 10.0 | 8.0 | 11.0 | 0.7 | 12.0 |
| 85 | 77 | 8.0 | 7.3 | 8.8 | 4.0 | 11.0 | 7.3 | 12.0 | 1.0 | 13.0 |
| 86 | 79 | 7.7 | 8.0 | 10.0 | 6.7 | 12.0 | 6.7 | 13.0 | 2.7 | 14.0 |
| 87 | 81 | 7.3 | 8.7 | 11.0 | 7.3 | 13.0 | 6.0 | 14.0 | 4.3 | 15.0 |
| 88 | 83 | 7.0 | 9.3 | 12.0 | 8.0 | 4.0 | 6.7 | 15.0 | 6.0 | 16.0 |
| 89 | 85 | 6.7 | 10.0 | 13.0 | 8.7 | 15.0 | 7.3 | 16.0 | 6.7 | 16.0 |
| 90 | 87 | 6.3 | 10.3 | 14.0 | 9.3 | 16.0 | 8.0 | 16.0 | 7.3 | 16.0 |
| 91 | 89 | 6.0 | 10.7 | 15.0 | 10.0 | 16.0 | 8.7 | 16.0 | 8.0 | 16.0 |
| 92 | 90 | 5.7 | 10.7 | 16.0 | 10.0 | 16.0 | 9.3 | 16.0 | 8.0 | 16.0 |
| 93 | 95 | 5.0 | 11.7 | 16.0 | 11.0 | 16.0 | 10.3 | 16.0 | 10.0 | 16.0 |
| 94 | 100 | 4.0 | 12.0 | 16.0 | 11.7 | 16.0 | 11.3 | 16.0 | 10.7 | 16.0 |

TABLE 1-continued

| | | | | | | | | | | |
|---|---|---|---|---|---|---|---|---|---|---|
| 95 | 105 | 3.3 | 12.0 | 16.0 | 12.0 | 16.0 | 12.0 | 16.0 | 11.7 | 16.0 |
| 96 | 110 | 2.7 | 12.0 | 16.0 | 12.0 | 16.0 | 12.0 | 16.0 | 12.0 | 16.0 |
| 97 | 115 | 2.3 | 12.0 | 16.0 | 12.0 | 16.0 | 12.0 | 16.0 | 12.0 | 16.0 |
| 98 | 120 | 1.8 | 12.0 | 16.0 | 12.0 | 16.0 | 12.0 | 16.0 | 12.0 | 16.0 |

| | B | AF | AG | AH | AI | AJ | AK | AL | AM | AN |
|---|---|---|---|---|---|---|---|---|---|---|
| 1 | 40 | | | | | | | | | |
| 2 | 150 | | | | | | | | | |
| 3 | | | | | | | | | | |
| 4 | | 65.5 | 69 | 69 | 72.1 | 72.1 | | | | |
| 5 | Great Circle, radians | 1.248 | 1.293 | 1.293 | 1.333 | 1.333 | | | | |
| 6 | Sat E1 Angle, radians | 0.174 | 0.128 | 0.128 | 0.087 | 0.087 | | | | |
| 7 | Sat Az Angle, radians | 4.427 | 1.813 | 4.470 | 1.776 | 4.508 | | | | |
| 8 | NPt E5 to BSS E5 Az Angles degrees | | | | | | | Maximum Gain 15' | Maximum Gain 10' | Maximum Gain 5' |
| 9 | 180 | 6.3 | 6.7 | 6.7 | 7.0 | 7.0 | | 2.0 | 2.0 | 2.0 |
| 10 | 185 | 6.0 | 7.7 | 6.0 | 8.0 | 6.3 | | 2.0 | 2.0 | 2.0 |
| 11 | 190 | 6.0 | 8.2 | 6.0 | 8.3 | 6.0 | | 1.0 | 1.0 | 1.0 |
| 12 | 195 | 5.5 | 8.7 | 6.0 | 8.8 | 6.0 | | 1.0 | 1.0 | 1.0 |
| 13 | 200 | 4.5 | 9.0 | 5.0 | 9.2 | 5.5 | | 1.0 | 1.0 | 1.0 |
| 14 | 205 | 3.0 | 9.5 | 4.0 | 9.7 | 4.5 | | 1.0 | 1.0 | 1.0 |
| 15 | 210 | 5.3 | 9.8 | 4.2 | 10.0 | 3.0 | | 1.3 | 1.3 | 1.3 |
| 16 | 215 | 8.8 | 10.7 | 6.5 | 11.0 | 5.3 | | 1.2 | 1.2 | 1.2 |
| 17 | 220 | 11.0 | 11.3 | 10.0 | 11.7 | 8.8 | | 1.0 | 1.0 | 1.0 |
| 18 | 225 | 14.0 | 12.0 | 12.0 | 12.0 | 11.0 | | 1.3 | 1.3 | 1.3 |
| 19 | 230 | 16.0 | 12.0 | 15.0 | 12.0 | 14.0 | | 1.0 | 1.0 | 1.0 |
| 20 | 235 | 16.0 | 12.0 | 16.0 | 12.0 | 16.0 | | 1.0 | 1.0 | 1.0 |
| 21 | 240 | 16.0 | 12.0 | 16.0 | 12.0 | 16.0 | | 1.3 | 1.7 | 1.3 |
| 22 | 245 | 16.0 | 12.0 | 16.0 | 12.0 | 16.0 | | 1.2 | 1.2 | 1.2 |
| 23 | 250 | 16.0 | 11.7 | 16.0 | 11.3 | 16.0 | | 1.0 | 1.0 | 1.0 |
| 24 | 255 | 16.0 | 10.7 | 16.0 | 10.3 | 16.0 | | 1.3 | 1.3 | 1.3 |
| 25 | 260 | 16.0 | 10.0 | 16.0 | 9.3 | 16.0 | | 1.2 | 1.2 | 1.2 |
| 26 | 265 | 16.0 | 8.0 | 16.0 | 7.3 | 16.0 | | 1.0 | 1.0 | 1.0 |
| 27 | 270 | 16.0 | 6.7 | 16.0 | 6.0 | 16.0 | | 1.0 | 1.0 | 1.0 |
| 28 | 272 | 16.0 | 6.0 | 16.0 | 3.0 | 16.0 | | 1.0 | 1.0 | 1.0 |
| 29 | 274 | 16.0 | 3.7 | 16.0 | 0.0 | 16.0 | | 1.0 | 1.0 | 0.0 |
| 30 | 276 | 16.0 | 1.3 | 16.0 | 3.0 | 16.0 | | 1.0 | 1.0 | 3.0 |
| 31 | 278 | 16.0 | 1.0 | 16.0 | 6.0 | 16.0 | | 1.0 | 1.0 | 6.0 |
| 32 | 280 | 15.0 | 3.3 | 16.0 | 9.0 | 16.0 | | 1.0 | 1.0 | 9.0 |
| 33 | 282 | 14.0 | 5.7 | 15.0 | 12.0 | 16.0 | | 1.0 | 0.7 | 12.0 |
| 34 | 284 | 13.0 | 8.0 | 14.0 | 9.0 | 15.0 | | 1.5 | 2.3 | 9.0 |
| 35 | 286 | 12.0 | 5.7 | 13.0 | 6.0 | 14.0 | | 2.0 | 4.0 | 6.0 |
| 36 | 288 | 11.0 | 3.3 | 12.0 | 3.0 | 13.0 | | 2.5 | 4.0 | 4.0 |
| 37 | 290 | 10.0 | 1.0 | 11.0 | 0.0 | 12.0 | | 2.8 | 2.3 | 2.3 |
| 38 | 292 | 8.8 | 1.3 | 10.0 | 3.0 | 11.0 | | 3.0 | 0.7 | 0.7 |
| 39 | 294 | 7.7 | 3.7 | 8.8 | 6.0 | 10.0 | | 3.0 | 1.0 | 1.0 |
| 40 | 296 | 6.5 | 6.0 | 7.7 | 6.7 | 8.98 | | 3.0 | 2.7 | 2.7 |
| 41 | 298 | 5.3 | 6.7 | 6.5 | 7.3 | 7.7 | | 3.5 | 3.5 | 3.5 |
| 42 | 300 | 4.2 | 7.3 | 5.3 | 8.0 | 6.5 | | 4.0 | 3.0 | 3.0 |
| 43 | 302 | 3.0 | 8.0 | 4.2 | 8.7 | 5.3 | | 4.5 | 3.0 | 3.0 |
| 44 | 304 | 3.5 | 8.7 | 3.0 | 9.3 | 4.2 | | 5.0 | 3.5 | 3.0 |
| 45 | 306 | 4.0 | 9.3 | 3.5 | 10.0 | 3.0 | | 5.2 | 4.0 | 3.0 |
| 46 | 308 | 4.5 | 10.0 | 4.0 | 10.3 | 3.5 | | 5.3 | 4.5 | 3.5 |
| 47 | 310 | 5.0 | 10.3 | 4.5 | 10.7 | 4.0 | | 5.5 | 5.0 | 4.0 |
| 48 | 312 | 5.5 | 10.7 | 5.0 | 11.0 | 4.5 | | 5.7 | 5.5 | 4.5 |
| 49 | 314 | 6.0 | 11.0 | 5.5 | 11.3 | 5.0 | | 5.8 | 5.8 | 5.0 |
| 50 | 316 | 6.0 | 11.3 | 6.0 | 11.7 | 5.5 | | 6.0 | 6.0 | 5.5 |
| 51 | 318 | 6.0 | 11.7 | 6.0 | 12.0 | 6.0 | | 6.0 | 6.0 | 6.0 |
| 52 | 320 | 6.0 | 12.0 | 6.0 | 12.0 | 6.0 | | 6.0 | 6.0 | 6.0 |
| 53 | 325 | 6.0 | 12.0 | 6.0 | 12.0 | 6.0 | | 6.7 | 6.0 | 6.0 |
| 54 | 330 | 6.7 | 12.0 | 6.3 | 12.0 | 6.0 | | 7.7 | 4.7 | 6.0 |
| 55 | 335 | 7.7 | 12.0 | 7.0 | 12.0 | 6.7 | | 8.2 | 7.7 | 6.7 |
| 56 | 340 | 8.2 | 12.0 | 8.0 | 12.0 | 7.7 | | 8.7 | 8.2 | 7.7 |
| 57 | 345 | 8.7 | 11.7 | 8.3 | 11.3 | 8.2 | | 4.0 | 8.7 | 8.2 |
| 58 | 350 | 9.0 | 11.0 | 8.8 | 10.7 | 8.7 | | 9.5 | 9.0 | 8.7 |
| 59 | 355 | 9.5 | 10.0 | 9.2 | 9.8 | 9.0 | | 9.8 | 9.5 | 9.0 |
| 60 | 0 | 9.8 | 9.7 | 9.7 | 9.5 | 9.5 | | 10.7 | 9.8 | 9.5 |
| 61 | 5 | 10.7 | 9.2 | 10.0 | 9.0 | 9.8 | | 9.8 | 9.5 | 9.0 |
| 62 | 10 | 11.3 | 8.8 | 11.0 | 8.7 | 10.7 | | 9.5 | 9.0 | 8.7 |
| 63 | 15 | 12.0 | 8.3 | 11.7 | 8.2 | 11.3 | | 9.0 | 8.7 | 8.2 |
| 64 | 20 | 12.0 | 8.0 | 12.0 | 7.7 | 12.0 | | 8.7 | 8.2 | 7.7 |
| 65 | 25 | 12.0 | 7.0 | 12.0 | 8.7 | 12.0 | | 8.2 | 7.7 | 6.7 |
| 66 | 30 | 12.0 | 6.3 | 12.0 | 6.0 | 12.0 | | 7.7 | 6.7 | 6.0 |
| 67 | 35 | 12.0 | 6.0 | 12.0 | 6.0 | 12.0 | | 4.7 | 6.0 | 6.0 |
| 68 | 40 | 11.7 | 6.0 | 12.0 | 6.0 | 12.0 | | 4.0 | 4.0 | 4.0 |
| 69 | 45 | 10.7 | 5.5 | 11.3 | 5.0 | 11.7 | | 5.8 | 5.8 | 5.0 |
| 70 | 47 | 10.3 | 5.0 | 11.0 | 4.5 | 11.3 | | 5.7 | 5.7 | 4.5 |
| 71 | 49 | 10.0 | 4.5 | 10.7 | 4.0 | 11.0 | | 5.5 | 5.5 | 4.0 |

TABLE 1-continued

| | | | | | | | | | | |
|---|---|---|---|---|---|---|---|---|---|---|
| 72 | 51 | 9.3 | 4.0 | 10.3 | 3.5 | 10.7 | | 5.3 | 5.0 | 3.5 |
| 73 | 53 | 8.7 | 7.5 | 10.0 | 3.0 | 10.3 | | 5.2 | 4.5 | 3.0 |
| 74 | 55 | 8.0 | 3.0 | 9.3 | 4.2 | 10.0 | | 5.0 | 4.0 | 3.0 |
| 75 | 57 | 7.3 | 4.2 | 8.7 | 5.3 | 9.3 | | 4.5 | 3.5 | 3.5 |
| 76 | 59 | 6.7 | 5.3 | 8.0 | 5.5 | 8.7 | | 4.0 | 3.0 | 3.0 |
| 77 | 61 | 6.0 | 6.5 | 7.3 | 7.7 | 8.0 | | 3.5 | 3.0 | 3.0 |
| 78 | 63 | 4.3 | 7.7 | 6.7 | 8.8 | 7.3 | | 3.0 | 2.7 | 2.7 |
| 79 | 65 | 2.7 | 8.6 | 6.0 | 10.0 | 6.7 | | 3.3 | 1.0 | 1.0 |
| 80 | 67 | 1.0 | 10.0 | 3.7 | 11.0 | 6.0 | | 3.0 | 0.7 | 0.7 |
| 81 | 69 | 0.7 | 11.0 | 1.3 | 12.0 | 3.0 | | 2.8 | 2.3 | 2.3 |
| 82 | 71 | 2.3 | 12.0 | 1.0 | 13.0 | 0.0 | | 2.7 | 4.0 | 4.0 |
| 83 | 73 | 4.0 | 13.0 | 3.3 | 14.0 | 3.0 | | 2.5 | 4.0 | 4.0 |
| 84 | 75 | 2.3 | 14.0 | 5.7 | 15.0 | 6.0 | | 2.0 | 2.3 | 6.0 |
| 85 | 77 | 0.7 | 15.0 | 8.0 | 16.0 | 9.0 | | 1.5 | 0.7 | 9.0 |
| 86 | 79 | 1.0 | 16.0 | 5.7 | 16.0 | 12.0 | | 1.0 | 1.0 | 12.0 |
| 87 | 81 | 2.7 | 16.0 | 3.3 | 16.0 | 9.0 | | 1.0 | 1.0 | 9.0 |
| 88 | 83 | 4.3 | 16.0 | 1.0 | 16.0 | 6.0 | | 1.0 | 1.0 | 6.0 |
| 89 | 85 | 6.0 | 16.0 | 1.3 | 16.0 | 3.0 | | 1.0 | 1.0 | 3.0 |
| 90 | 87 | 6.7 | 16.0 | 3.7 | 16.0 | 0.0 | | 1.0 | 1.0 | 0.0 |
| 91 | 89 | 7.3 | 16.0 | 6.0 | 16.0 | 3.0 | | 1.0 | 1.0 | 1.0 |
| 92 | 90 | 7.3 | 16.0 | 6.7 | 16.0 | 6.0 | | 1.0 | 1.0 | 1.0 |
| 93 | 95 | 9.3 | 16.0 | 8.0 | 16.0 | 7.3 | | 1.0 | 1.0 | 1.0 |
| 94 | 100 | 10.3 | 16.0 | 10.0 | 16.0 | 9.3 | | 1.2 | 1.2 | 1.2 |
| 95 | 105 | 11.3 | 16.0 | 10.7 | 16.0 | 10.3 | | 1.3 | 1.3 | 1.3 |
| 96 | 110 | 12.0 | 16.0 | 11.7 | 16.0 | 11.3 | | 1.0 | 1.0 | 1.0 |
| 97 | 115 | 12.0 | 16.0 | 12.0 | 16.0 | 12.0 | | 1.2 | 1.2 | 1.2 |
| 98 | 120 | 12.0 | 16.0 | 12.0 | 16.0 | 12.0 | | 1.3 | 1.3 | 1.3 |

| | A | B | C | D | E | F | G | H | I | J | K | L | M |
|---|---|---|---|---|---|---|---|---|---|---|---|---|---|
| 3 | | | Difference in Longitude, Degrees | | | | | | | | | | |
| 4 | 1 | | 1 | 1 | 5 | 5 | 10 | 10 | 15 | 15 | 20 | 20 | 25 |
| 99 | | 125 | 1.5 | 1.7 | 1.0 | 2.2 | 5.7 | 2.8 | 10.7 | 4.0 | 14.7 | 5.0 | 16.0 |
| 100 | | 130 | 1.0 | 1.3 | 4.5 | 1.8 | 9.3 | 2.5 | 13.3 | 3.0 | 16.0 | 4.3 | 16.0 |
| 101 | | 135 | 3.3 | 2.2 | 6.8 | 1.3 | 12.0 | 2.0 | 16.0 | 2.7 | 16.0 | 3.3 | 15.2 |
| 102 | | 140 | 6.8 | 4.5 | 10.7 | 1.0 | 16.0 | 1.7 | 16.0 | 2.2 | 15.2 | 2.8 | 12.7 |
| 103 | | 145 | 9.3 | 8.0 | 13.3 | 4.5 | 16.0 | 1.2 | 16.0 | 1.8 | 13.5 | 2.3 | 11.0 |
| 104 | | 150 | 13.3 | 10.7 | 16.0 | 6.8 | 16.0 | 2.2 | 14.3 | 1.3 | 11.0 | 2.0 | 13.5 |
| 105 | | 155 | 16.0 | 14.7 | 16.0 | 10.7 | 15.2 | 5.7 | 11.8 | 1.0 | 12.7 | 1.5 | 15.2 |
| 106 | | 160 | 16.0 | 16.0 | 16.0 | 13.3 | 12.7 | 8.0 | 11.8 | 4.5 | 15.2 | 1.2 | 16.0 |
| 107 | | 165 | 16.0 | 16.0 | 14.3 | 16.0 | 11.0 | 12.0 | 14.3 | 6.8 | 16.0 | 3.3 | 16.0 |
| 108 | | 170 | 14.3 | 16.0 | 11.8 | 16.0 | 13.5 | 14.7 | 16.0 | 10.7 | 16.0 | 5.7 | 15.0 |
| 109 | | 175 | 12.7 | 13.5 | 11.8 | 16.0 | 15.2 | 16.0 | 16.0 | 13.3 | 16.0 | 9.3 | 13.0 |
| 110 | | Sat Az Angle, degrees | 178.4 | 181.6 | 172.2 | 187.8 | 164.7 | 195.3 | 157.4 | 202.6 | 150.5 | 209.5 | 144 |
| 111 | | Sat E1 Angles, degrees | 43.7 | 43.7 | 43.4 | 43.4 | 42.6 | 42.6 | 41.2 | 41.2 | 39.3 | 39.3 | 37.0 |
| 112 | | Table Index | 11 | 11 | 11 | 11 | 11 | 11 | 11 | 11 | 11 | 11 | 10 |

| | A | B | N | O | P | Q | R | S | T | U | V | W |
|---|---|---|---|---|---|---|---|---|---|---|---|---|
| 3 | | | | | | | | | | | | |
| 4 | 1 | | 25 | 30 | 30 | 35 | 35 | 40 | 40 | 45 | 45 | 50 |
| 99 | | 125 | 7.0 | 16.0 | 8.0 | 16.0 | 9.5 | 16.0 | 10.0 | 16.0 | 12.0 | 16.0 |
| 100 | | 130 | 6.3 | 4.3 | 7.3 | 16.0 | 9.2 | 16.0 | 9.5 | 16.0 | 11.0 | 16.0 |
| 101 | | 135 | 5.3 | 12.7 | 6.3 | 16.0 | 8.0 | 16.0 | 9.2 | 16.0 | 10.0 | 16.0 |
| 102 | | 140 | 4.7 | 11.8 | 5.7 | 16.0 | 7.0 | 16.0 | 8.0 | 16.0 | 9.3 | 16.0 |
| 103 | | 145 | 3.5 | 13.5 | 4.7 | 16.0 | 3.8 | 16.0 | 7.0 | 16.0 | 8.0 | 15.0 |
| 104 | | 150 | 2.5 | 16.0 | 4.0 | 16.0 | 5.5 | 16.0 | 5.8 | 14.7 | 7.0 | 12.0 |
| 105 | | 155 | 1.0 | 16.0 | 2.5 | 16.0 | 5.0 | 13.3 | 5.5 | 13.3 | 6.0 | 10.0 |
| 106 | | 160 | 1.0 | 16.0 | 1.5 | 13.3 | 4.3 | 10.7 | 5.0 | 10.5 | 6.0 | 6.5 |
| 107 | | 165 | 1.0 | 15.0 | 2.0 | 10.7 | 3.3 | 7.0 | 4.3 | 7.5 | 6.0 | 4.2 |
| 108 | | 170 | 2.5 | 12.0 | 1.0 | 7.0 | 2.8 | 5.0 | 3.3 | 3.0 | 5.3 | 4.0 |
| 109 | | 175 | 7.0 | 10.0 | 2.5 | 5.0 | 2.3 | 2.0 | 2.8 | 3.3 | 4.3 | 5.0 |
| 110 | | Sat Az Angle, degrees | 216 | 138.1 | 221.9 | 133 | 227 | 127 | 233 | 123 | 237 | 118 |
| 111 | | Sat E1 Angles, degrees | 37.0 | 34.4 | 34.4 | 31.5 | 31.5 | 28.3 | 28.3 | 24.9 | 24.9 | 21.4 |
| 112 | | Table Index | 10 | 10 | 10 | 9 | 9 | 9 | 9 | 8 | 8 | 7 |

| | B | C | X | Y | Z | AA | AB | AC | AD | AE | AF | AG | AH | AI | AJ | AK | AL | AM | AN |
|---|---|---|---|---|---|---|---|---|---|---|---|---|---|---|---|---|---|---|---|
| 3 | | | | | | | | | | | | | | | | | | | |
| 4 | | 1 | 50 | 55 | 55 | 58.8 | 58.8 | 62 | 62 | 65.5 | 65.6 | 69 | 69 | 72.1 | 72.1 | | | | |
| 99 | 125 | 1.5 | 11.3 | 16.0 | 12.0 | 16.0 | 12.0 | 16.0 | 12.0 | 16.0 | 12.0 | 16.0 | 12.0 | 16.0 | 12.0 | | 1.0 | 1.0 | 1.0 |
| 100 | 130 | 1.0 | 10.7 | 16.0 | 11.3 | 16.0 | 11.7 | 16.0 | 12.0 | 16.0 | 12.0 | 15.0 | 12.0 | 14.0 | 12.0 | | 1.0 | 1.0 | 1.0 |
| 101 | 135 | 3.3 | 9.8 | 16.0 | 10.3 | 16.0 | 11.0 | 15.0 | 11.3 | 14.0 | 11.7 | 12.0 | 12.0 | 11.0 | 12.0 | | 1.3 | 1.3 | 1.3 |
| 102 | 140 | 6.8 | 9.5 | 15.0 | 9.8 | 14.0 | 10.0 | 12.0 | 10.7 | 11.0 | 11.0 | 10.0 | 11.3 | 8.8 | 11.7 | | 1.0 | 1.0 | 1.0 |
| 103 | 145 | 9.3 | 9.0 | 13.0 | 9.3 | 11.0 | 9.7 | 10.0 | 9.8 | 8.8 | 10.0 | 6.5 | 10.7 | 5.3 | 11.0 | | 1.2 | 1.2 | 1.2 |
| 104 | 150 | 13.3 | 8.7 | 10.0 | 9.0 | 8.8 | 9.2 | 6.5 | 9.5 | 5.3 | 9.7 | 4.2 | 9.8 | 3.0 | 10.0 | | 1.3 | 1.3 | 1.3 |
| 105 | 155 | 16.0 | 9.2 | 7.7 | 8.5 | 5.3 | 8.8 | 4.2 | 9.0 | 3.0 | 9.2 | 4.0 | 9.5 | 4.5 | 9.7 | | 1.0 | 1.0 | 1.0 |
| 106 | 160 | 16.0 | 7.7 | 4.2 | 6.2 | 3.0 | 8.3 | 4.0 | 8.7 | 4.5 | 8.8 | 5.0 | 9.0 | 5.5 | 9.2 | | 1.0 | 1.0 | 1.0 |
| 107 | 165 | 16.0 | 6.7 | 3.5 | 7.3 | 4.5 | 8.0 | 5.0 | 8.2 | 5.5 | 8.3 | 6.0 | 8.7 | 6.0 | 8.8 | | 1.0 | 1.0 | 1.0 |

TABLE 1-continued

| | | | | | | | | | | | | | | | | | | |
|---|---|---|---|---|---|---|---|---|---|---|---|---|---|---|---|---|---|---|
| 108 | 170 | 14.3 | 6.0 | 5.0 | 6.7 | 5.5 | 7.0 | 6.0 | 7.7 | 6.0 | 8.0 | 6.0 | 8.2 | 6.0 | 8.3 | 1.0 | 1.0 | 1.0 |
| 109 | 175 | 12.7 | 6.0 | 6.0 | 6.0 | 6.0 | 6.3 | 6.0 | 6.7 | 6.0 | 7.0 | 6.0 | 7.7 | 6.3 | 8.0 | 2.0 | 2.0 | 2.0 |
| 110 | Sat Az Angle, degrees | 178.4 | 242 | 114 | 246 | 111 | 249 | 109 | 251 | 106 | 254 | 104 | 256 | 102 | 258 | | | |
| 111 | Sat E1 Angles, degrees | 43.7 | 21.4 | 17.8 | 17.8 | 15.0 | 15.0 | 12.6 | 12.6 | 10.0 | 10.0 | 7.3 | 7.3 | 5.0 | 5.0 | | | |
| 112 | Table Index | 11 | 7 | 7 | 7 | 7 | 7 | 6 | 6 | 6 | 6 | 5 | 5 | 3 | 3 | | | |

TABLE 2

| A | B | C | D | E | F | G | H | I | J | K | L | M | N |
|---|---|---|---|---|---|---|---|---|---|---|---|---|---|
| 1 | | | | | | | | | | | | | |
| 2 | Title Angle, degrees | 0 | | | | | | | | | | | |
| 3 | Tower Height, m | 150 | | | | | | | | | | | |
| 4 | Max Range, km | 16 | | | | | | | | | | | |
| 5 | | | | | | | | | | | | | |
| 6 | Relative Angle | 71.03 | 55.77 | 36.33 | 26.03 | 20.02 | 16.16 | 11.56 | 7.994 | 6.306 | 5.173 | 4.362 | 3.752 |
| 7 | ES Separation Dist, Km | 0.05 | 0.1 | 0.2 | 0.3 | 0.4 | 0.5 | 0.7 | 1 | 1.25 | 1.5 | 1.75 | 2 |
| 8 | TT to BSS ES Az Angle degrees | Terrestrial Transmitter Antenna Vertical Gain | | | | | | | | | | | |
| 9 | All Angles | 28 | 28 | 21.91 | 21 | 12.42 | 8.098 | 4.141 | 1.981 | 1.233 | 0.83 | 0.59 | 0.436 |

| A | B | O | P | Q | R | S | T | M | V | W | X |
|---|---|---|---|---|---|---|---|---|---|---|---|
| 1 | | | | | | | | | | | |
| 2 | Title Angle, degrees | | | | | | | | | | |
| 3 | Tower Height, m | | | | | | | | | | |
| 4 | Max Range, km | | | | | | | | | | |
| 5 | | | | | | | | | | | |
| 6 | Relative Angle | 3.277 | 2.896 | 2.585 | 2.325 | 2.1054 | 1.9169 | 1.753477846 | 1.61045323 | 1.48423274 | 1.37202024 |
| 7 | ES Separation Dist, Km | 2.25 | 2.5 | 2.75 | 3 | 3.25 | 3.5 | 3.75 | 4 | 4.25 | 4.5 |
| 8 | TT to BSS ES Az Angle degrees | Terrestrial Transmitter Antenna Vertical Gain | | | | | | | | | |
| 9 | All Angles | 0.33 | 0.26 | 0.207 | 0.168 | 0.1374 | 0.1139 | 0.095315221 | 0.08040035 | 0.06829135 | 0.05835563 |

| A | B | Y | Z | AA | AB | AC |
|---|---|---|---|---|---|---|
| 1 | | | | | | |
| 2 | Title Angle, degrees | | | | | |
| 3 | Tower Height, m | | | | | |
| 4 | Max Range, km | | | | | |
| 5 | | | | | | |
| 6 | Relative Angle | 1.27160713 | 1.1812258 | 1.09944484 | 1.02509272 | 0.95720139 |
| 7 | ES Separation Dist, Km | 4.75 | 5 | 5.25 | 5.5 | 5.75 |
| 8 | TT to BSS ES Az Angle degrees | Terrestrial Transmitter Antenna Vertical Gain | | | | |
| 9 | All Angles | 0.05012653 | 0.04325413 | 0.03747215 | 0.03257527 | 0.02840327 |

| | B | C | AD | AE | AF | AG | AH | AI | AJ |
|---|---|---|---|---|---|---|---|---|---|
| 1 | | | | | | | | | |
| 2 | Title Angle, degrees | 0 | | | | | | | |
| 3 | Tower Height, m | 150 | | | | | | | |
| 4 | Max Range, km | 16 | | | | | | | |
| 5 | | | | | | | | | |
| 6 | Relative Angle | 71.03 | 0.89496399 | 0.83770258 | 0.78484346 | 0.73589782 | 0.69044664 | 0.64812862 | 0.60863064 |
| 7 | ES Separation Dist, Km | 0.05 | 6 | 6.25 | 6.5 | 6.75 | 7 | 7.25 | 7.5 |
| 8 | TT to BSS ES Az Angle degrees | | | | | | | | |
| 9 | All Angles | 28 | 0.02482978 | 0.02175411 | 0.01909536 | 0.01678791 | 0.01477821 | 0.01302219 | 0.01148337 |

| | B | C | AK | AL | AM | AN | AO | AP | AQ |
|---|---|---|---|---|---|---|---|---|---|
| 1 | | | | | | | | | |
| 2 | Title Angle, degrees | 0 | | | | | | | |
| 3 | Tower Height, m | 150 | | | | | | | |
| 4 | Max Range, km | 16 | | | | | | | |
| 5 | | | | | | | | | |
| 6 | Relative Angle | 71.03 | 0.57167993 | 0.5370378 | 0.50449448 | 0.47386486 | 0.44498497 | 0.41770906 | 0.39190712 |
| 7 | ES Separation Dist, Km | 0.05 | 7.75 | 8 | 8.25 | 8.5 | 8.75 | 9 | 9.25 |
| | TT to BSS ES Az Angle | | | | | | | | |

TABLE 2-continued

| | | | | | | | | | |
|---|---|---|---|---|---|---|---|---|---|
| 8 | degrees | | | | | | | | |
| 9 | All Angles | 28 | 0.01013136 | 0.0089407 | 0.00788996 | 0.00696098 | 0.00613826 | 0.00540891 | 0.00476133 |

| | B | C | AR | AS | AT | AU | AV |
|---|---|---|---|---|---|---|---|
| 1 | | | | | | | |
| 2 | Title Angle, degrees | 0 | | | | | |
| 3 | Tower Height, m | 150 | | | | | |
| 4 | Max Range, km | 16 | | | | | |
| 5 | | | | | | | |
| 6 | Relative Angle | 71.03 | 0.36746284 | 0.3442718 | 0.32224005 | 0.30128278 | 0.28132326 |
| 7 | ES Separation Dist, Km | 0.05 | 9.5 | 9.75 | 10 | 10.25 | 10.5 |
| 8 | TT to BSS ES Az Angle degrees | | | | | | |
| 9 | All Angles | 28 | 0.0041859 | 0.00367422 | 0.003219 | 0.0028139 | 0.00245343 |

| | B | C | AW | AX | AY | AZ | BA | BB | BC |
|---|---|---|---|---|---|---|---|---|---|
| 1 | | | | | | | | | |
| 2 | Title Angle, degrees | 0 | 0.26229192 | 0.24412546 | 0.22676626 | 0.21016168 | 0.19426356 | 0.179027775 | 0.16441372 |
| 3 | Tower Height, m | 150 | 10.75 | 11 | 11.25 | 11.5 | 11.75 | 12 | 12.25 |
| 4 | Max Range, km | 16 | | | | | | | |
| 5 | | | | | | | | | |
| 6 | Relative Angle | 71.03 | | | | | | | |
| 7 | ES Separation Dist, Km | 0.05 | | | | | | | |
| 8 | TT to BSS ES Az Angle degrees | | | | | | | | |
| 9 | All Angles | 28 | 0.00213271 | 0.00184751 | 0.00159411 | 0.00136921 | 0.00116989 | 0.00099358 | 0.00083799 |

| | B | C | BD | BE | BF | BG | BH | BI | BJ |
|---|---|---|---|---|---|---|---|---|---|
| 1 | | | | | | | | | |
| 2 | Title Angle, degrees | 0 | | | | | | | |
| 3 | Tower Height, m | 150 | | | | | | | |
| 4 | Max Range, km | 16 | | | | | | | |
| 5 | | | | | | | | | |
| 6 | Relative Angle | 71.03 | 0.15038416 | 0.1369047 | 0.1239436 | 0.11147156 | 0.09946138 | 0.08788788 | 0.07672767 |
| 7 | ES Separation Dist, Km | 0.05 | 12.5 | 12.75 | 13 | 13.25 | 13.5 | 13.75 | 14 |
| 8 | TT to BSS ES Az Angle degrees | | | | | | | | |
| 9 | All Angles | 28 | 0.00070108 | 0.00058103 | 0.00047622 | 0.0003852 | 0.00030667 | 0.00023945 | 0.0001825 |

| | B | C | BK | BL | BM | BN | BO |
|---|---|---|---|---|---|---|---|
| 1 | | | | | | | |
| 2 | Title Angle, degrees | 0 | | | | | |
| 3 | Tower Height, m | 150 | | | | | |
| 4 | Max Range, km | 16 | | | | | |
| 5 | | | | | | | |
| 6 | Relative Angle | 71.03 | 0.065959 | 0.05556162 | 0.04551666 | 0.0358065 | 0.02641467 |
| 7 | ES Separation Dist, Km | 0.05 | 14.25 | 14.5 | 14.75 | 15 | 15.25 |
| 8 | TT to BSS ES Az Angle degrees | | | | | | |
| 9 | All Angles | 28 | 0.00013487 | 9.57E05 | 6.4225E05 | 3.9745E05 | 2.163E05 |

| | B | C | BP | GO | BR | BS | BT | BU | BV | BW |
|---|---|---|---|---|---|---|---|---|---|---|
| 1 | | | | | | | | | | |
| 2 | Title Angle, degrees | 0 | | | | | | | | |
| 3 | Tower Height, m | 150 | | | | | | | | |
| 4 | Max Range, km | 16 | | | | | | | | |
| 5 | | | | | | | | | | |
| 6 | Relative Angle | 71.03 | 0.01732578 | 0.0085254 | 0 | 0.0082631 | 0.01627582 | 0.02404938 | 0.03159432 | 0.03892058 |
| 7 | ES Separation Dist, Km | 0.05 | 15.5 | 15.75 | 16 | 16.25 | 16.5 | 16.75 | 17 | 17.25 |
| 8 | TT to BSS ES Az Angle degrees | | | | | | | | | |
| 9 | All Angles | 28 | 9.3057E06 | 2.2532E06 | 0 | 2.1166E06 | 8.212E06 | 1.793E05 | 3.0944E05 | 4.6959E05 |

| | B | C | BX | BY | BZ | CA | CB | CC | CD |
|---|---|---|---|---|---|---|---|---|---|
| 1 | | | | | | | | | |
| 2 | Title Angle, degrees | 0 | | | | | | | |
| 3 | Tower Height, m | 150 | | | | | | | |
| 4 | Max Range, km | 16 | | | | | | | |
| 5 | | | | | | | | | |
| 6 | Relative Angle | 71.03 | 0.04603754 | 0.05295404 | 0.05967842 | 0.06621859 | 0.072582 | 0.07877574 | 0.08480649 |
| 7 | ES Separation Dist, Km | 0.05 | 17.5 | 17.75 | 18 | 18.25 | 18.5 | 18.75 | 19 |
| | TT to BSS ES Az Angle | | | | | | | | |

TABLE 2-continued

| | | | | | | | | | |
|---|---|---|---|---|---|---|---|---|---|
| 8 | degrees | | | | | | | | |
| 9 | All Angles | 28 | 6.5703E05 | 8.6928E05 | 0.00011041 | 0.00013593 | 0.00016331 | 0.00019237 | 0.00022296 |

TABLE 3

| A | B | C | D | E | F | G | H | I | J | K | L | M | N | O |
|---|---|---|---|---|---|---|---|---|---|---|---|---|---|---|
| 1 | GHz | 12.5 | | | | | | | | | | | | |
| 2 | m | 0.02 | | | | | | | | | | | | |
| 3 | Tower Height, m | 150 | | | | | | | | | | | | |
| 4 | Max Range, km | 16 | | | | | | | | | | | | |
| 5 | | | | | | | | | | | | | | |
| 6 | Relative Angle | 71.0 | 55.8 | 36.3 | 26.0 | 20.0 | 16.2 | 11.6 | 8.0 | 6.3 | 5.2 | 4.4 | 3.8 | 3.3 |
| 7 | ES Separation Dist. K | 0.05 | 0.1 | 0.2 | 0.3 | 0.4 | 0.5 | 0.7 | 1 | 1.25 | 1.5 | 1.75 | 2 | 2.25 |
| 8 | TT to BSS ES Az Angle degrees | | | | | | | | | Path Loss | | | | |
| 9 | All Angles | 98.36 | 99.5 | 102.3 | 104.9 | 107 | 108.7 | 111.5 | 114.5 | 116.4 | 117.9 | 119.3 | 120.4 | 121.4 |

| A | B | C | P | Q | R | S | T | U | V | W |
|---|---|---|---|---|---|---|---|---|---|---|
| 1 | GHz | 12.5 | | | | | | | | |
| 2 | m | 0.02 | | | | | | | | |
| 3 | Tower Height, m | 150 | | | | | | | | |
| 4 | Max Range, km | 16 | | | | | | | | |
| 5 | | | | | | | | | | |
| 6 | Relative Angle | 71.0 | 2.9 | 2.6 | 2.3 | 2.1 | 1.9 | 1.8 | 1.6 | 1.5 |
| 7 | ES Separation Dist. K | 0.05 | 2.5 | 2.75 | 3 | 3.25 | 3.5 | 3.75 | 4 | 4.25 |
| 8 | TT to BSS ES Az Angle degrees | | | | | | | | | |
| 9 | All Angles | 98.36 | 122.4 | 123.2 | 123.9 | 125 | 125 | 126 | 126 | 127 |

| A | B | C | X | Y | Z | AA | AB | AC | AD | AE |
|---|---|---|---|---|---|---|---|---|---|---|
| 1 | GHz | 12.5 | | | | | | | | |
| 2 | m | 0.02 | | | | | | | | |
| 3 | Tower Height, m | 150 | | | | | | | | |
| 4 | Max Range, km | 16 | | | | | | | | |
| 5 | | | | | | | | | | |
| 6 | Relative Angle | 71.0 | 1.4 | 1.3 | 1.2 | 1.1 | 1.0 | 1.0 | 0.9 | 0.8 |
| 7 | ES Separation Dist. K | 0.05 | 4.5 | 4.75 | 5 | 5.25 | 5.5 | 5.75 | 6 | 6.25 |
| 8 | TT to BSS ES Az Angle degrees | | | | | | | | | |
| 9 | All Angles | 98.36 | 127 | 128 | 128 | 129 | 129 | 130 | 130 | 130 |

| | B | C | AF | AG | AH | AI | AJ | AK | AL | AM | AN | AO | AP | AQ | AR |
|---|---|---|---|---|---|---|---|---|---|---|---|---|---|---|---|
| 1 | GHz | 12.5 | | | | | | | | | | | | | |
| 2 | m | 0.02 | | | | | | | | | | | | | |
| 3 | Tower Height, m | 150 | | | | | | | | | | | | | |
| 4 | Max Range, km | 16 | | | | | | | | | | | | | |
| 5 | | | | | | | | | | | | | | | |
| 6 | Relative Angle | 71.0 | 0.8 | 0.7 | 0.7 | 0.6 | 0.6 | 0.6 | 0.5 | 0.5 | 0.5 | 0.4 | 0.4 | 0.4 | 0.4 |
| 7 | ES Separation Dist. K | 0.05 | 6.5 | 6.75 | 7 | 7.25 | 7.5 | 7.75 | 8 | 8.25 | 8.5 | 8.75 | 9 | 9.25 | 9.5 |
| 8 | TT to BSS ES Az Angle degrees | | | | | | | | | | | | | | |
| 9 | All Angles | 98.36 | 131 | 131 | 131 | 132 | 132 | 132 | 132 | 133 | 133 | 133 | 133 | 134 | 134 |

| | B | C | AS | AT | AU | AV | AW | AX | AY | AZ |
|---|---|---|---|---|---|---|---|---|---|---|
| 1 | GHz | 12.5 | | | | | | | | |
| 2 | m | 0.02 | | | | | | | | |
| 3 | Tower Height, m | 150 | | | | | | | | |
| 4 | Max Range, km | 16 | | | | | | | | |
| 5 | | | | | | | | | | |
| 6 | Relative Angle | 71.0 | 0.3 | 0.3 | 0.3 | 0.3 | 0.3 | 0.2 | 0.2 | 0.2 |
| 7 | ES Separation Dist. K | 0.05 | 9.75 | 10 | 10.25 | 10.5 | 10.75 | 11 | 11.25 | 11.5 |
| 8 | TT to BSS ES Az Angle degrees | | | | | | | | | |
| 9 | All Angles | 98.36 | 134 | 134 | 135 | 135 | 135 | 135 | 135 | 136 |

| | B | C | BA | BB | BC | BD | BE | BF | BG | BH |
|---|---|---|---|---|---|---|---|---|---|---|
| 1 | GHz | 12.5 | | | | | | | | |
| 2 | m | 0.02 | | | | | | | | |
| 3 | Tower Height, m | 150 | | | | | | | | |
| 4 | Max Range, km | 16 | | | | | | | | |

TABLE 3-continued

| | | | | | | | | | | |
|---|---|---|---|---|---|---|---|---|---|---|
| 5 | | | | | | | | | | |
| 6 | Relative Angle | 71.0 | 0.2 | 0.2 | 0.2 | 0.2 | 0.1 | 0.1 | 0.1 | 0.1 |
| 7 | ES Separation Dist. K | 0.05 | 11.75 | 12 | 12.25 | 12.5 | 12.75 | 13 | 13.25 | 13.5 |
| 8 | TT to BSS ES Az Angle degrees | | | | | | | | | |
| 9 | All Angles | 98.36 | 136 | 136 | 136 | 136 | 136 | 137 | 137 | 137 |

| | B | C | BI | BJ | BK | BL | BM | BN | BO | BP | BQ | BR | BS |
|---|---|---|---|---|---|---|---|---|---|---|---|---|---|
| 1 | GHz | 12.5 | | | | | | | | | | | |
| 2 | m | 0.02 | | | | | | | | | | | |
| 3 | Tower Height, m | 150 | | | | | | | | | | | |
| 4 | Max Range, km | 16 | | | | | | | | | | | |
| 5 | | | | | | | | | | | | | |
| 6 | Relative Angle | 71.0 | 0.1 | 0.1 | 0.1 | 0.1 | 0.0 | 0.0 | 0.0 | 0.0 | 0.0 | 0.0 | 0.0 |
| 7 | ES Separation Dist. K | 0.05 | 13.75 | 14 | 14.25 | 14.5 | 14.75 | 15 | 15.25 | 15.5 | 15.75 | 16 | 16.25 |
| 8 | TT to BSS ES Az Angle degrees | | | | | | | | | | | | |
| 9 | All Angles | 98.36 | 137 | 137 | 137 | 138 | 138 | 138 | 138 | 138 | 138 | 138 | 139 |

| | B | C | BT | BU | BV | BW | BX | BY | BZ | CA | CB | CC | CD |
|---|---|---|---|---|---|---|---|---|---|---|---|---|---|
| 1 | GHz | 12.5 | | | | | | | | | | | |
| 2 | m | 0.02 | | | | | | | | | | | |
| 3 | Tower Height, m | 150 | | | | | | | | | | | |
| 4 | Max Range, km | 16 | | | | | | | | | | | |
| 5 | | | | | | | | | | | | | |
| 6 | Relative Angle | 71.0 | 0.0 | 0.0 | 0.0 | 0.0 | 0.0 | 0.1 | 0.1 | 0.1 | 0.1 | 0.1 | 0.1 |
| 7 | ES Separation Dist. K | 0.05 | 16.5 | 16.75 | 17 | 17.25 | 17.5 | 17.75 | 18 | 18.25 | 18.5 | 18.75 | 19 |
| 8 | TT to BSS ES Az Angle degrees | | | | | | | | | | | | |
| 9 | All Angles | 98.36 | 139 | 139 | 139 | 139 | 139 | 139 | 139 | 140 | 140 | 140 | 140 |

TABLE 4

| A | B | C | D | E | F | G | H | I | J | K | L | M | N |
|---|---|---|---|---|---|---|---|---|---|---|---|---|---|
| 1 | Tile Angle, degree | 0 | | | | | | | | | | | |
| 2 | Tower, Height m | 150 | | | | | | | | | | | |
| 3 | Max Range, km | 16 | | | | | | | | | | | |
| 4 | | | | | | | | | | | | | |
| 5 | Amp Power, dBw | | 25 | | | NOW LINKED TO NOTES SPREADSHEET | | | | | | | |
| 6 | Line Losses, dB | 2.5 | | | | | | | | | | | |
| 7 | Peak Npt Xmrt Gain, dBi | 10 | | | | | | | | | | | |
| 8 | Atmospheric Abs dB | 0.2 | | | | | | | | | | | |
| 9 | | | | | | | | | | | | | |
| 10 | Relative Angle | 71.03 | 55.77 | 36.33 | 26.03 | 20.02 | 16.16 | 11.56 | 7.99 | 6.31 | 5.17 | 4.36 | 3.75 |
| 11 | ES Separation Dist Km | 0.05 | 0.10 | 0.20 | 0.30 | 0.40 | 0.50 | 0.70 | 1.00 | 1.25 | 1.50 | 1.75 | 2.00 |
| 12 | TT to BSS ES Az Angle degrees | | | | | | | | Calculated RSSi | | | | |
| 13 | 180 | 144.1 | 145.2 | 142.0 | 143.6 | 137.1 | 134.5 | 133.3 | 134.2 | 135.3 | 136.5 | 137.6 | 138.6 |
| 14 | 185 | 144.3 | 145.4 | 142.2 | 143.8 | 137.4 | 134.8 | 133.6 | 134.4 | 135.6 | 136.7 | 137.8 | 138.8 |
| 15 | 190 | 144.6 | 145.7 | 142.5 | 144.1 | 137.6 | 135.0 | 133.8 | 134.7 | 135.8 | 137.0 | 138.1 | 139.1 |
| 16 | 195 | 144.8 | 145.9 | 142.7 | 144.3 | 137.9 | 135.3 | 134.1 | 134.9 | 136.1 | 137.2 | 138.3 | 139.3 |
| 17 | 200 | 145.1 | 146.2 | 143.0 | 144.6 | 138.1 | 135.5 | 134.3 | 135.2 | 136.3 | 137.5 | 138.6 | 139.6 |
| 18 | 205 | 145.3 | 146.4 | 143.2 | 144.8 | 138.4 | 135.8 | 134.6 | 135.4 | 136.6 | 137.7 | 138.8 | 139.8 |
| 19 | 210 | 145.8 | 146.7 | 143.5 | 145.1 | 138.6 | 136.0 | 134.8 | 135.7 | 136.8 | 138.0 | 139.1 | 140.1 |
| 20 | 215 | 145.8 | 146.9 | 143.7 | 145.3 | 138.9 | 136.3 | 135.1 | 135.9 | 137.1 | 138.2 | 139.3 | 140.3 |
| 21 | 220 | 146.1 | 147.2 | 144.0 | 145.6 | 139.1 | 136.5 | 135.3 | 136.2 | 137.3 | 138.5 | 139.6 | 140.6 |
| 22 | 225 | 146.6 | 147.7 | 144.5 | 146.1 | 139.6 | 137.0 | 135.8 | 136.7 | 137.8 | 139.0 | 140.1 | 141.1 |
| 23 | 230 | 147.0 | 148.1 | 144.9 | 146.5 | 140.0 | 137.4 | 136.2 | 137.1 | 138.2 | 139.4 | 140.5 | 141.5 |
| 24 | 235 | 147.6 | 148.7 | 145.5 | 147.1 | 140.6 | 138.0 | 136.8 | 137.7 | 138.8 | 140.0 | 141.1 | 142.1 |
| 25 | 240 | 148.0 | 149.1 | 145.9 | 147.5 | 141.0 | 138.4 | 137.2 | 138.1 | 139.2 | 140.4 | 141.5 | 142.5 |
| 26 | 245 | 148.9 | 150.0 | 146.8 | 148.4 | 141.9 | 139.3 | 138.1 | 139.0 | 140.1 | 141.3 | 142.4 | 143.4 |
| 27 | 250 | 149.5 | 150.6 | 147.4 | 149.0 | 142.5 | 139.9 | 138.7 | 139.6 | 140.7 | 141.9 | 143.0 | 144.0 |
| 28 | 255 | 150.4 | 151.5 | 148.3 | 149.9 | 143.4 | 140.8 | 139.6 | 140.5 | 141.6 | 142.8 | 143.9 | 144.9 |
| 29 | 260 | 151.0 | 152.1 | 148.9 | 150.5 | 144.0 | 141.4 | 140.2 | 141.1 | 142.2 | 143.4 | 144.5 | 145.5 |
| 30 | 265 | 152.4 | 153.5 | 150.3 | 151.9 | 145.4 | 142.8 | 141.6 | 142.5 | 143.6 | 144.8 | 145.9 | 146.9 |
| 31 | 270 | 153.6 | 154.7 | 151.5 | 153.1 | 146.6 | 144.0 | 142.8 | 143.7 | 144.8 | 146.0 | 147.1 | 148.1 |
| 32 | 272 | 153.6 | 154.7 | 151.5 | 153.1 | 146.6 | 144.0 | 142.8 | 143.7 | 144.8 | 146.0 | 147.1 | 148.1 |
| 33 | 274 | 153.6 | 154.7 | 151.5 | 153.1 | 146.6 | 144.0 | 142.8 | 143.7 | 144.8 | 146.0 | 147.1 | 148.1 |
| 34 | 276 | 155.1 | 156.2 | 153.0 | 154.6 | 148.1 | 145.5 | 144.3 | 145.2 | 146.3 | 147.5 | 148.6 | 149.6 |
| 35 | 278 | 155.1 | 156.2 | 153.0 | 154.6 | 148.1 | 145.5 | 144.3 | 145.2 | 146.3 | 147.5 | 148.6 | 149.6 |
| 36 | 280 | 156.6 | 157.7 | 154.5 | 156.1 | 149.6 | 147.0 | 145.8 | 146.7 | 147.8 | 149.0 | 150.1 | 151.1 |
| 37 | 282 | 156.6 | 157.7 | 154.5 | 156.1 | 149.6 | 147.0 | 145.8 | 146.7 | 147.8 | 149.0 | 150.1 | 151.1 |
| 38 | 284 | 156.6 | 157.7 | 154.5 | 156.1 | 149.6 | 147.0 | 145.8 | 146.7 | 147.8 | 149.0 | 150.1 | 151.1 |

TABLE 4-continued

| | | | | | | | | | | | | | |
|---|---|---|---|---|---|---|---|---|---|---|---|---|---|
| 39 | 286 | 157.8 | 158.9 | 155.7 | 157.3 | 150.9 | 148.3 | 147.1 | 147.9 | 149.1 | 150.2 | 151.3 | 152.3 |
| 40 | 288 | 157.8 | 158.9 | 155.7 | 157.3 | 150.9 | 148.3 | 147.1 | 147.9 | 149.1 | 150.2 | 151.3 | 152.3 |
| 41 | 290 | 159.1 | 160.2 | 157.0 | 158.6 | 152.1 | 149.5 | 148.3 | 149.2 | 150.3 | 151.5 | 152.6 | 153.6 |
| 42 | 292 | 159.1 | 160.2 | 157.0 | 158.6 | 152.1 | 149.5 | 148.3 | 149.2 | 150.3 | 151.5 | 152.6 | 153.6 |
| 43 | 294 | 159.1 | 160.2 | 157.0 | 158.6 | 152.1 | 149.5 | 148.3 | 149.2 | 150.3 | 151.5 | 152.6 | 153.6 |
| 44 | 296 | 161.1 | 162.2 | 159.0 | 160.6 | 154.1 | 151.5 | 150.3 | 151.2 | 152.3 | 153.5 | 154.6 | 155.6 |
| 45 | 298 | 161.1 | 162.2 | 159.0 | 160.6 | 154.1 | 151.5 | 150.3 | 151.2 | 152.3 | 153.5 | 154.6 | 155.6 |
| 46 | 300 | 163.1 | 164.2 | 161.0 | 162.6 | 156.1 | 153.5 | 152.3 | 153.2 | 154.3 | 155.5 | 156.6 | 157.6 |
| 47 | 302 | 163.1 | 164.2 | 161.0 | 162.6 | 156.1 | 153.5 | 152.3 | 153.2 | 154.3 | 155.5 | 156.6 | 157.6 |
| 48 | 304 | 163.1 | 164.2 | 161.0 | 162.6 | 156.1 | 153.5 | 152.3 | 153.2 | 154.3 | 155.5 | 156.6 | 157.6 |
| 49 | 306 | 163.1 | 164.2 | 161.0 | 162.6 | 156.1 | 153.5 | 152.3 | 153.2 | 154.3 | 155.5 | 156.6 | 157.6 |
| 50 | 308 | 163.1 | 164.2 | 161.0 | 162.6 | 156.1 | 153.5 | 152.3 | 153.2 | 154.3 | 155.5 | 156.6 | 157.6 |
| 51 | 310 | 165.1 | 166.2 | 163.0 | 164.6 | 158.1 | 155.5 | 154.3 | 155.2 | 156.3 | 157.5 | 158.6 | 159.6 |
| 52 | 312 | 165.1 | 166.2 | 163.0 | 164.6 | 158.1 | 155.5 | 154.3 | 155.2 | 156.3 | 157.5 | 158.6 | 159.6 |
| 53 | 314 | 165.1 | 166.2 | 163.0 | 164.6 | 158.1 | 155.5 | 154.3 | 155.2 | 156.3 | 157.5 | 158.6 | 159.6 |
| 54 | 316 | 167.1 | 168.2 | 165.0 | 166.6 | 160.1 | 157.5 | 156.3 | 157.2 | 158.3 | 159.5 | 160.6 | 161.6 |
| 55 | 318 | 167.1 | 168.2 | 165.0 | 166.6 | 160.1 | 157.5 | 156.3 | 157.2 | 158.3 | 159.5 | 160.6 | 161.6 |
| 56 | 320 | 169.1 | 170.2 | 167.0 | 168.6 | 162.1 | 159.5 | 158.3 | 159.2 | 160.3 | 161.5 | 162.6 | 163.6 |
| 57 | 325 | 171.1 | 172.2 | 169.0 | 170.6 | 164.1 | 161.5 | 160.3 | 161.2 | 162.3 | 163.5 | 164.6 | 165.6 |
| 58 | 330 | 173.1 | 174.2 | 171.0 | 172.6 | 166.1 | 163.5 | 162.3 | 163.2 | 164.3 | 165.5 | 168.6 | 167.6 |
| 59 | 335 | 175.1 | 176.2 | 173.0 | 174.6 | 168.1 | 165.5 | 164.3 | 165.2 | 166.3 | 167.5 | 168.6 | 169.6 |
| 60 | 340 | 177.1 | 178.2 | 175.0 | 176.6 | 170.1 | 167.5 | 166.3 | 167.2 | 168.3 | 169.5 | 170.6 | 171.6 |
| 61 | 345 | 179.1 | 180.2 | 177.0 | 178.6 | 172.1 | 169.5 | 168.3 | 169.2 | 170.3 | 171.5 | 172.6 | 173.6 |
| 62 | 350 | 181.1 | 182.2 | 179.0 | 180.6 | 174.1 | 171.5 | 170.3 | 171.2 | 172.3 | 173.5 | 174.6 | 175.6 |
| 63 | 355 | 183.1 | 184.2 | 181.0 | 182.6 | 176.1 | 173.5 | 172.3 | 173.2 | 174.3 | 175.5 | 176.6 | 177.6 |
| 64 | 0 | 187.1 | 188.2 | 185.0 | 186.6 | 180.1 | 177.5 | 176.3 | 177.2 | 178.3 | 179.5 | 180.8 | 181.6 |
| 65 | 5 | 185.1 | 186.2 | 183.0 | 184.6 | 178.1 | 175.5 | 174.3 | 175.2 | 176.3 | 177.5 | 178.6 | 179.6 |
| 66 | 10 | 183.1 | 184.2 | 181.0 | 182.6 | 176.1 | 173.5 | 172.3 | 173.2 | 174.3 | 175.5 | 176.6 | 177.6 |
| 67 | 15 | 181.1 | 182.2 | 179.0 | 180.6 | 174.1 | 171.5 | 170.3 | 171.2 | 172.3 | 173.5 | 174.6 | 175.6 |
| 68 | 20 | 179.1 | 180.2 | 177.0 | 178.6 | 172.1 | 169.5 | 168.3 | 169.2 | 170.3 | 171.5 | 172.6 | 173.6 |
| 69 | 25 | 177.1 | 178.2 | 175.0 | 176.6 | 170.1 | 167.5 | 166.3 | 167.2 | 168.3 | 169.5 | 170.6 | 171.6 |
| 70 | 30 | 175.1 | 176.2 | 173.0 | 174.6 | 168.1 | 165.5 | 164.3 | 165.2 | 166.3 | 167.5 | 168.6 | 169.6 |
| 71 | 35 | 173.1 | 174.2 | 171.0 | 172.6 | 166.1 | 163.5 | 162.3 | 163.2 | 164.3 | 165.5 | 166.6 | 167.6 |
| 72 | 40 | 171.1 | 172.2 | 169.0 | 170.6 | 164.1 | 161.5 | 160.3 | 161.2 | 162.3 | 163.5 | 164.6 | 165.6 |
| 73 | 45 | 169.1 | 170.2 | 167.0 | 168.6 | 162.1 | 159.5 | 158.3 | 159.2 | 160.3 | 161.5 | 162.6 | 163.6 |
| 74 | 47 | 169.1 | 170.2 | 167.0 | 168.6 | 162.1 | 159.5 | 158.3 | 159.2 | 160.3 | 161.5 | 162.6 | 163.6 |
| 75 | 49 | 169.1 | 170.2 | 167.0 | 168.6 | 162.1 | 159.5 | 158.3 | 159.2 | 160.3 | 161.5 | 162.6 | 163.6 |

| A | B | O | P | Q | R | S | T | U | V | W | X |
|---|---|---|---|---|---|---|---|---|---|---|---|
| 1 | Tile Angle, degree | | | | | | | | | | |
| 2 | Tower, Height m | | | | | | | | | | |
| 3 | Max Range, km | | | | | | | | | | |
| 4 | | | | | | | | | | | |
| 5 | Amp Power, dBw | | | | | | | | | | |
| 6 | Line Losses, dB | | | | | | | | | | |
| 7 | Peak Npt Xmrt Gain, dBi | | | | | | | | | | |
| 8 | Atmospheric Abs dB | | | | | | | | | | |
| 9 | | | | | | | | | | | |
| 10 | Relative Angle | 3.28 | 2.90 | 2.58 | 2.33 | 2.11 | 1.92 | 1.75 | 1.61 | 1.48 | 1.37 |
| 11 | ES Separation Dist Km | 2.25 | 2.50 | 2.75 | 3.00 | 3.25 | 3.50 | 3.75 | 4.00 | 4.25 | 4.50 |
| 12 | TT to BSS ES Az Angle degrees | | | | | | | | | | |
| 13 | 180 | 139.5 | 140.3 | 141.1 | 141.8 | 142.5 | 143.1 | 143.7 | 144.2 | 144.7 | 145.2 |
| 14 | 185 | 139.7 | 140.6 | 141.3 | 142.1 | 142.7 | 143.3 | 143.9 | 144.5 | 145.0 | 145.5 |
| 15 | 190 | 140.0 | 140.8 | 141.6 | 142.3 | 143.0 | 143.6 | 144.2 | 144.2 | 145.2 | 145.7 |
| 16 | 195 | 140.2 | 141.1 | 141.8 | 142.6 | 143.2 | 143.8 | 144.4 | 145.0 | 145.5 | 146.0 |
| 17 | 200 | 140.5 | 141.3 | 142.1 | 142.8 | 143.5 | 144.1 | 144.7 | 145.2 | 145.7 | 146.2 |
| 18 | 205 | 140.7 | 141.6 | 142.3 | 143.1 | 143.7 | 144.3 | 144.9 | 145.5 | 146.0 | 146.5 |
| 19 | 210 | 141.0 | 141.8 | 142.6 | 143.3 | 144.0 | 144.6 | 145.2 | 145.7 | 146.2 | 146.7 |
| 20 | 215 | 141.2 | 142.1 | 142.8 | 143.6 | 144.2 | 144.8 | 145.4 | 146.0 | 146.5 | 147.0 |
| 21 | 220 | 141.5 | 142.3 | 143.1 | 143.8 | 144.5 | 145.1 | 145.7 | 146.2 | 146.7 | 147.2 |
| 22 | 225 | 142.0 | 142.8 | 143.6 | 144.3 | 145.0 | 145.6 | 146.2 | 146.7 | 147.2 | 147.7 |
| 23 | 230 | 142.4 | 143.2 | 144.0 | 144.7 | 145.4 | 146.0 | 146.6 | 147.1 | 147.6 | 148.1 |
| 24 | 235 | 143.0 | 143.8 | 144.6 | 145.3 | 146.0 | 146.6 | 147.2 | 147.7 | 148.2 | 148.7 |
| 25 | 240 | 143.4 | 144.2 | 145.0 | 145.7 | 146.4 | 147.0 | 147.6 | 148.1 | 148.6 | 149.1 |
| 26 | 245 | 144.3 | 145.1 | 145.9 | 146.6 | 147.3 | 147.9 | 148.5 | 149.0 | 149.5 | 150.0 |
| 27 | 250 | 144.9 | 145.7 | 146.5 | 147.2 | 147.9 | 148.5 | 149.1 | 149.6 | 150.1 | 150.6 |
| 28 | 255 | 145.8 | 146.6 | 147.4 | 148.1 | 148.8 | 149.4 | 150.0 | 150.5 | 151.0 | 151.5 |
| 29 | 260 | 146.4 | 147.2 | 148.0 | 148.7 | 149.4 | 150.0 | 150.6 | 151.1 | 151.6 | 152.1 |
| 30 | 265 | 147.8 | 148.6 | 149.4 | 150.1 | 150.8 | 151.4 | 152.0 | 152.5 | 153.0 | 153.5 |
| 31 | 270 | 149.0 | 149.8 | 150.6 | 151.3 | 152.0 | 152.6 | 153.2 | 153.7 | 154.2 | 154.7 |
| 32 | 272 | 149.0 | 149.8 | 150.6 | 151.3 | 152.0 | 152.6 | 153.2 | 153.7 | 154.2 | 154.7 |
| 33 | 274 | 149.0 | 149.8 | 150.6 | 151.3 | 152.0 | 152.6 | 153.2 | 153.7 | 154.2 | 154.7 |
| 34 | 276 | 150.5 | 151.3 | 152.1 | 152.8 | 153.5 | 154.1 | 154.7 | 155.2 | 155.7 | 156.2 |
| 35 | 278 | 150.5 | 151.3 | 152.1 | 152.8 | 153.5 | 154.1 | 154.7 | 155.2 | 155.7 | 156.2 |
| 36 | 280 | 152.0 | 152.8 | 153.6 | 154.3 | 155.0 | 155.6 | 156.2 | 156.7 | 157.2 | 157.7 |
| 37 | 282 | 152.0 | 152.8 | 153.6 | 154.3 | 155.0 | 155.6 | 156.2 | 156.7 | 157.2 | 157.7 |
| 38 | 284 | 152.0 | 152.8 | 153.6 | 154.3 | 155.0 | 155.6 | 156.2 | 156.7 | 157.2 | 157.7 |

TABLE 4-continued

| | | | | | | | | | | | |
|---|---|---|---|---|---|---|---|---|---|---|---|
| 39 | 286 | 153.2 | 154.1 | 154.8 | 155.6 | 156.2 | 156.8 | 157.4 | 158.0 | 158.5 | 159.0 |
| 40 | 288 | 153.2 | 154.1 | 154.8 | 155.6 | 156.2 | 156.8 | 157.4 | 158.0 | 158.5 | 159.0 |
| 41 | 290 | 154.5 | 155.3 | 156.1 | 156.8 | 157.5 | 158.1 | 158.7 | 159.2 | 159.7 | 160.2 |
| 42 | 292 | 154.5 | 155.3 | 156.1 | 156.8 | 157.5 | 158.1 | 158.7 | 159.2 | 159.7 | 160.2 |
| 43 | 294 | 154.5 | 155.3 | 156.1 | 156.8 | 157.5 | 158.1 | 158.7 | 159.2 | 159.7 | 160.2 |
| 44 | 296 | 156.5 | 157.3 | 158.1 | 158.8 | 159.5 | 160.1 | 160.7 | 161.2 | 161.7 | 162.2 |
| 45 | 298 | 156.5 | 157.3 | 158.1 | 158.8 | 159.5 | 160.1 | 160.7 | 161.2 | 161.7 | 162.2 |
| 46 | 300 | 158.5 | 159.3 | 160.1 | 160.8 | 161.5 | 162.1 | 162.7 | 163.2 | 163.7 | 164.2 |
| 47 | 302 | 158.5 | 159.3 | 160.1 | 160.8 | 161.5 | 162.1 | 162.7 | 163.2 | 163.7 | 164.2 |
| 48 | 304 | 158.5 | 159.3 | 160.1 | 160.8 | 161.5 | 162.1 | 162.7 | 163.2 | 163.7 | 164.2 |
| 49 | 306 | 158.5 | 159.3 | 160.1 | 160.8 | 161.5 | 162.1 | 162.7 | 163.2 | 163.7 | 164.2 |
| 50 | 308 | 158.5 | 159.3 | 160.1 | 160.8 | 161.5 | 162.1 | 162.7 | 163.2 | 163.7 | 164.2 |
| 51 | 310 | 160.5 | 161.3 | 162.1 | 162.8 | 163.5 | 164.1 | 164.7 | 165.2 | 165.7 | 166.2 |
| 52 | 312 | 160.5 | 161.3 | 162.1 | 162.8 | 163.5 | 164.1 | 164.7 | 165.2 | 165.7 | 166.2 |
| 53 | 314 | 160.5 | 161.3 | 162.1 | 162.8 | 163.5 | 164.1 | 164.7 | 165.2 | 165.7 | 166.2 |
| 54 | 316 | 162.5 | 163.3 | 164.1 | 164.8 | 165.5 | 166.1 | 166.7 | 167.2 | 167.7 | 168.2 |
| 55 | 318 | 162.5 | 163.3 | 164.1 | 164.8 | 165.5 | 166.1 | 166.7 | 167.2 | 167.7 | 168.2 |
| 56 | 320 | 164.5 | 165.3 | 166.1 | 166.8 | 167.5 | 168.1 | 168.7 | 169.2 | 169.7 | 170.2 |
| 57 | 325 | 166.5 | 167.3 | 168.1 | 168.8 | 169.5 | 170.1 | 170.7 | 171.2 | 171.7 | 172.2 |
| 58 | 330 | 168.5 | 169.3 | 170.1 | 170.8 | 171.5 | 172.1 | 172.7 | 173.2 | 173.7 | 174.2 |
| 59 | 335 | 170.5 | 171.3 | 172.1 | 172.8 | 173.5 | 174.1 | 174.7 | 175.2 | 175.7 | 176.2 |
| 60 | 340 | 172.5 | 173.3 | 174.1 | 174.8 | 175.5 | 176.1 | 176.7 | 177.2 | 177.7 | 178.2 |
| 61 | 345 | 174.5 | 175.3 | 176.1 | 176.8 | 177.5 | 178.1 | 178.7 | 179.2 | 179.7 | 180.2 |
| 62 | 350 | 176.5 | 177.3 | 178.1 | 178.8 | 179.5 | 180.1 | 180.7 | 181.2 | 181.7 | 182.2 |
| 63 | 355 | 178.5 | 179.3 | 180.1 | 180.8 | 181.5 | 182.1 | 182.7 | 183.2 | 183.7 | 184.2 |
| 64 | 0 | 182.5 | 183.3 | 184.1 | 184.8 | 185.5 | 186.1 | 186.7 | 187.2 | 187.7 | 188.2 |
| 65 | 5 | 180.5 | 181.3 | 182.1 | 182.8 | 183.5 | 184.1 | 184.7 | 185.2 | 185.7 | 188.2 |
| 66 | 10 | 178.5 | 179.3 | 180.1 | 180.8 | 181.5 | 182.1 | 182.7 | 183.2 | 183.7 | 184.2 |
| 67 | 15 | 176.5 | 177.3 | 178.1 | 178.8 | 179.5 | 180.1 | 180.7 | 181.2 | 181.7 | 182.2 |
| 68 | 20 | 174.5 | 175.3 | 176.1 | 176.8 | 177.5 | 178.1 | 178.7 | 179.2 | 179.7 | 180.2 |
| 69 | 25 | 172.5 | 173.3 | 174.1 | 174.8 | 175.5 | 176.1 | 176.7 | 177.2 | 177.7 | 178.2 |
| 70 | 30 | 170.5 | 171.3 | 172.1 | 172.8 | 173.5 | 174.1 | 174.7 | 175.2 | 175.7 | 176.2 |
| 71 | 35 | 168.5 | 169.3 | 170.1 | 170.8 | 171.5 | 172.1 | 172.7 | 173.2 | 173.7 | 174.2 |
| 72 | 40 | 166.5 | 167.3 | 168.1 | 168.8 | 169.5 | 170.1 | 170.7 | 171.2 | 171.7 | 172.2 |
| 73 | 45 | 164.5 | 165.3 | 166.1 | 166.8 | 167.5 | 168.1 | 168.7 | 169.2 | 169.7 | 170.2 |
| 74 | 47 | 164.5 | 165.3 | 166.1 | 166.8 | 167.5 | 168.1 | 168.7 | 169.2 | 169.7 | 170.2 |
| 75 | 49 | 164.5 | 165.3 | 166.1 | 166.8 | 167.5 | 168.1 | 168.7 | 169.2 | 169.7 | 170.2 |

| A | B | Y | Z | AA | AB | AC | AD | AE |
|---|---|---|---|---|---|---|---|---|
| 1 | Tile Angle, degree | | | | | | | |
| 2 | Tower, Height m | | | | | | | |
| 3 | Max Range, km | | | | | | | |
| 4 | | | | | | | | |
| 5 | Amp Power, dBw | | | | | | | |
| 6 | Line Losses, dB | | | | | | | |
| 7 | Peak Npt Xmrt Gain, dBi | | | | | | | |
| 8 | Atmospheric Abs dB | | | | | | | |
| 9 | | | | | | | | |
| 10 | Relative Angle | 1.27 | 1.18 | 1.10 | 1.03 | 0.96 | 0.89 | 0.84 |
| 11 | ES Separation Dist Km | 4.75 | 5.00 | 5.25 | 5.50 | 5.75 | 6.00 | 6.25 |
| 12 | TT to BSS ES Az Angle degrees | | | | | | | |
| 13 | 180 | 145.7 | 146.1 | 146.5 | 146.9 | 147.3 | 147.7 | 148.0 |
| 14 | 185 | 145.9 | 146.4 | 146.8 | 147.2 | 147.6 | 147.9 | 148.7 |
| 15 | 190 | 146.2 | 146.6 | 147.0 | 147.4 | 147.8 | 148.2 | 148.5 |
| 16 | 195 | 146.4 | 146.9 | 147.3 | 147.7 | 148.1 | 148.4 | 148.8 |
| 17 | 200 | 146.7 | 147.1 | 147.5 | 147.9 | 148.3 | 148.7 | 149.0 |
| 18 | 205 | 146.9 | 147.4 | 147.8 | 148.2 | 148.6 | 148.9 | 149.3 |
| 19 | 210 | 147.2 | 147.6 | 148.0 | 148.4 | 148.8 | 149.2 | 149.5 |
| 20 | 215 | 147.4 | 147.9 | 148.3 | 148.7 | 149.1 | 149.4 | 149.8 |
| 21 | 220 | 147.7 | 148.1 | 148.5 | 148.9 | 149.3 | 149.7 | 150.0 |
| 22 | 225 | 148.2 | 148.6 | 149.0 | 149.4 | 149.8 | 150.2 | 150.5 |
| 23 | 230 | 148.6 | 149.0 | 149.4 | 149.8 | 150.2 | 150.6 | 150.9 |
| 24 | 235 | 149.2 | 149.6 | 150.0 | 150.4 | 150.8 | 151.2 | 151.5 |
| 25 | 240 | 149.6 | 150.0 | 150.4 | 150.8 | 151.2 | 151.6 | 151.9 |
| 26 | 245 | 150.5 | 150.9 | 151.3 | 151.7 | 152.1 | 152.5 | 152.8 |
| 27 | 250 | 151.1 | 151.5 | 151.9 | 152.3 | 152.7 | 153.1 | 153.4 |
| 28 | 255 | 152.0 | 152.4 | 152.8 | 153.2 | 153.6 | 154.0 | 154.3 |
| 29 | 260 | 152.6 | 153.0 | 153.4 | 153.8 | 154.2 | 154.6 | 154.9 |
| 30 | 265 | 154.0 | 154.4 | 154.8 | 155.2 | 155.6 | 156.0 | 156.3 |
| 31 | 270 | 155.2 | 155.6 | 156.0 | 156.4 | 156.8 | 157.2 | 157.5 |
| 32 | 272 | 155.2 | 155.6 | 156.0 | 156.4 | 156.8 | 157.2 | 157.5 |
| 33 | 274 | 155.2 | 155.6 | 156.0 | 156.4 | 156.8 | 157.2 | 157.5 |
| 34 | 276 | 156.7 | 157.1 | 157.5 | 157.9 | 158.3 | 158.7 | 159.0 |
| 35 | 278 | 156.7 | 157.1 | 157.5 | 157.9 | 158.3 | 158.7 | 159.0 |
| 36 | 280 | 158.2 | 158.6 | 159.0 | 159.4 | 159.8 | 160.2 | 160.5 |
| 37 | 282 | 158.2 | 158.6 | 159.0 | 159.4 | 159.8 | 160.2 | 160.5 |
| 38 | 284 | 158.2 | 158.6 | 159.0 | 159.4 | 159.8 | 160.2 | 160.5 |

TABLE 4-continued

| | | | | | | | | |
|---|---|---|---|---|---|---|---|---|
| 39 | 286 | 159.4 | 159.9 | 160.3 | 160.7 | 161.1 | 161.4 | 161.8 |
| 40 | 288 | 159.4 | 159.9 | 160.3 | 160.7 | 161.1 | 161.4 | 161.8 |
| 41 | 290 | 160.7 | 161.1 | 161.5 | 161.9 | 162.3 | 162.7 | 163.0 |
| 42 | 292 | 160.7 | 161.1 | 161.5 | 161.9 | 162.3 | 162.7 | 163.0 |
| 43 | 294 | 160.7 | 161.1 | 161.5 | 161.9 | 162.3 | 162.7 | 163.0 |
| 44 | 296 | 162.7 | 163.1 | 163.5 | 163.9 | 164.3 | 164.7 | 165.0 |
| 45 | 298 | 162.7 | 163.1 | 163.5 | 163.9 | 164.3 | 164.7 | 165.0 |
| 46 | 300 | 164.7 | 165.1 | 165.5 | 165.9 | 166.3 | 166.7 | 167.0 |
| 47 | 302 | 164.7 | 165.1 | 165.5 | 165.9 | 166.3 | 166.7 | 167.0 |
| 48 | 304 | 164.7 | 165.1 | 165.5 | 165.9 | 166.3 | 166.7 | 167.0 |
| 49 | 306 | 164.7 | 165.1 | 165.5 | 165.9 | 166.3 | 166.7 | 167.0 |
| 50 | 308 | 164.7 | 165.1 | 165.5 | 165.9 | 166.3 | 166.7 | 167.0 |
| 51 | 310 | 166.7 | 167.1 | 167.5 | 167.9 | 168.3 | 168.7 | 169.0 |
| 52 | 312 | 166.7 | 167.1 | 167.5 | 167.9 | 168.3 | 168.7 | 169.0 |
| 53 | 314 | 166.7 | 167.1 | 167.5 | 167.9 | 168.3 | 168.7 | 169.0 |
| 54 | 316 | 168.7 | 169.1 | 169.5 | 169.9 | 170.3 | 170.7 | 171.0 |
| 55 | 318 | 168.7 | 169.1 | 169.5 | 169.9 | 170.3 | 170.7 | 171.0 |
| 56 | 320 | 170.7 | 171.1 | 171.5 | 171.9 | 172.3 | 172.7 | 173.0 |
| 57 | 325 | 172.7 | 173.1 | 173.5 | 173.9 | 174.3 | 174.7 | 175.0 |
| 58 | 330 | 174.7 | 175.1 | 175.5 | 175.9 | 176.3 | 176.7 | 177.0 |
| 59 | 335 | 176.7 | 177.1 | 177.5 | 177.9 | 178.3 | 178.7 | 179.0 |
| 60 | 340 | 178.7 | 179.1 | 179.5 | 179.9 | 180.3 | 180.7 | 181.0 |
| 61 | 345 | 180.7 | 181.1 | 181.5 | 181.9 | 182.3 | 182.7 | 183.0 |
| 62 | 350 | 182.7 | 183.1 | 183.5 | 183.9 | 184.3 | 184.7 | 185.0 |
| 63 | 355 | 184.7 | 185.1 | 185.5 | 185.9 | 186.3 | 186.7 | 187.0 |
| 64 | 0 | 188.7 | 189.1 | 189.5 | 189.9 | 190.3 | 190.7 | 191.0 |
| 65 | 5 | 186.7 | 187.1 | 187.5 | 187.9 | 188.3 | 188.7 | 189.0 |
| 66 | 10 | 184.7 | 185.1 | 185.5 | 185.9 | 186.3 | 186.7 | 187.0 |
| 67 | 15 | 182.7 | 183.1 | 183.5 | 183.9 | 184.3 | 184.7 | 185.0 |
| 68 | 20 | 180.7 | 181.1 | 181.5 | 181.9 | 182.3 | 182.7 | 183.0 |
| 69 | 25 | 178.7 | 179.1 | 179.5 | 179.9 | 180.3 | 180.7 | 181.0 |
| 70 | 30 | 176.7 | 177.1 | 177.5 | 177.9 | 178.3 | 178.7 | 179.0 |
| 71 | 35 | 174.7 | 175.1 | 175.5 | 175.9 | 176.3 | 176.7 | 177.0 |
| 72 | 40 | 172.7 | 173.1 | 173.5 | 173.9 | 174.3 | 174.7 | 175.0 |
| 73 | 45 | 170.7 | 171.1 | 171.5 | 171.9 | 172.3 | 172.7 | 173.0 |
| 74 | 47 | 170.7 | 171.1 | 171.5 | 171.9 | 172.3 | 172.7 | 173.0 |
| 75 | 49 | 170.7 | 171.1 | 171.5 | 171.9 | 172.3 | 172.7 | 173.0 |

| | B | AF | AG | AH | AI | AJ | AK | AL | AM | AN | AO | AP | AQ |
|---|---|---|---|---|---|---|---|---|---|---|---|---|---|
| 1 | Tile Angle, degree | | | | | | | | | | | | |
| 2 | Tower, Height m | | | | | | | | | | | | |
| 3 | Max Range, km | | | | | | | | | | | | |
| 4 | | | | | | | | | | | | | |
| 5 | Amp Power, dBw | | | | | | | | | | | | |
| 6 | Line Losses, dB | | | | | | | | | | | | |
| 7 | Peak Npt Xmrt Gain, dBi | | | | | | | | | | | | |
| 8 | Atmospheric Abs dB | | | | | | | | | | | | |
| 9 | | | | | | | | | | | | | |
| 10 | Relative Angle | 0.78 | 0.74 | 0.69 | 0.65 | 0.61 | 0.57 | 0.54 | 0.50 | 0.47 | 0.44 | 0.42 | 0.39 |
| 11 | ES Separation Dist Km | 6.50 | 6.75 | 7.00 | 7.25 | 7.50 | 7.75 | 8.00 | 8.25 | 8.50 | 8.75 | 9.00 | 9.25 |
| 12 | TT to BSS ES Az Angle degrees | | | | | | | | | | | | |
| 13 | 180 | 148.4 | 148.7 | 149.0 | 149.3 | 149.6 | 149.9 | 150.2 | 150.4 | 150.7 | 150.9 | 151.2 | 151.4 |
| 14 | 185 | 148.6 | 158.9 | 149.2 | 149.6 | 149.8 | 150.1 | 150.4 | 150.7 | 150.9 | 151.2 | 151.4 | 151.7 |
| 15 | 190 | 148.9 | 149.2 | 149.5 | 149.8 | 150.1 | 150.4 | 150.7 | 150.9 | 151.2 | 151.4 | 151.7 | 151.9 |
| 16 | 195 | 149.1 | 149.4 | 149.7 | 150.1 | 150.3 | 150.6 | 150.9 | 151.2 | 151.4 | 151.7 | 151.9 | 152.2 |
| 17 | 200 | 149.4 | 149.7 | 150.0 | 150.3 | 150.6 | 150.9 | 151.2 | 151.4 | 151.7 | 151.9 | 152.2 | 152.4 |
| 18 | 205 | 149.6 | 149.9 | 150.2 | 150.6 | 150.8 | 151.1 | 151.4 | 151.7 | 151.9 | 152.2 | 152.4 | 152.7 |
| 19 | 210 | 149.9 | 150.2 | 150.5 | 150.8 | 151.1 | 151.4 | 151.7 | 151.9 | 152.2 | 152.4 | 152.7 | 152.9 |
| 20 | 215 | 150.1 | 150.4 | 150.7 | 151.1 | 151.3 | 151.6 | 151.9 | 152.2 | 152.4 | 152.7 | 152.9 | 153.2 |
| 21 | 220 | 150.4 | 150.7 | 151.0 | 151.3 | 151.6 | 151.9 | 152.2 | 152.4 | 152.7 | 152.9 | 153.2 | 153.4 |
| 22 | 225 | 150.9 | 151.2 | 151.5 | 151.8 | 152.1 | 152.4 | 152.7 | 152.9 | 153.2 | 153.4 | 153.7 | 153.9 |
| 23 | 230 | 151.3 | 151.6 | 151.9 | 152.2 | 152.5 | 152.8 | 153.1 | 153.3 | 153.6 | 153.8 | 154.1 | 154.3 |
| 24 | 235 | 151.9 | 152.2 | 152.5 | 152.8 | 153.1 | 153.4 | 153.7 | 153.9 | 154.2 | 154.4 | 154.7 | 154.9 |
| 25 | 240 | 152.3 | 152.6 | 152.9 | 153.2 | 153.5 | 153.8 | 154.1 | 154.3 | 154.6 | 154.8 | 155.1 | 155.3 |
| 26 | 245 | 153.2 | 153.5 | 153.8 | 154.1 | 154.4 | 154.7 | 155.0 | 155.2 | 155.5 | 155.7 | 156.0 | 156.2 |
| 27 | 250 | 153.8 | 154.1 | 154.4 | 154.7 | 155.0 | 155.3 | 155.6 | 155.8 | 156.1 | 156.3 | 156.6 | 156.8 |
| 28 | 255 | 154.7 | 155.0 | 155.3 | 155.6 | 155.9 | 156.2 | 156.5 | 156.7 | 157.0 | 157.2 | 157.5 | 157.7 |
| 29 | 260 | 155.3 | 155.6 | 155.9 | 156.2 | 156.5 | 156.8 | 157.1 | 157.3 | 157.6 | 157.8 | 158.1 | 158.3 |
| 30 | 265 | 156.7 | 157.0 | 157.3 | 157.6 | 157.9 | 158.2 | 158.5 | 158.7 | 159.0 | 159.2 | 159.5 | 159.7 |
| 31 | 270 | 157.9 | 158.2 | 158.5 | 158.8 | 159.1 | 159.4 | 149.7 | 159.9 | 160.2 | 160.4 | 160.7 | 160.9 |
| 32 | 272 | 157.9 | 158.2 | 158.5 | 158.8 | 159.1 | 159.4 | 149.7 | 159.9 | 160.2 | 160.4 | 160.7 | 160.9 |
| 33 | 274 | 157.9 | 158.2 | 158.5 | 158.8 | 159.1 | 159.4 | 149.7 | 159.9 | 160.2 | 160.4 | 160.7 | 160.9 |
| 34 | 276 | 159.4 | 159.7 | 160.0 | 160.3 | 160.6 | 160.9 | 161.2 | 161.4 | 161.7 | 161.9 | 162.2 | 162.4 |
| 35 | 278 | 159.4 | 159.7 | 160.0 | 160.3 | 160.6 | 160.9 | 161.2 | 161.4 | 161.7 | 161.9 | 162.2 | 162.4 |
| 36 | 280 | 160.9 | 161.2 | 161.5 | 161.8 | 162.1 | 162.4 | 162.7 | 162.9 | 163.2 | 163.4 | 163.7 | 163.9 |
| 37 | 282 | 160.9 | 161.2 | 161.5 | 161.8 | 162.1 | 162.4 | 162.7 | 162.9 | 163.2 | 163.4 | 163.7 | 163.9 |
| 38 | 284 | 160.9 | 161.2 | 161.5 | 161.8 | 162.1 | 162.4 | 162.7 | 162.9 | 163.2 | 163.4 | 163.7 | 163.9 |

TABLE 4-continued

| | | | | | | | | | | | | | |
|---|---|---|---|---|---|---|---|---|---|---|---|---|---|
| 39 | 286 | 162.1 | 162.4 | 162.2 | 163.1 | 163.3 | 163.6 | 163.9 | 164.2 | 164.4 | 164.7 | 164.9 | 165.2 |
| 40 | 288 | 162.1 | 162.4 | 162.2 | 163.1 | 163.3 | 163.6 | 163.9 | 164.2 | 164.4 | 164.7 | 164.9 | 165.2 |
| 41 | 290 | 163.4 | 163.7 | 164.0 | 164.3 | 164.6 | 164.9 | 165.2 | 165.4 | 165.7 | 165.9 | 166.2 | 166.4 |
| 42 | 292 | 163.4 | 163.7 | 164.0 | 164.3 | 164.6 | 164.9 | 165.2 | 165.4 | 165.7 | 165.9 | 166.2 | 166.4 |
| 43 | 294 | 163.4 | 163.7 | 164.0 | 164.3 | 164.6 | 164.9 | 165.2 | 165.4 | 165.7 | 165.9 | 166.2 | 166.4 |
| 44 | 296 | 165.4 | 165.7 | 166.0 | 166.3 | 166.6 | 166.9 | 167.2 | 167.4 | 167.7 | 167.9 | 168.2 | 168.4 |
| 45 | 298 | 165.4 | 165.7 | 166.0 | 166.3 | 166.6 | 166.9 | 167.2 | 167.4 | 167.7 | 167.9 | 168.2 | 168.4 |
| 46 | 300 | 167.4 | 167.7 | 168.0 | 168.3 | 168.6 | 168.9 | 169.2 | 169.4 | 169.7 | 169.9 | 170.2 | 170.4 |
| 47 | 302 | 167.4 | 167.7 | 168.0 | 168.3 | 168.6 | 168.9 | 169.2 | 169.4 | 169.7 | 169.9 | 170.2 | 170.4 |
| 48 | 304 | 167.4 | 167.7 | 168.0 | 168.3 | 168.6 | 168.9 | 169.2 | 169.4 | 169.7 | 169.9 | 170.2 | 170.4 |
| 49 | 306 | 167.4 | 167.7 | 168.0 | 168.3 | 168.6 | 168.9 | 169.2 | 169.4 | 169.7 | 169.9 | 170.2 | 170.4 |
| 50 | 308 | 167.4 | 167.7 | 168.0 | 168.3 | 168.6 | 168.9 | 169.2 | 169.4 | 169.7 | 169.9 | 170.2 | 170.4 |
| 51 | 310 | 169.4 | 169.7 | 170.0 | 170.3 | 170.6 | 170.9 | 171.2 | 171.4 | 171.7 | 171.9 | 172.2 | 172.4 |
| 52 | 312 | 169.4 | 169.7 | 170.0 | 170.3 | 170.6 | 170.9 | 171.2 | 171.4 | 171.7 | 171.9 | 172.2 | 172.4 |
| 53 | 314 | 169.4 | 169.7 | 170.0 | 170.3 | 170.6 | 170.9 | 171.2 | 171.4 | 171.7 | 171.9 | 172.2 | 172.4 |
| 54 | 316 | 171.4 | 171.7 | 172.0 | 172.3 | 172.6 | 172.9 | 173.2 | 173.4 | 173.7 | 173.9 | 174.2 | 174.4 |
| 55 | 318 | 171.4 | 171.7 | 172.0 | 172.3 | 172.6 | 172.9 | 173.2 | 173.4 | 173.7 | 173.9 | 174.2 | 174.4 |
| 56 | 320 | 173.4 | 173.7 | 174.0 | 174.3 | 174.6 | 174.9 | 175.2 | 175.4 | 175.7 | 175.9 | 176.2 | 176.4 |
| 57 | 325 | 175.4 | 175.7 | 176.0 | 176.3 | 176.6 | 176.9 | 177.2 | 177.4 | 177.7 | 177.9 | 178.2 | 178.4 |
| 58 | 330 | 177.4 | 177.7 | 178.0 | 178.3 | 178.6 | 178.9 | 179.2 | 179.4 | 179.7 | 179.9 | 180.2 | 180.4 |
| 59 | 335 | 179.4 | 179.7 | 180.0 | 180.3 | 180.6 | 180.9 | 181.2 | 181.4 | 181.7 | 181.9 | 182.2 | 182.4 |
| 60 | 340 | 181.4 | 181.7 | 182.0 | 182.3 | 182.6 | 182.9 | 183.2 | 183.4 | 183.7 | 183.9 | 184.2 | 184.4 |
| 61 | 345 | 183.4 | 183.7 | 184.0 | 184.3 | 184.6 | 184.9 | 185.2 | 185.4 | 185.7 | 185.9 | 186.2 | 186.4 |
| 62 | 350 | 185.4 | 185.7 | 186.0 | 186.3 | 186.6 | 186.9 | 187.2 | 187.4 | 187.7 | 187.9 | 188.2 | 188.4 |
| 63 | 355 | 187.4 | 187.7 | 188.0 | 188.3 | 188.6 | 188.9 | 189.2 | 189.4 | 189.7 | 189.9 | 190.2 | 190.4 |
| 64 | 0 | 191.4 | 191.7 | 192.0 | 192.3 | 192.6 | 192.9 | 193.2 | 193.4 | 193.7 | 193.9 | 194.2 | 194.4 |
| 65 | 5 | 189.4 | 189.7 | 190.0 | 190.3 | 190.6 | 190.9 | 191.2 | 191.4 | 191.7 | 191.9 | 192.2 | 192.4 |
| 66 | 10 | 187.4 | 187.7 | 188.0 | 188.3 | 188.6 | 188.9 | 189.2 | 189.4 | 189.7 | 189.9 | 190.2 | 190.4 |
| 67 | 15 | 185.4 | 185.7 | 186.0 | 186.3 | 186.6 | 186.9 | 187.2 | 187.4 | 187.7 | 187.9 | 188.2 | 188.4 |
| 68 | 20 | 183.4 | 183.7 | 184.0 | 184.3 | 184.6 | 184.9 | 185.2 | 185.4 | 185.7 | 185.9 | 186.2 | 186.4 |
| 69 | 25 | 181.4 | 181.7 | 182.0 | 182.3 | 182.6 | 182.9 | 183.2 | 193.4 | 183.7 | 183.9 | 184.2 | 184.4 |
| 70 | 30 | 179.4 | 179.7 | 180.0 | 180.3 | 180.6 | 180.9 | 181.2 | 181.4 | 181.7 | 181.9 | 182.2 | 182.4 |
| 71 | 35 | 177.4 | 177.7 | 178.0 | 178.3 | 178.6 | 178.9 | 179.2 | 179.4 | 179.7 | 179.9 | 180.2 | 180.4 |
| 72 | 40 | 175.4 | 175.7 | 176.0 | 176.3 | 176.6 | 176.9 | 177.2 | 177.4 | 177.7 | 177.9 | 178.2 | 178.4 |
| 73 | 45 | 173.4 | 173.7 | 174.0 | 174.3 | 174.6 | 174.9 | 175.2 | 175.4 | 175.7 | 175.9 | 176.2 | 176.4 |
| 74 | 47 | 173.4 | 173.7 | 174.0 | 174.3 | 174.6 | 174.9 | 175.2 | 175.4 | 175.7 | 175.9 | 176.2 | 176.4 |
| 75 | 49 | 173.4 | 173.7 | 174.0 | 174.3 | 174.6 | 174.9 | 175.2 | 175.4 | 175.7 | 175.9 | 176.2 | 176.4 |

| | B | AR | AS | AT | AU | AV | AW | AX | AY |
|---|---|---|---|---|---|---|---|---|---|
| 1 | Tile Angle, degree | | | | | | | | |
| 2 | Tower, Height m | | | | | | | | |
| 3 | Max Range, km | | | | | | | | |
| 4 | | | | | | | | | |
| 5 | Amp Power, dBw | | | | | | | | |
| 6 | Line Losses, dB | | | | | | | | |
| 7 | Peak Npt Xmrt Gain, dBi | | | | | | | | |
| 8 | Atmospheric Abs dB | | | | | | | | |
| 9 | | | | | | | | | |
| 10 | Relative Angle | 0.37 | 0.34 | 0.32 | 0.30 | 0.28 | 0.26 | 0.24 | 0.23 |
| 11 | ES Separation Dist Km | 9.50 | 9.75 | 10.00 | 10.25 | 10.50 | 10.75 | 11.00 | 11.25 |
| 12 | TT to BSS ES Az Angle degrees | | | | | | | | |
| 13 | 180 | 151.6 | 151.9 | 152.1 | 152.3 | 152.5 | 152.7 | 152.9 | 153.1 |
| 14 | 185 | 151.9 | 152.1 | 152.3 | 152.5 | 152.8 | 153.0 | 153.2 | 153.4 |
| 15 | 190 | 152.1 | 152.4 | 152.6 | 152.8 | 153.0 | 153.2 | 153.4 | 153.6 |
| 16 | 195 | 152.4 | 152.6 | 152.8 | 153.0 | 153.3 | 153.5 | 153.7 | 153.9 |
| 17 | 200 | 152.6 | 152.9 | 153.1 | 153.3 | 153.5 | 153.7 | 153.9 | 154.1 |
| 18 | 205 | 152.9 | 153.1 | 153.3 | 153.5 | 153.8 | 154.0 | 154.2 | 154.4 |
| 19 | 210 | 153.1 | 153.4 | 153.6 | 153.8 | 154.0 | 154.2 | 154.4 | 154.6 |
| 20 | 215 | 153.4 | 153.6 | 153.8 | 154.0 | 154.3 | 154.5 | 154.7 | 154.9 |
| 21 | 220 | 153.6 | 153.9 | 154.1 | 154.3 | 154.5 | 154.7 | 154.9 | 155.1 |
| 22 | 225 | 154.1 | 154.4 | 154.6 | 154.8 | 155.0 | 155.2 | 155.4 | 155.6 |
| 23 | 230 | 154.5 | 154.8 | 155.0 | 155.2 | 155.4 | 155.6 | 155.8 | 156.0 |
| 24 | 235 | 155.1 | 155.4 | 155.6 | 155.8 | 156.0 | 156.2 | 156.4 | 156.6 |
| 25 | 240 | 155.5 | 155.8 | 156.0 | 156.2 | 156.4 | 156.6 | 156.8 | 157.0 |
| 26 | 245 | 156.4 | 156.7 | 156.9 | 157.1 | 157.3 | 157.5 | 157.7 | 157.9 |
| 27 | 250 | 157.0 | 157.3 | 157.5 | 157.7 | 157.9 | 158.1 | 158.3 | 158.5 |
| 28 | 255 | 157.9 | 158.2 | 158.4 | 158.6 | 158.8 | 159.0 | 159.2 | 159.4 |
| 29 | 260 | 158.5 | 158.8 | 159.0 | 159.2 | 159.4 | 159.6 | 159.8 | 160.0 |
| 30 | 265 | 159.9 | 160.2 | 160.4 | 160.6 | 160.8 | 161.0 | 161.2 | 161.4 |
| 31 | 270 | 161.1 | 161.4 | 161.6 | 161.8 | 162.0 | 162.2 | 162.4 | 162.6 |
| 32 | 272 | 161.1 | 161.4 | 161.6 | 161.8 | 162.0 | 162.2 | 162.4 | 162.6 |
| 33 | 274 | 161.1 | 161.4 | 161.6 | 161.8 | 162.0 | 162.2 | 162.4 | 162.6 |
| 34 | 276 | 162.6 | 162.9 | 163.1 | 163.3 | 163.5 | 163.7 | 163.9 | 164.1 |
| 35 | 278 | 162.6 | 162.9 | 163.1 | 163.3 | 163.5 | 163.7 | 163.9 | 164.1 |
| 36 | 280 | 164.1 | 164.4 | 164.6 | 164.8 | 165.0 | 165.2 | 165.4 | 165.6 |
| 37 | 282 | 164.1 | 164.4 | 164.6 | 164.8 | 165.0 | 165.2 | 165.4 | 165.6 |
| 38 | 284 | 164.1 | 164.4 | 164.6 | 164.8 | 165.0 | 165.2 | 165.4 | 165.6 |

TABLE 4-continued

| | | | | | | | | | |
|---|---|---|---|---|---|---|---|---|---|
| 39 | 286 | 165.4 | 165.6 | 165.8 | 166.0 | 166.3 | 166.5 | 166.7 | 166.9 |
| 40 | 288 | 165.4 | 165.6 | 165.8 | 166.0 | 166.3 | 166.5 | 166.7 | 166.9 |
| 41 | 290 | 166.6 | 166.9 | 167.1 | 167.3 | 167.5 | 167.7 | 167.9 | 168.1 |
| 42 | 292 | 166.6 | 166.9 | 167.1 | 167.3 | 167.5 | 167.7 | 167.9 | 168.1 |
| 43 | 294 | 166.6 | 166.9 | 167.1 | 167.3 | 167.5 | 167.7 | 167.9 | 168.1 |
| 44 | 296 | 168.6 | 168.9 | 169.1 | 169.3 | 169.5 | 169.7 | 169.9 | 170.1 |
| 45 | 298 | 168.6 | 168.9 | 169.1 | 169.3 | 169.5 | 169.7 | 169.9 | 170.1 |
| 46 | 300 | 170.6 | 170.9 | 171.1 | 171.3 | 171.5 | 171.7 | 171.9 | 172.1 |
| 47 | 302 | 170.6 | 170.9 | 171.1 | 171.3 | 171.5 | 171.7 | 171.9 | 172.1 |
| 48 | 304 | 170.6 | 170.9 | 171.1 | 171.3 | 171.5 | 171.7 | 171.9 | 172.1 |
| 49 | 306 | 170.6 | 170.9 | 171.1 | 171.3 | 171.5 | 171.7 | 171.9 | 172.1 |
| 50 | 308 | 170.6 | 170.9 | 171.1 | 171.3 | 171.5 | 171.7 | 171.9 | 172.1 |
| 51 | 310 | 172.6 | 172.9 | 173.1 | 173.3 | 173.5 | 173.7 | 173.9 | 174.1 |
| 52 | 312 | 172.6 | 172.9 | 173.1 | 173.3 | 173.5 | 173.7 | 173.9 | 174.1 |
| 53 | 314 | 172.6 | 172.9 | 173.1 | 173.3 | 173.5 | 173.7 | 173.9 | 174.1 |
| 54 | 316 | 174.6 | 174.9 | 175.1 | 175.3 | 175.5 | 175.7 | 175.9 | 176.1 |
| 55 | 318 | 174.6 | 174.9 | 175.1 | 175.3 | 175.5 | 175.7 | 175.9 | 176.1 |
| 56 | 320 | 176.6 | 176.9 | 177.1 | 177.3 | 177.5 | 177.7 | 177.9 | 178.1 |
| 57 | 325 | 178.6 | 178.9 | 179.1 | 179.3 | 179.5 | 179.7 | 179.9 | 180.1 |
| 58 | 330 | 180.6 | 180.9 | 181.1 | 181.3 | 181.5 | 181.7 | 181.9 | 182.1 |
| 59 | 335 | 182.6 | 182.9 | 183.1 | 183.3 | 183.5 | 183.7 | 183.9 | 184.1 |
| 60 | 340 | 184.6 | 184.9 | 185.1 | 185.3 | 185.5 | 185.7 | 185.9 | 186.1 |
| 61 | 345 | 186.6 | 186.9 | 187.1 | 187.3 | 187.5 | 187.7 | 187.9 | 188.1 |
| 62 | 350 | 188.6 | 188.9 | 189.1 | 189.3 | 189.5 | 189.7 | 189.9 | 190.1 |
| 63 | 355 | 190.6 | 190.9 | 191.1 | 191.3 | 191.5 | 191.7 | 191.9 | 192.1 |
| 64 | 0 | 194.6 | 194.9 | 195.1 | 195.3 | 195.5 | 195.7 | 195.9 | 196.1 |
| 65 | 5 | 192.6 | 192.9 | 193.1 | 193.3 | 193.5 | 193.7 | 193.9 | 194.1 |
| 66 | 10 | 190.6 | 190.9 | 191.1 | 191.3 | 191.5 | 191.7 | 191.9 | 192.1 |
| 67 | 15 | 188.6 | 188.9 | 189.1 | 189.3 | 189.5 | 189.7 | 189.9 | 190.1 |
| 68 | 20 | 186.6 | 186.9 | 187.1 | 187.3 | 187.5 | 187.7 | 187.9 | 188.1 |
| 69 | 25 | 184.6 | 184.9 | 185.1 | 185.3 | 185.5 | 185.7 | 185.9 | 186.1 |
| 70 | 30 | 182.6 | 182.9 | 183.1 | 183.3 | 183.5 | 183.7 | 183.9 | 184.1 |
| 71 | 35 | 180.6 | 180.9 | 181.1 | 181.3 | 181.5 | 181.7 | 181.9 | 182.1 |
| 72 | 40 | 178.6 | 178.9 | 179.1 | 179.3 | 179.5 | 179.7 | 179.9 | 180.1 |
| 73 | 45 | 176.6 | 176.9 | 177.1 | 177.3 | 177.5 | 177.7 | 177.9 | 178.1 |
| 74 | 47 | 176.6 | 176.9 | 177.1 | 177.3 | 177.5 | 177.7 | 177.9 | 178.1 |
| 75 | 49 | 176.6 | 176.9 | 177.1 | 177.3 | 177.5 | 177.7 | 177.9 | 178.1 |

| | B | AZ | BA | BB | BC | BD | BE | BF | BG |
|---|---|---|---|---|---|---|---|---|---|
| 1 | Tile Angle, degree | | | | | | | | |
| 2 | Tower, Height m | | | | | | | | |
| 3 | Max Range, km | | | | | | | | |
| 4 | | | | | | | | | |
| 5 | Amp Power, dBw | | | | | | | | |
| 6 | Line Losses, dB | | | | | | | | |
| 7 | Peak Npt Xmrt Gain, dBi | | | | | | | | |
| 8 | Atmospheric Abs dB | | | | | | | | |
| 9 | | | | | | | | | |
| 10 | Relative Angle | 0.21 | 0.19 | 0.18 | 0.16 | 0.15 | 0.14 | 0.12 | 0.11 |
| 11 | ES Separation Dist Km | 11.50 | 11.75 | 12.00 | 12.25 | 12.50 | 12.75 | 13.00 | 13.25 |
| 12 | TT to BSS ES Az Angle degrees | | | | | | | | |
| 13 | 180 | 153.3 | 153.5 | 153.7 | 153.8 | 154.0 | 154.2 | 154.4 | 154.5 |
| 14 | 185 | 153.5 | 153.7 | 153.9 | 154.1 | 154.3 | 154.4 | 154.6 | 154.8 |
| 15 | 190 | 153.8 | 154.0 | 154.2 | 154.3 | 154.5 | 154.7 | 154.9 | 155.0 |
| 16 | 195 | 154.0 | 154.2 | 154.4 | 154.6 | 154.8 | 154.9 | 155.1 | 155.3 |
| 17 | 200 | 154.3 | 154.5 | 154.7 | 154.8 | 155.0 | 155.2 | 155.4 | 155.5 |
| 18 | 205 | 154.5 | 154.7 | 154.9 | 155.1 | 155.3 | 155.4 | 155.6 | 155.8 |
| 19 | 210 | 154.8 | 155.0 | 155.2 | 155.3 | 155.5 | 155.7 | 155.9 | 156.0 |
| 20 | 215 | 155.0 | 155.2 | 155.4 | 155.6 | 155.8 | 155.9 | 156.1 | 156.3 |
| 21 | 220 | 155.3 | 155.5 | 155.7 | 155.8 | 156.0 | 156.2 | 156.4 | 156.5 |
| 22 | 225 | 155.8 | 156.0 | 156.2 | 156.3 | 156.5 | 156.7 | 156.9 | 157.0 |
| 23 | 230 | 156.2 | 156.4 | 156.6 | 156.7 | 156.9 | 157.1 | 157.3 | 157.4 |
| 24 | 235 | 156.8 | 157.0 | 157.2 | 157.3 | 157.5 | 157.7 | 157.9 | 158.0 |
| 25 | 240 | 157.2 | 157.4 | 157.6 | 157.7 | 157.9 | 158.1 | 158.3 | 158.4 |
| 26 | 245 | 158.1 | 158.3 | 158.5 | 158.6 | 158.8 | 159.0 | 159.2 | 159.3 |
| 27 | 250 | 158.7 | 158.9 | 159.1 | 159.2 | 159.4 | 159.6 | 159.8 | 159.9 |
| 28 | 255 | 159.6 | 159.8 | 160.0 | 160.1 | 160.3 | 160.5 | 160.7 | 160.8 |
| 29 | 260 | 160.2 | 160.4 | 160.6 | 160.7 | 160.9 | 161.1 | 161.3 | 161.4 |
| 30 | 265 | 161.6 | 161.8 | 162.0 | 162.1 | 162.3 | 162.5 | 162.7 | 162.8 |
| 31 | 270 | 162.8 | 163.0 | 163.2 | 163.3 | 163.5 | 163.7 | 163.9 | 164.0 |
| 32 | 272 | 162.8 | 163.0 | 163.2 | 163.3 | 163.5 | 163.7 | 163.9 | 164.0 |
| 33 | 274 | 162.8 | 163.0 | 163.2 | 163.3 | 163.5 | 163.7 | 163.9 | 164.0 |
| 34 | 276 | 164.3 | 164.5 | 164.7 | 164.8 | 165.0 | 165.2 | 165.4 | 165.5 |
| 35 | 278 | 164.3 | 164.5 | 164.7 | 164.8 | 165.0 | 165.2 | 165.4 | 165.5 |
| 36 | 280 | 165.8 | 166.0 | 166.2 | 166.3 | 166.5 | 166.7 | 166.9 | 167.0 |
| 37 | 282 | 165.8 | 166.0 | 166.2 | 166.3 | 166.5 | 166.7 | 166.9 | 167.0 |
| 38 | 284 | 165.8 | 166.0 | 166.2 | 166.3 | 166.5 | 166.7 | 166.9 | 167.0 |

TABLE 4-continued

| | | | | | | | | | |
|---|---|---|---|---|---|---|---|---|---|
| 39 | 286 | 167.0 | 167.2 | 167.4 | 167.6 | 167.8 | 167.9 | 168.1 | 168.3 |
| 40 | 288 | 167.0 | 167.2 | 167.4 | 167.6 | 167.8 | 167.9 | 168.1 | 168.3 |
| 41 | 290 | 168.3 | 168.5 | 168.7 | 168.8 | 169.0 | 169.2 | 169.4 | 169.5 |
| 42 | 292 | 168.3 | 168.5 | 168.7 | 168.8 | 169.0 | 169.2 | 169.4 | 169.5 |
| 43 | 294 | 168.3 | 168.5 | 168.7 | 168.8 | 169.0 | 169.2 | 169.4 | 169.5 |
| 44 | 296 | 170.3 | 170.5 | 170.7 | 170.8 | 171.0 | 171.2 | 171.4 | 171.5 |
| 45 | 298 | 170.3 | 170.5 | 170.7 | 170.8 | 171.0 | 171.2 | 171.4 | 171.5 |
| 46 | 300 | 172.3 | 172.5 | 172.7 | 172.8 | 173.0 | 173.2 | 173.4 | 173.5 |
| 47 | 302 | 172.3 | 172.5 | 172.7 | 172.8 | 173.0 | 173.2 | 173.4 | 173.5 |
| 48 | 304 | 172.3 | 172.5 | 172.7 | 172.8 | 173.0 | 173.2 | 173.4 | 173.5 |
| 49 | 306 | 172.3 | 172.5 | 172.7 | 172.8 | 173.0 | 173.2 | 173.4 | 173.5 |
| 50 | 308 | 172.3 | 172.5 | 172.7 | 172.8 | 173.0 | 173.2 | 173.4 | 173.5 |
| 51 | 310 | 174.3 | 174.5 | 174.7 | 174.8 | 175.0 | 175.2 | 175.4 | 175.5 |
| 52 | 312 | 174.3 | 174.5 | 174.7 | 174.8 | 175.0 | 175.2 | 175.4 | 175.5 |
| 53 | 314 | 174.3 | 174.5 | 174.7 | 174.8 | 175.0 | 175.2 | 175.4 | 175.5 |
| 54 | 316 | 176.3 | 176.5 | 176.7 | 176.8 | 177.0 | 177.2 | 177.4 | 177.5 |
| 55 | 318 | 176.3 | 176.5 | 176.7 | 176.8 | 177.0 | 177.2 | 177.4 | 177.5 |
| 56 | 320 | 178.3 | 178.5 | 178.7 | 178.8 | 179.0 | 179.2 | 179.4 | 179.5 |
| 57 | 325 | 180.3 | 180.5 | 180.7 | 180.8 | 181.0 | 181.2 | 181.4 | 181.5 |
| 58 | 330 | 182.3 | 182.5 | 182.7 | 182.8 | 183.0 | 183.2 | 183.4 | 183.5 |
| 59 | 335 | 184.3 | 184.5 | 184.7 | 184.8 | 185.0 | 185.2 | 185.4 | 185.5 |
| 60 | 340 | 186.3 | 186.5 | 186.7 | 186.8 | 187.0 | 187.2 | 187.4 | 187.5 |
| 61 | 345 | 188.3 | 188.5 | 188.7 | 188.8 | 189.0 | 189.2 | 189.4 | 189.5 |
| 62 | 350 | 190.3 | 190.5 | 190.7 | 190.8 | 191.0 | 191.2 | 191.4 | 191.5 |
| 63 | 355 | 192.3 | 192.5 | 192.7 | 192.8 | 193.0 | 193.2 | 193.4 | 193.5 |
| 64 | 0 | 196.3 | 196.5 | 196.7 | 196.8 | 197.0 | 197.2 | 197.4 | 197.5 |
| 65 | 5 | 194.3 | 194.5 | 194.7 | 194.8 | 195.0 | 195.2 | 195.4 | 195.5 |
| 66 | 10 | 192.3 | 192.5 | 192.7 | 192.8 | 193.0 | 193.2 | 193.4 | 193.5 |
| 67 | 15 | 190.3 | 190.5 | 190.7 | 190.8 | 191.0 | 191.2 | 191.4 | 191.5 |
| 68 | 20 | 188.3 | 188.5 | 188.7 | 188.8 | 189.0 | 189.2 | 189.4 | 189.5 |
| 69 | 25 | 186.3 | 186.5 | 186.7 | 186.8 | 187.0 | 187.2 | 187.4 | 187.5 |
| 70 | 30 | 184.3 | 184.5 | 184.7 | 184.8 | 185.0 | 185.2 | 185.4 | 185.5 |
| 71 | 35 | 182.3 | 182.5 | 182.7 | 182.8 | 183.0 | 183.2 | 183.4 | 183.5 |
| 72 | 40 | 180.3 | 180.5 | 180.7 | 180.8 | 181.0 | 181.2 | 181.4 | 181.5 |
| 73 | 45 | 178.3 | 178.5 | 178.7 | 178.8 | 179.0 | 179.2 | 179.4 | 179.5 |
| 74 | 47 | 178.3 | 178.5 | 178.7 | 178.8 | 179.0 | 179.2 | 179.4 | 179.5 |
| 75 | 49 | 178.3 | 178.5 | 178.7 | 178.8 | 179.0 | 179.2 | 179.4 | 179.5 |

| | B | BH | BI | BJ | BK | BL | BM | BN | BO | BP | BQ | BR | BS |
|---|---|---|---|---|---|---|---|---|---|---|---|---|---|
| 1 | Tile Angle, degree | | | | | | | | | | | | |
| 2 | Tower, Height m | | | | | | | | | | | | |
| 3 | Max Range, km | | | | | | | | | | | | |
| 4 | | | | | | | | | | | | | |
| 5 | Amp Power, dBw | | | | | | | | | | | | |
| 6 | Line Losses, dB | | | | | | | | | | | | |
| 7 | Peak Npt Xmrt Gain, dBi | | | | | | | | | | | | |
| 8 | Atmospheric Abs dB | | | | | | | | | | | | |
| 9 | | | | | | | | | | | | | |
| 10 | Relative Angle | 0.10 | 0.09 | 0.08 | 0.07 | 0.06 | 0.05 | 0.04 | 0.03 | 0.02 | 0.01 | 0.00 | 0.01 |
| 11 | ES Separation Dist Km | 13.50 | 13.75 | 14.00 | 14.25 | 14.50 | 14.75 | 15.00 | 15.25 | 15.50 | 15.75 | 16.00 | 16.25 |
| 12 | TT to BSS ES Az Angle degrees | | | | | | | | | | | | |
| 13 | 180 | 154.7 | 154.8 | 155.0 | 155.2 | 155.3 | 155.5 | 155.6 | 155.7 | 155.9 | 156.0 | 156.2 | 156.3 |
| 14 | 185 | 154.9 | 155.1 | 155.3 | 155.4 | 155.6 | 155.7 | 155.9 | 156.0 | 156.1 | 156.3 | 156.4 | 156.5 |
| 15 | 190 | 155.2 | 155.3 | 155.5 | 155.7 | 155.8 | 156.0 | 156.1 | 156.2 | 156.4 | 156.5 | 156.7 | 156.8 |
| 16 | 195 | 155.4 | 155.6 | 155.8 | 155.9 | 156.1 | 156.2 | 156.4 | 156.5 | 156.6 | 156.8 | 156.9 | 157.0 |
| 17 | 200 | 155.7 | 155.8 | 156.0 | 156.2 | 156.3 | 156.5 | 156.6 | 156.7 | 156.9 | 157.0 | 157.2 | 157.3 |
| 18 | 205 | 155.9 | 156.1 | 156.3 | 156.4 | 156.6 | 156.7 | 156.9 | 157.0 | 157.1 | 157.3 | 157.4 | 157.5 |
| 19 | 210 | 156.2 | 156.3 | 156.5 | 156.7 | 156.8 | 157.0 | 157.1 | 157.2 | 157.4 | 157.5 | 157.7 | 157.8 |
| 20 | 215 | 156.4 | 156.6 | 156.8 | 156.9 | 157.1 | 157.2 | 157.4 | 157.5 | 157.6 | 157.8 | 157.9 | 158.0 |
| 21 | 220 | 156.7 | 156.8 | 157.0 | 157.2 | 157.3 | 157.5 | 157.6 | 157.7 | 157.9 | 158.0 | 158.2 | 158.3 |
| 22 | 225 | 157.2 | 157.3 | 157.5 | 157.7 | 157.8 | 158.0 | 158.1 | 158.2 | 158.4 | 158.5 | 158.7 | 158.8 |
| 23 | 230 | 157.7 | 157.8 | 158.0 | 158.2 | 158.3 | 158.5 | 158.6 | 158.7 | 158.9 | 159.0 | 159.2 | 159.3 |
| 24 | 235 | 158.2 | 158.3 | 158.5 | 158.7 | 158.8 | 159.0 | 159.1 | 159.2 | 159.4 | 159.5 | 159.7 | 159.8 |
| 25 | 240 | 158.6 | 158.7 | 158.9 | 159.1 | 159.2 | 159.4 | 159.5 | 159.6 | 159.8 | 159.9 | 160.1 | 160.2 |
| 26 | 245 | 159.5 | 159.6 | 159.8 | 160.0 | 160.1 | 160.3 | 160.4 | 160.5 | 160.7 | 160.8 | 161.0 | 161.1 |
| 27 | 250 | 160.1 | 160.2 | 160.4 | 160.6 | 160.7 | 160.9 | 161.0 | 161.1 | 161.3 | 161.4 | 161.6 | 161.7 |
| 28 | 255 | 161.0 | 161.1 | 161.3 | 161.5 | 161.6 | 161.8 | 161.9 | 162.0 | 162.2 | 162.3 | 162.5 | 162.6 |
| 29 | 260 | 161.6 | 161.7 | 161.9 | 162.1 | 162.2 | 162.4 | 162.5 | 162.6 | 162.8 | 162.9 | 163.1 | 163.2 |
| 30 | 265 | 163.0 | 163.1 | 163.3 | 163.5 | 163.6 | 163.8 | 163.9 | 164.0 | 164.2 | 164.3 | 164.5 | 164.6 |
| 31 | 270 | 164.2 | 164.3 | 164.5 | 164.7 | 164.8 | 165.0 | 165.1 | 165.2 | 165.4 | 165.5 | 165.7 | 165.8 |
| 32 | 272 | 164.2 | 164.3 | 164.5 | 164.7 | 164.8 | 165.0 | 165.1 | 165.2 | 165.4 | 165.5 | 165.7 | 165.8 |
| 33 | 274 | 164.2 | 164.3 | 164.5 | 164.7 | 164.8 | 165.0 | 165.1 | 165.2 | 165.4 | 165.5 | 165.7 | 165.8 |
| 34 | 276 | 165.7 | 165.8 | 166.0 | 166.2 | 166.3 | 166.5 | 166.6 | 166.7 | 166.9 | 167.0 | 167.2 | 167.3 |
| 35 | 278 | 165.7 | 165.8 | 166.0 | 166.2 | 166.3 | 166.5 | 166.6 | 166.7 | 166.9 | 167.0 | 167.2 | 167.3 |
| 36 | 280 | 167.2 | 167.3 | 167.5 | 167.7 | 167.8 | 168.0 | 168.1 | 168.2 | 168.4 | 168.5 | 168.7 | 168.8 |
| 37 | 282 | 167.2 | 167.3 | 167.5 | 167.7 | 167.8 | 168.0 | 168.1 | 168.2 | 168.4 | 168.5 | 168.7 | 168.8 |
| 38 | 284 | 167.2 | 167.3 | 167.5 | 167.7 | 167.8 | 168.0 | 168.1 | 168.2 | 168.4 | 168.5 | 168.7 | 168.8 |

TABLE 4-continued

| | | | | | | | | | | | | | |
|---|---|---|---|---|---|---|---|---|---|---|---|---|---|
| 39 | 286 | 168.4 | 168.6 | 168.8 | 168.9 | 169.1 | 169.2 | 169.4 | 169.5 | 169.6 | 169.8 | 169.9 | 170.0 |
| 40 | 288 | 168.4 | 168.6 | 168.8 | 168.9 | 169.1 | 169.2 | 169.4 | 169.5 | 169.6 | 169.8 | 169.9 | 170.0 |
| 41 | 290 | 169.7 | 169.8 | 170.0 | 170.2 | 170.3 | 170.5 | 170.6 | 170.7 | 170.9 | 171.0 | 171.2 | 171.3 |
| 42 | 292 | 169.7 | 169.8 | 170.0 | 170.2 | 170.3 | 170.5 | 170.6 | 170.7 | 170.9 | 171.0 | 171.2 | 171.3 |
| 43 | 294 | 169.7 | 169.8 | 170.0 | 170.2 | 170.3 | 170.5 | 170.6 | 170.7 | 170.9 | 171.0 | 171.2 | 171.3 |
| 44 | 296 | 171.7 | 171.8 | 172.0 | 172.2 | 172.3 | 172.5 | 172.6 | 172.7 | 172.9 | 173.0 | 173.2 | 173.3 |
| 45 | 298 | 171.7 | 171.8 | 172.0 | 172.2 | 172.3 | 172.5 | 172.6 | 172.7 | 172.9 | 173.0 | 173.2 | 173.3 |
| 46 | 300 | 173.7 | 173.8 | 174.0 | 174.2 | 174.3 | 174.5 | 174.6 | 174.7 | 174.9 | 175.0 | 175.2 | 175.3 |
| 47 | 302 | 173.7 | 173.8 | 174.0 | 174.2 | 174.3 | 174.5 | 174.6 | 174.7 | 174.9 | 175.0 | 175.2 | 175.3 |
| 48 | 304 | 173.7 | 173.8 | 174.0 | 174.2 | 174.3 | 174.5 | 174.6 | 174.7 | 174.9 | 175.0 | 175.2 | 175.3 |
| 49 | 306 | 173.7 | 173.8 | 174.0 | 174.2 | 174.3 | 174.5 | 174.6 | 174.7 | 174.9 | 175.0 | 175.2 | 175.3 |
| 50 | 308 | 173.7 | 173.8 | 174.0 | 174.2 | 174.3 | 174.5 | 174.6 | 174.7 | 174.9 | 175.0 | 175.2 | 175.3 |
| 51 | 310 | 175.7 | 175.8 | 176.0 | 176.2 | 176.3 | 176.5 | 176.6 | 176.7 | 176.9 | 177.0 | 177.2 | 177.3 |
| 52 | 312 | 175.7 | 175.8 | 176.0 | 176.2 | 176.3 | 176.5 | 176.6 | 176.7 | 176.9 | 177.0 | 177.2 | 177.3 |
| 53 | 314 | 175.7 | 175.8 | 176.0 | 176.2 | 176.3 | 176.5 | 176.6 | 176.7 | 176.9 | 177.0 | 177.2 | 177.3 |
| 54 | 316 | 177.7 | 177.8 | 178.0 | 178.2 | 178.3 | 178.5 | 178.6 | 178.7 | 178.9 | 179.0 | 179.2 | 179.3 |
| 55 | 318 | 177.7 | 177.8 | 178.0 | 178.2 | 178.3 | 178.5 | 178.6 | 178.7 | 178.9 | 179.0 | 179.2 | 179.3 |
| 56 | 320 | 179.7 | 179.8 | 180.0 | 180.2 | 180.3 | 180.5 | 180.6 | 180.7 | 180.9 | 181.0 | 181.2 | 181.3 |
| 57 | 325 | 181.7 | 181.8 | 182.0 | 182.2 | 182.3 | 182.5 | 182.6 | 182.7 | 182.9 | 183.0 | 183.2 | 183.3 |
| 58 | 330 | 183.7 | 183.8 | 184.0 | 184.2 | 184.3 | 184.5 | 184.6 | 184.7 | 184.9 | 185.0 | 185.2 | 185.3 |
| 59 | 335 | 185.7 | 185.8 | 186.0 | 186.2 | 186.3 | 186.5 | 186.6 | 186.7 | 186.9 | 187.0 | 187.2 | 187.3 |
| 60 | 340 | 187.7 | 187.8 | 188.0 | 188.2 | 188.3 | 188.5 | 188.6 | 188.7 | 188.9 | 189.0 | 189.2 | 189.3 |
| 61 | 345 | 189.7 | 189.8 | 190.0 | 190.2 | 190.3 | 190.5 | 190.6 | 190.7 | 190.9 | 191.0 | 191.2 | 191.3 |
| 62 | 350 | 191.7 | 191.8 | 192.0 | 192.2 | 192.3 | 192.5 | 192.6 | 192.7 | 192.9 | 193.0 | 193.2 | 193.3 |
| 63 | 355 | 193.7 | 193.8 | 194.0 | 194.2 | 194.3 | 194.5 | 194.6 | 194.7 | 194.9 | 195.0 | 195.2 | 195.3 |
| 64 | 0 | 197.7 | 197.8 | 198.0 | 198.2 | 198.3 | 198.5 | 198.6 | 198.7 | 198.9 | 199.0 | 199.2 | 199.3 |
| 65 | 5 | 195.7 | 195.8 | 196.0 | 196.2 | 196.3 | 196.5 | 196.6 | 196.7 | 196.9 | 197.0 | 197.2 | 197.3 |
| 66 | 10 | 193.7 | 193.8 | 194.0 | 194.2 | 194.3 | 194.5 | 194.6 | 194.7 | 194.9 | 195.0 | 195.2 | 195.3 |
| 67 | 15 | 191.7 | 191.8 | 192.0 | 192.2 | 192.3 | 192.5 | 192.6 | 192.7 | 192.9 | 193.0 | 193.2 | 193.3 |
| 68 | 20 | 189.7 | 189.8 | 190.0 | 190.2 | 190.3 | 190.5 | 190.6 | 190.7 | 190.9 | 191.0 | 191.2 | 191.3 |
| 69 | 25 | 187.7 | 187.8 | 188.0 | 188.2 | 188.3 | 188.5 | 188.6 | 188.7 | 188.9 | 189.0 | 189.2 | 189.3 |
| 70 | 30 | 185.7 | 185.8 | 186.0 | 186.2 | 186.3 | 186.5 | 186.6 | 186.7 | 186.9 | 187.0 | 187.2 | 187.3 |
| 71 | 35 | 183.7 | 183.8 | 184.0 | 184.2 | 184.3 | 184.5 | 184.6 | 184.7 | 184.9 | 185.0 | 185.2 | 185.3 |
| 72 | 40 | 181.7 | 181.8 | 182.0 | 182.2 | 182.3 | 182.5 | 182.6 | 182.7 | 182.9 | 183.0 | 183.2 | 183.3 |
| 73 | 45 | 179.7 | 179.8 | 180.0 | 180.2 | 180.3 | 180.5 | 180.6 | 180.7 | 180.9 | 181.0 | 181.2 | 181.3 |
| 74 | 47 | 179.7 | 179.8 | 180.0 | 180.2 | 180.3 | 180.5 | 180.6 | 180.7 | 180.9 | 181.0 | 181.2 | 181.3 |
| 75 | 49 | 179.7 | 179.8 | 180.0 | 180.2 | 180.3 | 180.5 | 180.6 | 180.7 | 180.9 | 181.0 | 181.2 | 181.3 |

| | B | BT | BU | BV | BW | BX | BY | BZ | CA | CB | CC | CD |
|---|---|---|---|---|---|---|---|---|---|---|---|---|
| 1 | Tile Angle, degree | | | | | | | | | | | |
| 2 | Tower, Height m | | | | | | | | | | | |
| 3 | Max Range, km | | | | | | | | | | | |
| 4 | | | | | | | | | | | | |
| 5 | Amp Power, dBw | | | | | | | | | | | |
| 6 | Line Losses, dB | | | | | | | | | | | |
| 7 | Peak Npt Xmrt Gain, dBi | | | | | | | | | | | |
| 8 | Atmospheric Abs dB | | | | | | | | | | | |
| 9 | | | | | | | | | | | | |
| 10 | Relative Angle | 0.02 | 0.02 | 0.03 | 0.04 | 0.05 | 0.05 | 0.06 | 0.07 | 0.07 | 0.08 | 0.08 |
| 11 | ES Separation Dist Km | 16.50 | 16.75 | 17.00 | 17.25 | 17.50 | 17.75 | 18.00 | 18.25 | 18.50 | 18.75 | 19.00 |
| 12 | TT to BSS ES Az Angle degrees | | | | | | | | | | | |
| 13 | 180 | 156.4 | 156.6 | 156.7 | 156.8 | 156.9 | 157.1 | 157.2 | 157.3 | 157.4 | 157.5 | 157.7 |
| 14 | 185 | 156.7 | 156.8 | 156.9 | 157.1 | 157.2 | 157.3 | 157.4 | 157.6 | 157.7 | 157.8 | 157.9 |
| 15 | 190 | 156.9 | 157.1 | 157.2 | 157.3 | 157.4 | 157.6 | 157.7 | 157.8 | 157.9 | 158.0 | 158.2 |
| 16 | 195 | 157.2 | 157.3 | 157.4 | 157.6 | 157.7 | 157.8 | 157.9 | 158.1 | 158.2 | 158.3 | 158.4 |
| 17 | 200 | 157.4 | 157.6 | 157.7 | 157.8 | 157.9 | 158.1 | 158.2 | 158.3 | 158.4 | 158.5 | 158.7 |
| 18 | 205 | 157.7 | 157.8 | 157.9 | 158.1 | 158.2 | 158.3 | 158.4 | 158.6 | 158.7 | 158.8 | 158.9 |
| 19 | 210 | 157.9 | 158.1 | 158.2 | 158.3 | 158.4 | 158.6 | 158.7 | 158.8 | 158.9 | 159.0 | 159.2 |
| 20 | 215 | 158.2 | 158.3 | 158.4 | 158.6 | 158.7 | 158.8 | 158.9 | 159.1 | 159.2 | 159.3 | 159.4 |
| 21 | 220 | 158.4 | 158.6 | 158.7 | 158.8 | 158.9 | 159.1 | 159.2 | 159.3 | 159.4 | 159.5 | 159.7 |
| 22 | 225 | 158.9 | 159.1 | 159.2 | 159.3 | 159.4 | 159.6 | 159.7 | 159.8 | 159.9 | 160.0 | 160.2 |
| 23 | 230 | 159.3 | 159.5 | 159.6 | 159.7 | 159.8 | 160.0 | 160.1 | 160.2 | 160.3 | 160.4 | 160.6 |
| 24 | 235 | 159.9 | 160.1 | 160.2 | 160.3 | 160.4 | 160.6 | 160.7 | 160.8 | 160.9 | 161.0 | 161.2 |
| 25 | 240 | 160.3 | 160.5 | 160.6 | 160.7 | 160.8 | 161.0 | 161.1 | 161.2 | 161.3 | 161.4 | 161.6 |
| 26 | 245 | 161.2 | 161.3 | 161.4 | 161.6 | 161.7 | 161.8 | 161.9 | 162.1 | 162.2 | 162.3 | 162.4 |
| 27 | 250 | 161.8 | 162.0 | 162.1 | 162.2 | 162.3 | 162.5 | 162.6 | 162.7 | 162.8 | 162.9 | 163.1 |
| 28 | 255 | 162.7 | 162.9 | 163.0 | 163.1 | 163.2 | 163.4 | 163.5 | 163.6 | 163.7 | 163.8 | 164.0 |
| 29 | 260 | 163.3 | 163.5 | 163.6 | 163.7 | 163.8 | 164.0 | 164.1 | 164.2 | 164.3 | 164.4 | 164.6 |
| 30 | 265 | 164.7 | 164.9 | 165.0 | 165.1 | 165.2 | 165.4 | 165.5 | 165.6 | 165.7 | 165.8 | 166.0 |
| 31 | 270 | 165.9 | 166.1 | 166.2 | 166.3 | 166.4 | 166.6 | 166.7 | 166.8 | 166.9 | 167.0 | 167.2 |
| 32 | 272 | 165.9 | 166.1 | 166.2 | 166.3 | 166.4 | 166.6 | 166.7 | 166.8 | 166.9 | 167.0 | 167.2 |
| 33 | 274 | 165.9 | 166.1 | 166.2 | 166.3 | 166.4 | 166.6 | 166.7 | 166.8 | 166.9 | 167.0 | 167.2 |
| 34 | 276 | 167.4 | 167.6 | 167.7 | 167.8 | 167.9 | 168.1 | 168.2 | 168.3 | 168.4 | 168.5 | 168.7 |
| 35 | 278 | 167.4 | 167.6 | 167.7 | 167.8 | 167.9 | 168.1 | 168.2 | 168.3 | 168.4 | 168.5 | 168.7 |
| 36 | 280 | 168.9 | 169.1 | 169.2 | 169.3 | 169.4 | 169.6 | 169.7 | 169.8 | 169.9 | 170.0 | 170.2 |
| 37 | 282 | 168.9 | 169.1 | 169.2 | 169.3 | 169.4 | 169.6 | 169.7 | 169.8 | 169.9 | 170.0 | 170.2 |
| 38 | 284 | 168.9 | 169.1 | 169.2 | 169.3 | 169.4 | 169.6 | 169.7 | 169.8 | 169.9 | 170.0 | 170.2 |

TABLE 4-continued

| | | | | | | | | | | | | |
|---|---|---|---|---|---|---|---|---|---|---|---|---|
| 39 | 286 | 170.2 | 170.3 | 170.4 | 170.6 | 170.7 | 170.8 | 170.9 | 171.1 | 171.2 | 171.3 | 171.4 |
| 40 | 288 | 170.2 | 170.3 | 170.4 | 170.6 | 170.7 | 170.8 | 170.9 | 171.1 | 171.2 | 171.3 | 171.4 |
| 41 | 290 | 171.4 | 171.6 | 171.7 | 171.8 | 171.9 | 172.1 | 172.2 | 172.3 | 172.4 | 172.5 | 172.7 |
| 42 | 292 | 171.4 | 171.6 | 171.7 | 171.8 | 171.9 | 172.1 | 172.2 | 172.3 | 172.4 | 172.5 | 172.7 |
| 43 | 294 | 171.4 | 171.6 | 171.7 | 171.8 | 171.9 | 172.1 | 172.2 | 172.3 | 172.4 | 172.5 | 172.7 |
| 44 | 296 | 173.4 | 173.6 | 173.7 | 173.8 | 173.9 | 174.1 | 174.2 | 174.3 | 174.4 | 174.5 | 174.7 |
| 45 | 298 | 173.4 | 173.6 | 173.7 | 173.8 | 173.9 | 174.1 | 174.2 | 174.3 | 174.4 | 174.5 | 174.7 |
| 46 | 300 | 175.4 | 175.6 | 175.7 | 175.8 | 175.9 | 176.1 | 176.2 | 176.3 | 176.4 | 176.5 | 176.7 |
| 47 | 302 | 175.4 | 175.6 | 175.7 | 175.8 | 175.9 | 176.1 | 176.2 | 176.3 | 176.4 | 176.5 | 176.7 |
| 48 | 304 | 175.4 | 175.6 | 175.7 | 175.8 | 175.9 | 176.1 | 176.2 | 176.3 | 176.4 | 176.5 | 176.7 |
| 49 | 306 | 175.4 | 175.6 | 175.7 | 175.8 | 175.9 | 176.1 | 176.2 | 176.3 | 176.4 | 176.5 | 176.7 |
| 50 | 308 | 175.4 | 175.6 | 175.7 | 175.8 | 175.9 | 176.1 | 176.2 | 176.3 | 176.4 | 176.5 | 176.7 |
| 51 | 310 | 177.4 | 177.6 | 177.7 | 177.8 | 177.9 | 178.1 | 178.2 | 178.3 | 178.4 | 178.5 | 178.7 |
| 52 | 312 | 177.4 | 177.6 | 177.7 | 177.8 | 177.9 | 178.1 | 178.2 | 178.3 | 178.4 | 178.5 | 178.7 |
| 53 | 314 | 177.4 | 177.6 | 177.7 | 177.8 | 177.9 | 178.1 | 178.2 | 178.3 | 178.4 | 178.5 | 178.7 |
| 54 | 316 | 179.4 | 179.6 | 179.7 | 179.8 | 179.9 | 180.1 | 180.2 | 180.3 | 180.4 | 180.5 | 180.7 |
| 55 | 318 | 179.4 | 179.6 | 179.7 | 179.8 | 179.9 | 180.1 | 180.2 | 180.3 | 180.4 | 180.5 | 180.7 |
| 56 | 320 | 181.4 | 181.6 | 181.7 | 181.8 | 181.9 | 182.1 | 182.2 | 182.3 | 182.4 | 182.5 | 182.7 |
| 57 | 325 | 183.4 | 183.6 | 183.7 | 183.8 | 183.9 | 184.1 | 184.2 | 184.3 | 184.4 | 184.5 | 184.7 |
| 58 | 330 | 185.4 | 185.6 | 185.7 | 185.8 | 185.9 | 186.1 | 186.2 | 186.3 | 186.4 | 186.5 | 186.7 |
| 59 | 335 | 187.4 | 187.6 | 187.7 | 187.8 | 187.9 | 188.1 | 188.2 | 188.3 | 188.4 | 188.5 | 188.7 |
| 60 | 340 | 189.4 | 189.6 | 189.7 | 189.8 | 189.9 | 190.1 | 190.2 | 190.3 | 190.4 | 190.5 | 190.7 |
| 61 | 345 | 191.4 | 191.6 | 191.7 | 191.8 | 191.9 | 192.1 | 192.2 | 192.3 | 192.4 | 192.5 | 192.7 |
| 62 | 350 | 193.4 | 193.6 | 193.7 | 193.8 | 193.9 | 194.1 | 194.2 | 194.3 | 194.4 | 194.5 | 194.7 |
| 63 | 355 | 195.4 | 195.6 | 195.7 | 195.8 | 195.9 | 196.1 | 196.2 | 196.3 | 196.4 | 196.5 | 196.7 |
| 64 | 0 | 199.4 | 199.6 | 199.7 | 199.8 | 199.9 | 200.1 | 200.2 | 200.3 | 200.4 | 200.5 | 200.7 |
| 65 | 5 | 197.4 | 197.6 | 197.7 | 197.8 | 197.9 | 198.1 | 198.2 | 198.3 | 198.4 | 198.5 | 198.7 |
| 66 | 10 | 195.4 | 195.6 | 195.7 | 195.8 | 195.9 | 196.1 | 196.2 | 196.3 | 196.4 | 196.5 | 196.7 |
| 67 | 15 | 193.4 | 193.6 | 193.7 | 193.8 | 193.9 | 194.1 | 194.2 | 194.3 | 194.4 | 194.5 | 194.7 |
| 68 | 20 | 191.4 | 191.6 | 191.7 | 191.8 | 191.9 | 192.1 | 192.2 | 192.3 | 192.4 | 192.5 | 192.7 |
| 69 | 25 | 189.4 | 189.6 | 189.7 | 189.8 | 189.9 | 190.1 | 190.2 | 190.3 | 190.4 | 190.5 | 190.7 |
| 70 | 30 | 187.4 | 187.6 | 187.7 | 187.8 | 187.9 | 188.1 | 188.2 | 188.3 | 188.4 | 188.5 | 188.7 |
| 71 | 35 | 185.4 | 185.6 | 185.7 | 185.8 | 185.9 | 186.1 | 186.2 | 186.3 | 186.4 | 186.5 | 186.7 |
| 72 | 40 | 183.4 | 183.6 | 183.7 | 183.8 | 183.9 | 184.1 | 184.2 | 184.3 | 184.4 | 184.5 | 184.7 |
| 73 | 45 | 181.4 | 181.6 | 181.7 | 181.8 | 181.9 | 182.1 | 182.2 | 182.3 | 182.4 | 182.5 | 182.7 |
| 74 | 47 | 181.4 | 181.6 | 181.7 | 181.8 | 181.9 | 182.1 | 182.2 | 182.3 | 182.4 | 182.5 | 182.7 |
| 75 | 49 | 181.4 | 181.6 | 181.7 | 181.8 | 181.9 | 182.1 | 182.2 | 182.3 | 182.4 | 182.5 | 182.7 |

| A | B | C | D | E | F | G | H | I | J | K | L | M | N |
|---|---|---|---|---|---|---|---|---|---|---|---|---|---|
| 1 | Tile Angle, degree | 0 | | | | | | | | | | | |
| 2 | Tower, Height m | 150 | | | | | | | | | | | |
| 3 | Max Range, km | 16 | | | | | | | | | | | |
| 4 | | | | | | | | | | | | | |
| 5 | Amp Power, dBw | | 25 | | | | NOW LINKED TO NOTES SPREADSHEET | | | | | | |
| 6 | Line Losses, dB | 2.5 | | | | | | | | | | | |
| 7 | Peak Npt Xmrt Gain, dBi | 10 | | | | | | | | | | | |
| 8 | Atmospheric Abs dB | 0.2 | | | | | | | | | | | |
| 9 | | | | | | | | | | | | | |
| 10 | Relative Angle | 71.03 | 55.77 | 36.33 | 26.03 | 20.02 | 16.16 | 11.56 | 7.99 | 6.31 | 5.17 | 4.36 | 3.75 |
| 11 | ES Separation Dist Km | 0.05 | 0.10 | 0.20 | 0.30 | 0.40 | 0.50 | 0.70 | 1.00 | 1.25 | 1.50 | 1.75 | 2.00 |
| 12 | TT to BSS ES Az Angle degrees | | | | | | | | Calculated RSSi | | | | |
| 76 | 51 | 167.1 | 168.2 | 165.0 | 166.6 | 160.1 | 157.5 | 156.3 | 157.2 | 158.3 | 159.5 | 160.6 | 161.6 |
| 77 | 53 | 167.1 | 168.2 | 165.0 | 166.6 | 160.1 | 157.5 | 156.3 | 157.2 | 158.3 | 159.5 | 160.6 | 161.6 |
| 78 | 55 | 165.1 | 166.2 | 163.0 | 164.6 | 158.1 | 155.5 | 154.3 | 155.2 | 156.3 | 157.5 | 158.6 | 159.6 |
| 79 | 57 | 165.1 | 166.2 | 163.0 | 164.6 | 158.1 | 155.5 | 154.3 | 155.2 | 156.3 | 157.5 | 158.6 | 159.6 |
| 80 | 59 | 165.1 | 166.2 | 163.0 | 164.6 | 158.1 | 155.5 | 154.3 | 155.2 | 156.3 | 157.5 | 158.6 | 159.6 |
| 81 | 61 | 163.1 | 164.2 | 161.0 | 162.6 | 156.1 | 153.5 | 152.3 | 153.2 | 154.3 | 155.5 | 156.6 | 157.6 |
| 82 | 63 | 163.1 | 164.2 | 161.0 | 162.6 | 156.1 | 153.5 | 152.3 | 153.2 | 154.3 | 155.5 | 156.6 | 157.6 |
| 83 | 65 | 161.1 | 162.2 | 159.0 | 160.6 | 154.1 | 151.5 | 150.3 | 151.2 | 152.3 | 153.5 | 154.6 | 155.6 |
| 84 | 67 | 161.1 | 162.2 | 159.0 | 160.6 | 154.1 | 151.5 | 150.3 | 151.2 | 152.3 | 153.5 | 154.6 | 155.6 |
| 85 | 69 | 161.1 | 162.2 | 159.0 | 160.6 | 154.1 | 151.5 | 150.3 | 151.2 | 152.3 | 153.5 | 154.6 | 155.6 |
| 86 | 71 | 159.1 | 160.2 | 157.0 | 158.6 | 152.1 | 149.5 | 148.3 | 149.2 | 150.3 | 151.5 | 152.6 | 153.6 |
| 87 | 73 | 159.1 | 160.2 | 157.0 | 158.6 | 152.1 | 149.5 | 148.3 | 149.2 | 150.3 | 151.5 | 152.6 | 153.6 |
| 88 | 75 | 157.8 | 158.9 | 155.7 | 157.3 | 150.9 | 148.3 | 147.1 | 147.9 | 149.1 | 150.2 | 151.3 | 152.3 |
| 89 | 77 | 157.8 | 158.9 | 155.7 | 157.3 | 150.9 | 148.3 | 147.1 | 147.9 | 149.1 | 150.2 | 151.3 | 152.3 |
| 90 | 79 | 157.8 | 158.9 | 155.7 | 157.3 | 150.9 | 148.3 | 147.1 | 147.9 | 149.1 | 150.2 | 151.3 | 152.3 |
| 91 | 81 | 156.6 | 157.7 | 154.5 | 156.1 | 149.6 | 147.0 | 145.8 | 146.7 | 147.8 | 149.0 | 150.1 | 151.1 |
| 92 | 83 | 156.6 | 157.7 | 154.5 | 156.1 | 149.6 | 147.0 | 145.8 | 146.7 | 147.8 | 149.0 | 150.1 | 151.1 |
| 93 | 85 | 155.1 | 156.2 | 153.0 | 154.6 | 148.1 | 145.5 | 144.3 | 145.2 | 146.3 | 147.5 | 148.6 | 149.6 |
| 94 | 87 | 155.1 | 156.2 | 153.0 | 154.6 | 148.1 | 145.5 | 144.3 | 145.2 | 146.3 | 147.5 | 148.6 | 149.6 |
| 95 | 89 | 155.1 | 156.2 | 153.0 | 154.6 | 148.1 | 145.5 | 144.3 | 145.2 | 146.3 | 147.5 | 148.6 | 149.6 |
| 96 | 90 | 153.6 | 154.7 | 151.5 | 153.1 | 146.6 | 144.0 | 142.8 | 143.7 | 144.8 | 146.0 | 147.1 | 148.1 |
| 97 | 95 | 152.2 | 153.3 | 150.1 | 151.7 | 145.2 | 142.6 | 141.4 | 142.3 | 143.4 | 144.6 | 145.7 | 146.7 |
| 98 | 100 | 151.1 | 152.2 | 149.0 | 150.6 | 144.1 | 141.5 | 140.3 | 141.2 | 142.3 | 143.5 | 144.6 | 145.6 |
| 99 | 105 | 150.5 | 151.6 | 148.4 | 150.0 | 143.5 | 140.9 | 139.7 | 140.6 | 141.7 | 142.9 | 144.0 | 145.0 |
| 100 | 110 | 149.6 | 150.7 | 147.5 | 149.1 | 142.6 | 140.0 | 138.8 | 139.7 | 140.8 | 142.0 | 143.1 | 144.1 |

TABLE 4-continued

| | | | | | | | | | | | |
|---|---|---|---|---|---|---|---|---|---|---|---|
| 101 | 115 | 149.0 | 150.1 | 146.9 | 148.5 | 142.0 | 139.4 | 138.2 | 139.1 | 140.2 | 141.4 | 142.5 | 143.5 |
| 102 | 120 | 148.1 | 149.2 | 146.0 | 147.6 | 141.1 | 138.5 | 137.3 | 138.2 | 139.3 | 140.5 | 141.6 | 142.6 |
| 103 | 125 | 147.7 | 148.8 | 145.6 | 147.2 | 140.7 | 138.1 | 136.9 | 137.8 | 138.9 | 140.1 | 141.2 | 142.2 |
| 104 | 130 | 147.1 | 148.2 | 145.0 | 146.6 | 140.1 | 137.5 | 136.3 | 137.2 | 138.3 | 139.5 | 140.6 | 141.6 |
| 105 | 135 | 146.7 | 147.8 | 144.6 | 146.2 | 139.7 | 137.1 | 135.9 | 136.8 | 137.9 | 139.1 | 140.2 | 141.2 |
| 106 | 140 | 146.1 | 147.2 | 144.0 | 145.6 | 139.1 | 136.5 | 135.3 | 136.2 | 137.3 | 138.5 | 139.6 | 140.6 |
| 107 | 145 | 145.8 | 146.9 | 143.7 | 145.3 | 138.9 | 136.3 | 135.1 | 135.9 | 137.1 | 138.2 | 139.3 | 140.3 |
| 108 | 150 | 145.6 | 146.7 | 143.5 | 145.1 | 138.6 | 136.0 | 134.8 | 135.7 | 136.8 | 138.0 | 139.1 | 140.1 |
| 109 | 155 | 145.3 | 146.4 | 143.2 | 144.8 | 138.4 | 135.8 | 134.6 | 135.4 | 136.6 | 137.7 | 138.8 | 139.8 |
| 110 | 160 | 145.1 | 146.2 | 143.0 | 144.6 | 138.1 | 135.5 | 134.3 | 135.2 | 136.3 | 137.5 | 138.6 | 139.6 |
| 111 | 165 | 144.8 | 145.9 | 142.7 | 144.3 | 137.9 | 135.3 | 134.1 | 134.9 | 136.1 | 137.2 | 138.3 | 139.3 |
| 112 | 170 | 144.6 | 145.7 | 142.5 | 144.1 | 137.6 | 135.0 | 133.8 | 134.7 | 135.8 | 137.0 | 138.1 | 139.1 |
| 113 | 175 | 144.3 | 145.4 | 142.2 | 143.8 | 137.4 | 134.8 | 133.6 | 134.4 | 135.6 | 136.7 | 137.8 | 138.8 |

| A | B | O | P | Q | R | S | T | U | V | W | X |
|---|---|---|---|---|---|---|---|---|---|---|---|
| 1 | Tile Angle, degree | | | | | | | | | | |
| 2 | Tower, Height m | | | | | | | | | | |
| 3 | Max Range, km | | | | | | | | | | |
| 4 | | | | | | | | | | | |
| 5 | Amp Power, dBw | | | | | | | | | | |
| 6 | Line Losses, dB | | | | | | | | | | |
| 7 | Peak Npt Xmrt Gain, dBi | | | | | | | | | | |
| 8 | Atmospheric Abs dB | | | | | | | | | | |
| 9 | | | | | | | | | | | |
| 10 | Relative Angle | 3.28 | 2.90 | 2.58 | 2.33 | 2.11 | 1.92 | 1.75 | 1.61 | 1.48 | 1.37 |
| 11 | ES Separation Dist Km | 2.25 | 2.50 | 2.75 | 3.00 | 3.25 | 3.50 | 3.75 | 4.00 | 4.25 | 4.50 |
| 12 | TT to BSS ES Az Angle degrees | | | | | | | | | | |
| 76 | 51 | 162.5 | 163.3 | 164.1 | 164.8 | 165.5 | 166.1 | 166.7 | 167.2 | 167.7 | 168.2 |
| 77 | 53 | 162.5 | 163.3 | 164.1 | 164.8 | 165.5 | 166.1 | 166.7 | 167.2 | 167.7 | 168.2 |
| 78 | 55 | 160.5 | 161.3 | 162.1 | 162.8 | 163.5 | 164.1 | 164.7 | 165.2 | 165.7 | 166.2 |
| 79 | 57 | 160.5 | 161.3 | 162.1 | 162.8 | 163.5 | 164.1 | 164.7 | 165.2 | 165.7 | 166.2 |
| 80 | 59 | 160.5 | 161.3 | 162.1 | 162.8 | 163.5 | 164.1 | 164.7 | 165.2 | 165.7 | 166.2 |
| 81 | 61 | 158.5 | 159.3 | 160.1 | 160.8 | 161.5 | 162.1 | 162.7 | 163.2 | 163.7 | 164.2 |
| 82 | 63 | 158.5 | 159.3 | 160.1 | 160.8 | 161.5 | 162.1 | 162.7 | 163.2 | 163.7 | 164.2 |
| 83 | 65 | 156.5 | 157.3 | 158.1 | 158.8 | 159.5 | 160.1 | 160.7 | 161.2 | 161.7 | 162.2 |
| 84 | 67 | 156.5 | 157.3 | 158.1 | 158.8 | 159.5 | 160.1 | 160.7 | 161.2 | 161.7 | 162.2 |
| 85 | 69 | 156.5 | 157.3 | 158.1 | 158.8 | 159.5 | 160.1 | 160.7 | 161.2 | 161.7 | 162.2 |
| 86 | 71 | 154.5 | 155.3 | 156.1 | 156.8 | 157.5 | 158.1 | 158.7 | 159.2 | 159.7 | 160.2 |
| 87 | 73 | 154.5 | 155.3 | 156.1 | 156.8 | 157.5 | 158.1 | 158.7 | 159.2 | 159.7 | 160.2 |
| 88 | 75 | 153.2 | 154.1 | 154.8 | 155.6 | 156.2 | 156.8 | 157.4 | 158.0 | 158.5 | 159.0 |
| 89 | 77 | 153.2 | 154.1 | 154.8 | 155.6 | 156.2 | 156.8 | 157.4 | 158.0 | 158.5 | 159.0 |
| 90 | 79 | 153.2 | 154.1 | 154.8 | 155.6 | 156.2 | 156.8 | 157.4 | 158.0 | 158.5 | 159.0 |
| 91 | 81 | 152.0 | 152.8 | 153.6 | 154.3 | 155.0 | 155.6 | 156.2 | 156.7 | 157.2 | 157.7 |
| 92 | 83 | 152.0 | 152.8 | 153.6 | 154.3 | 155.0 | 155.6 | 156.2 | 156.7 | 157.2 | 157.7 |
| 93 | 85 | 150.5 | 151.3 | 152.1 | 152.8 | 153.5 | 154.1 | 154.7 | 155.2 | 155.7 | 156.2 |
| 94 | 87 | 150.5 | 151.3 | 152.1 | 152.8 | 153.5 | 154.1 | 154.7 | 155.2 | 155.7 | 156.2 |
| 95 | 89 | 150.5 | 151.3 | 152.1 | 152.8 | 153.5 | 154.1 | 154.7 | 155.2 | 155.7 | 156.2 |
| 96 | 90 | 149.0 | 149.8 | 150.6 | 151.3 | 152.0 | 152.6 | 153.2 | 153.7 | 154.2 | 154.7 |
| 97 | 95 | 147.6 | 148.4 | 149.2 | 149.9 | 150.6 | 151.2 | 151.8 | 152.3 | 152.8 | 153.3 |
| 98 | 100 | 146.5 | 147.3 | 148.1 | 148.8 | 149.5 | 150.1 | 150.7 | 151.2 | 151.7 | 152.2 |
| 99 | 105 | 145.9 | 146.7 | 147.5 | 148.2 | 148.9 | 149.5 | 150.1 | 150.6 | 151.1 | 151.6 |
| 100 | 110 | 145.0 | 145.8 | 146.6 | 147.3 | 148.0 | 148.6 | 149.2 | 149.7 | 150.2 | 150.7 |
| 101 | 115 | 144.4 | 145.2 | 146.0 | 146.7 | 147.4 | 148.0 | 148.6 | 149.1 | 149.6 | 150.1 |
| 102 | 120 | 143.5 | 144.3 | 145.1 | 145.8 | 146.5 | 147.1 | 147.7 | 148.2 | 148.7 | 149.2 |
| 103 | 125 | 143.1 | 143.9 | 144.7 | 145.4 | 146.1 | 146.7 | 147.3 | 147.8 | 148.3 | 148.8 |
| 104 | 130 | 142.5 | 143.3 | 144.1 | 144.8 | 145.5 | 146.1 | 146.7 | 147.2 | 147.7 | 148.2 |
| 105 | 135 | 142.1 | 142.9 | 143.7 | 144.4 | 145.1 | 145.7 | 146.3 | 146.8 | 147.3 | 147.8 |
| 106 | 140 | 141.5 | 142.3 | 143.1 | 143.8 | 144.5 | 145.1 | 145.7 | 146.2 | 146.7 | 147.2 |
| 107 | 145 | 141.2 | 142.1 | 142.8 | 143.6 | 144.2 | 144.8 | 145.4 | 146.0 | 146.5 | 147.0 |
| 108 | 150 | 141.0 | 141.8 | 142.6 | 143.3 | 144.0 | 144.6 | 145.2 | 145.7 | 146.2 | 146.7 |
| 109 | 155 | 140.7 | 141.6 | 142.3 | 143.1 | 143.7 | 144.3 | 144.9 | 145.5 | 146.0 | 146.5 |
| 110 | 160 | 140.5 | 141.3 | 142.1 | 142.8 | 143.5 | 144.1 | 144.7 | 145.2 | 145.7 | 146.2 |
| 111 | 165 | 140.2 | 141.1 | 141.8 | 142.6 | 143.2 | 143.8 | 144.4 | 145.0 | 145.5 | 146.0 |
| 112 | 170 | 140.0 | 140.8 | 141.6 | 142.3 | 143.0 | 143.6 | 144.2 | 144.2 | 145.2 | 145.7 |
| 113 | 175 | 139.7 | 140.6 | 141.3 | 142.1 | 142.7 | 143.3 | 143.9 | 144.5 | 145.0 | 145.5 |

| A | B | Y | Z | AA | AB | AC | AD | AE |
|---|---|---|---|---|---|---|---|---|
| 1 | Tile Angle, degree | | | | | | | |
| 2 | Tower, Height m | | | | | | | |
| 3 | Max Range, km | | | | | | | |
| 4 | | | | | | | | |
| 5 | Amp Power, dBw | | | | | | | |
| 6 | Line Losses, dB | | | | | | | |
| 7 | Peak Npt Xmrt Gain, dBi | | | | | | | |

TABLE 4-continued

| | | | | | | | | |
|---|---|---|---|---|---|---|---|---|
| 8 | Atmospheric Abs dB | | | | | | | |
| 9 | | | | | | | | |
| 10 | Relative Angle | 1.27 | 1.18 | 1.10 | 1.03 | 0.96 | 0.89 | 0.84 |
| 11 | ES Separation Dist Km | 4.75 | 5.00 | 5.25 | 5.50 | 5.75 | 6.00 | 6.25 |
| 12 | TT to BSS ES Az Angle degrees | | | | | | | |
| 76 | 51 | 168.7 | 169.1 | 169.5 | 169.9 | 170.3 | 170.7 | 171.0 |
| 77 | 53 | 168.7 | 169.1 | 169.5 | 169.9 | 170.3 | 170.7 | 171.0 |
| 78 | 55 | 166.7 | 167.1 | 167.5 | 167.9 | 168.3 | 168.7 | 169.0 |
| 79 | 57 | 166.7 | 167.1 | 167.5 | 167.9 | 168.3 | 168.7 | 169.0 |
| 80 | 59 | 166.7 | 167.1 | 167.5 | 167.9 | 168.3 | 168.7 | 169.0 |
| 81 | 61 | 164.7 | 165.1 | 165.5 | 165.9 | 166.3 | 166.7 | 167.0 |
| 82 | 63 | 164.7 | 165.1 | 165.5 | 165.9 | 166.3 | 166.7 | 167.0 |
| 83 | 65 | 162.7 | 163.1 | 163.5 | 163.9 | 164.3 | 164.7 | 165.0 |
| 84 | 67 | 162.7 | 163.1 | 163.5 | 163.9 | 164.3 | 164.7 | 165.0 |
| 85 | 69 | 162.7 | 163.1 | 163.5 | 163.9 | 164.3 | 164.7 | 165.0 |
| 86 | 71 | 160.7 | 161.1 | 161.5 | 161.9 | 162.3 | 162.7 | 163.0 |
| 87 | 73 | 160.7 | 161.1 | 161.5 | 161.9 | 162.3 | 162.7 | 163.0 |
| 88 | 75 | 159.4 | 159.9 | 160.3 | 160.7 | 161.1 | 161.4 | 161.8 |
| 89 | 77 | 159.4 | 159.9 | 160.3 | 160.7 | 161.1 | 161.4 | 161.8 |
| 90 | 79 | 159.4 | 159.9 | 160.3 | 160.7 | 161.1 | 161.4 | 161.8 |
| 91 | 81 | 158.2 | 158.6 | 159.0 | 159.4 | 159.8 | 160.2 | 160.5 |
| 92 | 83 | 158.2 | 158.6 | 159.0 | 159.4 | 159.8 | 160.2 | 160.5 |
| 93 | 85 | 156.7 | 157.1 | 157.5 | 157.9 | 158.3 | 158.7 | 159.0 |
| 94 | 87 | 156.7 | 157.1 | 157.5 | 157.9 | 158.3 | 158.7 | 159.0 |
| 95 | 89 | 156.7 | 157.1 | 157.5 | 157.9 | 158.3 | 158.7 | 159.0 |
| 96 | 90 | 155.2 | 155.6 | 156.0 | 156.4 | 156.8 | 157.2 | 157.5 |
| 97 | 95 | 153.8 | 154.2 | 154.6 | 155.0 | 155.4 | 155.8 | 156.1 |
| 98 | 100 | 152.7 | 153.1 | 153.5 | 153.9 | 154.3 | 154.7 | 155.0 |
| 99 | 105 | 152.1 | 152.5 | 152.9 | 153.3 | 153.7 | 154.1 | 154.4 |
| 100 | 110 | 151.2 | 151.6 | 152.0 | 152.4 | 152.8 | 153.2 | 153.5 |
| 101 | 115 | 150.6 | 151.0 | 151.4 | 151.8 | 152.2 | 152.6 | 152.9 |
| 102 | 120 | 149.7 | 150.1 | 150.5 | 150.9 | 151.3 | 151.7 | 152.0 |
| 103 | 125 | 149.3 | 149.7 | 150.1 | 150.5 | 150.9 | 151.3 | 151.6 |
| 104 | 130 | 148.7 | 149.1 | 149.5 | 149.9 | 150.3 | 150.7 | 151.0 |
| 105 | 135 | 148.3 | 148.7 | 149.1 | 149.5 | 149.9 | 150.3 | 150.6 |
| 106 | 140 | 147.7 | 148.1 | 148.5 | 148.9 | 149.3 | 149.7 | 150.0 |
| 107 | 145 | 147.4 | 147.9 | 148.3 | 148.7 | 149.1 | 149.4 | 149.8 |
| 108 | 150 | 147.2 | 147.6 | 148.0 | 148.4 | 148.8 | 149.2 | 149.5 |
| 109 | 155 | 146.9 | 147.4 | 147.8 | 148.2 | 148.6 | 148.9 | 149.3 |
| 110 | 160 | 146.7 | 147.1 | 147.5 | 147.9 | 148.3 | 148.7 | 149.0 |
| 111 | 165 | 146.4 | 146.9 | 147.3 | 147.7 | 148.1 | 148.4 | 148.8 |
| 112 | 170 | 146.2 | 146.6 | 147.0 | 147.4 | 147.8 | 148.2 | 148.5 |
| 113 | 175 | 145.9 | 146.4 | 146.8 | 147.2 | 147.6 | 147.9 | 148.3 |

| | B | AF | AG | AH | AI | AJ | AK | AL | AM | AN | AO | AP | AQ |
|---|---|---|---|---|---|---|---|---|---|---|---|---|---|
| 1 | Tile Angle, degree | | | | | | | | | | | | |
| 2 | Tower, Height m | | | | | | | | | | | | |
| 3 | Max Range, km | | | | | | | | | | | | |
| 4 | | | | | | | | | | | | | |
| 5 | Amp Power, dBw | | | | | | | | | | | | |
| 6 | Line Losses, dB | | | | | | | | | | | | |
| 7 | Peak Npt Xmrt Gain, dBi | | | | | | | | | | | | |
| 8 | Atmospheric Abs dB | | | | | | | | | | | | |
| 9 | | | | | | | | | | | | | |
| 10 | Relative Angle | 0.78 | 0.74 | 0.69 | 0.65 | 0.61 | 0.57 | 0.54 | 0.50 | 0.47 | 0.44 | 0.42 | 0.39 |
| 11 | ES Separation Dist Km | 6.50 | 6.75 | 7.00 | 7.25 | 7.50 | 7.75 | 8.00 | 8.25 | 8.50 | 8.75 | 9.00 | 9.25 |
| 12 | TT to BSS ES Az Angle degrees | | | | | | | | | | | | |
| 76 | 51 | 171.4 | 171.7 | 172.0 | 172.3 | 172.6 | 172.9 | 173.2 | 173.4 | 173.7 | 173.9 | 174.2 | 174.4 |
| 77 | 53 | 171.4 | 171.7 | 172.0 | 172.3 | 172.6 | 172.9 | 173.2 | 173.4 | 173.7 | 173.9 | 174.2 | 174.4 |
| 78 | 55 | 169.4 | 169.7 | 170.0 | 170.3 | 170.6 | 170.9 | 171.2 | 171.4 | 171.7 | 171.9 | 172.2 | 172.4 |
| 79 | 57 | 169.4 | 169.7 | 170.0 | 170.3 | 170.6 | 170.9 | 171.2 | 171.4 | 171.7 | 171.9 | 172.2 | 172.4 |
| 80 | 59 | 169.4 | 169.7 | 170.0 | 170.3 | 170.6 | 170.9 | 171.2 | 171.4 | 171.7 | 171.9 | 172.2 | 172.4 |
| 81 | 61 | 167.4 | 167.7 | 168.0 | 168.3 | 168.6 | 168.9 | 169.2 | 169.4 | 169.7 | 169.9 | 170.2 | 170.4 |
| 82 | 63 | 167.4 | 167.7 | 168.0 | 168.3 | 168.6 | 168.9 | 169.2 | 169.4 | 169.7 | 169.9 | 170.2 | 170.4 |
| 83 | 65 | 165.4 | 165.7 | 166.0 | 166.3 | 166.6 | 166.9 | 167.2 | 167.4 | 167.7 | 167.9 | 168.2 | 168.4 |
| 84 | 67 | 165.4 | 165.7 | 166.0 | 166.3 | 166.6 | 166.9 | 167.2 | 167.4 | 167.7 | 167.9 | 168.2 | 168.4 |
| 85 | 69 | 165.4 | 165.7 | 166.0 | 166.3 | 166.6 | 166.9 | 167.2 | 167.4 | 167.7 | 167.9 | 168.2 | 168.4 |
| 86 | 71 | 163.4 | 163.7 | 164.0 | 164.3 | 164.6 | 164.9 | 165.2 | 165.4 | 165.7 | 165.9 | 166.2 | 166.4 |
| 87 | 73 | 163.4 | 163.7 | 164.0 | 164.3 | 164.6 | 164.9 | 165.2 | 165.4 | 165.7 | 165.9 | 166.2 | 166.4 |
| 88 | 75 | 162.1 | 162.4 | 162.7 | 163.1 | 163.3 | 163.6 | 163.9 | 164.2 | 164.4 | 164.7 | 164.9 | 165.2 |
| 89 | 77 | 162.1 | 162.4 | 162.7 | 163.1 | 163.3 | 163.6 | 163.9 | 164.2 | 164.4 | 164.7 | 164.9 | 165.2 |
| 90 | 79 | 162.1 | 162.4 | 162.7 | 163.1 | 163.3 | 163.6 | 163.9 | 164.2 | 164.4 | 164.7 | 164.9 | 165.2 |
| 91 | 81 | 160.9 | 161.2 | 161.5 | 161.8 | 162.1 | 162.4 | 162.7 | 162.9 | 163.2 | 163.4 | 163.7 | 163.9 |
| 92 | 83 | 160.9 | 161.2 | 161.5 | 161.8 | 162.1 | 162.4 | 162.7 | 162.9 | 163.2 | 163.4 | 163.7 | 163.9 |
| 93 | 85 | 159.4 | 159.7 | 160.0 | 160.3 | 160.6 | 160.9 | 161.2 | 161.4 | 161.7 | 161.9 | 162.2 | 162.4 |

TABLE 4-continued

| | | | | | | | | | | | | | |
|---|---|---|---|---|---|---|---|---|---|---|---|---|---|
| 94 | 87 | 159.4 | 159.7 | 160.0 | 160.3 | 160.6 | 160.9 | 161.2 | 161.4 | 161.7 | 161.9 | 162.2 | 162.4 |
| 95 | 89 | 159.4 | 159.7 | 160.0 | 160.3 | 160.6 | 160.9 | 161.2 | 161.4 | 161.7 | 161.9 | 162.2 | 162.4 |
| 96 | 90 | 157.9 | 158.2 | 158.5 | 158.8 | 159.1 | 159.4 | 159.7 | 159.9 | 160.2 | 160.4 | 160.7 | 160.9 |
| 97 | 95 | 156.5 | 156.8 | 157.1 | 157.4 | 157.7 | 158.0 | 158.3 | 158.5 | 158.8 | 159.0 | 159.3 | 159.5 |
| 98 | 100 | 155.4 | 155.7 | 156.0 | 156.3 | 156.6 | 156.9 | 157.2 | 157.4 | 157.7 | 157.9 | 158.2 | 158.4 |
| 99 | 105 | 154.8 | 155.1 | 155.4 | 155.7 | 156.0 | 156.3 | 156.6 | 156.8 | 157.1 | 157.3 | 157.6 | 157.8 |
| 100 | 110 | 153.9 | 154.2 | 154.5 | 154.8 | 155.1 | 155.4 | 155.7 | 155.9 | 156.2 | 156.4 | 156.7 | 156.9 |
| 101 | 115 | 153.3 | 153.6 | 153.9 | 154.2 | 154.5 | 154.8 | 155.1 | 155.3 | 155.6 | 155.8 | 156.1 | 156.3 |
| 102 | 120 | 152.4 | 152.7 | 153.0 | 153.3 | 153.6 | 153.9 | 154.2 | 154.4 | 154.7 | 154.9 | 155.2 | 155.4 |
| 103 | 125 | 152.0 | 152.3 | 152.6 | 152.9 | 153.2 | 153.5 | 153.8 | 154.0 | 154.3 | 154.5 | 154.8 | 155.0 |
| 104 | 130 | 151.4 | 151.7 | 152.0 | 152.3 | 152.6 | 152.9 | 153.2 | 153.4 | 153.7 | 153.9 | 154.2 | 154.4 |
| 105 | 135 | 151.0 | 151.3 | 151.6 | 151.9 | 152.2 | 152.5 | 152.8 | 153.0 | 153.3 | 153.5 | 153.8 | 154.0 |
| 106 | 140 | 150.4 | 150.7 | 151.0 | 151.3 | 151.6 | 151.9 | 152.2 | 152.4 | 152.7 | 152.9 | 153.2 | 153.4 |
| 107 | 145 | 150.1 | 150.4 | 150.7 | 151.1 | 151.3 | 151.6 | 151.9 | 152.2 | 152.4 | 152.7 | 152.9 | 153.2 |
| 108 | 150 | 149.9 | 150.2 | 150.5 | 150.8 | 151.1 | 151.4 | 151.7 | 151.9 | 152.2 | 152.4 | 152.7 | 152.9 |
| 109 | 155 | 149.6 | 149.9 | 150.2 | 150.6 | 150.8 | 151.1 | 151.4 | 151.7 | 151.9 | 152.2 | 152.4 | 152.7 |
| 110 | 160 | 149.4 | 149.7 | 150.0 | 150.3 | 150.6 | 150.9 | 151.2 | 151.4 | 151.7 | 151.9 | 152.2 | 152.4 |
| 111 | 165 | 149.1 | 149.4 | 149.7 | 150.1 | 150.3 | 150.6 | 150.9 | 151.2 | 151.4 | 151.7 | 151.9 | 152.2 |
| 112 | 170 | 148.9 | 149.2 | 149.5 | 149.8 | 150.1 | 150.4 | 150.7 | 150.9 | 151.2 | 151.4 | 151.7 | 151.9 |
| 113 | 175 | 148.6 | 148.9 | 149.2 | 149.6 | 149.8 | 150.1 | 150.4 | 150.7 | 150.9 | 151.2 | 151.4 | 151.7 |

| | B | AR | AS | AT | AU | AV | AW | AX | AY |
|---|---|---|---|---|---|---|---|---|---|
| 1 | Tile Angle, degree | | | | | | | | |
| 2 | Tower, Height m | | | | | | | | |
| 3 | Max Range, km | | | | | | | | |
| 4 | | | | | | | | | |
| 5 | Amp Power, dBw | | | | | | | | |
| 6 | Line Losses, dB | | | | | | | | |
| 7 | Peak Npt Xmrt Gain, dBi | | | | | | | | |
| 8 | Atmospheric Abs dB | | | | | | | | |
| 9 | | | | | | | | | |
| 10 | Relative Angle | 0.37 | 0.34 | 0.32 | 0.30 | 0.28 | 0.26 | 0.24 | 0.23 |
| 11 | ES Separation Dist Km | 9.50 | 9.75 | 10.00 | 10.25 | 10.50 | 10.75 | 11.00 | 11.25 |
| 12 | TT to BSS ES Az Angle degrees | | | | | | | | |
| 76 | 51 | 174.6 | 174.9 | 175.1 | 175.3 | 175.5 | 175.7 | 175.9 | 176.1 |
| 77 | 53 | 174.6 | 174.9 | 175.1 | 175.3 | 175.5 | 175.7 | 175.9 | 176.1 |
| 78 | 55 | 172.6 | 172.9 | 173.1 | 173.3 | 173.5 | 173.7 | 173.9 | 174.1 |
| 79 | 57 | 172.6 | 172.9 | 173.1 | 173.3 | 173.5 | 173.7 | 173.9 | 174.1 |
| 80 | 59 | 172.6 | 172.9 | 173.1 | 173.3 | 173.5 | 173.7 | 173.9 | 174.1 |
| 81 | 61 | 170.6 | 170.9 | 171.1 | 171.3 | 171.5 | 171.7 | 171.9 | 172.1 |
| 82 | 63 | 170.6 | 170.9 | 171.1 | 171.3 | 171.5 | 171.7 | 171.9 | 172.1 |
| 83 | 65 | 168.6 | 168.9 | 169.1 | 169.3 | 169.5 | 169.7 | 169.9 | 170.1 |
| 84 | 67 | 168.6 | 168.9 | 169.1 | 169.3 | 169.5 | 169.7 | 169.9 | 170.1 |
| 85 | 69 | 168.6 | 168.9 | 169.1 | 169.3 | 169.5 | 169.7 | 169.9 | 170.1 |
| 86 | 71 | 166.6 | 166.9 | 167.1 | 167.3 | 167.5 | 167.7 | 167.9 | 168.1 |
| 87 | 73 | 166.6 | 166.9 | 167.1 | 167.3 | 167.5 | 167.7 | 167.9 | 168.1 |
| 88 | 75 | 165.4 | 165.6 | 165.8 | 166.0 | 166.3 | 166.5 | 166.7 | 166.9 |
| 89 | 77 | 165.4 | 165.6 | 165.8 | 166.0 | 166.3 | 166.5 | 166.7 | 166.9 |
| 90 | 79 | 165.4 | 165.6 | 165.8 | 166.0 | 166.3 | 166.5 | 166.7 | 166.9 |
| 91 | 81 | 164.1 | 164.4 | 164.6 | 164.8 | 165.0 | 165.2 | 165.4 | 165.6 |
| 92 | 83 | 164.1 | 164.4 | 164.6 | 164.8 | 165.0 | 165.2 | 165.4 | 165.6 |
| 93 | 85 | 162.6 | 162.9 | 163.1 | 163.3 | 163.5 | 163.7 | 163.9 | 164.1 |
| 94 | 87 | 162.6 | 162.9 | 163.1 | 163.3 | 163.5 | 163.7 | 163.9 | 164.1 |
| 95 | 89 | 162.6 | 162.9 | 163.1 | 163.3 | 163.5 | 163.7 | 163.9 | 164.1 |
| 96 | 90 | 161.1 | 161.4 | 161.6 | 161.8 | 162.0 | 162.2 | 162.4 | 162.6 |
| 97 | 95 | 159.7 | 160.0 | 160.2 | 160.4 | 160.6 | 160.8 | 161.0 | 161.2 |
| 98 | 100 | 158.6 | 158.9 | 159.1 | 159.3 | 159.5 | 159.7 | 159.9 | 160.1 |
| 99 | 105 | 158.0 | 158.3 | 158.5 | 158.7 | 158.9 | 159.1 | 159.3 | 159.5 |
| 100 | 110 | 157.1 | 157.4 | 157.6 | 157.8 | 158.0 | 158.2 | 158.4 | 158.6 |
| 101 | 115 | 156.5 | 156.8 | 157.0 | 157.2 | 157.4 | 157.6 | 157.8 | 158.0 |
| 102 | 120 | 155.6 | 155.9 | 156.1 | 156.3 | 156.5 | 156.7 | 156.9 | 157.1 |
| 103 | 125 | 155.2 | 155.5 | 155.7 | 155.9 | 156.1 | 156.3 | 156.5 | 156.7 |
| 104 | 130 | 154.6 | 154.9 | 155.1 | 155.3 | 155.5 | 155.7 | 155.9 | 156.1 |
| 105 | 135 | 154.2 | 154.5 | 154.7 | 154.9 | 155.1 | 155.3 | 155.5 | 155.7 |
| 106 | 140 | 153.6 | 153.9 | 154.1 | 154.3 | 154.5 | 154.7 | 154.9 | 155.1 |
| 107 | 145 | 153.4 | 153.6 | 153.8 | 154.0 | 154.3 | 154.5 | 154.7 | 154.9 |
| 108 | 150 | 153.1 | 153.4 | 153.6 | 153.8 | 154.0 | 154.2 | 154.4 | 154.6 |
| 109 | 155 | 152.9 | 153.1 | 153.3 | 153.5 | 153.8 | 154.0 | 154.2 | 154.4 |
| 110 | 160 | 152.6 | 152.9 | 153.1 | 153.3 | 153.5 | 153.7 | 153.9 | 154.1 |
| 111 | 165 | 152.4 | 152.6 | 152.8 | 153.0 | 153.3 | 153.5 | 153.7 | 153.9 |
| 112 | 170 | 152.1 | 152.4 | 152.6 | 152.8 | 153.0 | 153.2 | 153.4 | 153.6 |
| 113 | 175 | 151.9 | 152.1 | 152.3 | 152.5 | 152.8 | 153.0 | 153.2 | 153.4 |

TABLE 4-continued

| | B | AZ | BA | BB | BC | BD | BE | BF | BG |
|---|---|---|---|---|---|---|---|---|---|
| 1 | Tile Angle, degree | | | | | | | | |
| 2 | Tower, Height m | | | | | | | | |
| 3 | Max Range, km | | | | | | | | |
| 4 | | | | | | | | | |
| 5 | Amp Power, dBw | | | | | | | | |
| 6 | Line Losses, dB | | | | | | | | |
| 7 | Peak Npt Xmrt Gain, dBi | | | | | | | | |
| 8 | Atmospheric Abs dB | | | | | | | | |
| 9 | | | | | | | | | |
| 10 | Relative Angle | 0.21 | 0.19 | 0.18 | 0.16 | 0.15 | 0.14 | 0.12 | 0.11 |
| 11 | ES Separation Dist Km | 11.50 | 11.75 | 12.00 | 12.25 | 12.50 | 12.75 | 13.00 | 13.25 |
| 12 | TT to BSS ES Az Angle degrees | | | | | | | | |
| 76 | 51 | 176.3 | 176.5 | 176.7 | 176.8 | 177.0 | 177.2 | 177.4 | 177.5 |
| 77 | 53 | 176.3 | 176.5 | 176.7 | 176.8 | 177.0 | 177.2 | 177.4 | 177.5 |
| 78 | 55 | 174.3 | 174.5 | 174.7 | 174.8 | 175.0 | 175.2 | 175.4 | 175.5 |
| 79 | 57 | 174.3 | 174.5 | 174.7 | 174.8 | 175.0 | 175.2 | 175.4 | 175.5 |
| 80 | 59 | 174.3 | 174.5 | 174.7 | 174.8 | 175.0 | 175.2 | 175.4 | 175.5 |
| 81 | 61 | 172.3 | 172.5 | 172.7 | 172.8 | 173.0 | 173.2 | 173.4 | 173.5 |
| 82 | 63 | 172.3 | 172.5 | 172.7 | 172.8 | 173.0 | 173.2 | 173.4 | 173.5 |
| 83 | 65 | 170.3 | 170.5 | 170.7 | 170.8 | 171.0 | 171.2 | 171.4 | 171.5 |
| 84 | 67 | 170.3 | 170.5 | 170.7 | 170.8 | 171.0 | 171.2 | 171.4 | 171.5 |
| 85 | 69 | 170.3 | 170.5 | 170.7 | 170.8 | 171.0 | 171.2 | 171.4 | 171.5 |
| 86 | 71 | 168.3 | 168.5 | 168.7 | 168.8 | 169.0 | 169.2 | 169.4 | 169.5 |
| 87 | 73 | 168.3 | 168.5 | 168.7 | 168.8 | 169.0 | 169.2 | 169.4 | 169.5 |
| 88 | 75 | 167.0 | 167.2 | 167.4 | 167.6 | 167.8 | 167.9 | 168.1 | 168.3 |
| 89 | 77 | 167.0 | 167.2 | 167.4 | 167.6 | 167.8 | 167.9 | 168.1 | 168.3 |
| 90 | 79 | 167.0 | 167.2 | 167.4 | 167.6 | 167.8 | 167.9 | 168.1 | 168.3 |
| 91 | 81 | 165.8 | 166.0 | 166.2 | 166.3 | 166.5 | 166.7 | 166.9 | 167.0 |
| 92 | 83 | 165.8 | 166.0 | 166.2 | 166.3 | 166.5 | 166.7 | 166.9 | 167.0 |
| 93 | 85 | 164.3 | 164.5 | 164.7 | 164.8 | 165.0 | 165.2 | 165.4 | 165.5 |
| 94 | 87 | 164.3 | 164.5 | 164.7 | 164.8 | 165.0 | 165.2 | 165.4 | 165.5 |
| 95 | 89 | 164.3 | 164.5 | 164.7 | 164.8 | 165.0 | 165.2 | 165.4 | 165.5 |
| 96 | 90 | 162.8 | 163.0 | 163.2 | 163.3 | 163.5 | 163.7 | 163.9 | 164.0 |
| 97 | 95 | 161.4 | 161.6 | 161.8 | 161.9 | 162.1 | 162.3 | 162.5 | 162.6 |
| 98 | 100 | 160.3 | 160.5 | 160.7 | 160.8 | 161.0 | 161.2 | 161.4 | 161.5 |
| 99 | 105 | 159.7 | 159.9 | 160.1 | 160.2 | 160.4 | 160.6 | 160.8 | 160.9 |
| 100 | 110 | 158.8 | 159.0 | 159.2 | 159.3 | 159.5 | 159.7 | 159.9 | 160.0 |
| 101 | 115 | 158.2 | 158.4 | 158.6 | 158.7 | 158.9 | 159.1 | 159.3 | 159.4 |
| 102 | 120 | 157.3 | 157.5 | 157.7 | 157.8 | 158.0 | 158.2 | 158.4 | 158.5 |
| 103 | 125 | 156.9 | 157.1 | 157.3 | 157.4 | 157.6 | 157.8 | 158.0 | 158.1 |
| 104 | 130 | 156.3 | 156.5 | 156.7 | 156.8 | 157.0 | 157.2 | 157.4 | 157.5 |
| 105 | 135 | 155.9 | 156.1 | 156.3 | 156.4 | 156.6 | 156.8 | 157.0 | 157.1 |
| 106 | 140 | 155.3 | 155.5 | 155.7 | 155.8 | 156.0 | 156.2 | 156.4 | 156.5 |
| 107 | 145 | 155.0 | 155.2 | 155.4 | 155.6 | 155.8 | 155.9 | 156.1 | 156.3 |
| 108 | 150 | 154.8 | 155.0 | 155.2 | 155.3 | 155.5 | 155.7 | 155.9 | 156.0 |
| 109 | 155 | 154.5 | 154.7 | 154.9 | 155.1 | 155.3 | 155.4 | 155.6 | 155.8 |
| 110 | 160 | 154.3 | 154.5 | 154.7 | 154.8 | 155.0 | 155.2 | 155.4 | 155.5 |
| 111 | 165 | 154.0 | 154.2 | 154.4 | 154.6 | 154.8 | 154.9 | 155.1 | 155.3 |
| 112 | 170 | 153.8 | 154.0 | 154.2 | 154.3 | 154.5 | 154.7 | 154.9 | 155.0 |
| 113 | 175 | 153.5 | 153.7 | 153.9 | 154.1 | 154.3 | 154.4 | 154.6 | 154.8 |

| | B | BH | BI | BJ | BK | BL | BM | BN | BO | BP | BQ | BR | BS |
|---|---|---|---|---|---|---|---|---|---|---|---|---|---|
| 1 | Tile Angle, degree | | | | | | | | | | | | |
| 2 | Tower, Height m | | | | | | | | | | | | |
| 3 | Max Range, km | | | | | | | | | | | | |
| 4 | | | | | | | | | | | | | |
| 5 | Amp Power, dBw | | | | | | | | | | | | |
| 6 | Line Losses, dB | | | | | | | | | | | | |
| 7 | Peak Npt Xmrt Gain, dBi | | | | | | | | | | | | |
| 8 | Atmospheric Abs dB | | | | | | | | | | | | |
| 9 | | | | | | | | | | | | | |
| 10 | Relative Angle | 0.10 | 0.09 | 0.08 | 0.07 | 0.06 | 0.05 | 0.04 | 0.03 | 0.02 | 0.01 | 0.00 | 0.01 |
| 11 | ES Separation Dist Km | 13.50 | 13.75 | 14.00 | 14.25 | 14.50 | 14.75 | 15.00 | 15.25 | 15.50 | 15.75 | 16.00 | 16.25 |
| 12 | TT to BSS ES Az Angle degrees | | | | | | | | | | | | |
| 76 | 51 | 177.7 | 177.8 | 178.0 | 178.2 | 178.3 | 178.5 | 178.6 | 178.7 | 178.9 | 179.0 | 179.2 | 179.3 |
| 77 | 53 | 177.7 | 177.8 | 178.0 | 178.2 | 178.3 | 178.5 | 178.6 | 178.7 | 178.9 | 179.0 | 179.2 | 179.3 |
| 78 | 55 | 175.7 | 175.8 | 176.0 | 176.2 | 176.3 | 176.5 | 176.6 | 176.7 | 176.9 | 177.0 | 177.2 | 177.3 |
| 79 | 57 | 175.7 | 175.8 | 176.0 | 176.2 | 176.3 | 176.5 | 176.6 | 176.7 | 176.9 | 177.0 | 177.2 | 177.3 |
| 80 | 59 | 175.7 | 175.8 | 176.0 | 176.2 | 176.3 | 176.5 | 176.6 | 176.7 | 176.9 | 177.0 | 177.2 | 177.3 |
| 81 | 61 | 173.7 | 173.8 | 174.0 | 174.2 | 174.3 | 174.5 | 174.6 | 174.7 | 174.9 | 175.0 | 175.2 | 175.3 |
| 82 | 63 | 173.7 | 173.8 | 174.0 | 174.2 | 174.3 | 174.5 | 174.6 | 174.7 | 174.9 | 175.0 | 175.2 | 175.3 |
| 83 | 65 | 171.7 | 171.8 | 172.0 | 172.2 | 172.3 | 172.5 | 172.6 | 172.7 | 172.9 | 173.0 | 173.2 | 173.3 |

TABLE 4-continued

| | | | | | | | | | | | | | |
|---|---|---|---|---|---|---|---|---|---|---|---|---|---|
| 84 | 67 | 171.7 | 171.8 | 172.0 | 172.2 | 172.3 | 172.5 | 172.6 | 172.7 | 172.9 | 173.0 | 173.2 | 173.3 |
| 85 | 69 | 171.7 | 171.8 | 172.0 | 172.2 | 172.3 | 172.5 | 172.6 | 172.7 | 172.9 | 173.0 | 173.2 | 173.3 |
| 86 | 71 | 169.7 | 169.8 | 170.0 | 170.2 | 170.3 | 170.5 | 170.6 | 170.7 | 170.9 | 171.0 | 171.2 | 171.3 |
| 87 | 73 | 169.7 | 169.8 | 170.0 | 170.2 | 170.3 | 170.5 | 170.6 | 170.7 | 170.9 | 171.0 | 171.2 | 171.3 |
| 88 | 75 | 168.4 | 168.6 | 168.8 | 168.9 | 169.1 | 169.2 | 169.4 | 169.5 | 169.6 | 169.8 | 169.9 | 170.0 |
| 89 | 77 | 168.4 | 168.6 | 168.8 | 168.9 | 169.1 | 169.2 | 169.4 | 169.5 | 169.6 | 169.8 | 169.9 | 170.0 |
| 90 | 79 | 168.4 | 168.6 | 168.8 | 168.9 | 169.1 | 169.2 | 169.4 | 169.5 | 169.6 | 169.8 | 169.9 | 170.0 |
| 91 | 81 | 167.2 | 167.3 | 167.5 | 167.7 | 167.8 | 168.0 | 168.1 | 168.2 | 168.4 | 168.5 | 168.7 | 168.8 |
| 92 | 83 | 167.2 | 167.3 | 167.5 | 167.7 | 167.8 | 168.0 | 168.1 | 168.2 | 168.4 | 168.5 | 168.7 | 168.8 |
| 93 | 85 | 165.7 | 165.8 | 166.0 | 166.2 | 166.3 | 166.5 | 166.6 | 166.7 | 166.9 | 167.0 | 167.2 | 167.3 |
| 94 | 87 | 165.7 | 165.8 | 166.0 | 166.2 | 166.3 | 166.5 | 166.6 | 166.7 | 166.9 | 167.0 | 167.2 | 167.3 |
| 95 | 89 | 165.7 | 165.8 | 166.0 | 166.2 | 166.3 | 166.5 | 166.6 | 166.7 | 166.9 | 167.0 | 167.2 | 167.3 |
| 96 | 90 | 164.2 | 164.3 | 164.5 | 164.7 | 164.8 | 165.0 | 165.1 | 165.2 | 165.4 | 165.5 | 165.7 | 165.8 |
| 97 | 95 | 162.8 | 162.9 | 163.1 | 163.3 | 163.4 | 163.6 | 163.7 | 163.8 | 164.0 | 164.1 | 164.3 | 164.4 |
| 98 | 100 | 161.7 | 161.8 | 162.0 | 162.2 | 162.3 | 162.5 | 162.6 | 162.7 | 162.9 | 163.0 | 163.2 | 163.3 |
| 99 | 105 | 161.1 | 161.2 | 161.4 | 161.6 | 161.7 | 161.9 | 162.0 | 162.1 | 162.3 | 162.4 | 162.6 | 162.7 |
| 100 | 110 | 160.2 | 160.3 | 160.5 | 160.7 | 160.8 | 161.0 | 161.1 | 161.2 | 161.4 | 161.5 | 161.7 | 161.8 |
| 101 | 115 | 159.6 | 159.7 | 159.9 | 160.1 | 160.2 | 160.4 | 160.5 | 160.6 | 160.8 | 160.9 | 161.1 | 161.2 |
| 102 | 120 | 158.7 | 158.8 | 159.0 | 159.2 | 159.3 | 159.5 | 159.6 | 159.7 | 159.9 | 160.0 | 160.2 | 160.3 |
| 103 | 125 | 158.3 | 158.4 | 158.6 | 158.8 | 158.9 | 159.1 | 159.2 | 159.3 | 159.5 | 159.6 | 159.8 | 159.9 |
| 104 | 130 | 157.7 | 157.8 | 158.0 | 158.2 | 158.3 | 158.5 | 158.6 | 158.7 | 158.9 | 159.0 | 159.2 | 159.3 |
| 105 | 135 | 157.3 | 157.4 | 157.6 | 157.8 | 157.9 | 158.1 | 158.2 | 158.3 | 158.5 | 158.6 | 158.8 | 158.9 |
| 106 | 140 | 156.7 | 156.8 | 157.0 | 157.2 | 157.3 | 157.5 | 157.6 | 157.7 | 157.9 | 158.0 | 158.2 | 158.3 |
| 107 | 145 | 156.4 | 156.6 | 156.8 | 156.9 | 157.1 | 157.2 | 157.4 | 157.5 | 157.6 | 157.8 | 157.9 | 158.0 |
| 108 | 150 | 156.2 | 156.3 | 156.5 | 156.7 | 156.8 | 157.0 | 157.1 | 157.2 | 157.4 | 157.5 | 157.7 | 157.8 |
| 109 | 155 | 155.9 | 156.1 | 156.3 | 156.4 | 156.6 | 156.7 | 156.9 | 157.0 | 157.1 | 157.3 | 157.4 | 157.5 |
| 110 | 160 | 155.7 | 155.8 | 156.0 | 156.2 | 156.3 | 156.5 | 156.6 | 156.7 | 156.9 | 157.0 | 157.2 | 157.3 |
| 111 | 165 | 155.4 | 155.6 | 155.8 | 155.9 | 156.1 | 156.2 | 156.4 | 156.5 | 156.6 | 156.8 | 156.9 | 157.0 |
| 112 | 170 | 155.2 | 155.3 | 155.5 | 155.7 | 155.8 | 156.0 | 156.1 | 156.2 | 156.4 | 156.5 | 156.7 | 156.8 |
| 113 | 175 | 154.9 | 155.1 | 155.3 | 155.4 | 155.6 | 155.7 | 155.9 | 156.0 | 156.1 | 156.3 | 156.4 | 156.5 |

| | B | BT | BU | BV | BW | BX | BY | BZ | CA | CB | CC | CD |
|---|---|---|---|---|---|---|---|---|---|---|---|---|
| 1 | Tile Angle, degree | | | | | | | | | | | |
| 2 | Tower, Height m | | | | | | | | | | | |
| 3 | Max Range, km | | | | | | | | | | | |
| 4 | | | | | | | | | | | | |
| 5 | Amp Power, dBw | | | | | | | | | | | |
| 6 | Line Losses, dB | | | | | | | | | | | |
| 7 | Peak Npt Xmrt Gain, dBi | | | | | | | | | | | |
| 8 | Atmospheric Abs dB | | | | | | | | | | | |
| 9 | | | | | | | | | | | | |
| 10 | Relative Angle | 0.02 | 0.02 | 0.03 | 0.04 | 0.05 | 0.05 | 0.06 | 0.07 | 0.07 | 0.08 | 0.08 |
| 11 | ES Separation Dist Km | 16.50 | 16.75 | 17.00 | 17.25 | 17.50 | 17.75 | 18.00 | 18.25 | 18.50 | 18.75 | 19.00 |
| 12 | TT to BSS ES Az Angle degrees | | | | | | | | | | | |
| 76 | 51 | 179.4 | 179.6 | 179.7 | 179.8 | 179.9 | 180.1 | 180.2 | 180.3 | 180.4 | 180.5 | 180.7 |
| 77 | 53 | 179.4 | 179.6 | 179.7 | 179.8 | 179.9 | 180.1 | 180.2 | 180.3 | 180.4 | 180.5 | 180.7 |
| 78 | 55 | 177.4 | 177.6 | 177.7 | 177.8 | 177.9 | 178.1 | 178.2 | 178.3 | 178.4 | 178.5 | 178.7 |
| 79 | 57 | 177.4 | 177.6 | 177.7 | 177.8 | 177.9 | 178.1 | 178.2 | 178.3 | 178.4 | 178.5 | 178.7 |
| 80 | 59 | 177.4 | 177.6 | 177.7 | 177.8 | 177.9 | 178.1 | 178.2 | 178.3 | 178.4 | 178.5 | 178.7 |
| 81 | 61 | 175.4 | 175.6 | 175.7 | 175.8 | 175.9 | 176.1 | 176.2 | 176.3 | 176.4 | 176.5 | 176.7 |
| 82 | 63 | 175.4 | 175.6 | 175.7 | 175.8 | 175.9 | 176.1 | 176.2 | 176.3 | 176.4 | 176.5 | 176.7 |
| 83 | 65 | 173.4 | 173.6 | 173.7 | 173.8 | 173.9 | 174.1 | 174.2 | 174.3 | 174.4 | 174.5 | 174.7 |
| 84 | 67 | 173.4 | 173.6 | 173.7 | 173.8 | 173.9 | 174.1 | 174.2 | 174.3 | 174.4 | 174.5 | 174.7 |
| 85 | 69 | 173.4 | 173.6 | 173.7 | 173.8 | 173.9 | 174.1 | 174.2 | 174.3 | 174.4 | 174.5 | 174.7 |
| 86 | 71 | 171.4 | 171.6 | 171.7 | 171.8 | 171.9 | 172.1 | 172.2 | 172.3 | 172.4 | 172.5 | 172.7 |
| 87 | 73 | 171.4 | 171.6 | 171.7 | 171.8 | 171.9 | 172.1 | 172.2 | 172.3 | 172.4 | 172.5 | 172.7 |
| 88 | 75 | 170.2 | 170.3 | 170.4 | 170.6 | 170.7 | 170.8 | 170.9 | 171.1 | 171.2 | 171.3 | 171.4 |
| 89 | 77 | 170.2 | 170.3 | 170.4 | 170.6 | 170.7 | 170.8 | 170.9 | 171.1 | 171.2 | 171.3 | 171.4 |
| 90 | 79 | 170.2 | 170.3 | 170.4 | 170.6 | 170.7 | 170.8 | 170.9 | 171.1 | 171.2 | 171.3 | 171.4 |
| 91 | 81 | 168.9 | 169.1 | 169.2 | 169.3 | 169.4 | 169.6 | 169.7 | 168.8 | 168.9 | 170.0 | 170.2 |
| 92 | 83 | 168.9 | 169.1 | 169.2 | 169.3 | 169.4 | 169.6 | 169.7 | 169.8 | 169.9 | 170.0 | 170.2 |
| 93 | 85 | 167.4 | 167.6 | 167.7 | 167.8 | 167.9 | 168.1 | 168.2 | 168.3 | 168.4 | 168.5 | 168.7 |
| 94 | 87 | 167.4 | 167.6 | 167.7 | 167.8 | 167.9 | 168.1 | 168.2 | 168.3 | 168.4 | 168.5 | 168.7 |
| 95 | 89 | 167.4 | 167.6 | 167.7 | 167.8 | 167.9 | 168.1 | 168.2 | 168.3 | 168.4 | 168.5 | 168.7 |
| 96 | 90 | 165.9 | 166.1 | 166.2 | 166.3 | 166.4 | 166.6 | 166.7 | 166.8 | 166.9 | 167.0 | 167.2 |
| 97 | 95 | 164.5 | 164.7 | 164.8 | 164.9 | 165.0 | 165.2 | 165.3 | 165.4 | 165.5 | 165.6 | 165.8 |
| 98 | 100 | 163.4 | 163.6 | 163.7 | 163.8 | 163.9 | 164.1 | 164.2 | 164.3 | 164.4 | 164.5 | 164.7 |
| 99 | 105 | 162.8 | 163.0 | 163.1 | 163.2 | 163.3 | 163.5 | 163.6 | 163.7 | 163.8 | 163.9 | 164.1 |
| 100 | 110 | 161.9 | 162.1 | 162.2 | 162.3 | 162.4 | 162.6 | 162.7 | 162.8 | 162.9 | 163.0 | 163.2 |
| 101 | 115 | 161.3 | 161.5 | 161.6 | 161.7 | 161.8 | 162.0 | 162.1 | 162.2 | 162.3 | 162.4 | 162.6 |
| 102 | 120 | 160.4 | 160.6 | 160.7 | 160.8 | 160.9 | 161.1 | 161.2 | 161.3 | 161.4 | 161.5 | 161.7 |
| 103 | 125 | 160.0 | 160.2 | 160.3 | 160.4 | 160.5 | 160.7 | 160.8 | 160.9 | 161.0 | 161.1 | 161.3 |
| 104 | 130 | 159.4 | 159.6 | 159.7 | 159.8 | 159.9 | 160.1 | 160.2 | 160.3 | 160.4 | 160.5 | 160.7 |
| 105 | 135 | 159.0 | 159.2 | 159.3 | 159.4 | 159.5 | 159.7 | 159.8 | 159.9 | 160.0 | 160.1 | 160.3 |
| 106 | 140 | 158.4 | 158.6 | 158.7 | 158.8 | 158.9 | 159.1 | 159.2 | 159.3 | 159.4 | 159.5 | 159.7 |
| 107 | 145 | 158.2 | 158.3 | 158.4 | 158.6 | 158.7 | 158.8 | 158.9 | 159.1 | 159.2 | 159.3 | 159.4 |

TABLE 4-continued

| | | | | | | | | | | | | |
|---|---|---|---|---|---|---|---|---|---|---|---|---|
| 108 | 150 | 157.9 | 158.1 | 158.2 | 158.3 | 158.4 | 158.6 | 158.7 | 158.8 | 158.9 | 159.0 | 159.2 |
| 109 | 155 | 157.7 | 157.8 | 157.9 | 158.1 | 158.2 | 158.3 | 158.4 | 158.6 | 158.7 | 158.8 | 158.9 |
| 110 | 160 | 157.4 | 157.6 | 157.7 | 157.8 | 157.9 | 158.1 | 158.2 | 158.3 | 158.4 | 158.5 | 158.7 |
| 111 | 165 | 157.2 | 157.3 | 157.4 | 157.6 | 157.7 | 157.8 | 157.9 | 158.1 | 158.2 | 158.3 | 158.4 |
| 112 | 170 | 156.9 | 157.1 | 157.2 | 157.3 | 157.4 | 157.6 | 157.7 | 157.8 | 157.9 | 158.0 | 158.2 |
| 113 | 175 | 156.7 | 156.8 | 156.9 | 157.1 | 157.2 | 157.3 | 157.4 | 157.6 | 157.7 | 157.8 | 157.9 |

TABLE 5

| | O | P | Q |
|---|---|---|---|
| 123 | TT to BSS ES Az Angle degrees | BSS Ant Gain | RSSI Trigger-DBS Gain |
| 124 | 180 | 2.00 | 150.1 |
| 125 | 185 | 2.00 | 150.1 |
| 126 | 190 | 1.00 | 151.1 |
| 127 | 195 | 1.00 | 151.1 |
| 128 | 200 | 1.00 | 151.1 |
| 129 | 205 | 1.00 | 151.1 |
| 130 | 210 | 1.33 | 150.8 |
| 131 | 215 | 1.17 | 150.9 |
| 132 | 220 | 1.00 | 151.1 |
| 133 | 225 | 1.33 | 150.8 |
| 134 | 230 | 1.00 | 151.1 |
| 135 | 235 | 1.00 | 151.1 |
| 136 | 240 | 1.33 | 150.8 |
| 137 | 245 | 1.17 | 150.9 |
| 138 | 250 | 1.00 | 151.1 |
| 139 | 255 | 1.33 | 150.8 |
| 140 | 260 | 1.17 | 150.9 |
| 141 | 265 | 1.00 | 151.1 |
| 142 | 270 | 1.00 | 151.1 |
| 143 | 272 | 1.00 | 151.1 |
| 144 | 274 | 1.00 | 151.1 |
| 145 | 276 | 1.00 | 151.1 |
| 146 | 278 | 1.00 | 151.1 |
| 147 | 280 | 1.00 | 151.1 |
| 148 | 282 | 0.67 | 152.8 |
| 149 | 284 | 2.33 | 154.4 |
| 150 | 286 | 4.00 | 156.1 |
| 151 | 288 | 4.00 | 156.1 |
| 152 | 290 | 2.33 | 154.4 |
| 153 | 292 | 0.67 | 152.8 |
| 154 | 294 | 1.00 | 151.1 |
| 155 | 296 | 2.67 | 149.4 |
| 156 | 298 | 3.50 | 148.6 |
| 157 | 300 | 3.00 | 149.1 |
| 158 | 302 | 3.00 | 149.1 |
| 159 | 304 | 3.50 | 148.6 |
| 160 | 306 | 4.00 | 148.1 |
| 161 | 308 | 4.50 | 147.6 |
| 162 | 310 | 5.00 | 147.1 |
| 163 | 312 | 5.50 | 146.6 |
| 164 | 314 | 5.83 | 146.3 |
| 165 | 316 | 6.00 | 146.1 |
| 166 | 318 | 6.00 | 146.1 |
| 167 | 320 | 6.00 | 146.1 |
| 168 | 325 | 6.00 | 146.1 |
| 169 | 330 | 6.67 | 145.4 |
| 170 | 335 | 7.67 | 144.4 |
| 171 | 340 | 8.17 | 143.9 |
| 172 | 345 | 8.67 | 143.4 |
| 173 | 350 | 9.00 | 143.1 |
| 174 | 355 | 9.50 | 142.6 |
| 175 | 0 | 9.83 | 142.3 |
| 176 | 5 | 9.50 | 142.6 |
| 177 | 10 | 9.00 | 143.1 |
| 178 | 15 | 8.67 | 143.4 |
| 179 | 20 | 8.17 | 143.9 |
| 180 | 25 | 7.67 | 144.4 |
| 181 | 30 | 6.67 | 145.4 |

TABLE 5-continued

| | O | P | Q |
|---|---|---|---|
| 182 | 35 | 6.00 | 146.1 |
| 183 | 40 | 6.00 | 146.1 |
| 184 | 45 | 5.83 | 146.3 |
| 185 | 47 | 5.67 | 146.4 |
| 186 | 49 | 5.50 | 146.6 |
| 187 | 51 | 5.00 | 147.1 |
| 188 | 53 | 4.50 | 147.6 |
| 189 | 55 | 4.00 | 148.1 |
| 190 | 57 | 3.50 | 148.6 |
| 191 | 59 | 3.00 | 149.1 |
| 192 | 61 | 3.00 | 149.1 |
| 193 | 63 | 2.67 | 149.4 |
| 194 | 65 | 1.00 | 151.1 |
| 195 | 67 | 0.67 | 152.8 |
| 196 | 69 | 2.33 | 154.4 |
| 197 | 71 | 4.00 | 156.1 |
| 198 | 73 | 4.00 | 156.1 |
| 199 | 75 | 2.33 | 154.4 |
| 200 | 77 | 0.67 | 152.8 |
| 201 | 79 | 1.00 | 151.1 |
| 202 | 81 | 1.00 | 151.1 |
| 203 | 83 | 1.00 | 151.1 |
| 204 | 85 | 1.00 | 151.1 |
| 205 | 87 | 1.00 | 151.1 |
| 206 | 89 | 1.00 | 151.1 |
| 207 | 90 | 1.00 | 151.1 |
| 208 | 95 | 1.00 | 151.1 |
| 209 | 100 | 1.17 | 150.9 |
| 210 | 105 | 1.33 | 150.8 |
| 211 | 110 | 1.00 | 151.1 |
| 212 | 115 | 1.17 | 150.9 |
| 213 | 120 | 1.33 | 150.8 |
| 214 | 125 | 1.00 | 151.1 |
| 215 | 130 | 1.00 | 151.1 |
| 216 | 135 | 1.33 | 150.8 |
| 217 | 140 | 1.00 | 151.1 |
| 218 | 145 | 1.17 | 150.9 |
| 219 | 150 | 1.33 | 150.8 |
| 220 | 155 | 1.00 | 151.1 |
| 221 | 160 | 1.00 | 151.1 |
| 222 | 165 | 1.00 | 151.1 |
| 223 | 170 | 1.00 | 151.1 |
| 224 | 175 | 2.00 | 150.1 |

TABLE 6

| A | B | C | D | E | F | G | H | I | J | K | L | M | N | O |
|---|---|---|---|---|---|---|---|---|---|---|---|---|---|---|
| 1 | GHz | 12.5 | | | | | | | | | | | | |
| 2 | m | 0.02 | | | | | | | | | | | | |
| 3 | Tower Height, m | 150 | | | | | | | | | | | | |
| 4 | Max Range, km | 16 | | | | | | | | | | | | |
| 5 | | | | | | | | | | | | | | |
| 6 | Relative Angle | 71.0 | 55.8 | 36.3 | 26.0 | 20.0 | 16.2 | 11.6 | 8.0 | 6.3 | 5.2 | 4.4 | 3.8 | 3.3 |
| 7 | ES Separation Dist. K | 0.05 | 0.1 | 0.2 | 0.3 | 0.4 | 0.5 | 0.7 | 1 | 1.25 | 1.5 | 1.75 | 2 | 2.25 |
| 8 | TT to BSS ES Az Angle degrees | | | | | | | | | Path Loss | | | | |
| 9 | All Angles | 98.36 | 99.5 | 102 | 105 | 107 | 109 | 111 | 114 | 116 | 118 | 119 | 120 | 121 |

| A | B | P | Q | R | S | T | U | V | W | X | Y | Z | AA | AB | AC |
|---|---|---|---|---|---|---|---|---|---|---|---|---|---|---|---|
| 1 | GHz | 12.5 | | | | | | | | | | | | | |
| 2 | m | 0.02 | | | | | | | | | | | | | |
| 3 | Tower Height, m | 150 | | | | | | | | | | | | | |
| 4 | Max Range, km | 16 | | | | | | | | | | | | | |
| 5 | | | | | | | | | | | | | | | |
| 6 | Relative Angle | 71.0 | 2.9 | 2.6 | 2.3 | 2.1 | 1.9 | 1.8 | 1.6 | 1.5 | 1.4 | 1.3 | 1.2 | 1.1 | 1.01.0 |
| 7 | ES Separation Dist. K | 0.05 | 2.5 | 2.75 | 3 | 3.25 | 3.5 | 3.75 | 4 | 4.25 | 4.5 | 4.75 | 5 | 5.25 | 5.55.75 |
| 8 | TT to BSS ES Az Angle degrees | | | | | | | | | | | | | | |
| 9 | All Angles | 98.36 | 122 | 123 | 124 | 125 | 125 | 126 | 126 | 127 | 127 | 128 | 128 | 129 | 129 130 |

| | B | AD | AE | AF | AG | AH | AI | AJ | AK | AL | AM | AN | AO | AP | AQ |
|---|---|---|---|---|---|---|---|---|---|---|---|---|---|---|---|
| 1 | GHz | | | | | | | | | | | | | | |
| 2 | m | | | | | | | | | | | | | | |
| 3 | Tower Height, m | | | | | | | | | | | | | | |
| 4 | Max Range, km | | | | | | | | | | | | | | |
| 5 | | | | | | | | | | | | | | | |
| 6 | Relative Angle | 0.9 | 0.8 | 0.8 | 0.7 | 0.7 | 0.6 | 0.6 | 0.6 | 0.5 | 0.5 | 0.5 | 0.4 | 0.4 | 0.4 |
| 7 | ES Separation Dist. K | 6 | 6.25 | 6.5 | 6.75 | 7 | 7.25 | 7.5 | 7.75 | 8 | 8.25 | 8.5 | 8.75 | 9 | 9.25 |
| 8 | TT to BSS ES Az Angle degrees | | | | | | | | | | | | | | |
| 9 | All Angles | 130 | 130 | 131 | 131 | 131 | 132 | 132 | 132 | 132 | 133 | 133 | 133 | 133 | 134 |

| | B | AR | AS | AT | AU | AV | AW | AX | AY | AZ | BA | BB | BC | BD | BE |
|---|---|---|---|---|---|---|---|---|---|---|---|---|---|---|---|
| 1 | GHz | | | | | | | | | | | | | | |
| 2 | m | | | | | | | | | | | | | | |
| 3 | Tower Height, m | | | | | | | | | | | | | | |
| 4 | Max Range, km | | | | | | | | | | | | | | |
| 5 | | | | | | | | | | | | | | | |
| 6 | Relative Angle | 0.4 | 0.3 | 0.3 | 0.3 | 0.3 | 0.3 | 0.2 | 0.2 | 0.2 | 0.2 | 0.2 | 0.2 | 0.2 | 0.1 |
| 7 | ES Separation Dist. K | 9.5 | 9.75 | 10 | 10.25 | 10.5 | 10.75 | 11 | 11.25 | 11.5 | 11.75 | 12 | 12.25 | 12.5 | 12.75 |
| 8 | TT to BSS ES Az Angle degrees | | | | | | | | | | | | | | |
| 9 | All Angles | 134 | 134 | 134 | 135 | 135 | 135 | 135 | 135 | 136 | 136 | 136 | 136 | 136 | 136 |

| | B | BF | BG | BH | BI | BJ | BK | BL | BM | BN | BO | BP | BQ | BR | BS |
|---|---|---|---|---|---|---|---|---|---|---|---|---|---|---|---|
| 1 | GHz | | | | | | | | | | | | | | |
| 2 | m | | | | | | | | | | | | | | |
| 3 | Tower Height, m | | | | | | | | | | | | | | |
| 4 | Max Range, km | | | | | | | | | | | | | | |
| 5 | | | | | | | | | | | | | | | |
| 6 | Relative Angle | 0.1 | 0.1 | 0.1 | 0.1 | 0.1 | 0.1 | 0.1 | 0.0 | 0.0 | 0.0 | 0.0 | 0.0 | 0.0 | 0.0 |
| 7 | ES Separation Dist. K | 13 | 13.25 | 13.5 | 13.75 | 14 | 14.25 | 14.5 | 14.75 | 15 | 15.25 | 15.5 | 15.75 | 16 | 16.25 |
| 8 | TT to BSS ES Az Angle degrees | | | | | | | | | | | | | | |
| 9 | All Angles | 137 | 137 | 137 | 137 | 137 | 137 | 138 | 138 | 138 | 138 | 138 | 138 | 138 | 139 |

| | B | BT | BU | BV | BW | BX | BY | BZ | CA | CB | CC | CD |
|---|---|---|---|---|---|---|---|---|---|---|---|---|
| 1 | GHz | | | | | | | | | | | |
| 2 | m | | | | | | | | | | | |
| 3 | Tower Height, m | | | | | | | | | | | |
| 4 | Max Range, km | | | | | | | | | | | |
| 5 | | | | | | | | | | | | |
| 6 | Relative Angle | 0.0 | 0.0 | 0.0 | 0.0 | 0.0 | 0.1 | 0.1 | 0.1 | 0.1 | 0.1 | 0.1 |
| 7 | ES Separation Dist. K | 16.5 | 16.75 | 17 | 17.25 | 17.5 | 17.75 | 18 | 18.25 | 18.5 | 18.75 | 19 |
| 8 | TT to BSS ES Az Angle degrees | | | | | | | | | | | |
| 9 | All Angles | 139 | 139 | 139 | 139 | 139 | 139 | 139 | 140 | 140 | 140 | 140 |

TABLE 7

| A | B | C | D | E | F | G | H | I | J | K | L | M | N |
|---|---|---|---|---|---|---|---|---|---|---|---|---|---|
| 1 | Tile Angle degrees | 0 | | | | | | | | | | | |
| 2 | Tower Height m | 150 | | | | | | | | | | | |
| 3 | Max Range km | 16 | | | | | | | | | | | |
| 4 | | | | | | | | | | | | | |
| 5 | Amp Power dBw | | 25 | | | | NOW LINKED TO NOTES SPREADSHEET | | | | | | |
| 6 | Line Losses dB | | 2.5 | | | | | | | | | | |
| 7 | Peak Npt Xmit Gain, dBi | | 10 | | | | | | | | | | |
| 8 | Atmospheric Abs dB | | 0.2 | | | | | | | | | | |
| 9 | | | | | | | | | | | | | |
| 10 | Relative Angle | 71.03 | 55.77 | 36.33 | 26.03 | 20.02 | 16.16 | 11.56 | 7.99 | 6.31 | 5.17 | 4.36 | 3.75 |
| 11 | ES Separation Dist, Km | 0.05 | 0.10 | 0.20 | 0.30 | 0.40 | 0.50 | 0.70 | 1.00 | 1.25 | 1.50 | 1.75 | 2.00 |
| 12 | TT to BSS ES Az Angle degrees | | | | | | | Calculated RSSI | | | | | |
| 13 | 180 | 187.1 | 188.2 | 185.0 | 186.6 | 180.1 | 177.5 | 176.3 | 177.2 | 178.3 | 179.5 | 180.6 | 181.6 |
| 14 | 185 | 185.1 | 186.2 | 183.0 | 184.6 | 178.1 | 175.5 | 174.3 | 175.2 | 176.3 | 177.5 | 178.6 | 179.6 |
| 15 | 190 | 183.1 | 184.2 | 181.0 | 182.6 | 176.1 | 173.5 | 172.3 | 173.2 | 174.3 | 175.5 | 176.6 | 177.6 |
| 16 | 195 | 181.1 | 182.2 | 179.0 | 180.6 | 174.1 | 171.5 | 170.3 | 171.2 | 172.3 | 173.5 | 174.6 | 175.6 |
| 17 | 200 | 179.1 | 180.2 | 177.0 | 178.6 | 172.1 | 169.5 | 168.3 | 169.2 | 170.3 | 171.5 | 172.6 | 173.6 |
| 18 | 205 | 177.1 | 178.2 | 175.0 | 176.6 | 170.1 | 167.5 | 166.3 | 167.2 | 168.3 | 169.5 | 170.6 | 171.6 |
| 19 | 210 | 175.1 | 176.2 | 173.0 | 174.6 | 168.1 | 165.5 | 164.3 | 165.2 | 166.3 | 167.5 | 168.6 | 169.6 |
| 20 | 215 | 173.1 | 174.2 | 171.0 | 172.6 | 166.1 | 163.5 | 162.3 | 163.2 | 164.3 | 165.5 | 166.6 | 167.6 |
| 21 | 220 | 171.1 | 172.2 | 169.0 | 170.6 | 164.1 | 161.5 | 160.3 | 161.2 | 162.3 | 163.5 | 164.6 | 165.6 |
| 22 | 225 | 169.1 | 170.2 | 167.0 | 168.6 | 162.1 | 159.5 | 158.3 | 159.2 | 160.3 | 161.5 | 162.6 | 163.6 |
| 23 | 230 | 167.1 | 168.2 | 165.0 | 166.6 | 160.1 | 157.5 | 156.3 | 157.2 | 158.3 | 159.5 | 160.6 | 161.6 |
| 24 | 235 | 165.1 | 166.2 | 163.0 | 164.6 | 158.1 | 155.5 | 154.3 | 155.2 | 156.3 | 157.5 | 158.6 | 159.6 |
| 25 | 240 | 163.1 | 164.2 | 161.0 | 162.6 | 156.1 | 153.5 | 152.3 | 153.2 | 154.3 | 155.5 | 156.6 | 157.6 |
| 26 | 245 | 161.1 | 162.2 | 159.0 | 160.6 | 154.1 | 151.5 | 150.3 | 151.2 | 152.3 | 153.5 | 154.6 | 155.6 |
| 27 | 250 | 159.1 | 160.2 | 157.0 | 158.6 | 152.1 | 149.5 | 148.3 | 149.2 | 150.3 | 151.5 | 152.6 | 153.6 |
| 28 | 255 | 157.8 | 158.9 | 155.7 | 157.3 | 150.9 | 148.3 | 147.1 | 147.9 | 149.1 | 150.2 | 151.3 | 152.3 |
| 29 | 260 | 156.6 | 157.7 | 154.5 | 156.1 | 149.6 | 147.0 | 145.8 | 146.7 | 147.8 | 149.0 | 150.1 | 151.1 |
| 30 | 265 | 155.1 | 156.2 | 153.0 | 154.6 | 148.1 | 145.5 | 144.3 | 145.2 | 146.3 | 147.5 | 148.6 | 149.6 |
| 31 | 270 | 153.6 | 154.7 | 151.5 | 153.1 | 146.6 | 144.0 | 142.8 | 143.7 | 144.8 | 146.0 | 147.1 | 148.1 |
| 32 | 272 | 153.1 | 154.2 | 151.0 | 152.6 | 146.1 | 143.5 | 142.3 | 143.2 | 144.3 | 145.5 | 146.6 | 147.6 |
| 33 | 274 | 152.2 | 153.3 | 150.1 | 151.7 | 145.2 | 142.6 | 141.4 | 142.3 | 143.4 | 144.6 | 145.7 | 146.7 |
| 34 | 276 | 152.6 | 153.7 | 150.5 | 152.1 | 145.6 | 143.0 | 141.8 | 142.7 | 143.8 | 145.0 | 146.1 | 147.1 |
| 35 | 278 | 151.6 | 152.7 | 149.5 | 151.1 | 144.6 | 142.0 | 140.8 | 141.7 | 142.8 | 144.0 | 145.1 | 146.1 |
| 36 | 280 | 151.1 | 152.2 | 149.0 | 150.6 | 144.1 | 141.5 | 140.3 | 141.2 | 142.3 | 143.5 | 144.6 | 145.6 |
| 37 | 282 | 150.8 | 151.9 | 148.7 | 150.3 | 143.8 | 141.2 | 140.0 | 140.9 | 142.0 | 143.2 | 144.3 | 145.3 |
| 38 | 284 | 150.5 | 151.6 | 148.4 | 150.0 | 143.5 | 140.9 | 139.7 | 140.6 | 141.7 | 142.9 | 144.0 | 145.0 |
| 39 | 286 | 150.2 | 151.3 | 148.1 | 149.7 | 143.2 | 140.6 | 139.4 | 140.3 | 141.4 | 142.6 | 143.7 | 144.7 |
| 40 | 288 | 149.8 | 150.9 | 147.7 | 149.3 | 142.8 | 140.2 | 139.0 | 139.9 | 141.0 | 142.2 | 143.3 | 144.3 |
| 41 | 290 | 149.5 | 150.7 | 147.5 | 149.1 | 142.6 | 140.0 | 138.8 | 139.7 | 140.8 | 142.0 | 143.1 | 144.1 |
| 42 | 292 | 149.3 | 150.4 | 147.2 | 148.8 | 142.3 | 139.7 | 138.5 | 139.4 | 140.5 | 141.7 | 142.8 | 143.8 |
| 43 | 294 | 149.0 | 150.1 | 146.9 | 148.5 | 142.0 | 139.4 | 138.2 | 139.1 | 140.2 | 141.4 | 142.5 | 143.5 |
| 44 | 296 | 148.7 | 149.8 | 146.6 | 148.2 | 141.7 | 139.1 | 137.9 | 138.8 | 139.9 | 141.1 | 142.2 | 143.2 |
| 45 | 298 | 149.4 | 149.5 | 146.3 | 147.9 | 141.4 | 138.8 | 137.6 | 138.5 | 139.6 | 140.8 | 141.9 | 142.9 |
| 46 | 300 | 148.1 | 149.2 | 146.0 | 147.6 | 141.1 | 138.5 | 137.3 | 138.2 | 139.3 | 140.5 | 141.6 | 142.6 |
| 47 | 302 | 147.9 | 149.0 | 145.8 | 147.4 | 140.9 | 138.3 | 137.1 | 138.0 | 139.1 | 140.3 | 141.4 | 142.4 |
| 48 | 304 | 147.7 | 148.8 | 145.6 | 147.2 | 140.7 | 138.1 | 136.9 | 137.8 | 138.9 | 140.1 | 141.2 | 142.2 |
| 49 | 306 | 147.5 | 148.6 | 145.4 | 147.0 | 140.5 | 137.9 | 136.7 | 137.6 | 138.7 | 139.9 | 141.0 | 142.0 |
| 50 | 308 | 147.3 | 148.4 | 145.2 | 146.8 | 140.3 | 137.7 | 136.5 | 137.4 | 138.5 | 139.7 | 140.8 | 141.8 |
| 51 | 310 | 147.1 | 148.2 | 145.0 | 146.6 | 140.1 | 137.5 | 136.3 | 137.2 | 138.3 | 139.5 | 140.6 | 141.6 |
| 52 | 312 | 146.9 | 148.0 | 144.8 | 146.4 | 139.9 | 137.3 | 136.1 | 137.0 | 138.1 | 139.3 | 140.4 | 141.4 |
| 53 | 314 | 146.7 | 147.8 | 144.6 | 146.2 | 139.7 | 137.1 | 135.9 | 136.8 | 137.9 | 139.1 | 140.2 | 141.2 |
| 54 | 316 | 146.5 | 147.6 | 144.4 | 146.0 | 139.5 | 136.9 | 135.7 | 136.6 | 137.7 | 138.9 | 140.0 | 141.0 |
| 55 | 318 | 146.3 | 147.4 | 144.2 | 145.8 | 139.3 | 136.7 | 135.5 | 136.4 | 137.5 | 138.7 | 139.8 | 140.8 |
| 56 | 320 | 146.1 | 147.2 | 144.0 | 145.6 | 139.1 | 136.5 | 135.3 | 136.2 | 137.3 | 138.5 | 139.6 | 140.6 |
| 57 | 325 | 145.8 | 146.9 | 143.7 | 145.3 | 138.9 | 136.3 | 135.1 | 135.9 | 137.1 | 138.2 | 139.3 | 140.3 |
| 58 | 330 | 145.6 | 146.7 | 143.5 | 145.1 | 138.6 | 136.0 | 134.8 | 135.7 | 136.8 | 138.0 | 139.1 | 140.1 |
| 59 | 335 | 145.3 | 146.4 | 143.2 | 144.8 | 138.4 | 135.8 | 134.6 | 135.4 | 136.6 | 137.7 | 138.8 | 139.8 |
| 60 | 340 | 145.1 | 146.2 | 143.0 | 144.6 | 138.1 | 135.5 | 134.3 | 135.2 | 136.3 | 137.5 | 138.6 | 139.6 |
| 61 | 345 | 144.8 | 145.9 | 142.7 | 144.3 | 137.9 | 135.3 | 134.1 | 134.9 | 136.1 | 137.2 | 138.3 | 139.3 |
| 62 | 350 | 144.6 | 145.7 | 142.5 | 144.1 | 137.6 | 135.0 | 133.8 | 134.7 | 135.8 | 137.0 | 138.1 | 139.1 |
| 63 | 355 | 144.3 | 145.4 | 142.2 | 143.8 | 137.4 | 134.8 | 133.6 | 134.4 | 135.6 | 136.7 | 137.8 | 138.8 |
| 64 | 0 | 144.1 | 145.2 | 142.0 | 143.6 | 137.1 | 134.5 | 133.3 | 134.2 | 135.3 | 136.5 | 137.6 | 138.6 |
| 65 | 5 | 144.3 | 145.4 | 142.2 | 143.8 | 137.4 | 134.8 | 133.6 | 134.4 | 135.6 | 136.7 | 137.8 | 138.8 |
| 66 | 10 | 144.6 | 145.7 | 142.5 | 144.1 | 137.6 | 135.0 | 133.8 | 134.7 | 135.8 | 137.0 | 138.1 | 139.1 |
| 67 | 15 | 144.8 | 145.9 | 142.7 | 144.3 | 137.9 | 135.3 | 134.1 | 134.9 | 136.1 | 137.2 | 138.3 | 139.3 |
| 68 | 20 | 145.1 | 146.2 | 143.0 | 144.6 | 138.1 | 135.5 | 134.3 | 135.2 | 136.3 | 137.5 | 138.6 | 139.6 |
| 69 | 25 | 145.3 | 146.4 | 143.2 | 144.8 | 138.4 | 135.8 | 134.6 | 135.4 | 136.6 | 137.7 | 138.8 | 139.8 |
| 70 | 30 | 145.6 | 146.7 | 143.5 | 145.1 | 138.6 | 136.0 | 134.8 | 135.7 | 136.8 | 138.0 | 139.1 | 140.1 |
| 71 | 35 | 145.8 | 146.9 | 143.7 | 145.3 | 138.9 | 136.3 | 135.1 | 135.9 | 137.1 | 138.2 | 139.3 | 140.3 |
| 72 | 40 | 146.1 | 147.2 | 144.0 | 145.6 | 139.1 | 136.5 | 135.3 | 136.2 | 137.3 | 138.5 | 139.6 | 140.6 |
| 73 | 45 | 146.6 | 147.7 | 144.5 | 146.1 | 139.6 | 137.0 | 135.8 | 136.7 | 137.8 | 139.0 | 140.1 | 141.1 |
| 74 | 47 | 146.8 | 147.9 | 144.7 | 146.3 | 139.9 | 137.3 | 136.1 | 136.9 | 138.1 | 139.2 | 140.3 | 141.3 |
| 75 | 49 | 147.0 | 148.1 | 144.9 | 146.5 | 140.0 | 137.4 | 136.2 | 137.1 | 138.2 | 139.4 | 140.5 | 141.5 |

TABLE 7-continued

| A | B | O | P | Q | R | S | T | U | V | W | X |
|---|---|---|---|---|---|---|---|---|---|---|---|
| 1 | Tile Angle degrees | | | | | | | | | | |
| 2 | Tower Height m | | | | | | | | | | |
| 3 | Max Range km | | | | | | | | | | |
| 4 | | | | | | | | | | | |
| 5 | Amp Power dBw | | | | | | | | | | |
| 6 | Line Losses dB | | | | | | | | | | |
| 7 | Peak Npt Xmit Gain, dBi | | | | | | | | | | |
| 8 | Atmospheric Abs dB | | | | | | | | | | |
| 9 | | | | | | | | | | | |
| 10 | Relative Angle | 3.28 | 2.90 | 2.58 | 2.33 | 2.11 | 1.92 | 1.75 | 1.61 | 1.48 | 1.37 |
| 11 | ES Separation Dist, Km | 2.25 | 2.50 | 2.75 | 3.00 | 3.25 | 3.50 | 3.75 | 4.00 | 4.25 | 4.50 |
| 12 | TT to BSS ES Az Angle degrees | | | | | | | | | | |
| 13 | 180 | 182.5 | 183.3 | 184.1 | 184.8 | 185.5 | 186.1 | 186.7 | 187.2 | 187.7 | 188.2 |
| 14 | 185 | 180.5 | 181.3 | 182.1 | 182.8 | 183.5 | 184.1 | 184.7 | 185.2 | 185.7 | 186.2 |
| 15 | 190 | 178.5 | 179.3 | 180.1 | 180.8 | 181.5 | 182.1 | 182.7 | 183.2 | 183.7 | 184.2 |
| 16 | 195 | 176.5 | 177.3 | 178.1 | 178.8 | 179.5 | 180.1 | 180.7 | 181.2 | 181.7 | 182.2 |
| 17 | 200 | 174.5 | 175.3 | 176.1 | 176.8 | 177.5 | 178.1 | 178.7 | 179.2 | 179.7 | 180.2 |
| 18 | 205 | 172.5 | 173.3 | 174.1 | 174.8 | 175.5 | 176.1 | 176.7 | 177.2 | 177.7 | 178.2 |
| 19 | 210 | 170.5 | 171.3 | 172.1 | 172.8 | 173.5 | 174.1 | 174.7 | 175.2 | 175.7 | 176.2 |
| 20 | 215 | 168.5 | 169.3 | 170.1 | 170.8 | 171.5 | 172.1 | 172.7 | 173.2 | 173.7 | 174.2 |
| 21 | 220 | 166.5 | 167.3 | 168.1 | 168.8 | 169.5 | 170.1 | 170.7 | 171.2 | 171.7 | 172.2 |
| 22 | 225 | 164.5 | 165.3 | 166.1 | 166.8 | 167.5 | 168.1 | 168.7 | 169.2 | 169.7 | 170.2 |
| 23 | 230 | 162.5 | 163.3 | 164.1 | 164.8 | 165.5 | 166.1 | 166.7 | 167.2 | 167.7 | 168.2 |
| 24 | 235 | 160.5 | 161.3 | 162.1 | 162.8 | 163.5 | 164.1 | 164.7 | 165.2 | 165.7 | 166.2 |
| 25 | 240 | 158.5 | 159.3 | 160.1 | 160.8 | 161.5 | 162.1 | 162.7 | 163.2 | 163.7 | 164.2 |
| 26 | 245 | 156.5 | 157.3 | 158.1 | 158.8 | 159.5 | 160.1 | 160.7 | 161.2 | 161.7 | 162.2 |
| 27 | 250 | 154.5 | 155.3 | 156.1 | 156.8 | 157.5 | 158.1 | 158.7 | 159.2 | 159.7 | 160.2 |
| 28 | 255 | 153.2 | 154.1 | 154.8 | 155.6 | 156.2 | 156.8 | 157.4 | 158.0 | 158.5 | 159.0 |
| 29 | 260 | 152.0 | 152.8 | 153.6 | 154.3 | 155.0 | 155.6 | 156.2 | 156.7 | 157.2 | 157.7 |
| 30 | 265 | 150.5 | 151.3 | 152.1 | 152.8 | 153.5 | 154.1 | 154.7 | 155.2 | 155.7 | 156.2 |
| 31 | 270 | 149.0 | 149.8 | 150.6 | 151.3 | 152.0 | 152.6 | 153.2 | 153.7 | 154.2 | 154.7 |
| 32 | 272 | 148.5 | 149.3 | 150.1 | 150.8 | 151.5 | 152.1 | 152.7 | 153.2 | 153.7 | 154.2 |
| 33 | 274 | 147.6 | 148.4 | 149.2 | 149.9 | 150.6 | 151.2 | 151.8 | 152.3 | 152.8 | 153.3 |
| 34 | 276 | 148.0 | 148.8 | 149.6 | 150.3 | 151.0 | 151.6 | 152.2 | 152.7 | 153.2 | 153.7 |
| 35 | 278 | 147.0 | 147.8 | 148.6 | 149.3 | 150.0 | 150.6 | 151.2 | 151.7 | 152.2 | 152.7 |
| 36 | 280 | 146.5 | 147.3 | 148.1 | 148.8 | 149.5 | 150.1 | 150.7 | 151.2 | 151.7 | 152.2 |
| 37 | 282 | 146.2 | 147.0 | 147.8 | 148.5 | 149.2 | 149.8 | 150.4 | 150.9 | 151.4 | 151.9 |
| 38 | 284 | 145.9 | 146.7 | 147.5 | 148.2 | 148.9 | 149.5 | 150.1 | 150.6 | 151.1 | 151.6 |
| 39 | 286 | 145.6 | 146.4 | 147.2 | 147.9 | 158.6 | 150.2 | 149.8 | 150.3 | 150.8 | 151.3 |
| 40 | 288 | 145.2 | 146.0 | 146.8 | 147.5 | 148.2 | 148.8 | 149.4 | 149.9 | 150.4 | 150.9 |
| 41 | 290 | 145.0 | 145.8 | 146.6 | 147.3 | 148.0 | 148.6 | 149.2 | 149.7 | 150.2 | 150.7 |
| 42 | 292 | 144.7 | 145.5 | 146.3 | 147.0 | 147.7 | 148.3 | 148.9 | 149.4 | 149.9 | 150.4 |
| 43 | 294 | 144.4 | 145.2 | 146.0 | 146.7 | 147.4 | 148.0 | 148.6 | 149.1 | 149.6 | 150.1 |
| 44 | 296 | 144.1 | 144.9 | 145.7 | 146.4 | 147.1 | 147.7 | 148.3 | 148.8 | 149.3 | 149.8 |
| 45 | 298 | 143.8 | 144.6 | 145.4 | 146.1 | 146.8 | 147.4 | 148.0 | 148.5 | 149.0 | 149.5 |
| 46 | 300 | 143.5 | 144.3 | 145.1 | 145.8 | 146.5 | 147.1 | 147.7 | 148.2 | 148.7 | 149.2 |
| 47 | 302 | 143.3 | 144.1 | 144.9 | 145.6 | 146.3 | 146.9 | 147.5 | 148.0 | 148.5 | 149.0 |
| 48 | 304 | 143.1 | 143.9 | 144.7 | 145.4 | 146.1 | 146.7 | 147.3 | 147.8 | 148.3 | 148.8 |
| 49 | 306 | 142.9 | 143.7 | 144.5 | 145.2 | 145.9 | 146.5 | 147.1 | 147.6 | 148.1 | 148.6 |
| 50 | 308 | 142.7 | 143.5 | 144.3 | 145.0 | 145.7 | 146.3 | 146.9 | 147.4 | 147.9 | 148.4 |
| 51 | 310 | 142.5 | 143.3 | 144.1 | 144.8 | 145.5 | 146.1 | 146.7 | 147.2 | 147.7 | 148.2 |
| 52 | 312 | 142.3 | 143.1 | 143.9 | 144.6 | 145.3 | 145.9 | 146.5 | 147.0 | 147.5 | 148.0 |
| 53 | 314 | 142.1 | 142.9 | 143.7 | 144.4 | 145.1 | 145.7 | 146.3 | 146.8 | 147.3 | 147.8 |
| 54 | 316 | 141.9 | 142.7 | 143.5 | 144.2 | 144.9 | 145.5 | 146.1 | 146.6 | 147.1 | 147.6 |
| 55 | 318 | 141.7 | 142.5 | 143.3 | 144.0 | 144.7 | 145.3 | 145.9 | 146.4 | 146.9 | 147.4 |
| 56 | 320 | 141.5 | 142.3 | 143.1 | 143.8 | 144.5 | 145.1 | 145.7 | 146.2 | 146.7 | 147.2 |
| 57 | 325 | 141.2 | 142.1 | 142.8 | 143.6 | 144.2 | 144.8 | 145.4 | 146.0 | 146.5 | 147.0 |
| 58 | 330 | 141.0 | 141.8 | 142.6 | 143.3 | 144.0 | 144.6 | 145.2 | 145.7 | 146.2 | 146.7 |
| 59 | 335 | 140.7 | 141.6 | 142.3 | 143.1 | 143.7 | 144.3 | 144.9 | 145.5 | 146.0 | 146.5 |
| 60 | 340 | 140.5 | 141.3 | 142.1 | 142.8 | 143.5 | 144.1 | 144.7 | 145.2 | 145.7 | 146.2 |
| 61 | 345 | 140.2 | 141.1 | 141.8 | 142.6 | 143.2 | 143.8 | 144.4 | 145.0 | 145.5 | 146.0 |
| 62 | 350 | 140.0 | 140.8 | 141.6 | 142.3 | 143.0 | 143.6 | 144.2 | 144.7 | 145.2 | 145.7 |
| 63 | 355 | 139.7 | 140.6 | 141.3 | 142.1 | 142.7 | 143.3 | 143.9 | 144.5 | 145.0 | 145.5 |
| 64 | 0 | 139.5 | 140.3 | 141.1 | 141.8 | 142.5 | 143.1 | 143.7 | 144.2 | 144.7 | 145.2 |
| 65 | 5 | 139.7 | 140.6 | 141.3 | 142.1 | 142.7 | 143.3 | 143.9 | 144.5 | 145.0 | 145.5 |
| 66 | 10 | 140.0 | 140.8 | 141.6 | 142.3 | 143.0 | 143.6 | 144.2 | 144.7 | 145.2 | 145.7 |
| 67 | 15 | 140.2 | 141.1 | 141.8 | 142.6 | 143.2 | 143.8 | 144.4 | 145.0 | 145.5 | 146.0 |
| 68 | 20 | 140.5 | 141.3 | 142.1 | 142.8 | 143.5 | 144.1 | 144.7 | 145.2 | 145.7 | 146.2 |
| 69 | 25 | 140.7 | 141.6 | 142.3 | 143.1 | 143.7 | 144.3 | 144.9 | 145.5 | 146.0 | 146.5 |
| 70 | 30 | 141.0 | 141.8 | 142.6 | 143.3 | 144.0 | 144.6 | 145.2 | 145.7 | 146.2 | 146.7 |
| 71 | 35 | 141.2 | 142.1 | 142.8 | 143.6 | 144.2 | 144.8 | 145.4 | 146.0 | 146.5 | 147.0 |
| 72 | 40 | 141.5 | 142.3 | 143.1 | 143.8 | 144.5 | 145.1 | 145.7 | 146.2 | 146.7 | 147.2 |
| 73 | 45 | 142.0 | 142.8 | 143.6 | 144.3 | 145.0 | 145.6 | 146.2 | 146.7 | 147.2 | 147.7 |
| 74 | 47 | 142.2 | 143.0 | 143.8 | 144.5 | 145.2 | 145.8 | 146.4 | 146.9 | 147.4 | 147.9 |
| 75 | 49 | 142.4 | 143.2 | 144.0 | 144.7 | 145.4 | 146.0 | 146.6 | 147.1 | 147.6 | 148.1 |

TABLE 7-continued

| A | B | Y | Z | AA | AB | AC | AD | AE |
|---|---|---|---|---|---|---|---|---|
| 1 | Tile Angle degrees | | | | | | | |
| 2 | Tower Height m | | | | | | | |
| 3 | Max Range km | | | | | | | |
| 4 | | | | | | | | |
| 5 | Amp Power dBw | | | | | | | |
| 6 | Line Losses dB | | | | | | | |
| 7 | Peak Npt Xmit Gain, dBi | | | | | | | |
| 8 | Atmospheric Abs dB | | | | | | | |
| 9 | | | | | | | | |
| 10 | Relative Angle | 1.27 | 1.18 | 1.10 | 1.03 | 0.96 | 0.89 | 0.84 |
| 11 | ES Separation Dist, Km | 4.75 | 5.00 | 5.25 | 5.50 | 5.75 | 6.00 | 6.25 |
| 12 | TT to BSS ES Az Angle degrees | | | | | | | |
| 13 | 180 | 188.7 | 189.1 | 189.5 | 189.9 | 190.3 | 190.7 | 191.0 |
| 14 | 185 | 186.7 | 187.1 | 187.5 | 187.9 | 188.3 | 188.7 | 189.0 |
| 15 | 190 | 184.7 | 185.1 | 185.5 | 185.9 | 186.3 | 186.7 | 187.0 |
| 16 | 195 | 182.7 | 183.1 | 183.5 | 183.9 | 184.3 | 184.7 | 185.0 |
| 17 | 200 | 180.7 | 181.1 | 181.5 | 181.9 | 182.3 | 182.7 | 183.0 |
| 18 | 205 | 178.7 | 179.1 | 179.5 | 179.9 | 180.3 | 180.7 | 181.0 |
| 19 | 210 | 176.7 | 177.1 | 177.5 | 177.9 | 178.3 | 178.7 | 179.0 |
| 20 | 215 | 174.7 | 175.1 | 175.5 | 175.9 | 176.3 | 176.7 | 177.0 |
| 21 | 220 | 172.7 | 173.1 | 173.5 | 173.9 | 174.3 | 174.7 | 175.0 |
| 22 | 225 | 170.7 | 171.1 | 171.5 | 171.9 | 172.3 | 172.7 | 173.0 |
| 23 | 230 | 168.7 | 169.1 | 169.5 | 169.9 | 170.3 | 170.7 | 171.0 |
| 24 | 235 | 166.7 | 167.1 | 167.5 | 167.9 | 168.3 | 168.7 | 169.0 |
| 25 | 240 | 164.7 | 165.1 | 165.5 | 165.9 | 166.3 | 166.7 | 167.0 |
| 26 | 245 | 162.7 | 163.1 | 163.5 | 163.9 | 164.3 | 164.7 | 165.0 |
| 27 | 250 | 160.7 | 161.1 | 161.5 | 161.9 | 162.3 | 162.7 | 163.0 |
| 28 | 255 | 159.4 | 159.9 | 160.3 | 160.7 | 161.1 | 161.4 | 161.8 |
| 29 | 260 | 158.2 | 158.6 | 159.0 | 159.4 | 159.8 | 160.2 | 160.5 |
| 30 | 265 | 156.7 | 157.1 | 157.5 | 157.9 | 158.3 | 158.7 | 159.0 |
| 31 | 270 | 155.2 | 155.6 | 156.0 | 156.4 | 156.8 | 157.2 | 157.5 |
| 32 | 272 | 154.7 | 155.1 | 155.5 | 155.9 | 156.3 | 156.7 | 157.0 |
| 33 | 274 | 153.8 | 154.2 | 154.6 | 155.0 | 155.4 | 155.8 | 156.1 |
| 34 | 276 | 154.2 | 154.6 | 155.0 | 155.4 | 155.8 | 156.2 | 156.5 |
| 35 | 278 | 153.2 | 153.6 | 154.0 | 154.4 | 154.8 | 155.2 | 155.5 |
| 36 | 280 | 152.7 | 153.1 | 153.5 | 153.9 | 154.3 | 154.7 | 155.0 |
| 37 | 282 | 152.4 | 152.8 | 153.2 | 153.6 | 154.0 | 154.4 | 154.7 |
| 38 | 284 | 152.1 | 152.5 | 152.9 | 153.3 | 153.7 | 154.1 | 154.4 |
| 39 | 286 | 151.8 | 152.2 | 152.6 | 153.0 | 153.4 | 153.8 | 154.1 |
| 40 | 288 | 151.4 | 151.8 | 152.2 | 152.6 | 153.0 | 153.4 | 153.7 |
| 41 | 290 | 151.2 | 151.6 | 152.0 | 152.4 | 152.8 | 153.2 | 153.5 |
| 42 | 292 | 150.9 | 151.3 | 151.7 | 152.1 | 152.5 | 152.9 | 153.2 |
| 43 | 294 | 150.6 | 151.0 | 151.4 | 151.8 | 152.2 | 152.6 | 152.9 |
| 44 | 296 | 150.3 | 150.7 | 151.1 | 151.5 | 151.9 | 152.3 | 152.6 |
| 45 | 298 | 150.0 | 150.4 | 150.8 | 151.2 | 151.6 | 152.0 | 152.3 |
| 46 | 300 | 149.7 | 150.1 | 150.5 | 150.9 | 151.3 | 151.7 | 152.0 |
| 47 | 302 | 149.5 | 149.9 | 150.3 | 150.7 | 151.1 | 151.5 | 151.8 |
| 48 | 304 | 149.3 | 149.7 | 150.1 | 150.5 | 150.9 | 151.3 | 151.6 |
| 49 | 306 | 149.1 | 149.5 | 149.9 | 150.3 | 150.7 | 151.1 | 151.4 |
| 50 | 308 | 148.9 | 149.3 | 149.7 | 150.1 | 150.5 | 150.9 | 151.2 |
| 51 | 310 | 148.7 | 149.1 | 149.5 | 149.9 | 150.3 | 150.7 | 151.0 |
| 52 | 312 | 148.5 | 148.9 | 149.3 | 149.7 | 150.1 | 150.5 | 150.8 |
| 53 | 314 | 148.3 | 148.7 | 149.1 | 149.5 | 149.9 | 150.3 | 150.6 |
| 54 | 316 | 148.1 | 148.5 | 148.9 | 149.3 | 149.7 | 150.1 | 150.4 |
| 55 | 318 | 147.9 | 148.3 | 148.7 | 149.1 | 149.5 | 149.9 | 150.2 |
| 56 | 320 | 147.7 | 148.1 | 148.5 | 148.9 | 149.3 | 149.7 | 150.0 |
| 57 | 325 | 147.4 | 147.9 | 148.3 | 148.7 | 149.1 | 149.4 | 149.8 |
| 58 | 330 | 147.2 | 147.6 | 148.0 | 148.4 | 148.8 | 149.2 | 149.5 |
| 59 | 335 | 146.9 | 147.4 | 147.8 | 148.2 | 148.6 | 148.9 | 149.3 |
| 60 | 340 | 146.7 | 147.1 | 147.5 | 147.9 | 148.3 | 148.7 | 149.0 |
| 61 | 345 | 146.4 | 146.9 | 147.3 | 147.7 | 148.1 | 148.4 | 148.8 |
| 62 | 350 | 146.2 | 146.6 | 147.0 | 147.4 | 147.8 | 148.2 | 148.5 |
| 63 | 355 | 145.9 | 146.4 | 146.8 | 147.2 | 147.6 | 147.9 | 148.3 |
| 64 | 0 | 145.7 | 146.1 | 146.5 | 146.9 | 147.3 | 147.7 | 148.0 |
| 65 | 5 | 145.9 | 146.4 | 146.8 | 147.2 | 147.6 | 147.9 | 148.3 |
| 66 | 10 | 146.2 | 146.6 | 147.0 | 147.4 | 147.8 | 148.2 | 148.5 |
| 67 | 15 | 146.4 | 146.9 | 147.3 | 147.7 | 148.1 | 148.4 | 148.8 |
| 68 | 20 | 146.7 | 147.1 | 147.5 | 147.9 | 148.3 | 148.7 | 149.0 |
| 69 | 25 | 146.9 | 147.4 | 147.8 | 148.2 | 148.6 | 148.9 | 149.3 |
| 70 | 30 | 147.2 | 147.6 | 148.0 | 148.4 | 148.8 | 149.2 | 149.5 |
| 71 | 35 | 147.4 | 147.9 | 148.3 | 148.7 | 149.1 | 149.4 | 149.8 |
| 72 | 40 | 147.7 | 148.1 | 148.5 | 148.9 | 149.3 | 149.7 | 150.0 |
| 73 | 45 | 148.2 | 148.6 | 149.0 | 149.4 | 149.8 | 150.2 | 150.5 |
| 74 | 47 | 148.4 | 148.8 | 149.2 | 149.6 | 150.0 | 150.4 | 150.7 |
| 75 | 49 | 148.6 | 149.0 | 149.4 | 149.8 | 150.2 | 150.6 | 150.9 |

TABLE 7-continued

| | B | AF | AG | AH | AI | AJ | AK | AL | AM | AN | AO | AP | AQ |
|---|---|---|---|---|---|---|---|---|---|---|---|---|---|
| 1 | Tile Angle degrees | | | | | | | | | | | | |
| 2 | Tower Height m | | | | | | | | | | | | |
| 3 | Max Range km | | | | | | | | | | | | |
| 4 | | | | | | | | | | | | | |
| 5 | Amp Power dBw | | | | | | | | | | | | |
| 6 | Line Losses dB | | | | | | | | | | | | |
| 7 | Peak Npt Xmit Gain, dBi | | | | | | | | | | | | |
| 8 | Atmospheric Abs dB | | | | | | | | | | | | |
| 9 | | | | | | | | | | | | | |
| 10 | Relative Angle | 0.78 | 0.74 | 0.69 | 0.65 | 0.61 | 0.57 | 0.54 | 0.50 | 0.47 | 0.44 | 0.42 | 0.39 |
| 11 | ES Separation Dist, Km | 6.50 | 6.75 | 7.00 | 7.25 | 7.50 | 7.75 | 8.00 | 8.25 | 8.50 | 8.75 | 9.00 | 9.25 |
| 12 | TT to BSS ES Az Angle degrees | | | | | | | | | | | | |
| 13 | 180 | 191.4 | 191.7 | 192.0 | 192.3 | 192.6 | 192.9 | 193.2 | 193.4 | 193.7 | 193.9 | 194.2 | 194.4 |
| 14 | 185 | 189.4 | 189.7 | 190.0 | 190.3 | 190.6 | 190.9 | 191.2 | 191.4 | 191.7 | 191.9 | 192.2 | 192.4 |
| 15 | 190 | 187.4 | 187.7 | 188.0 | 188.3 | 188.6 | 188.9 | 189.2 | 189.4 | 189.7 | 189.9 | 190.2 | 190.4 |
| 16 | 195 | 185.4 | 185.7 | 186.0 | 186.3 | 186.6 | 186.9 | 187.2 | 187.4 | 187.7 | 187.9 | 188.2 | 188.4 |
| 17 | 200 | 183.4 | 183.7 | 184.0 | 184.3 | 184.6 | 184.9 | 185.2 | 185.4 | 185.7 | 185.9 | 186.2 | 186.4 |
| 18 | 205 | 181.4 | 181.7 | 182.0 | 182.3 | 182.6 | 182.9 | 183.2 | 183.4 | 183.7 | 183.9 | 184.2 | 184.4 |
| 19 | 210 | 179.4 | 179.7 | 180.0 | 180.3 | 180.6 | 180.9 | 181.2 | 181.4 | 181.7 | 181.9 | 182.2 | 182.4 |
| 20 | 215 | 177.4 | 177.7 | 178.0 | 178.3 | 178.6 | 178.9 | 179.2 | 179.4 | 179.7 | 179.9 | 180.2 | 180.4 |
| 21 | 220 | 175.4 | 175.7 | 176.0 | 176.3 | 176.6 | 176.9 | 177.2 | 177.4 | 177.7 | 177.9 | 178.2 | 178.4 |
| 22 | 225 | 173.4 | 173.7 | 174.0 | 174.3 | 174.6 | 174.9 | 175.2 | 175.4 | 175.7 | 175.9 | 176.2 | 176.4 |
| 23 | 230 | 171.4 | 171.7 | 172.0 | 172.3 | 172.6 | 172.9 | 173.2 | 173.4 | 173.7 | 173.9 | 174.2 | 174.4 |
| 24 | 235 | 169.4 | 169.7 | 170.0 | 170.3 | 170.6 | 170.9 | 171.2 | 171.4 | 171.7 | 171.9 | 172.2 | 172.4 |
| 25 | 240 | 167.4 | 167.7 | 168.0 | 168.3 | 168.6 | 168.9 | 169.2 | 169.4 | 169.7 | 169.9 | 170.2 | 170.4 |
| 26 | 245 | 165.4 | 165.7 | 166.0 | 166.3 | 166.6 | 166.9 | 167.2 | 167.4 | 167.7 | 167.9 | 168.2 | 168.4 |
| 27 | 250 | 163.4 | 163.7 | 164.0 | 164.3 | 164.6 | 164.9 | 165.2 | 165.4 | 165.7 | 165.9 | 166.2 | 166.4 |
| 28 | 255 | 162.1 | 162.4 | 162.7 | 163.1 | 163.3 | 163.6 | 163.9 | 164.2 | 164.4 | 164.7 | 164.9 | 165.2 |
| 29 | 260 | 160.9 | 161.2 | 161.5 | 161.8 | 162.1 | 162.4 | 162.7 | 162.9 | 163.2 | 163.4 | 163.7 | 163.9 |
| 30 | 265 | 159.4 | 159.7 | 160.0 | 160.3 | 160.6 | 160.9 | 161.2 | 161.4 | 161.7 | 161.9 | 162.2 | 162.4 |
| 31 | 270 | 157.9 | 158.2 | 158.5 | 158.8 | 159.1 | 159.4 | 159.7 | 159.9 | 160.2 | 160.4 | 160.7 | 160.9 |
| 32 | 272 | 157.4 | 157.7 | 158.0 | 158.3 | 158.6 | 158.9 | 159.2 | 159.4 | 159.7 | 159.9 | 160.2 | 160.4 |
| 33 | 274 | 156.5 | 156.8 | 157.1 | 157.4 | 157.7 | 158.0 | 158.3 | 158.5 | 158.8 | 159.0 | 159.3 | 159.5 |
| 34 | 276 | 156.9 | 157.2 | 157.5 | 157.8 | 158.1 | 158.4 | 158.7 | 158.9 | 159.2 | 159.4 | 159.7 | 159.9 |
| 35 | 278 | 155.9 | 156.2 | 156.5 | 156.8 | 157.1 | 157.4 | 157.7 | 157.9 | 158.2 | 158.4 | 158.7 | 158.9 |
| 36 | 280 | 155.4 | 155.7 | 156.0 | 156.3 | 156.6 | 156.9 | 157.2 | 157.4 | 157.7 | 157.9 | 158.2 | 158.4 |
| 37 | 282 | 155.1 | 155.4 | 155.7 | 156.0 | 156.3 | 156.6 | 156.9 | 157.1 | 157.4 | 157.5 | 157.9 | 158.1 |
| 38 | 284 | 154.8 | 155.1 | 155.4 | 155.7 | 156.0 | 156.3 | 156.6 | 156.8 | 157.1 | 157.3 | 157.6 | 157.8 |
| 39 | 286 | 154.5 | 154.8 | 155.1 | 155.4 | 155.7 | 156.0 | 156.3 | 156.5 | 156.8 | 157.0 | 157.3 | 157.5 |
| 40 | 288 | 154.1 | 154.4 | 154.7 | 155.0 | 155.3 | 155.6 | 155.9 | 156.1 | 156.4 | 156.5 | 156.9 | 157.1 |
| 41 | 290 | 153.9 | 154.2 | 154.5 | 154.8 | 155.1 | 155.4 | 155.7 | 155.9 | 156.2 | 156.4 | 156.7 | 156.9 |
| 42 | 292 | 153.6 | 153.9 | 154.2 | 154.5 | 154.8 | 155.1 | 155.4 | 155.6 | 155.9 | 156.1 | 156.4 | 156.6 |
| 43 | 294 | 153.3 | 153.6 | 153.9 | 154.2 | 154.5 | 154.8 | 155.1 | 155.3 | 155.6 | 155.8 | 156.1 | 156.3 |
| 44 | 296 | 153.0 | 153.3 | 153.6 | 153.9 | 154.2 | 154.5 | 154.8 | 155.0 | 155.3 | 155.5 | 155.8 | 156.0 |
| 45 | 298 | 152.7 | 153.0 | 153.3 | 153.6 | 155.8 | 154.2 | 154.5 | 154.7 | 155.0 | 155.2 | 155.5 | 155.7 |
| 46 | 300 | 152.4 | 152.7 | 153.0 | 153.3 | 153.6 | 153.9 | 154.2 | 154.4 | 154.7 | 154.9 | 155.2 | 155.4 |
| 47 | 302 | 152.2 | 152.5 | 152.8 | 153.1 | 153.4 | 153.7 | 154.0 | 154.2 | 154.5 | 154.2 | 155.0 | 155.2 |
| 48 | 304 | 152.0 | 152.3 | 152.6 | 152.9 | 153.2 | 153.5 | 153.8 | 154.0 | 154.3 | 154.5 | 154.8 | 155.0 |
| 49 | 306 | 151.8 | 152.1 | 152.4 | 152.7 | 153.0 | 153.3 | 153.6 | 153.8 | 154.1 | 154.3 | 154.6 | 154.8 |
| 50 | 308 | 151.6 | 151.9 | 152.2 | 152.5 | 152.8 | 153.1 | 153.4 | 153.6 | 153.9 | 154.1 | 154.4 | 154.6 |
| 51 | 310 | 151.4 | 151.7 | 152.0 | 152.3 | 152.6 | 152.9 | 153.2 | 153.4 | 153.7 | 153.9 | 154.2 | 154.4 |
| 52 | 312 | 151.2 | 151.5 | 151.8 | 152.1 | 152.4 | 152.7 | 153.0 | 153.2 | 153.5 | 153.2 | 154.0 | 154.2 |
| 53 | 314 | 151.0 | 151.3 | 151.6 | 151.9 | 152.2 | 152.5 | 152.8 | 153.0 | 153.3 | 153.5 | 153.8 | 154.0 |
| 54 | 316 | 150.8 | 151.1 | 151.4 | 151.7 | 152.0 | 152.3 | 152.6 | 152.8 | 153.1 | 153.3 | 153.6 | 153.8 |
| 55 | 318 | 150.6 | 150.9 | 151.2 | 151.5 | 151.8 | 152.1 | 152.4 | 152.6 | 152.9 | 153.1 | 153.4 | 153.6 |
| 56 | 320 | 150.4 | 150.7 | 151.0 | 151.3 | 151.6 | 151.9 | 152.2 | 152.4 | 152.7 | 152.9 | 153.2 | 153.4 |
| 57 | 325 | 150.1 | 150.4 | 150.7 | 151.1 | 151.3 | 151.6 | 151.9 | 152.2 | 152.4 | 152.7 | 152.9 | 153.2 |
| 58 | 330 | 149.9 | 150.2 | 150.5 | 150.8 | 151.1 | 151.4 | 151.7 | 151.9 | 152.2 | 152.4 | 152.7 | 152.9 |
| 59 | 335 | 149.6 | 149.9 | 150.2 | 150.6 | 150.8 | 151.1 | 151.4 | 151.7 | 151.9 | 152.2 | 152.4 | 152.7 |
| 60 | 340 | 149.4 | 149.7 | 150.0 | 150.3 | 150.6 | 150.9 | 151.2 | 151.4 | 151.7 | 151.9 | 152.2 | 152.4 |
| 61 | 345 | 149.1 | 149.4 | 149.7 | 150.1 | 150.3 | 150.6 | 150.9 | 151.2 | 151.4 | 151.7 | 151.9 | 152.2 |
| 62 | 350 | 148.9 | 149.2 | 149.5 | 149.8 | 150.1 | 150.4 | 150.7 | 150.9 | 151.2 | 151.4 | 151.7 | 151.9 |
| 63 | 355 | 148.6 | 148.9 | 149.2 | 149.6 | 149.8 | 150.1 | 150.4 | 150.7 | 150.9 | 151.2 | 151.4 | 151.7 |
| 64 | 0 | 148.4 | 148.7 | 149.0 | 149.3 | 149.6 | 149.9 | 150.2 | 150.4 | 150.7 | 150.9 | 151.2 | 151.4 |
| 65 | 5 | 148.6 | 148.9 | 149.2 | 149.6 | 149.8 | 150.1 | 150.4 | 150.7 | 150.9 | 151.2 | 151.4 | 151.7 |
| 66 | 10 | 148.9 | 149.2 | 149.5 | 149.8 | 150.1 | 150.4 | 150.7 | 150.9 | 151.2 | 151.4 | 151.7 | 151.9 |
| 67 | 15 | 149.1 | 149.4 | 149.7 | 150.1 | 150.3 | 150.6 | 150.9 | 151.2 | 151.4 | 151.7 | 151.9 | 152.2 |
| 68 | 20 | 149.4 | 149.7 | 150.0 | 150.3 | 150.6 | 150.9 | 151.2 | 151.4 | 151.7 | 151.9 | 152.2 | 152.4 |
| 69 | 25 | 149.6 | 149.9 | 150.2 | 150.6 | 150.8 | 151.1 | 151.4 | 151.7 | 151.9 | 152.2 | 152.4 | 152.7 |
| 70 | 30 | 149.9 | 150.2 | 150.5 | 150.8 | 151.1 | 151.4 | 151.7 | 151.9 | 152.2 | 152.4 | 152.7 | 152.9 |
| 71 | 35 | 150.1 | 150.4 | 150.7 | 151.1 | 151.3 | 151.6 | 151.9 | 152.2 | 152.4 | 152.7 | 152.9 | 153.2 |
| 72 | 40 | 150.4 | 150.7 | 151.0 | 151.3 | 151.6 | 151.9 | 152.2 | 152.4 | 152.7 | 152.9 | 153.2 | 153.4 |
| 73 | 45 | 150.9 | 151.2 | 151.5 | 151.8 | 152.1 | 152.4 | 152.7 | 152.9 | 153.2 | 153.4 | 153.7 | 153.9 |
| 74 | 47 | 151.1 | 151.4 | 151.7 | 152.0 | 152.3 | 152.6 | 152.9 | 153.1 | 153.4 | 153.6 | 153.9 | 154.1 |
| 75 | 49 | 151.5 | 151.6 | 151.9 | 152.2 | 152.5 | 152.8 | 153.1 | 153.3 | 153.6 | 153.8 | 154.1 | 154.3 |

TABLE 7-continued

| | B | AR | AS | AT | AU | AV | AW | AX | AY |
|---|---|---|---|---|---|---|---|---|---|
| 1 | Tile Angle degrees | | | | | | | | |
| 2 | Tower Height m | | | | | | | | |
| 3 | Max Range km | | | | | | | | |
| 4 | | | | | | | | | |
| 5 | Amp Power dBw | | | | | | | | |
| 6 | Line Losses dB | | | | | | | | |
| 7 | Peak Npt Xmit Gain, dBi | | | | | | | | |
| 8 | Atmospheric Abs dB | | | | | | | | |
| 9 | | | | | | | | | |
| 10 | Relative Angle | 0.37 | 0.34 | 0.32 | 0.30 | 0.28 | 0.26 | 0.24 | 0.23 |
| 11 | ES Separation Dist, Km | 9.50 | 9.75 | 10.00 | 10.25 | 10.50 | 10.75 | 11.00 | 11.25 |
| 12 | TT to BSS ES Az Angle degrees | | | | | | | | |
| 13 | 180 | 194.6 | 194.9 | 195.1 | 195.3 | 195.5 | 195.7 | 195.9 | 196.1 |
| 14 | 185 | 192.6 | 192.9 | 193.1 | 193.3 | 193.5 | 193.7 | 193.9 | 194.1 |
| 15 | 190 | 190.6 | 190.9 | 191.1 | 191.3 | 191.5 | 191.7 | 191.9 | 192.1 |
| 16 | 195 | 188.6 | 188.9 | 189.1 | 189.3 | 189.5 | 189.7 | 189.9 | 190.1 |
| 17 | 200 | 186.6 | 186.9 | 187.1 | 187.3 | 187.5 | 187.7 | 187.9 | 188.1 |
| 18 | 205 | 184.6 | 184.9 | 185.1 | 185.3 | 185.5 | 185.7 | 185.9 | 186.1 |
| 19 | 210 | 182.6 | 182.9 | 183.1 | 183.3 | 183.5 | 183.7 | 183.9 | 184.1 |
| 20 | 215 | 180.6 | 180.9 | 181.1 | 181.3 | 181.5 | 181.7 | 181.9 | 182.1 |
| 21 | 220 | 178.6 | 178.9 | 179.1 | 179.3 | 179.5 | 179.7 | 179.9 | 180.1 |
| 22 | 225 | 176.6 | 176.9 | 177.1 | 177.3 | 177.5 | 177.7 | 177.9 | 178.1 |
| 23 | 230 | 174.6 | 174.9 | 175.1 | 175.3 | 175.5 | 175.7 | 175.9 | 176.1 |
| 24 | 235 | 172.6 | 172.9 | 173.1 | 173.3 | 173.5 | 173.7 | 173.9 | 174.1 |
| 25 | 240 | 170.6 | 170.9 | 171.1 | 171.3 | 171.5 | 171.7 | 171.9 | 172.1 |
| 26 | 245 | 168.6 | 168.9 | 169.1 | 169.3 | 169.5 | 169.7 | 169.9 | 170.1 |
| 27 | 250 | 166.6 | 166.9 | 167.1 | 167.3 | 167.5 | 167.7 | 167.9 | 168.1 |
| 28 | 255 | 165.4 | 165.6 | 165.8 | 166.0 | 166.3 | 166.5 | 166.7 | 166.9 |
| 29 | 260 | 164.1 | 164.4 | 164.6 | 164.8 | 165.0 | 165.2 | 165.4 | 165.6 |
| 30 | 265 | 162.6 | 162.9 | 163.1 | 163.3 | 163.5 | 163.7 | 163.9 | 164.1 |
| 31 | 270 | 161.1 | 161.4 | 161.6 | 161.8 | 162.0 | 162.2 | 162.4 | 162.6 |
| 32 | 272 | 160.6 | 160.9 | 161.1 | 161.3 | 161.5 | 161.7 | 161.9 | 162.1 |
| 33 | 274 | 159.7 | 160.0 | 160.2 | 160.4 | 160.6 | 160.8 | 161.0 | 161.2 |
| 34 | 276 | 160.1 | 160.4 | 160.6 | 160.8 | 161.0 | 161.2 | 161.4 | 161.6 |
| 35 | 278 | 159.1 | 159.4 | 159.6 | 159.8 | 160.0 | 160.2 | 160.4 | 160.6 |
| 36 | 280 | 158.6 | 158.9 | 159.1 | 159.3 | 159.5 | 159.7 | 159.9 | 160.1 |
| 37 | 282 | 158.3 | 158.6 | 158.8 | 159.0 | 159.2 | 159.4 | 159.6 | 159.8 |
| 38 | 284 | 158.0 | 158.3 | 158.5 | 158.7 | 158.9 | 159.1 | 159.3 | 159.5 |
| 39 | 286 | 157.7 | 158.0 | 158.2 | 158.4 | 158.6 | 158.8 | 159.0 | 159.2 |
| 40 | 288 | 157.3 | 157.6 | 157.8 | 158.0 | 158.2 | 158.4 | 158.6 | 158.8 |
| 41 | 290 | 157.1 | 157.4 | 157.6 | 157.8 | 158.0 | 158.2 | 158.4 | 158.6 |
| 42 | 292 | 156.8 | 157.1 | 157.3 | 157.5 | 157.7 | 157.9 | 158.1 | 158.3 |
| 43 | 294 | 156.5 | 156.8 | 157.0 | 157.2 | 157.4 | 157.6 | 157.8 | 158.0 |
| 44 | 296 | 156.2 | 156.5 | 156.7 | 156.9 | 157.1 | 157.3 | 157.5 | 157.7 |
| 45 | 298 | 155.9 | 156.2 | 156.4 | 156.6 | 156.8 | 157.0 | 157.2 | 157.4 |
| 46 | 300 | 155.6 | 155.9 | 156.1 | 156.3 | 156.5 | 156.7 | 156.9 | 157.1 |
| 47 | 302 | 155.4 | 155.7 | 155.9 | 156.1 | 156.3 | 156.5 | 156.7 | 156.9 |
| 48 | 304 | 155.2 | 155.5 | 155.7 | 155.9 | 156.1 | 156.3 | 156.5 | 156.7 |
| 49 | 306 | 155.0 | 155.3 | 155.5 | 155.7 | 155.9 | 156.1 | 156.3 | 156.5 |
| 50 | 308 | 154.8 | 155.1 | 155.3 | 155.5 | 155.7 | 155.9 | 156.1 | 156.3 |
| 51 | 310 | 154.6 | 154.9 | 155.1 | 155.3 | 155.5 | 155.7 | 155.9 | 156.1 |
| 52 | 312 | 154.4 | 154.7 | 154.9 | 155.1 | 155.3 | 155.5 | 155.7 | 155.9 |
| 53 | 314 | 154.2 | 154.5 | 154.7 | 154.9 | 155.1 | 155.3 | 155.5 | 155.7 |
| 54 | 316 | 154.0 | 154.3 | 154.5 | 154.7 | 154.9 | 155.1 | 155.3 | 155.5 |
| 55 | 318 | 153.8 | 154.1 | 154.3 | 154.5 | 154.7 | 154.9 | 155.1 | 155.3 |
| 56 | 320 | 153.6 | 153.9 | 154.1 | 154.3 | 154.5 | 154.7 | 154.9 | 155.1 |
| 57 | 325 | 153.4 | 153.6 | 153.9 | 154.1 | 154.3 | 154.5 | 154.7 | 154.9 |
| 58 | 330 | 153.1 | 153.4 | 153.6 | 153.8 | 154.0 | 154.2 | 154.4 | 154.6 |
| 59 | 335 | 152.9 | 153.1 | 153.3 | 153.5 | 153.8 | 154.0 | 154.2 | 154.4 |
| 60 | 340 | 152.6 | 152.9 | 153.1 | 153.3 | 153.5 | 153.7 | 153.9 | 154.1 |
| 61 | 345 | 152.4 | 152.6 | 152.9 | 153.1 | 153.3 | 153.5 | 153.7 | 153.9 |
| 62 | 350 | 152.1 | 152.4 | 152.6 | 152.8 | 153.0 | 153.2 | 153.4 | 153.6 |
| 63 | 355 | 151.9 | 152.1 | 152.3 | 152.5 | 152.8 | 153.0 | 153.2 | 153.4 |
| 64 | 0 | 151.6 | 151.9 | 152.1 | 152.3 | 152.5 | 152.7 | 152.9 | 153.1 |
| 65 | 5 | 151.9 | 152.1 | 152.3 | 152.5 | 152.8 | 153.0 | 153.2 | 153.4 |
| 66 | 10 | 152.1 | 152.4 | 152.6 | 152.8 | 153.0 | 153.2 | 153.4 | 153.6 |
| 67 | 15 | 152.4 | 152.6 | 152.9 | 153.1 | 153.3 | 153.5 | 153.7 | 153.9 |
| 68 | 20 | 152.6 | 152.9 | 153.1 | 153.3 | 153.5 | 153.7 | 153.9 | 154.1 |
| 69 | 25 | 152.9 | 153.1 | 153.3 | 153.5 | 153.8 | 154.0 | 154.2 | 154.4 |
| 70 | 30 | 153.1 | 153.4 | 153.6 | 153.8 | 154.0 | 154.2 | 154.4 | 154.6 |
| 71 | 35 | 153.4 | 153.6 | 153.9 | 154.1 | 154.3 | 154.5 | 154.7 | 154.9 |
| 72 | 40 | 153.6 | 153.9 | 154.1 | 154.3 | 154.5 | 154.7 | 154.9 | 155.1 |
| 73 | 45 | 154.1 | 154.4 | 154.6 | 154.8 | 155.0 | 155.2 | 155.4 | 155.6 |
| 74 | 47 | 154.3 | 154.6 | 154.8 | 155.0 | 155.2 | 155.4 | 155.6 | 155.8 |
| 75 | 49 | 154.5 | 154.8 | 155.0 | 155.2 | 155.4 | 155.6 | 155.8 | 156.0 |

TABLE 7-continued

| | B | AZ | BA | BB | BC | BD | BE | BF | BG |
|---|---|---|---|---|---|---|---|---|---|
| 1 | Tile Angle degrees | | | | | | | | |
| 2 | Tower Height m | | | | | | | | |
| 3 | Max Range km | | | | | | | | |
| 4 | | | | | | | | | |
| 5 | Amp Power dBw | | | | | | | | |
| 6 | Line Losses dB | | | | | | | | |
| 7 | Peak Npt Xmit Gain, dBi | | | | | | | | |
| 8 | Atmospheric Abs dB | | | | | | | | |
| 9 | | | | | | | | | |
| 10 | Relative Angle | 0.21 | 0.19 | 0.18 | 0.16 | 0.15 | 0.14 | 0.12 | 0.11 |
| 11 | ES Separation Dist, Km | 11.50 | 11.75 | 12.00 | 12.25 | 12.50 | 12.75 | 13.00 | 13.25 |
| 12 | TT to BSS ES Az Angle degrees | | | | | | | | |
| 13 | 180 | 196.3 | 196.5 | 196.7 | 196.8 | 197.0 | 197.2 | 197.4 | 197.5 |
| 14 | 185 | 194.3 | 194.5 | 194.7 | 194.8 | 195.0 | 195.2 | 195.4 | 195.5 |
| 15 | 190 | 192.3 | 192.5 | 192.7 | 192.8 | 193.0 | 193.2 | 193.4 | 193.5 |
| 16 | 195 | 190.3 | 190.5 | 190.7 | 190.8 | 191.0 | 191.2 | 191.4 | 191.5 |
| 17 | 200 | 188.3 | 188.5 | 188.7 | 188.8 | 189.0 | 189.2 | 189.4 | 189.5 |
| 18 | 205 | 186.3 | 186.5 | 186.7 | 186.8 | 187.0 | 187.2 | 187.4 | 187.5 |
| 19 | 210 | 184.3 | 184.5 | 184.7 | 184.8 | 185.0 | 185.2 | 185.4 | 185.5 |
| 20 | 215 | 182.3 | 182.5 | 182.7 | 182.8 | 183.0 | 183.2 | 183.4 | 183.5 |
| 21 | 220 | 180.3 | 180.5 | 180.7 | 180.8 | 181.0 | 181.2 | 181.4 | 181.5 |
| 22 | 225 | 178.3 | 178.5 | 178.7 | 178.8 | 179.0 | 179.2 | 179.4 | 179.5 |
| 23 | 230 | 176.3 | 176.5 | 176.7 | 176.8 | 177.0 | 177.2 | 177.4 | 177.5 |
| 24 | 235 | 174.3 | 174.5 | 174.7 | 174.8 | 175.0 | 175.2 | 175.4 | 175.5 |
| 25 | 240 | 172.3 | 172.5 | 172.7 | 172.8 | 173.0 | 173.2 | 173.4 | 173.5 |
| 26 | 245 | 170.3 | 170.5 | 170.7 | 170.8 | 171.0 | 171.2 | 171.4 | 171.5 |
| 27 | 250 | 168.3 | 168.5 | 168.7 | 168.8 | 169.0 | 169.2 | 169.4 | 169.5 |
| 28 | 255 | 167.0 | 167.2 | 167.4 | 167.6 | 167.8 | 167.9 | 168.1 | 168.3 |
| 29 | 260 | 165.8 | 166.0 | 166.2 | 166.3 | 166.5 | 166.7 | 166.9 | 167.0 |
| 30 | 265 | 164.3 | 164.5 | 164.7 | 164.8 | 165.0 | 165.2 | 165.4 | 165.5 |
| 31 | 270 | 162.8 | 163.0 | 163.2 | 163.3 | 163.5 | 163.7 | 163.9 | 164.0 |
| 32 | 272 | 162.3 | 162.5 | 162.7 | 162.8 | 163.0 | 163.2 | 163.4 | 163.5 |
| 33 | 274 | 161.4 | 161.6 | 161.8 | 161.9 | 162.1 | 162.3 | 162.5 | 162.6 |
| 34 | 276 | 161.8 | 162.0 | 162.2 | 162.3 | 162.5 | 162.7 | 162.9 | 163.0 |
| 35 | 278 | 160.8 | 161.0 | 161.2 | 161.3 | 161.5 | 161.7 | 161.9 | 162.0 |
| 36 | 280 | 160.3 | 160.5 | 160.7 | 160.8 | 161.0 | 161.2 | 161.4 | 161.5 |
| 37 | 282 | 160.0 | 160.2 | 160.4 | 160.5 | 160.7 | 160.9 | 161.1 | 161.2 |
| 38 | 284 | 159.7 | 159.9 | 160.1 | 160.2 | 160.4 | 160.6 | 160.8 | 160.9 |
| 39 | 286 | 159.4 | 159.6 | 159.8 | 159.9 | 160.1 | 160.3 | 160.5 | 160.6 |
| 40 | 288 | 159.0 | 159.2 | 159.4 | 159.5 | 159.7 | 159.9 | 160.1 | 160.2 |
| 41 | 290 | 158.8 | 159.0 | 159.2 | 159.3 | 159.5 | 159.7 | 159.9 | 160.0 |
| 42 | 292 | 158.5 | 158.7 | 158.9 | 159.0 | 159.2 | 159.4 | 159.6 | 159.7 |
| 43 | 294 | 158.2 | 158.4 | 158.6 | 158.7 | 158.9 | 159.1 | 159.3 | 159.4 |
| 44 | 296 | 157.9 | 158.1 | 158.3 | 158.4 | 158.6 | 158.8 | 159.0 | 159.1 |
| 45 | 298 | 157.6 | 157.8 | 158.0 | 158.1 | 158.3 | 158.5 | 158.7 | 158.9 |
| 46 | 300 | 157.3 | 157.5 | 157.7 | 157.8 | 158.0 | 158.2 | 158.4 | 158.5 |
| 47 | 302 | 157.1 | 157.3 | 157.5 | 157.6 | 157.8 | 158.0 | 158.2 | 158.3 |
| 48 | 304 | 156.9 | 157.1 | 157.3 | 157.4 | 157.6 | 157.8 | 158.0 | 158.1 |
| 49 | 306 | 156.7 | 156.9 | 157.1 | 157.2 | 157.4 | 157.6 | 157.8 | 157.9 |
| 50 | 308 | 156.5 | 156.7 | 156.9 | 157.0 | 157.2 | 157.4 | 157.6 | 157.7 |
| 51 | 310 | 156.3 | 156.5 | 156.7 | 156.8 | 157.0 | 157.2 | 157.4 | 157.5 |
| 52 | 312 | 156.1 | 156.3 | 156.5 | 156.6 | 156.8 | 157.0 | 157.2 | 157.3 |
| 53 | 314 | 155.9 | 156.1 | 156.3 | 156.4 | 156.6 | 156.8 | 157.0 | 157.1 |
| 54 | 316 | 155.7 | 155.9 | 156.1 | 156.2 | 156.4 | 156.6 | 156.8 | 156.9 |
| 55 | 318 | 155.5 | 155.7 | 155.9 | 156.0 | 156.2 | 156.4 | 156.6 | 156.7 |
| 56 | 320 | 155.3 | 155.5 | 155.7 | 155.8 | 156.0 | 156.2 | 156.4 | 156.5 |
| 57 | 325 | 155.0 | 155.2 | 155.4 | 155.6 | 155.8 | 155.9 | 156.1 | 156.3 |
| 58 | 330 | 154.8 | 155.0 | 155.2 | 155.3 | 155.5 | 155.7 | 155.9 | 156.0 |
| 59 | 335 | 154.5 | 154.7 | 154.9 | 155.0 | 155.2 | 155.4 | 155.6 | 155.8 |
| 60 | 340 | 154.3 | 154.5 | 154.7 | 154.8 | 155.0 | 155.2 | 155.4 | 155.5 |
| 61 | 345 | 154.0 | 154.2 | 154.4 | 154.6 | 154.8 | 154.9 | 155.1 | 155.3 |
| 62 | 350 | 153.8 | 154.0 | 154.2 | 154.3 | 154.5 | 154.7 | 154.9 | 155.0 |
| 63 | 355 | 153.5 | 153.7 | 153.9 | 154.0 | 154.2 | 154.4 | 154.6 | 154.8 |
| 64 | 0 | 153.3 | 153.5 | 153.7 | 153.8 | 154.0 | 154.2 | 154.4 | 154.5 |
| 65 | 5 | 153.5 | 153.7 | 153.9 | 154.0 | 154.2 | 154.4 | 154.6 | 154.8 |
| 66 | 10 | 153.8 | 154.0 | 154.2 | 154.3 | 154.5 | 154.7 | 154.9 | 155.0 |
| 67 | 15 | 154.0 | 154.2 | 154.4 | 154.6 | 154.8 | 154.9 | 155.1 | 155.3 |
| 68 | 20 | 154.3 | 154.5 | 154.7 | 154.8 | 155.0 | 155.2 | 155.4 | 155.5 |
| 69 | 25 | 154.5 | 154.7 | 154.9 | 155.0 | 155.2 | 155.4 | 155.6 | 155.8 |
| 70 | 30 | 154.8 | 155.0 | 155.2 | 155.3 | 155.5 | 155.7 | 155.9 | 156.0 |
| 71 | 35 | 155.0 | 155.2 | 155.4 | 155.6 | 155.8 | 155.9 | 156.1 | 156.3 |
| 72 | 40 | 155.3 | 155.5 | 155.7 | 155.8 | 156.0 | 156.2 | 156.4 | 156.5 |
| 73 | 45 | 155.8 | 156.0 | 156.2 | 156.3 | 156.5 | 156.7 | 156.9 | 157.0 |
| 74 | 47 | 156.0 | 156.2 | 156.4 | 156.5 | 156.7 | 156.9 | 157.1 | 157.2 |
| 75 | 49 | 156.2 | 156.4 | 156.6 | 156.7 | 156.9 | 157.1 | 157.3 | 157.4 |

TABLE 7-continued

| | B | BH | BI | BJ | BK | BL | BM | BN | BO | BP | BQ | BR | BS |
|---|---|---|---|---|---|---|---|---|---|---|---|---|---|
| 1 | Tile Angle degrees | | | | | | | | | | | | |
| 2 | Tower Height m | | | | | | | | | | | | |
| 3 | Max Range km | | | | | | | | | | | | |
| 4 | | | | | | | | | | | | | |
| 5 | Amp Power dBw | | | | | | | | | | | | |
| 6 | Line Losses dB | | | | | | | | | | | | |
| 7 | Peak Npt Xmit Gain, dBi | | | | | | | | | | | | |
| 8 | Atmospheric Abs dB | | | | | | | | | | | | |
| 9 | | | | | | | | | | | | | |
| 10 | Relative Angle | 0.10 | 0.09 | 0.08 | 0.07 | 0.06 | 0.05 | 0.04 | 0.03 | 0.02 | 0.01 | 0.00 | 0.01 |
| 11 | ES Separation Dist, Km | 13.50 | 13.75 | 14.00 | 14.25 | 14.50 | 14.75 | 15.00 | 15.25 | 15.50 | 15.75 | 16.00 | 16.25 |
| 12 | TT to BSS ES Az Angle degrees | | | | | | | | | | | | |
| 13 | 180 | 197.7 | 197.8 | 198.0 | 198.2 | 198.3 | 198.5 | 198.6 | 198.7 | 198.9 | 199.0 | 199.2 | 199.3 |
| 14 | 185 | 195.7 | 195.8 | 196.0 | 196.2 | 196.3 | 196.5 | 196.6 | 196.7 | 196.9 | 197.0 | 197.2 | 197.3 |
| 15 | 190 | 193.7 | 193.8 | 194.0 | 194.2 | 194.3 | 194.5 | 194.6 | 194.7 | 194.9 | 195.0 | 195.2 | 195.3 |
| 16 | 195 | 191.7 | 191.8 | 192.0 | 192.2 | 192.3 | 192.5 | 192.6 | 192.7 | 192.9 | 193.0 | 193.2 | 193.3 |
| 17 | 200 | 189.7 | 189.8 | 190.0 | 190.2 | 190.3 | 190.5 | 190.6 | 190.7 | 190.9 | 191.0 | 191.2 | 191.3 |
| 18 | 205 | 187.7 | 187.8 | 188.0 | 188.2 | 188.3 | 188.5 | 188.6 | 188.7 | 188.9 | 189.0 | 189.2 | 189.3 |
| 19 | 210 | 185.7 | 185.8 | 186.0 | 186.2 | 186.3 | 186.5 | 186.6 | 186.7 | 186.9 | 187.0 | 187.2 | 187.3 |
| 20 | 215 | 183.7 | 183.8 | 184.0 | 184.2 | 184.3 | 184.5 | 184.6 | 184.7 | 184.9 | 185.0 | 185.2 | 185.3 |
| 21 | 220 | 181.7 | 181.8 | 182.0 | 182.2 | 182.3 | 182.5 | 182.6 | 182.7 | 182.9 | 183.0 | 183.2 | 183.3 |
| 22 | 225 | 179.7 | 179.8 | 180.0 | 180.2 | 180.3 | 180.5 | 180.6 | 180.7 | 180.9 | 181.0 | 181.2 | 181.3 |
| 23 | 230 | 177.7 | 177.8 | 178.0 | 178.2 | 178.3 | 178.5 | 178.6 | 178.7 | 178.9 | 179.0 | 179.2 | 179.3 |
| 24 | 235 | 175.7 | 175.8 | 176.0 | 176.2 | 176.3 | 176.5 | 176.6 | 176.7 | 176.9 | 177.0 | 177.2 | 177.3 |
| 25 | 240 | 173.7 | 173.8 | 174.0 | 174.2 | 174.3 | 174.5 | 174.6 | 174.7 | 174.9 | 175.0 | 175.2 | 175.3 |
| 26 | 245 | 171.7 | 171.8 | 172.0 | 172.2 | 172.3 | 172.5 | 172.6 | 172.7 | 172.9 | 173.0 | 173.2 | 173.3 |
| 27 | 250 | 169.7 | 169.8 | 170.0 | 170.2 | 170.3 | 170.5 | 170.6 | 170.7 | 170.9 | 171.0 | 171.2 | 171.3 |
| 28 | 255 | 168.4 | 168.6 | 168.8 | 168.9 | 169.1 | 169.2 | 169.4 | 169.5 | 169.6 | 169.8 | 169.9 | 170.0 |
| 29 | 260 | 167.2 | 167.3 | 167.5 | 167.7 | 167.8 | 168.0 | 168.1 | 168.2 | 168.4 | 168.5 | 168.7 | 168.8 |
| 30 | 265 | 165.7 | 165.8 | 166.0 | 166.2 | 166.3 | 166.5 | 166.6 | 166.7 | 166.9 | 167.0 | 167.2 | 167.3 |
| 31 | 270 | 164.2 | 164.3 | 164.5 | 164.7 | 164.8 | 165.0 | 165.1 | 165.2 | 165.4 | 165.5 | 165.7 | 165.8 |
| 32 | 272 | 163.7 | 163.8 | 164.0 | 164.2 | 164.3 | 164.5 | 164.6 | 164.7 | 164.9 | 165.0 | 165.2 | 165.3 |
| 33 | 274 | 162.8 | 162.9 | 163.1 | 163.3 | 163.4 | 163.6 | 163.7 | 163.8 | 164.0 | 164.1 | 164.3 | 164.4 |
| 34 | 276 | 163.2 | 163.3 | 163.5 | 163.7 | 163.8 | 164.0 | 164.1 | 164.2 | 164.4 | 164.5 | 164.7 | 164.8 |
| 35 | 278 | 162.2 | 162.3 | 162.5 | 162.7 | 162.8 | 163.0 | 163.1 | 163.2 | 163.4 | 163.5 | 163.7 | 163.8 |
| 36 | 280 | 161.7 | 161.8 | 162.0 | 162.2 | 162.3 | 162.5 | 162.6 | 162.7 | 162.9 | 163.0 | 163.2 | 163.3 |
| 37 | 282 | 161.4 | 161.5 | 161.7 | 161.9 | 162.0 | 162.2 | 162.3 | 162.4 | 162.6 | 162.7 | 162.9 | 163.0 |
| 38 | 284 | 161.1 | 161.2 | 161.4 | 161.6 | 161.7 | 161.9 | 162.0 | 162.1 | 162.3 | 162.4 | 162.6 | 162.7 |
| 39 | 286 | 160.8 | 160.9 | 161.1 | 161.3 | 161.4 | 161.6 | 161.7 | 161.8 | 162.0 | 162.1 | 162.3 | 162.4 |
| 40 | 288 | 160.4 | 160.5 | 160.7 | 160.9 | 161.0 | 161.2 | 161.3 | 161.4 | 161.6 | 161.7 | 161.9 | 162.0 |
| 41 | 290 | 160.2 | 160.3 | 160.5 | 160.7 | 160.8 | 161.0 | 161.1 | 161.2 | 161.4 | 161.5 | 161.7 | 161.8 |
| 42 | 292 | 159.9 | 160.0 | 160.2 | 160.4 | 160.5 | 160.7 | 160.8 | 160.9 | 161.1 | 161.2 | 161.4 | 161.5 |
| 43 | 294 | 159.6 | 159.7 | 159.9 | 160.1 | 160.2 | 160.4 | 160.5 | 160.6 | 160.8 | 160.9 | 161.1 | 161.2 |
| 44 | 296 | 159.3 | 159.4 | 159.6 | 159.8 | 159.9 | 160.1 | 160.2 | 160.3 | 160.5 | 160.6 | 160.8 | 160.9 |
| 45 | 298 | 159.0 | 159.1 | 159.3 | 159.5 | 159.6 | 159.8 | 159.9 | 160.0 | 160.2 | 160.3 | 160.5 | 160.6 |
| 46 | 300 | 158.7 | 158.8 | 159.0 | 159.2 | 159.3 | 159.5 | 159.6 | 159.7 | 159.9 | 160.0 | 160.2 | 160.3 |
| 47 | 302 | 158.5 | 158.6 | 158.8 | 159.0 | 159.1 | 159.3 | 159.4 | 159.5 | 159.7 | 159.8 | 160.0 | 160.1 |
| 48 | 304 | 158.3 | 158.4 | 158.6 | 158.8 | 158.9 | 159.1 | 159.2 | 159.3 | 159.5 | 159.6 | 159.8 | 159.9 |
| 49 | 306 | 158.1 | 158.2 | 158.4 | 158.6 | 158.7 | 158.9 | 159.0 | 159.1 | 159.3 | 159.4 | 159.6 | 159.7 |
| 50 | 308 | 157.9 | 158.0 | 158.2 | 158.4 | 158.5 | 158.7 | 158.8 | 158.9 | 159.1 | 159.2 | 159.4 | 159.5 |
| 51 | 310 | 157.7 | 157.8 | 158.0 | 158.2 | 158.3 | 158.5 | 158.6 | 158.7 | 158.9 | 159.0 | 159.2 | 159.3 |
| 52 | 312 | 157.5 | 157.6 | 157.8 | 158.0 | 158.1 | 158.3 | 158.4 | 158.5 | 158.7 | 158.8 | 159.0 | 159.1 |
| 53 | 314 | 157.3 | 157.4 | 157.6 | 157.8 | 157.9 | 158.1 | 158.2 | 158.3 | 158.5 | 158.6 | 158.8 | 158.9 |
| 54 | 316 | 157.1 | 157.2 | 157.4 | 157.6 | 157.7 | 157.9 | 158.0 | 158.1 | 158.3 | 158.4 | 158.6 | 158.7 |
| 55 | 318 | 156.9 | 157.0 | 157.2 | 157.4 | 157.5 | 157.7 | 157.8 | 157.9 | 158.1 | 158.2 | 158.4 | 158.5 |
| 56 | 320 | 156.7 | 156.8 | 157.0 | 157.2 | 157.3 | 157.5 | 157.6 | 157.7 | 157.9 | 158.0 | 158.2 | 158.3 |
| 57 | 325 | 156.4 | 156.6 | 156.8 | 156.9 | 157.1 | 157.2 | 157.4 | 157.5 | 157.6 | 157.8 | 157.9 | 158.0 |
| 58 | 330 | 156.2 | 156.3 | 156.5 | 156.7 | 156.8 | 157.0 | 157.1 | 157.2 | 157.4 | 157.5 | 157.7 | 157.8 |
| 59 | 335 | 155.9 | 156.1 | 156.2 | 156.4 | 156.6 | 156.7 | 156.9 | 157.0 | 157.1 | 157.3 | 157.4 | 157.5 |
| 60 | 340 | 155.7 | 155.8 | 156.0 | 156.2 | 156.3 | 156.5 | 156.6 | 156.7 | 156.9 | 157.0 | 157.2 | 157.3 |
| 61 | 345 | 155.4 | 155.6 | 155.8 | 155.9 | 156.1 | 156.2 | 156.4 | 156.5 | 156.6 | 156.8 | 156.9 | 157.0 |
| 62 | 350 | 155.2 | 155.3 | 155.5 | 155.7 | 155.8 | 156.0 | 156.1 | 156.2 | 156.4 | 156.5 | 156.7 | 156.8 |
| 63 | 355 | 154.9 | 155.1 | 155.2 | 155.4 | 155.6 | 155.7 | 155.9 | 156.0 | 156.1 | 156.3 | 156.4 | 156.5 |
| 64 | 0 | 154.7 | 154.8 | 155.0 | 155.2 | 155.3 | 155.5 | 155.6 | 155.7 | 155.9 | 156.0 | 156.2 | 156.3 |
| 65 | 5 | 154.9 | 155.1 | 155.2 | 155.4 | 155.6 | 155.7 | 155.9 | 156.0 | 156.1 | 156.3 | 156.4 | 156.5 |
| 66 | 10 | 155.2 | 155.3 | 155.5 | 155.7 | 155.8 | 156.0 | 156.1 | 156.2 | 156.4 | 156.5 | 156.7 | 156.8 |
| 67 | 15 | 155.4 | 155.6 | 155.8 | 155.9 | 156.1 | 156.2 | 156.4 | 156.5 | 156.6 | 156.8 | 156.9 | 157.0 |
| 68 | 20 | 155.7 | 155.8 | 156.0 | 156.2 | 156.3 | 156.5 | 156.6 | 156.7 | 156.9 | 157.0 | 157.2 | 157.3 |
| 69 | 25 | 155.9 | 156.1 | 156.2 | 156.4 | 156.6 | 156.7 | 156.9 | 157.0 | 157.1 | 157.3 | 157.4 | 157.5 |
| 70 | 30 | 156.2 | 156.3 | 156.5 | 156.7 | 156.8 | 157.0 | 157.1 | 157.2 | 157.4 | 157.5 | 157.7 | 157.8 |
| 71 | 35 | 156.4 | 156.6 | 156.8 | 156.9 | 157.1 | 157.2 | 157.4 | 157.5 | 157.6 | 157.8 | 157.9 | 158.0 |
| 72 | 40 | 156.7 | 156.8 | 157.0 | 157.2 | 157.3 | 157.5 | 157.6 | 157.7 | 157.9 | 158.0 | 158.2 | 158.3 |
| 73 | 45 | 157.2 | 157.3 | 157.5 | 157.7 | 157.8 | 158.0 | 158.1 | 158.2 | 158.4 | 158.5 | 158.7 | 158.8 |
| 74 | 47 | 157.4 | 157.5 | 157.7 | 157.9 | 158.0 | 158.2 | 158.3 | 158.4 | 158.6 | 158.7 | 158.9 | 159.0 |
| 75 | 49 | 157.6 | 157.7 | 157.9 | 158.1 | 158.2 | 158.4 | 158.5 | 158.6 | 158.8 | 158.9 | 159.1 | 159.2 |

TABLE 7-continued

| 7 | B | BT | BU | BV | BW | BX | BY | BZ | CA | CB | CC | CD |
|---|---|---|---|---|---|---|---|---|---|---|---|---|
| 1 | Tile Angle degrees | | | | | | | | | | | |
| 2 | Tower Height m | | | | | | | | | | | |
| 3 | Max Range km | | | | | | | | | | | |
| 4 | | | | | | | | | | | | |
| 5 | Amp Power dBw | | | | | | | | | | | |
| 6 | Line Losses dB | | | | | | | | | | | |
| 7 | Peak Npt Xmit Gain, dBi | | | | | | | | | | | |
| 8 | Atmospheric Abs dB | | | | | | | | | | | |
| 9 | | | | | | | | | | | | |
| 10 | Relative Angle | 0.02 | 0.02 | 0.03 | 0.04 | 0.05 | 0.05 | 0.06 | 0.07 | 0.07 | 0.08 | 0.08 |
| 11 | ES Separation Dist, Km | 16.50 | 16.75 | 17.00 | 17.25 | 17.50 | 17.75 | 18.00 | 18.25 | 18.50 | 18.75 | 19.00 |
| 12 | TT to BSS ES Az Angle degrees | | | | | | | | | | | |
| 13 | 180 | 199.4 | 199.6 | 199.7 | 199.8 | 199.9 | 200.1 | 200.2 | 200.3 | 200.4 | 200.5 | 200.7 |
| 14 | 185 | 197.4 | 197.6 | 197.7 | 197.8 | 197.9 | 198.1 | 198.2 | 198.3 | 198.4 | 198.5 | 198.7 |
| 15 | 190 | 195.4 | 195.6 | 195.7 | 195.8 | 195.9 | 196.1 | 196.2 | 196.3 | 196.4 | 196.5 | 196.7 |
| 16 | 195 | 193.4 | 193.6 | 193.7 | 193.8 | 193.9 | 194.1 | 194.2 | 194.3 | 194.4 | 194.5 | 194.7 |
| 17 | 200 | 191.4 | 191.6 | 191.7 | 191.8 | 191.9 | 192.1 | 192.2 | 192.3 | 192.4 | 192.5 | 192.7 |
| 18 | 205 | 189.4 | 189.6 | 189.7 | 189.8 | 189.9 | 190.1 | 190.2 | 190.3 | 190.4 | 190.5 | 190.7 |
| 19 | 210 | 187.4 | 187.6 | 187.7 | 187.8 | 187.9 | 188.1 | 188.2 | 188.3 | 188.4 | 188.5 | 188.7 |
| 20 | 215 | 185.4 | 185.6 | 185.7 | 185.8 | 185.9 | 186.1 | 186.2 | 186.3 | 186.4 | 186.5 | 186.7 |
| 21 | 220 | 183.4 | 183.6 | 183.7 | 183.8 | 183.9 | 184.1 | 184.2 | 184.3 | 184.4 | 184.5 | 184.7 |
| 22 | 225 | 181.4 | 181.6 | 181.7 | 181.8 | 181.9 | 182.1 | 182.2 | 182.3 | 182.4 | 182.5 | 182.7 |
| 23 | 230 | 179.4 | 179.6 | 179.7 | 179.8 | 179.9 | 180.1 | 180.2 | 180.3 | 180.4 | 180.5 | 180.7 |
| 24 | 235 | 177.4 | 177.6 | 177.7 | 177.8 | 177.9 | 178.1 | 178.2 | 178.3 | 178.4 | 178.5 | 178.7 |
| 25 | 240 | 175.4 | 175.6 | 175.7 | 175.8 | 175.9 | 176.1 | 176.2 | 176.3 | 176.4 | 176.5 | 176.7 |
| 26 | 245 | 173.4 | 173.6 | 173.7 | 173.8 | 173.9 | 174.1 | 174.2 | 174.3 | 174.4 | 174.5 | 174.7 |
| 27 | 250 | 171.4 | 171.6 | 171.7 | 171.8 | 171.9 | 172.1 | 172.2 | 172.3 | 172.4 | 172.5 | 172.7 |
| 28 | 255 | 170.2 | 170.3 | 170.4 | 170.6 | 170.7 | 170.8 | 170.9 | 171.1 | 171.2 | 171.3 | 171.4 |
| 29 | 260 | 168.9 | 169.1 | 169.2 | 169.3 | 169.4 | 169.6 | 169.7 | 169.8 | 169.9 | 170.0 | 170.2 |
| 30 | 265 | 167.4 | 167.6 | 167.7 | 167.8 | 167.9 | 168.1 | 168.2 | 168.3 | 168.4 | 168.5 | 168.7 |
| 31 | 270 | 165.9 | 166.1 | 166.2 | 166.3 | 166.4 | 166.6 | 166.7 | 166.8 | 166.9 | 167.0 | 167.2 |
| 32 | 272 | 165.4 | 165.6 | 165.7 | 165.8 | 165.9 | 166.1 | 166.2 | 166.3 | 166.4 | 166.5 | 166.7 |
| 33 | 274 | 164.5 | 164.7 | 164.8 | 164.9 | 165.0 | 165.2 | 165.3 | 165.4 | 165.5 | 165.6 | 165.8 |
| 34 | 276 | 164.9 | 165.1 | 165.2 | 165.3 | 165.4 | 165.6 | 165.7 | 165.8 | 165.9 | 166.0 | 166.2 |
| 35 | 278 | 163.9 | 164.1 | 164.2 | 164.3 | 164.4 | 164.6 | 164.7 | 164.8 | 164.9 | 165.0 | 165.2 |
| 36 | 280 | 163.4 | 163.6 | 163.7 | 163.8 | 163.9 | 164.1 | 164.2 | 164.3 | 164.4 | 164.5 | 164.7 |
| 37 | 282 | 163.1 | 163.3 | 163.4 | 163.5 | 163.6 | 163.8 | 163.9 | 164.0 | 164.1 | 164.2 | 164.4 |
| 38 | 284 | 162.8 | 163.0 | 163.1 | 163.2 | 163.3 | 163.5 | 163.6 | 163.7 | 163.8 | 163.9 | 164.1 |
| 39 | 286 | 162.5 | 162.7 | 162.8 | 162.9 | 163.0 | 163.2 | 163.3 | 163.4 | 163.5 | 163.6 | 163.8 |
| 40 | 288 | 162.1 | 162.3 | 162.4 | 162.5 | 162.6 | 162.8 | 162.9 | 163.0 | 163.1 | 163.2 | 163.4 |
| 41 | 290 | 161.9 | 162.1 | 162.2 | 162.3 | 162.4 | 162.6 | 162.7 | 162.8 | 162.9 | 163.0 | 163.2 |
| 42 | 292 | 161.6 | 161.8 | 161.9 | 162.0 | 162.1 | 162.3 | 162.4 | 162.5 | 162.6 | 162.7 | 162.9 |
| 43 | 294 | 161.3 | 161.5 | 161.6 | 161.7 | 161.8 | 162.0 | 162.1 | 162.2 | 162.3 | 162.4 | 162.6 |
| 44 | 296 | 161.0 | 161.2 | 161.3 | 161.4 | 161.5 | 161.7 | 161.8 | 161.9 | 162.0 | 162.1 | 162.3 |
| 45 | 298 | 160.7 | 160.9 | 161.0 | 161.1 | 161.2 | 161.4 | 161.5 | 161.6 | 161.7 | 161.8 | 162.0 |
| 46 | 300 | 160.4 | 160.6 | 160.7 | 160.8 | 160.9 | 161.1 | 161.2 | 161.3 | 161.4 | 161.5 | 161.7 |
| 47 | 302 | 160.2 | 160.4 | 160.5 | 160.6 | 160.7 | 160.9 | 161.0 | 161.1 | 161.2 | 161.3 | 161.5 |
| 48 | 304 | 160.0 | 160.2 | 160.3 | 160.4 | 160.5 | 160.7 | 160.8 | 160.9 | 161.0 | 161.1 | 161.3 |
| 49 | 306 | 159.8 | 160.0 | 160.1 | 160.2 | 160.3 | 160.5 | 160.6 | 160.7 | 160.8 | 160.9 | 161.1 |
| 50 | 308 | 159.6 | 159.8 | 159.9 | 160.0 | 160.1 | 160.3 | 160.4 | 160.5 | 160.6 | 160.7 | 160.9 |
| 51 | 310 | 159.4 | 159.6 | 159.7 | 159.8 | 159.9 | 160.1 | 160.2 | 160.3 | 160.4 | 160.5 | 160.7 |
| 52 | 312 | 158.2 | 158.4 | 158.5 | 158.6 | 158.7 | 158.9 | 159.0 | 159.1 | 159.2 | 159.3 | 159.5 |
| 53 | 314 | 159.0 | 159.2 | 159.3 | 159.4 | 159.5 | 159.7 | 159.8 | 159.9 | 160.0 | 160.1 | 160.3 |
| 54 | 316 | 158.8 | 159.0 | 159.1 | 159.2 | 159.3 | 159.5 | 159.6 | 159.7 | 159.8 | 159.9 | 160.1 |
| 55 | 318 | 158.6 | 158.8 | 158.9 | 159.0 | 159.1 | 159.3 | 159.4 | 159.5 | 159.6 | 159.7 | 159.9 |
| 56 | 320 | 158.4 | 158.6 | 158.7 | 158.8 | 158.9 | 159.1 | 159.2 | 159.3 | 159.4 | 159.5 | 159.7 |
| 57 | 325 | 158.2 | 158.3 | 158.4 | 158.6 | 158.7 | 158.8 | 158.9 | 159.1 | 159.2 | 159.3 | 159.4 |
| 58 | 330 | 157.9 | 158.1 | 158.2 | 158.3 | 158.4 | 158.6 | 158.7 | 158.8 | 158.9 | 159.0 | 159.2 |
| 59 | 335 | 157.7 | 157.8 | 157.9 | 158.1 | 158.2 | 158.3 | 158.4 | 158.6 | 158.7 | 158.8 | 158.9 |
| 60 | 340 | 157.4 | 157.6 | 157.7 | 157.8 | 157.9 | 158.1 | 158.2 | 158.3 | 158.4 | 158.5 | 158.7 |
| 61 | 345 | 157.2 | 157.3 | 157.4 | 157.6 | 157.7 | 157.8 | 157.9 | 158.1 | 158.2 | 158.3 | 158.4 |
| 62 | 350 | 156.9 | 157.1 | 157.2 | 157.3 | 157.4 | 157.6 | 157.7 | 157.8 | 157.9 | 158.0 | 158.2 |
| 63 | 355 | 156.7 | 156.8 | 156.9 | 157.1 | 157.2 | 157.3 | 157.4 | 157.6 | 157.7 | 157.8 | 157.9 |
| 64 | 0 | 156.4 | 156.6 | 156.7 | 156.8 | 156.9 | 157.1 | 157.2 | 157.3 | 157.4 | 157.5 | 157.7 |
| 65 | 5 | 156.7 | 156.8 | 156.9 | 157.1 | 157.2 | 157.3 | 157.4 | 157.6 | 157.7 | 157.8 | 157.9 |
| 66 | 10 | 156.9 | 157.1 | 157.2 | 157.3 | 157.4 | 157.6 | 157.7 | 157.8 | 157.9 | 158.0 | 158.2 |
| 67 | 15 | 157.2 | 157.3 | 157.4 | 157.6 | 157.7 | 157.8 | 157.9 | 158.1 | 158.2 | 158.3 | 158.4 |
| 68 | 20 | 157.4 | 157.6 | 157.7 | 157.8 | 157.9 | 158.1 | 158.2 | 158.3 | 158.4 | 158.5 | 158.7 |
| 69 | 25 | 157.7 | 157.8 | 157.9 | 158.1 | 158.2 | 158.3 | 158.4 | 158.6 | 158.7 | 158.8 | 158.9 |
| 70 | 30 | 157.9 | 158.1 | 158.2 | 158.3 | 158.4 | 158.6 | 158.7 | 158.8 | 158.9 | 159.0 | 159.2 |
| 71 | 35 | 158.2 | 158.3 | 158.4 | 158.6 | 158.7 | 158.8 | 158.9 | 159.1 | 159.2 | 159.3 | 159.4 |
| 72 | 40 | 158.4 | 158.6 | 158.7 | 158.8 | 158.9 | 159.1 | 159.2 | 159.3 | 159.4 | 159.5 | 159.7 |
| 73 | 45 | 158.9 | 159.1 | 159.2 | 159.3 | 159.4 | 159.6 | 159.7 | 159.8 | 159.9 | 160.0 | 160.2 |
| 74 | 47 | 159.1 | 159.3 | 159.4 | 159.5 | 159.6 | 159.8 | 159.9 | 160.0 | 160.1 | 160.2 | 160.4 |
| 75 | 49 | 159.3 | 159.5 | 159.6 | 159.7 | 159.8 | 160.0 | 160.1 | 160.2 | 160.3 | 160.4 | 160.6 |

TABLE 7-continued

| A | B | C | D | E | F | G | H | I | J | K | L | M | N |
|---|---|---|---|---|---|---|---|---|---|---|---|---|---|
| 1 | Tile Angle degrees | 0 | | | | | | | | | | | |
| 2 | Tower Height m | 150 | | | | | | | | | | | |
| 3 | Max Range km | 16 | | | | | | | | | | | |
| 4 | | | | | | | | | | | | | |
| 5 | Amp Power dBw | | 25 | | | | NOW LINKED TO NOTES SPREADSHEET | | | | | | |
| 6 | Line Losses dB | | 2.5 | | | | | | | | | | |
| 7 | Peak Npt Xmit Gain, dBi | | 10 | | | | | | | | | | |
| 8 | Atmospheric Abs dB | | 0.2 | | | | | | | | | | |
| 9 | | | | | | | | | | | | | |
| 10 | Relative Angle | 71.03 | 55.77 | 36.33 | 26.03 | 20.02 | 16.16 | 11.56 | 7.99 | 6.31 | 5.17 | 4.36 | 3.75 |
| 11 | ES Separation Dist, Km | 0.05 | 0.10 | 0.20 | 0.30 | 0.40 | 0.50 | 0.70 | 1.00 | 1.25 | 1.50 | 1.75 | 2.00 |
| 12 | TT to BSS ES Az Angle degrees | | | | | | | Calculated RSSI | | | | | |
| 76 | 51 | 147.2 | 148.3 | 145.1 | 146.7 | 140.2 | 137.6 | 136.4 | 137.3 | 138.4 | 139.6 | 140.7 | 141.7 |
| 77 | 53 | 147.4 | 148.5 | 145.3 | 146.9 | 140.4 | 137.8 | 136.6 | 137.5 | 138.6 | 139.8 | 140.9 | 141.9 |
| 78 | 55 | 147.6 | 148.7 | 145.5 | 147.1 | 140.6 | 138.0 | 136.8 | 137.7 | 138.8 | 140.0 | 141.1 | 142.1 |
| 79 | 57 | 147.6 | 148.9 | 145.7 | 147.3 | 140.8 | 138.2 | 137.0 | 137.9 | 139.0 | 140.2 | 141.3 | 142.3 |
| 80 | 59 | 148.0 | 149.1 | 145.9 | 147.5 | 141.0 | 138.4 | 137.2 | 138.1 | 139.2 | 140.4 | 141.5 | 142.5 |
| 81 | 61 | 148.2 | 149.3 | 146.1 | 147.7 | 141.2 | 138.6 | 137.4 | 138.3 | 139.4 | 140.6 | 141.7 | 142.7 |
| 82 | 63 | 148.6 | 149.7 | 146.5 | 148.1 | 141.6 | 139.0 | 137.8 | 138.7 | 139.8 | 141.0 | 142.1 | 143.1 |
| 83 | 65 | 148.9 | 150.0 | 146.8 | 148.4 | 141.9 | 139.3 | 138.1 | 139.0 | 140.1 | 141.3 | 142.4 | 143.4 |
| 84 | 67 | 149.1 | 150.2 | 147.0 | 148.6 | 142.1 | 139.5 | 138.3 | 139.2 | 140.3 | 141.5 | 142.6 | 143.6 |
| 85 | 69 | 149.5 | 150.6 | 147.4 | 149.0 | 142.5 | 139.9 | 138.7 | 139.6 | 140.7 | 141.9 | 143.0 | 144.0 |
| 86 | 71 | 149.8 | 150.9 | 147.7 | 149.3 | 142.6 | 140.2 | 139.0 | 139.9 | 141.0 | 142.2 | 143.3 | 144.3 |
| 87 | 73 | 149.6 | 150.7 | 147.5 | 149.1 | 142.6 | 140.0 | 138.8 | 139.7 | 140.8 | 142.0 | 143.1 | 144.1 |
| 88 | 75 | 150.4 | 151.5 | 148.3 | 149.9 | 143.4 | 140.8 | 139.6 | 140.5 | 141.6 | 142.8 | 143.9 | 144.9 |
| 89 | 77 | 150.7 | 151.8 | 148.6 | 150.2 | 143.7 | 141.1 | 139.9 | 140.8 | 141.9 | 145.1 | 144.2 | 145.2 |
| 90 | 79 | 151.0 | 152.1 | 148.9 | 150.5 | 144.0 | 141.4 | 140.2 | 141.1 | 142.2 | 143.4 | 144.5 | 145.5 |
| 91 | 81 | 151.4 | 152.5 | 149.3 | 150.9 | 144.4 | 141.8 | 140.6 | 141.5 | 142.6 | 143.8 | 144.9 | 145.9 |
| 92 | 83 | 151.1 | 152.2 | 149.0 | 150.6 | 144.1 | 141.5 | 140.3 | 141.2 | 142.3 | 143.5 | 144.6 | 145.6 |
| 93 | 85 | 152.4 | 153.5 | 150.3 | 151.9 | 145.4 | 142.8 | 141.6 | 142.5 | 143.6 | 144.8 | 145.9 | 146.9 |
| 94 | 87 | 152.6 | 153.7 | 150.5 | 152.1 | 145.6 | 143.0 | 141.8 | 142.7 | 143.8 | 145.0 | 146.1 | 147.1 |
| 95 | 89 | 153.4 | 154.5 | 151.3 | 152.9 | 146.4 | 143.8 | 142.6 | 143.5 | 144.6 | 145.8 | 146.9 | 147.9 |
| 96 | 90 | 153.6 | 154.7 | 151.5 | 153.1 | 146.6 | 144.0 | 142.8 | 143.7 | 144.8 | 146.0 | 147.1 | 148.1 |
| 97 | 95 | 155.1 | 156.2 | 153.0 | 154.6 | 148.1 | 145.5 | 144.3 | 145.2 | 146.3 | 147.5 | 148.6 | 149.6 |
| 98 | 100 | 156.6 | 157.7 | 154.5 | 156.1 | 149.6 | 147.0 | 145.8 | 146.7 | 147.8 | 149.0 | 150.1 | 151.1 |
| 99 | 105 | 157.8 | 158.9 | 155.7 | 157.3 | 150.9 | 148.3 | 147.1 | 147.9 | 149.1 | 150.2 | 151.3 | 152.3 |
| 100 | 110 | 199.1 | 160.2 | 157.0 | 158.6 | 152.1 | 149.5 | 148.3 | 149.2 | 150.3 | 151.5 | 152.6 | 153.6 |
| 101 | 115 | 161.1 | 162.2 | 159.0 | 160.6 | 154.1 | 151.5 | 150.3 | 151.2 | 152.3 | 153.5 | 154.6 | 155.6 |
| 102 | 120 | 163.1 | 164.2 | 161.0 | 162.6 | 156.1 | 153.5 | 152.3 | 153.2 | 154.3 | 155.5 | 156.6 | 157.6 |
| 103 | 125 | 163.1 | 164.2 | 161.0 | 162.6 | 156.1 | 153.5 | 152.3 | 153.2 | 154.3 | 155.5 | 156.6 | 157.6 |
| 104 | 130 | 165.1 | 166.2 | 163.0 | 164.6 | 158.1 | 155.5 | 154.3 | 155.2 | 156.3 | 157.5 | 158.6 | 159.6 |
| 105 | 135 | 167.1 | 168.2 | 165.0 | 166.6 | 157.1 | 157.5 | 156.3 | 157.2 | 158.3 | 159.5 | 160.6 | 161.6 |
| 106 | 140 | 169.1 | 170.2 | 167.0 | 168.6 | 159.1 | 159.5 | 158.3 | 159.2 | 160.3 | 161.5 | 162.6 | 163.6 |
| 107 | 145 | 171.1 | 172.2 | 169.0 | 170.6 | 161.1 | 161.5 | 160.3 | 161.2 | 162.3 | 163.5 | 164.6 | 165.6 |
| 108 | 150 | 173.1 | 174.2 | 171.0 | 172.6 | 163.1 | 163.5 | 162.3 | 163.2 | 164.3 | 165.5 | 166.6 | 167.6 |
| 109 | 155 | 175.1 | 176.2 | 173.0 | 174.6 | 165.1 | 165.5 | 164.3 | 165.2 | 166.3 | 167.5 | 168.6 | 169.6 |
| 110 | 160 | 177.1 | 178.2 | 175.0 | 176.6 | 167.1 | 167.5 | 166.3 | 167.2 | 168.3 | 169.5 | 170.6 | 171.6 |
| 111 | 165 | 179.1 | 180.2 | 177.0 | 178.6 | 169.1 | 169.5 | 168.3 | 169.2 | 170.3 | 171.5 | 172.6 | 173.6 |
| 112 | 170 | 181.1 | 182.2 | 179.0 | 180.6 | 174.1 | 171.5 | 170.3 | 171.2 | 172.3 | 173.5 | 174.6 | 175.6 |
| 113 | 175 | 183.1 | 184.2 | 181.0 | 182.6 | 176.1 | 173.5 | 172.3 | 173.2 | 174.3 | 175.5 | 176.6 | 177.6 |

| A | B | O | P | Q | R | S | T | U | V | W | X |
|---|---|---|---|---|---|---|---|---|---|---|---|
| 1 | Tile Angle degrees | | | | | | | | | | |
| 2 | Tower Height m | | | | | | | | | | |
| 3 | Max Range km | | | | | | | | | | |
| 4 | | | | | | | | | | | |
| 5 | Amp Power dBw | | | | | | | | | | |
| 6 | Line Losses dB | | | | | | | | | | |
| 7 | Peak Npt Xmit Gain, dBi | | | | | | | | | | |
| 8 | Atmospheric Abs dB | | | | | | | | | | |
| 9 | | | | | | | | | | | |
| 10 | Relative Angle | 3.28 | 2.90 | 2.58 | 2.33 | 2.11 | 1.92 | 1.75 | 1.61 | 1.48 | 1.37 |
| 11 | ES Separation Dist, Km | 2.25 | 2.50 | 2.75 | 3.00 | 3.25 | 3.50 | 3.75 | 4.00 | 4.25 | 4.50 |
| 12 | TT to BSS ES Az Angle degrees | | | | | | | | | | |
| 76 | 51 | 142.6 | 143.4 | 166.2 | 144.9 | 145.6 | 146.2 | 146.8 | 147.3 | 147.8 | 148.3 |
| 77 | 53 | 142.8 | 143.6 | 144.4 | 145.1 | 145.8 | 146.4 | 147.0 | 147.5 | 148.0 | 148.5 |
| 78 | 55 | 143.0 | 143.8 | 144.6 | 145.3 | 146.0 | 146.6 | 147.2 | 147.7 | 148.2 | 148.7 |
| 79 | 57 | 143.2 | 144.0 | 144.8 | 145.5 | 146.2 | 146.8 | 147.4 | 147.9 | 148.4 | 148.9 |
| 80 | 59 | 143.4 | 144.2 | 145.0 | 145.7 | 146.4 | 147.0 | 147.6 | 148.1 | 148.6 | 149.1 |
| 81 | 61 | 143.6 | 144.4 | 145.2 | 145.9 | 146.6 | 147.2 | 147.8 | 148.3 | 148.8 | 149.3 |

TABLE 7-continued

| | | | | | | | | | | | |
|---|---|---|---|---|---|---|---|---|---|---|---|
| 82 | 63 | 144.0 | 144.8 | 145.6 | 146.3 | 147.0 | 147.6 | 148.2 | 148.7 | 149.2 | 149.7 |
| 83 | 65 | 144.3 | 145.1 | 145.9 | 146.6 | 147.3 | 147.9 | 148.5 | 149.0 | 149.5 | 150.0 |
| 84 | 67 | 144.5 | 145.3 | 146.1 | 146.8 | 147.5 | 148.1 | 148.7 | 149.2 | 149.7 | 150.2 |
| 85 | 69 | 144.9 | 145.7 | 148.5 | 147.2 | 147.9 | 148.5 | 149.1 | 149.6 | 150.1 | 150.6 |
| 86 | 71 | 145.2 | 146.0 | 146.8 | 147.5 | 148.2 | 148.8 | 149.4 | 149.9 | 150.4 | 150.9 |
| 87 | 73 | 145.0 | 145.8 | 146.6 | 147.3 | 148.0 | 148.6 | 149.2 | 149.7 | 150.2 | 150.7 |
| 88 | 75 | 145.8 | 146.6 | 147.4 | 148.1 | 148.8 | 149.4 | 150.0 | 150.5 | 151.0 | 151.5 |
| 89 | 77 | 146.1 | 146.9 | 147.7 | 148.4 | 149.1 | 149.7 | 150.3 | 140.8 | 151.3 | 151.8 |
| 90 | 79 | 146.4 | 147.2 | 148.0 | 148.7 | 149.4 | 150.0 | 150.6 | 151.1 | 151.6 | 152.1 |
| 91 | 81 | 146.8 | 147.6 | 148.4 | 149.1 | 149.8 | 150.4 | 151.0 | 151.5 | 152.0 | 152.5 |
| 92 | 83 | 146.5 | 147.3 | 148.1 | 148.8 | 149.5 | 150.1 | 150.7 | 151.2 | 151.7 | 152.2 |
| 93 | 85 | 147.8 | 148.6 | 149.4 | 150.1 | 150.8 | 151.4 | 152.0 | 152.5 | 153.0 | 153.5 |
| 94 | 87 | 148.0 | 148.8 | 149.6 | 150.3 | 151.0 | 151.6 | 152.2 | 152.7 | 153.2 | 153.7 |
| 95 | 89 | 148.8 | 149.6 | 150.4 | 151.1 | 151.8 | 152.4 | 153.0 | 153.5 | 154.0 | 154.5 |
| 96 | 90 | 149.0 | 149.8 | 150.6 | 151.3 | 152.0 | 152.6 | 153.2 | 153.7 | 154.2 | 154.7 |
| 97 | 95 | 150.5 | 151.3 | 152.1 | 152.8 | 153.5 | 154.1 | 154.7 | 155.2 | 155.7 | 156.2 |
| 98 | 100 | 152.0 | 152.8 | 153.6 | 154.3 | 155.0 | 155.6 | 156.2 | 156.7 | 157.2 | 157.7 |
| 99 | 105 | 153.2 | 154.1 | 154.8 | 155.6 | 156.2 | 156.8 | 157.4 | 158.0 | 158.5 | 159.0 |
| 100 | 110 | 154.5 | 155.3 | 156.1 | 156.8 | 157.5 | 158.1 | 158.7 | 159.2 | 159.7 | 160.2 |
| 101 | 115 | 156.5 | 157.3 | 158.1 | 158.8 | 159.5 | 160.1 | 160.7 | 161.2 | 161.7 | 162.2 |
| 102 | 120 | 158.5 | 159.3 | 160.1 | 160.8 | 161.5 | 162.1 | 162.7 | 163.2 | 163.7 | 164.2 |
| 103 | 125 | 158.5 | 159.3 | 160.1 | 160.8 | 161.5 | 162.1 | 162.7 | 163.2 | 163.7 | 164.2 |
| 104 | 130 | 160.5 | 161.3 | 162.1 | 162.8 | 163.5 | 164.1 | 164.7 | 165.2 | 165.7 | 166.2 |
| 105 | 135 | 162.5 | 163.3 | 164.1 | 164.8 | 165.5 | 166.1 | 166.7 | 167.2 | 167.7 | 168.2 |
| 106 | 140 | 164.5 | 165.3 | 166.1 | 166.8 | 167.5 | 168.1 | 168.7 | 169.2 | 169.7 | 170.2 |
| 107 | 145 | 166.5 | 167.3 | 168.1 | 168.8 | 169.5 | 170.1 | 170.7 | 171.2 | 171.7 | 172.2 |
| 108 | 150 | 168.5 | 169.3 | 170.1 | 170.8 | 171.5 | 172.1 | 172.7 | 173.2 | 173.7 | 174.2 |
| 109 | 155 | 170.5 | 171.3 | 172.1 | 172.8 | 173.5 | 174.1 | 174.7 | 175.2 | 175.7 | 176.2 |
| 110 | 160 | 172.5 | 173.3 | 174.1 | 174.8 | 175.5 | 176.1 | 176.7 | 177.2 | 177.7 | 178.2 |
| 111 | 165 | 174.5 | 175.3 | 176.1 | 176.8 | 177.5 | 178.1 | 178.7 | 179.2 | 179.7 | 180.2 |
| 112 | 170 | 176.5 | 177.3 | 178.1 | 178.8 | 179.5 | 180.1 | 180.7 | 181.2 | 181.7 | 182.2 |
| 113 | 175 | 178.5 | 179.3 | 180.1 | 180.8 | 181.5 | 182.1 | 182.7 | 183.2 | 183.7 | 184.2 |

| A | B | Y | Z | AA | AB | AC | AD | AE |
|---|---|---|---|---|---|---|---|---|
| 1 | Tile Angle degrees | | | | | | | |
| 2 | Tower Height m | | | | | | | |
| 3 | Max Range km | | | | | | | |
| 4 | | | | | | | | |
| 5 | Amp Power dBw | | | | | | | |
| 6 | Line Losses dB | | | | | | | |
| 7 | Peak Npt Xmit Gain, dBi | | | | | | | |
| 8 | Atmospheric Abs dB | | | | | | | |
| 9 | | | | | | | | |
| 10 | Relative Angle | 1.27 | 1.18 | 1.10 | 1.03 | 0.96 | 0.89 | 0.84 |
| 11 | ES Separation Dist, Km | 4.75 | 5.00 | 5.25 | 5.50 | 5.75 | 6.00 | 6.25 |
| 12 | TT to BSS ES Az Angle degrees | | | | | | | |
| 76 | 51 | 148.8 | 149.2 | 149.6 | 150.0 | 150.4 | 150.8 | 151.1 |
| 77 | 53 | 149.0 | 149.4 | 149.8 | 150.2 | 150.6 | 151.0 | 151.3 |
| 78 | 55 | 149.2 | 149.6 | 150.0 | 150.4 | 150.8 | 151.2 | 151.5 |
| 79 | 57 | 149.4 | 149.8 | 150.2 | 150.6 | 151.0 | 151.4 | 151.7 |
| 80 | 59 | 149.6 | 150.0 | 150.4 | 150.8 | 151.2 | 151.6 | 151.9 |
| 81 | 61 | 149.8 | 150.2 | 150.6 | 151.0 | 151.4 | 151.8 | 152.1 |
| 82 | 63 | 150.2 | 150.6 | 151.0 | 151.4 | 151.8 | 152.2 | 152.5 |
| 83 | 65 | 150.5 | 150.9 | 151.3 | 151.7 | 152.1 | 152.5 | 152.8 |
| 84 | 67 | 150.7 | 151.1 | 151.5 | 151.9 | 152.3 | 152.7 | 153.0 |
| 85 | 69 | 151.1 | 151.5 | 151.9 | 152.3 | 152.7 | 153.1 | 153.4 |
| 86 | 71 | 151.4 | 151.8 | 152.2 | 152.6 | 153.0 | 153.4 | 153.7 |
| 87 | 73 | 151.2 | 151.6 | 152.0 | 152.4 | 152.8 | 153.2 | 153.5 |
| 88 | 75 | 152.0 | 152.4 | 152.8 | 153.2 | 153.6 | 154.0 | 154.3 |
| 89 | 77 | 152.3 | 152.7 | 153.1 | 153.5 | 153.9 | 154.3 | 154.6 |
| 90 | 79 | 152.6 | 153.0 | 153.4 | 153.8 | 154.2 | 154.6 | 154.9 |
| 91 | 81 | 153.0 | 153.4 | 153.8 | 154.2 | 154.6 | 155.0 | 155.3 |
| 92 | 83 | 152.7 | 153.1 | 153.5 | 153.9 | 154.3 | 154.7 | 155.0 |
| 93 | 85 | 154.0 | 154.4 | 154.8 | 155.2 | 155.6 | 156.0 | 156.3 |
| 94 | 87 | 154.2 | 154.6 | 155.0 | 155.4 | 155.8 | 156.2 | 156.5 |
| 95 | 89 | 155.0 | 155.4 | 155.8 | 156.2 | 156.6 | 157.0 | 157.3 |
| 96 | 90 | 155.2 | 155.6 | 156.0 | 156.4 | 156.8 | 157.2 | 157.5 |
| 97 | 95 | 156.7 | 157.1 | 157.5 | 157.9 | 158.3 | 158.7 | 159.0 |
| 98 | 100 | 158.2 | 158.6 | 159.0 | 159.4 | 159.8 | 160.2 | 160.5 |
| 99 | 105 | 159.4 | 159.9 | 160.3 | 150.7 | 161.1 | 161.4 | 161.8 |
| 100 | 110 | 160.7 | 161.1 | 161.5 | 161.9 | 162.3 | 162.7 | 163.0 |
| 101 | 115 | 162.7 | 163.1 | 163.5 | 163.9 | 164.3 | 164.7 | 165.0 |
| 102 | 120 | 164.7 | 165.1 | 165.5 | 165.9 | 166.3 | 166.7 | 167.0 |
| 103 | 125 | 164.7 | 165.1 | 165.5 | 165.9 | 166.3 | 166.7 | 167.0 |
| 104 | 130 | 166.7 | 167.1 | 167.5 | 167.9 | 168.3 | 168.7 | 169.0 |
| 105 | 135 | 168.7 | 169.1 | 169.5 | 169.9 | 170.3 | 170.7 | 171.0 |
| 106 | 140 | 170.7 | 171.1 | 171.5 | 171.9 | 172.3 | 172.7 | 173.0 |

TABLE 7-continued

| | | | | | | | | |
|---|---|---|---|---|---|---|---|---|
| 107 | 145 | 172.7 | 173.1 | 173.5 | 173.9 | 174.3 | 174.7 | 175.0 |
| 108 | 150 | 174.7 | 175.1 | 175.5 | 175.9 | 176.3 | 176.7 | 177.0 |
| 109 | 155 | 176.7 | 177.1 | 177.5 | 177.9 | 178.3 | 178.7 | 179.0 |
| 110 | 160 | 178.7 | 179.1 | 179.5 | 179.9 | 180.3 | 180.7 | 181.0 |
| 111 | 165 | 180.7 | 181.1 | 181.5 | 181.9 | 182.3 | 182.7 | 183.0 |
| 112 | 170 | 182.7 | 183.1 | 183.5 | 183.9 | 184.3 | 184.7 | 185.0 |
| 113 | 175 | 184.7 | 185.1 | 185.5 | 185.9 | 186.3 | 186.7 | 187.0 |

| | B | AF | AG | AH | AI | AJ | AK | AL | AM | AN | AO | AP | AQ |
|---|---|---|---|---|---|---|---|---|---|---|---|---|---|
| 1 | Tile Angle degrees | | | | | | | | | | | | |
| 2 | Tower Height m | | | | | | | | | | | | |
| 3 | Max Range km | | | | | | | | | | | | |
| 4 | | | | | | | | | | | | | |
| 5 | Amp Power dBw | | | | | | | | | | | | |
| 6 | Line Losses dB | | | | | | | | | | | | |
| 7 | Peak Npt Xmit Gain, dBi | | | | | | | | | | | | |
| 8 | Atmospheric Abs dB | | | | | | | | | | | | |
| 9 | | | | | | | | | | | | | |
| 10 | Relative Angle | 0.78 | 0.74 | 0.69 | 0.65 | 0.61 | 0.57 | 0.54 | 0.50 | 0.47 | 0.44 | 0.42 | 0.39 |
| 11 | ES Separation Dist, Km | 6.50 | 6.75 | 7.00 | 7.25 | 7.50 | 7.75 | 8.00 | 8.25 | 8.50 | 8.75 | 9.00 | 9.25 |
| 12 | TT to BSS ES Az Angle degrees | | | | | | | | | | | | |
| 76 | 51 | 151.5 | 151.8 | 152.1 | 152.4 | 152.7 | 153.0 | 153.3 | 153.5 | 153.8 | 154.0 | 154.3 | 154.5 |
| 77 | 53 | 151.7 | 152.0 | 152.3 | 152.6 | 152.9 | 153.2 | 153.5 | 153.7 | 154.0 | 154.2 | 154.5 | 154.7 |
| 78 | 55 | 151.9 | 152.2 | 152.5 | 152.8 | 153.1 | 153.4 | 153.7 | 153.9 | 154.2 | 154.4 | 154.7 | 154.9 |
| 79 | 57 | 152.1 | 152.4 | 152.7 | 153.0 | 153.3 | 153.6 | 153.9 | 154.1 | 154.4 | 154.6 | 154.9 | 155.1 |
| 80 | 59 | 152.3 | 152.6 | 152.9 | 153.2 | 153.5 | 153.8 | 154.1 | 154.3 | 154.6 | 154.8 | 155.1 | 155.3 |
| 81 | 61 | 152.5 | 152.8 | 153.1 | 153.4 | 153.7 | 154.0 | 154.3 | 154.5 | 154.8 | 155.0 | 155.3 | 155.5 |
| 82 | 63 | 152.9 | 153.2 | 153.5 | 153.8 | 154.1 | 154.4 | 154.7 | 154.9 | 155.2 | 155.4 | 155.7 | 155.9 |
| 83 | 65 | 153.2 | 153.5 | 153.9 | 154.1 | 154.4 | 154.7 | 155.0 | 155.2 | 155.5 | 155.7 | 156.0 | 156.2 |
| 84 | 67 | 153.4 | 153.7 | 154.0 | 154.3 | 154.6 | 154.9 | 155.2 | 155.4 | 155.7 | 155.9 | 156.2 | 156.4 |
| 85 | 69 | 153.8 | 154.1 | 154.4 | 154.7 | 155.0 | 155.3 | 155.6 | 155.8 | 156.1 | 156.3 | 156.6 | 156.8 |
| 86 | 71 | 154.1 | 154.4 | 154.7 | 155.0 | 155.3 | 155.6 | 155.9 | 156.1 | 156.4 | 156.6 | 156.9 | 157.1 |
| 87 | 73 | 153.9 | 154.2 | 154.5 | 154.8 | 155.1 | 155.4 | 155.7 | 155.9 | 156.2 | 156.4 | 156.7 | 156.9 |
| 88 | 75 | 154.7 | 155.0 | 155.3 | 155.6 | 155.9 | 156.2 | 156.5 | 156.7 | 157.0 | 157.2 | 157.5 | 157.7 |
| 89 | 77 | 155.0 | 155.3 | 155.6 | 155.9 | 156.2 | 156.5 | 156.8 | 157.0 | 157.3 | 157.5 | 157.8 | 158.0 |
| 90 | 79 | 155.3 | 155.6 | 155.9 | 156.2 | 156.5 | 156.8 | 157.1 | 157.3 | 157.6 | 157.8 | 158.1 | 158.3 |
| 91 | 81 | 155.7 | 156.0 | 156.3 | 156.6 | 156.9 | 157.2 | 157.5 | 157.7 | 158.0 | 158.2 | 158.5 | 158.7 |
| 92 | 83 | 155.4 | 155.7 | 156.0 | 156.3 | 156.6 | 156.9 | 157.2 | 157.4 | 157.7 | 157.9 | 158.2 | 158.4 |
| 93 | 85 | 156.7 | 157.0 | 157.3 | 157.6 | 157.9 | 158.2 | 158.5 | 158.7 | 159.0 | 159.2 | 159.5 | 159.7 |
| 94 | 87 | 156.9 | 157.2 | 157.5 | 157.8 | 158.1 | 158.4 | 158.7 | 158.9 | 159.2 | 159.4 | 159.7 | 159.9 |
| 95 | 89 | 157.7 | 158.0 | 158.3 | 158.6 | 158.9 | 159.2 | 159.5 | 159.7 | 160.0 | 160.2 | 160.5 | 160.7 |
| 96 | 90 | 157.9 | 158.2 | 158.5 | 158.8 | 159.1 | 159.4 | 159.7 | 159.9 | 160.2 | 160.4 | 160.7 | 160.9 |
| 97 | 95 | 159.4 | 159.7 | 160.0 | 160.3 | 160.6 | 160.9 | 161.2 | 161.4 | 161.7 | 161.9 | 162.2 | 162.4 |
| 98 | 100 | 160.9 | 161.2 | 161.5 | 161.8 | 162.1 | 162.4 | 162.7 | 162.9 | 163.2 | 163.4 | 163.7 | 163.9 |
| 99 | 105 | 162.1 | 162.4 | 162.7 | 163.1 | 163.3 | 163.6 | 163.9 | 164.2 | 164.4 | 164.7 | 164.9 | 165.2 |
| 100 | 110 | 163.4 | 163.7 | 164.0 | 164.3 | 164.6 | 164.9 | 165.2 | 165.4 | 165.7 | 165.9 | 166.2 | 166.4 |
| 101 | 115 | 165.4 | 165.7 | 166.0 | 166.3 | 166.6 | 166.9 | 167.2 | 167.4 | 167.7 | 167.9 | 168.2 | 168.4 |
| 102 | 120 | 167.4 | 167.7 | 168.0 | 168.3 | 168.6 | 168.9 | 169.2 | 169.4 | 169.7 | 169.9 | 170.2 | 170.4 |
| 103 | 125 | 167.4 | 167.7 | 168.0 | 168.3 | 168.6 | 168.9 | 169.2 | 169.4 | 169.7 | 169.9 | 170.2 | 170.4 |
| 104 | 130 | 169.4 | 169.7 | 170.0 | 170.3 | 170.6 | 170.9 | 171.2 | 171.4 | 171.7 | 171.9 | 172.2 | 172.4 |
| 105 | 135 | 171.4 | 171.7 | 172.0 | 172.3 | 172.6 | 172.9 | 173.2 | 173.4 | 173.7 | 173.9 | 174.2 | 174.4 |
| 106 | 140 | 173.4 | 173.7 | 174.0 | 174.3 | 174.6 | 174.9 | 175.2 | 175.4 | 175.7 | 175.9 | 176.2 | 176.4 |
| 107 | 145 | 175.4 | 175.7 | 176.0 | 176.3 | 176.6 | 176.9 | 177.2 | 177.4 | 177.7 | 177.9 | 178.2 | 178.4 |
| 108 | 150 | 177.4 | 177.7 | 178.0 | 178.3 | 178.6 | 178.9 | 179.2 | 179.4 | 179.7 | 179.9 | 180.2 | 180.4 |
| 109 | 155 | 179.4 | 179.7 | 180.0 | 180.3 | 180.6 | 180.9 | 181.2 | 181.4 | 181.7 | 181.9 | 182.2 | 182.4 |
| 110 | 160 | 181.4 | 181.7 | 182.0 | 182.3 | 182.6 | 182.9 | 183.2 | 183.4 | 183.7 | 183.9 | 184.2 | 184.4 |
| 111 | 165 | 183.4 | 183.7 | 184.0 | 184.3 | 184.6 | 184.9 | 185.2 | 185.4 | 185.7 | 185.9 | 186.2 | 186.4 |
| 112 | 170 | 185.4 | 185.7 | 186.0 | 186.3 | 186.6 | 186.9 | 187.2 | 187.4 | 187.7 | 187.9 | 188.2 | 188.4 |
| 113 | 175 | 187.4 | 187.7 | 188.0 | 188.3 | 188.6 | 188.9 | 189.2 | 189.4 | 189.7 | 189.9 | 190.2 | 190.4 |

| | B | AR | AS | AT | AU | AV | AW | AK | AY |
|---|---|---|---|---|---|---|---|---|---|
| 1 | Tile Angle degrees | | | | | | | | |
| 2 | Tower Height m | | | | | | | | |
| 3 | Max Range km | | | | | | | | |
| 4 | | | | | | | | | |
| 5 | Amp Power dBw | | | | | | | | |
| 6 | Line Losses dB | | | | | | | | |
| 7 | Peak Npt Xmit Gain, dBi | | | | | | | | |
| 8 | Atmospheric Abs dB | | | | | | | | |
| 9 | | | | | | | | | |
| 10 | Relative Angle | 0.37 | 0.34 | 0.32 | 0.30 | 0.28 | 0.26 | 0.24 | 0.23 |
| 11 | ES Separation Dist, Km | 9.50 | 9.75 | 10.00 | 10.25 | 10.50 | 10.75 | 11.00 | 11.25 |
| 12 | TT to BSS ES Az Angle degrees | | | | | | | | |

TABLE 7-continued

| | | | | | | | | | |
|---|---|---|---|---|---|---|---|---|---|
| 76 | 51 | 154.7 | 155.0 | 155.2 | 155.4 | 155.6 | 155.8 | 156.0 | 156.2 |
| 77 | 53 | 154.9 | 155.2 | 155.4 | 155.6 | 155.8 | 156.0 | 156.2 | 156.4 |
| 78 | 55 | 155.1 | 155.4 | 155.6 | 155.8 | 156.0 | 156.2 | 156.4 | 156.6 |
| 79 | 57 | 155.3 | 155.6 | 155.8 | 156.0 | 156.2 | 156.4 | 156.6 | 156.8 |
| 80 | 59 | 155.5 | 155.8 | 156.0 | 156.2 | 156.4 | 156.6 | 156.8 | 157.0 |
| 81 | 61 | 155.7 | 156.0 | 156.2 | 156.4 | 156.6 | 156.8 | 157.0 | 157.2 |
| 82 | 63 | 156.1 | 156.4 | 156.6 | 156.8 | 157.0 | 157.2 | 157.4 | 157.6 |
| 83 | 65 | 156.4 | 156.7 | 156.9 | 157.1 | 157.3 | 157.5 | 157.7 | 157.9 |
| 84 | 67 | 156.6 | 156.9 | 157.1 | 157.3 | 157.5 | 157.7 | 157.9 | 158.1 |
| 85 | 69 | 157.0 | 157.3 | 157.5 | 157.7 | 157.9 | 158.1 | 158.3 | 158.5 |
| 86 | 71 | 157.3 | 157.6 | 157.8 | 158.0 | 158.2 | 158.4 | 158.6 | 158.8 |
| 87 | 73 | 157.1 | 157.4 | 157.6 | 157.8 | 158.0 | 158.2 | 158.4 | 158.6 |
| 88 | 75 | 157.9 | 158.2 | 158.4 | 158.6 | 158.8 | 159.0 | 159.2 | 159.4 |
| 89 | 77 | 158.2 | 158.5 | 158.7 | 158.9 | 159.1 | 159.3 | 159.5 | 159.7 |
| 90 | 79 | 158.5 | 158.8 | 159.0 | 159.2 | 159.4 | 159.6 | 159.8 | 160.0 |
| 91 | 81 | 158.9 | 159.2 | 159.4 | 159.6 | 159.8 | 160.0 | 160.2 | 160.4 |
| 92 | 83 | 158.6 | 158.9 | 159.1 | 159.3 | 159.5 | 159.7 | 159.9 | 160.1 |
| 93 | 85 | 159.9 | 160.2 | 160.4 | 160.6 | 160.8 | 161.0 | 161.2 | 161.4 |
| 94 | 87 | 160.1 | 160.4 | 160.6 | 160.8 | 161.0 | 161.2 | 161.4 | 161.6 |
| 95 | 89 | 160.9 | 161.2 | 161.4 | 161.6 | 161.8 | 162.0 | 162.2 | 162.4 |
| 96 | 90 | 161.1 | 161.4 | 161.6 | 161.8 | 162.0 | 162.2 | 162.4 | 162.6 |
| 97 | 95 | 162.6 | 162.9 | 163.1 | 163.3 | 163.5 | 163.7 | 163.9 | 164.1 |
| 98 | 100 | 164.1 | 164.4 | 164.6 | 164.8 | 165.0 | 165.2 | 165.4 | 165.6 |
| 99 | 105 | 165.4 | 165.6 | 165.8 | 166.0 | 166.3 | 166.5 | 166.7 | 166.9 |
| 100 | 110 | 166.6 | 166.9 | 167.1 | 167.3 | 167.5 | 167.7 | 167.9 | 168.1 |
| 101 | 115 | 168.6 | 168.9 | 169.1 | 169.3 | 169.5 | 169.7 | 169.9 | 170.1 |
| 102 | 120 | 170.6 | 170.9 | 171.1 | 171.3 | 171.5 | 171.7 | 171.9 | 172.1 |
| 103 | 125 | 170.6 | 170.9 | 171.1 | 171.3 | 171.5 | 171.7 | 171.9 | 172.1 |
| 104 | 130 | 172.6 | 172.9 | 173.1 | 173.3 | 173.5 | 173.7 | 173.9 | 174.1 |
| 105 | 135 | 174.6 | 174.9 | 175.1 | 175.3 | 175.5 | 175.7 | 175.9 | 176.1 |
| 106 | 140 | 176.6 | 176.9 | 177.1 | 177.3 | 177.5 | 177.7 | 177.9 | 178.1 |
| 107 | 145 | 178.6 | 178.9 | 179.1 | 179.3 | 179.5 | 179.7 | 179.9 | 180.1 |
| 108 | 150 | 180.6 | 180.9 | 181.1 | 181.3 | 181.5 | 181.7 | 181.9 | 182.1 |
| 109 | 155 | 182.6 | 182.9 | 183.1 | 183.3 | 183.5 | 183.7 | 183.9 | 184.1 |
| 110 | 160 | 184.6 | 184.9 | 185.1 | 185.3 | 185.5 | 185.7 | 185.9 | 186.1 |
| 111 | 165 | 186.6 | 186.9 | 187.1 | 187.3 | 187.5 | 187.7 | 187.9 | 188.1 |
| 112 | 170 | 188.6 | 188.9 | 189.1 | 189.3 | 189.5 | 189.7 | 189.9 | 190.1 |
| 113 | 175 | 190.6 | 190.9 | 191.1 | 191.3 | 191.5 | 191.7 | 191.9 | 192.1 |

| | B | AZ | BA | BB | BC | BD | BE | BF | BG |
|---|---|---|---|---|---|---|---|---|---|
| 1 | Tile Angle degrees | | | | | | | | |
| 2 | Tower Height m | | | | | | | | |
| 3 | Max Range km | | | | | | | | |
| 4 | | | | | | | | | |
| 5 | Amp Power dBw | | | | | | | | |
| 6 | Line Losses dB | | | | | | | | |
| 7 | Peak Npt Xmit Gain, dBi | | | | | | | | |
| 8 | Atmospheric Abs dB | | | | | | | | |
| 9 | | | | | | | | | |
| 10 | Relative Angle | 0.21 | 0.19 | 0.18 | 0.16 | 0.15 | 0.14 | 0.12 | 0.11 |
| 11 | ES Separation Dist, Km | 11.50 | 11.75 | 12.00 | 12.25 | 12.50 | 12.75 | 13.00 | 13.25 |
| 12 | TT to BSS ES Az Angle degrees | | | | | | | | |
| 76 | 51 | 156.4 | 156.6 | 156.8 | 156.9 | 157.1 | 157.3 | 157.5 | 157.6 |
| 77 | 53 | 156.6 | 156.8 | 157.0 | 157.1 | 157.3 | 157.5 | 157.7 | 157.8 |
| 78 | 55 | 156.8 | 157.0 | 157.2 | 157.3 | 157.5 | 157.7 | 157.9 | 158.0 |
| 79 | 57 | 157.0 | 157.2 | 157.4 | 157.5 | 157.7 | 157.9 | 158.1 | 158.2 |
| 80 | 59 | 157.2 | 157.4 | 157.6 | 157.7 | 157.9 | 158.1 | 158.3 | 158.4 |
| 81 | 61 | 157.4 | 157.6 | 157.8 | 157.9 | 158.1 | 158.3 | 158.5 | 158.6 |
| 82 | 63 | 157.8 | 158.0 | 158.2 | 158.3 | 158.5 | 158.7 | 158.9 | 159.0 |
| 83 | 65 | 158.1 | 158.3 | 158.5 | 158.6 | 158.8 | 159.0 | 159.2 | 159.3 |
| 84 | 67 | 158.3 | 158.5 | 158.7 | 158.8 | 159.0 | 159.2 | 159.4 | 159.5 |
| 85 | 69 | 158.7 | 158.9 | 159.1 | 159.2 | 159.4 | 159.6 | 159.8 | 159.9 |
| 86 | 71 | 159.0 | 159.2 | 159.4 | 159.5 | 159.7 | 159.9 | 160.1 | 160.2 |
| 87 | 73 | 158.8 | 159.0 | 159.2 | 159.3 | 159.5 | 159.7 | 159.9 | 160.0 |
| 88 | 75 | 159.6 | 159.8 | 160.0 | 160.1 | 160.3 | 160.5 | 160.7 | 160.8 |
| 89 | 77 | 159.9 | 160.1 | 160.3 | 160.4 | 160.6 | 160.8 | 161.0 | 161.1 |
| 90 | 79 | 160.2 | 160.4 | 160.6 | 160.7 | 160.9 | 161.1 | 161.3 | 161.4 |
| 91 | 81 | 160.6 | 160.8 | 161.0 | 161.1 | 161.3 | 161.5 | 161.7 | 161.8 |
| 92 | 83 | 160.3 | 160.5 | 160.7 | 160.8 | 161.0 | 161.2 | 161.4 | 161.5 |
| 93 | 85 | 161.6 | 161.8 | 162.0 | 162.1 | 162.3 | 162.5 | 162.7 | 162.8 |
| 94 | 87 | 161.8 | 162.0 | 162.2 | 162.3 | 162.5 | 162.7 | 162.9 | 163.0 |
| 95 | 89 | 162.6 | 162.8 | 163.0 | 163.1 | 163.3 | 163.5 | 163.7 | 163.8 |
| 96 | 90 | 162.8 | 163.0 | 163.2 | 163.3 | 163.5 | 163.7 | 163.9 | 164.0 |
| 97 | 95 | 164.3 | 164.5 | 164.7 | 164.8 | 165.0 | 165.2 | 165.4 | 165.5 |
| 98 | 100 | 165.8 | 166.0 | 166.2 | 166.3 | 166.5 | 166.7 | 166.9 | 167.0 |
| 99 | 105 | 167.0 | 167.2 | 167.4 | 167.6 | 167.8 | 167.9 | 168.1 | 168.3 |
| 100 | 110 | 168.3 | 168.5 | 168.7 | 168.8 | 169.0 | 169.2 | 169.4 | 169.5 |

TABLE 7-continued

| | | | | | | | | | |
|---|---|---|---|---|---|---|---|---|---|
| 101 | 115 | 170.3 | 170.5 | 170.7 | 170.8 | 171.0 | 171.2 | 171.4 | 171.5 |
| 102 | 120 | 172.3 | 172.5 | 172.7 | 172.8 | 173.0 | 173.2 | 173.4 | 173.5 |
| 103 | 125 | 172.3 | 172.5 | 172.7 | 172.8 | 173.0 | 173.2 | 173.4 | 173.5 |
| 104 | 130 | 174.3 | 174.5 | 174.7 | 174.8 | 175.0 | 175.2 | 175.4 | 175.5 |
| 105 | 135 | 176.3 | 176.5 | 176.7 | 176.8 | 177.0 | 177.2 | 177.4 | 177.5 |
| 106 | 140 | 178.3 | 178.5 | 178.7 | 178.8 | 179.0 | 179.2 | 179.4 | 179.5 |
| 107 | 145 | 180.3 | 180.5 | 180.7 | 180.8 | 181.0 | 181.2 | 181.4 | 181.5 |
| 108 | 150 | 182.3 | 182.5 | 182.7 | 182.8 | 183.0 | 183.2 | 183.4 | 183.5 |
| 109 | 155 | 184.3 | 184.5 | 184.7 | 184.8 | 185.0 | 185.2 | 185.4 | 185.5 |
| 110 | 160 | 186.3 | 186.5 | 186.7 | 186.8 | 187.0 | 187.2 | 187.4 | 187.5 |
| 111 | 165 | 188.3 | 188.5 | 188.7 | 188.8 | 189.0 | 189.2 | 189.4 | 189.5 |
| 112 | 170 | 190.3 | 190.5 | 190.7 | 190.8 | 191.0 | 191.2 | 191.4 | 191.5 |
| 113 | 175 | 192.3 | 192.5 | 192.7 | 192.8 | 193.0 | 193.2 | 193.4 | 193.5 |

| | B | BH | BI | BJ | BK | BL | BM | BN | BO | BP | BQ | BR | BS |
|---|---|---|---|---|---|---|---|---|---|---|---|---|---|
| 1 | Tile Angle degrees | | | | | | | | | | | | |
| 2 | Tower Height m | | | | | | | | | | | | |
| 3 | Max Range km | | | | | | | | | | | | |
| 4 | | | | | | | | | | | | | |
| 5 | Amp Power dBw | | | | | | | | | | | | |
| 6 | Line Losses dB | | | | | | | | | | | | |
| 7 | Peak Npt Xmit Gain, dBi | | | | | | | | | | | | |
| 8 | Atmospheric Abs dB | | | | | | | | | | | | |
| 9 | | | | | | | | | | | | | |
| 10 | Relative Angle | 0.10 | 0.09 | 0.08 | 0.07 | 0.06 | 0.05 | 0.04 | 0.03 | 0.02 | 0.01 | 0.00 | 0.01 |
| 11 | ES Separation Dist, Km | 13.50 | 13.75 | 14.00 | 14.25 | 14.50 | 14.75 | 15.00 | 15.25 | 15.50 | 15.75 | 160.00 | 16.25 |
| 12 | TT to BSS ES Az Angle degrees | | | | | | | | | | | | |
| 76 | 51 | 157.8 | 157.9 | 158.1 | 158.3 | 158.4 | 158.6 | 158.7 | 158.8 | 159.0 | 159.1 | 159.3 | 159.4 |
| 77 | 53 | 158.0 | 158.1 | 158.3 | 158.5 | 158.6 | 158.8 | 158.9 | 159.0 | 159.2 | 159.3 | 159.5 | 159.6 |
| 78 | 55 | 158.2 | 158.3 | 158.5 | 158.7 | 158.8 | 159.0 | 159.1 | 159.2 | 159.4 | 159.5 | 159.7 | 159.8 |
| 79 | 57 | 158.4 | 158.5 | 158.7 | 158.9 | 159.0 | 159.2 | 159.3 | 159.4 | 159.6 | 159.7 | 159.9 | 160.0 |
| 80 | 59 | 158.6 | 158.7 | 158.9 | 159.1 | 159.2 | 159.4 | 159.5 | 159.6 | 159.8 | 159.9 | 160.1 | 160.2 |
| 81 | 61 | 158.8 | 158.9 | 159.1 | 159.3 | 159.4 | 159.6 | 159.7 | 159.8 | 160.0 | 160.1 | 160.3 | 160.4 |
| 82 | 63 | 159.2 | 159.3 | 159.5 | 159.7 | 159.8 | 160.0 | 160.1 | 160.2 | 160.4 | 160.5 | 160.7 | 160.8 |
| 83 | 65 | 159.5 | 159.6 | 159.8 | 160.0 | 160.1 | 160.3 | 160.4 | 160.5 | 160.7 | 160.8 | 161.0 | 161.1 |
| 84 | 67 | 159.7 | 159.8 | 160.0 | 160.2 | 160.3 | 160.5 | 160.6 | 160.7 | 160.9 | 161.0 | 161.2 | 161.3 |
| 85 | 69 | 160.1 | 160.2 | 160.4 | 160.6 | 160.7 | 160.9 | 161.0 | 161.1 | 161.3 | 161.4 | 161.6 | 161.7 |
| 86 | 71 | 160.4 | 160.5 | 160.7 | 160.9 | 161.0 | 161.2 | 161.3 | 161.4 | 161.6 | 161.7 | 161.9 | 162.0 |
| 87 | 73 | 160.2 | 160.3 | 160.5 | 160.7 | 160.8 | 161.0 | 161.1 | 161.2 | 161.4 | 161.5 | 161.7 | 161.8 |
| 88 | 75 | 161.0 | 161.1 | 161.3 | 161.5 | 161.6 | 161.8 | 161.9 | 162.0 | 162.2 | 162.3 | 162.5 | 162.6 |
| 89 | 77 | 161.3 | 161.4 | 161.6 | 161.8 | 161.9 | 162.1 | 162.2 | 162.3 | 162.5 | 162.6 | 162.8 | 162.9 |
| 90 | 79 | 161.6 | 161.7 | 161.9 | 162.1 | 162.2 | 162.4 | 162.5 | 162.6 | 162.8 | 162.9 | 163.1 | 163.2 |
| 91 | 81 | 162.0 | 162.1 | 162.3 | 162.5 | 162.6 | 162.8 | 162.9 | 163.0 | 163.2 | 163.3 | 163.5 | 163.6 |
| 92 | 83 | 161.7 | 161.8 | 162.0 | 162.2 | 162.3 | 162.5 | 162.6 | 162.7 | 162.9 | 163.0 | 163.2 | 163.3 |
| 93 | 85 | 163.0 | 163.1 | 163.3 | 163.5 | 163.6 | 163.8 | 163.9 | 164.0 | 164.2 | 164.3 | 164.5 | 164.6 |
| 94 | 87 | 163.2 | 163.3 | 163.5 | 163.7 | 163.8 | 164.0 | 164.1 | 164.2 | 164.4 | 164.5 | 164.7 | 164.8 |
| 95 | 89 | 164.0 | 164.1 | 164.3 | 164.5 | 164.6 | 164.8 | 164.9 | 165.0 | 165.2 | 165.3 | 165.5 | 165.6 |
| 96 | 90 | 164.2 | 164.3 | 164.5 | 164.7 | 164.8 | 165.0 | 165.1 | 165.2 | 165.4 | 165.5 | 165.7 | 165.8 |
| 97 | 95 | 165.7 | 165.8 | 166.0 | 166.2 | 166.3 | 166.5 | 166.6 | 166.7 | 166.9 | 167.0 | 167.2 | 167.3 |
| 98 | 100 | 167.2 | 167.3 | 167.5 | 167.7 | 167.8 | 168.0 | 168.1 | 168.2 | 168.4 | 168.5 | 168.7 | 168.8 |
| 99 | 105 | 168.4 | 168.6 | 168.8 | 168.9 | 169.1 | 169.2 | 169.4 | 169.5 | 169.6 | 169.8 | 169.9 | 170.0 |
| 100 | 110 | 169.7 | 169.8 | 170.0 | 170.2 | 170.3 | 170.5 | 170.6 | 170.7 | 170.9 | 171.0 | 171.2 | 171.3 |
| 101 | 115 | 171.7 | 171.8 | 172.0 | 172.2 | 172.3 | 172.5 | 172.6 | 172.7 | 172.9 | 173.0 | 173.2 | 173.3 |
| 102 | 120 | 173.7 | 173.8 | 174.0 | 174.2 | 174.3 | 174.5 | 174.6 | 174.7 | 174.9 | 175.0 | 175.2 | 175.3 |
| 103 | 125 | 173.7 | 173.8 | 174.0 | 174.2 | 174.3 | 174.5 | 174.6 | 174.7 | 174.9 | 175.0 | 175.2 | 175.3 |
| 104 | 130 | 175.7 | 175.8 | 176.0 | 176.2 | 176.3 | 176.5 | 176.6 | 176.7 | 176.9 | 177.0 | 177.2 | 177.3 |
| 105 | 135 | 177.7 | 177.8 | 178.0 | 178.2 | 178.3 | 178.5 | 178.6 | 178.7 | 178.9 | 179.0 | 179.2 | 179.3 |
| 106 | 140 | 179.7 | 179.8 | 180.0 | 180.2 | 180.3 | 180.5 | 180.6 | 180.7 | 180.9 | 181.0 | 181.2 | 181.3 |
| 107 | 145 | 181.7 | 181.8 | 182.0 | 182.2 | 182.3 | 182.5 | 182.6 | 182.7 | 182.9 | 183.0 | 183.2 | 183.3 |
| 108 | 150 | 183.7 | 183.8 | 184.0 | 184.2 | 184.3 | 184.5 | 184.6 | 184.7 | 184.9 | 185.0 | 185.2 | 185.3 |
| 109 | 155 | 185.7 | 185.8 | 186.0 | 186.2 | 186.3 | 186.5 | 186.6 | 186.7 | 186.9 | 187.0 | 187.2 | 187.3 |
| 110 | 160 | 187.7 | 187.8 | 188.0 | 188.2 | 188.3 | 188.5 | 188.6 | 188.7 | 188.9 | 189.0 | 189.2 | 189.3 |
| 111 | 165 | 189.7 | 189.8 | 190.0 | 190.2 | 190.3 | 190.5 | 190.6 | 190.7 | 190.9 | 191.0 | 191.2 | 191.3 |
| 112 | 170 | 191.7 | 191.8 | 192.0 | 192.2 | 192.3 | 192.5 | 192.6 | 192.7 | 192.9 | 193.0 | 193.2 | 193.3 |
| 113 | 175 | 193.7 | 193.8 | 194.0 | 194.2 | 194.3 | 194.5 | 194.6 | 194.7 | 194.9 | 195.0 | 195.2 | 195.3 |

| | B | BT | BU | BV | BW | BX | BY | BZ | CA | CB | CC | CD |
|---|---|---|---|---|---|---|---|---|---|---|---|---|
| 1 | Tile Angle degrees | | | | | | | | | | | |
| 2 | Tower Height m | | | | | | | | | | | |
| 3 | Max Range km | | | | | | | | | | | |
| 4 | | | | | | | | | | | | |
| 5 | Amp Power dBw | | | | | | | | | | | |
| 6 | Line Losses dB | | | | | | | | | | | |
| 7 | Peak Npt Xmit Gain, dBi | | | | | | | | | | | |
| 8 | Atmospheric Abs dB | | | | | | | | | | | |
| 9 | | | | | | | | | | | | |

TABLE 7-continued

| | | | | | | | | | | | | |
|---|---|---|---|---|---|---|---|---|---|---|---|---|
| 10 | Relative Angle | 0.02 | 0.02 | 0.03 | 0.04 | 0.05 | 0.05 | 0.06 | 0.07 | 0.08 | 0.08 | |
| 11 | ES Separation Dist, Km | 16.50 | 16.75 | 17.00 | 17.25 | 17.50 | 17.75 | 18.00 | 18.25 | 18.50 | 18.75 | 19.00 |
| 12 | TT to BSS ES Az Angle degrees | | | | | | | | | | | |
| 76 | 51 | 159.5 | 159.7 | 159.8 | 159.9 | 160.0 | 160.2 | 160.3 | 160.4 | 160.5 | 160.6 | 160.8 |
| 77 | 53 | 159.7 | 159.9 | 160.0 | 160.1 | 160.2 | 160.4 | 160.5 | 160.6 | 160.7 | 160.8 | 161.0 |
| 78 | 55 | 159.9 | 160.1 | 160.2 | 160.3 | 160.4 | 160.6 | 160.7 | 160.8 | 160.9 | 161.0 | 161.2 |
| 79 | 57 | 160.1 | 160.3 | 160.4 | 160.5 | 160.6 | 160.8 | 160.9 | 161.0 | 161.1 | 161.2 | 161.4 |
| 80 | 59 | 160.3 | 160.5 | 160.6 | 160.7 | 160.8 | 161.0 | 161.1 | 161.2 | 161.3 | 161.4 | 161.6 |
| 81 | 61 | 160.5 | 160.7 | 160.8 | 160.9 | 161.0 | 161.2 | 161.3 | 161.4 | 161.5 | 161.6 | 161.8 |
| 82 | 63 | 160.9 | 161.1 | 161.2 | 161.3 | 161.4 | 161.6 | 161.7 | 161.8 | 161.9 | 162.0 | 162.2 |
| 83 | 65 | 161.2 | 161.4 | 161.5 | 161.6 | 161.7 | 161.9 | 162.0 | 162.1 | 162.2 | 162.3 | 162.5 |
| 84 | 67 | 161.4 | 161.6 | 161.7 | 161.8 | 161.9 | 162.1 | 162.2 | 162.3 | 162.4 | 162.5 | 162.7 |
| 85 | 69 | 161.8 | 162.0 | 162.1 | 162.2 | 162.3 | 162.5 | 162.6 | 162.7 | 162.8 | 162.9 | 163.1 |
| 86 | 71 | 162.1 | 162.3 | 162.4 | 162.5 | 162.6 | 162.8 | 162.9 | 163.0 | 163.1 | 163.2 | 163.4 |
| 87 | 73 | 161.9 | 162.1 | 162.2 | 162.3 | 162.4 | 162.6 | 162.7 | 162.8 | 162.9 | 163.0 | 163.2 |
| 88 | 75 | 162.7 | 162.9 | 163.0 | 163.1 | 163.2 | 163.4 | 163.5 | 163.6 | 163.7 | 163.8 | 164.0 |
| 89 | 77 | 163.0 | 163.2 | 163.3 | 163.4 | 163.5 | 163.7 | 163.8 | 163.9 | 164.0 | 164.1 | 164.3 |
| 90 | 79 | 163.3 | 163.5 | 163.6 | 163.7 | 163.8 | 164.0 | 164.1 | 164.2 | 164.3 | 164.4 | 164.6 |
| 91 | 81 | 163.7 | 163.9 | 164.0 | 164.1 | 164.2 | 164.4 | 164.5 | 164.6 | 164.7 | 164.8 | 165.0 |
| 92 | 83 | 163.4 | 163.6 | 163.7 | 163.8 | 163.9 | 164.1 | 164.2 | 164.3 | 164.4 | 164.5 | 164.7 |
| 93 | 85 | 164.7 | 164.9 | 165.0 | 165.1 | 165.2 | 165.4 | 165.5 | 165.6 | 165.7 | 165.8 | 166.0 |
| 94 | 87 | 164.9 | 165.1 | 165.2 | 165.3 | 165.4 | 165.6 | 165.7 | 165.8 | 165.9 | 166.0 | 166.2 |
| 95 | 89 | 165.7 | 165.9 | 166.0 | 166.1 | 166.2 | 166.4 | 166.5 | 166.6 | 166.7 | 166.8 | 167.0 |
| 96 | 90 | 165.9 | 166.1 | 166.2 | 166.3 | 166.4 | 166.6 | 166.7 | 166.8 | 166.9 | 167.0 | 167.2 |
| 97 | 95 | 167.4 | 167.6 | 167.7 | 167.8 | 167.9 | 168.1 | 168.2 | 168.3 | 168.4 | 168.5 | 168.7 |
| 98 | 100 | 168.9 | 169.1 | 169.2 | 169.3 | 169.4 | 169.6 | 169.7 | 169.8 | 169.9 | 170.0 | 170.2 |
| 99 | 105 | 170.2 | 170.3 | 170.4 | 170.6 | 170.7 | 170.8 | 170.9 | 171.1 | 171.2 | 171.3 | 171.4 |
| 100 | 110 | 171.4 | 171.6 | 171.7 | 171.8 | 171.9 | 172.1 | 172.2 | 172.3 | 172.4 | 172.5 | 172.7 |
| 101 | 115 | 173.4 | 173.6 | 173.7 | 173.8 | 173.9 | 174.1 | 174.2 | 174.3 | 174.4 | 174.5 | 174.7 |
| 102 | 120 | 175.4 | 175.6 | 175.7 | 175.8 | 175.9 | 176.1 | 176.2 | 176.3 | 176.4 | 176.5 | 176.7 |
| 103 | 125 | 175.4 | 175.6 | 175.7 | 175.8 | 175.9 | 176.1 | 176.2 | 176.3 | 176.4 | 176.5 | 176.7 |
| 104 | 130 | 177.4 | 177.6 | 177.7 | 177.8 | 177.9 | 178.1 | 178.2 | 178.3 | 178.4 | 178.5 | 178.7 |
| 105 | 135 | 179.4 | 179.6 | 179.7 | 179.8 | 179.9 | 180.1 | 180.2 | 180.3 | 180.4 | 180.5 | 180.7 |
| 106 | 140 | 181.4 | 181.6 | 181.7 | 181.8 | 181.9 | 182.1 | 182.2 | 182.3 | 182.4 | 182.5 | 182.7 |
| 107 | 145 | 183.4 | 183.6 | 183.7 | 183.8 | 183.9 | 184.1 | 184.2 | 184.3 | 184.4 | 184.5 | 184.7 |
| 108 | 150 | 185.4 | 185.6 | 185.7 | 185.8 | 185.9 | 186.1 | 186.2 | 186.3 | 186.4 | 186.5 | 186.7 |
| 109 | 155 | 187.4 | 187.6 | 187.7 | 187.8 | 187.9 | 188.1 | 188.2 | 188.3 | 188.4 | 188.5 | 188.7 |
| 110 | 160 | 189.4 | 189.6 | 189.7 | 189.8 | 189.9 | 190.1 | 190.2 | 190.3 | 190.4 | 190.5 | 190.7 |
| 111 | 165 | 191.4 | 191.6 | 191.7 | 191.8 | 191.9 | 192.1 | 192.2 | 192.3 | 192.4 | 192.5 | 192.7 |
| 112 | 170 | 193.4 | 193.6 | 193.7 | 193.8 | 193.9 | 194.1 | 194.2 | 194.3 | 194.4 | 194.5 | 194.7 |
| 113 | 175 | 195.4 | 195.6 | 195.7 | 195.8 | 195.9 | 196.1 | 196.2 | 196.3 | 196.4 | 196.5 | 196.7 |

TABLE 8

| | O | P | Q |
|---|---|---|---|
| 123 | TT to BSS ES Az Angle degrees | BSS Ant Gain | RSSI Trigger-DBS Gain |
| 124 | 180 | 2.00 | 150.1 |
| 125 | 185 | 2.00 | 150.1 |
| 126 | 190 | 1.00 | 151.1 |
| 127 | 195 | 1.00 | 151.1 |
| 128 | 200 | 1.00 | 151.1 |
| 129 | 205 | 1.00 | 151.1 |
| 130 | 210 | 1.33 | 150.8 |
| 131 | 215 | 1.17 | 150.9 |
| 132 | 220 | 1.00 | 151.1 |
| 133 | 225 | 1.33 | 150.8 |
| 134 | 230 | 1.00 | 151.1 |
| 135 | 235 | 1.00 | 151.1 |
| 136 | 240 | 1.33 | 150.8 |
| 137 | 245 | 1.17 | 150.9 |
| 138 | 250 | 1.00 | 151.1 |
| 139 | 255 | 1.33 | 150.8 |
| 140 | 260 | 1.17 | 150.9 |
| 141 | 265 | 1.00 | 151.1 |
| 142 | 270 | 1.00 | 151.1 |
| 143 | 272 | 1.00 | 151.1 |
| 144 | 274 | 1.00 | 151.1 |
| 145 | 276 | 1.00 | 151.1 |
| 146 | 278 | 1.00 | 151.1 |
| 147 | 280 | 1.00 | 151.1 |
| 148 | 282 | 0.67 | 152.8 |
| 149 | 284 | 2.33 | 154.4 |

TABLE 8-continued

| | O | P | Q |
|---|---|---|---|
| 150 | 286 | 4.00 | 156.1 |
| 151 | 288 | 4.00 | 156.1 |
| 152 | 290 | 2.33 | 154.4 |
| 153 | 292 | 0.67 | 152.8 |
| 154 | 294 | 1.00 | 151.1 |
| 155 | 296 | 2.67 | 149.4 |
| 156 | 298 | 3.50 | 148.6 |
| 157 | 300 | 3.00 | 149.1 |
| 158 | 302 | 3.00 | 149.1 |
| 159 | 304 | 3.50 | 148.6 |
| 160 | 306 | 4.00 | 148.1 |
| 161 | 308 | 4.50 | 147.6 |
| 162 | 310 | 5.00 | 147.1 |
| 163 | 312 | 5.50 | 146.6 |
| 164 | 314 | 5.83 | 146.3 |
| 165 | 316 | 6.00 | 146.1 |
| 166 | 318 | 6.00 | 146.1 |
| 167 | 320 | 6.00 | 146.1 |
| 168 | 325 | 6.00 | 146.1 |
| 169 | 330 | 6.67 | 145.4 |
| 170 | 335 | 7.67 | 144.4 |
| 171 | 340 | 8.17 | 143.9 |
| 172 | 345 | 8.67 | 143.4 |
| 173 | 350 | 9.00 | 143.1 |
| 174 | 355 | 9.50 | 142.6 |
| 175 | 0 | 9.83 | 142.3 |
| 176 | 5 | 9.50 | 142.6 |
| 177 | 10 | 9.00 | 143.1 |

TABLE 8-continued

| | O | P | Q |
|---|---|---|---|
| 178 | 15 | 8.67 | 143.4 |
| 179 | 20 | 8.17 | 143.9 |
| 180 | 25 | 7.67 | 144.4 |
| 181 | 30 | 6.67 | 145.4 |
| 182 | 35 | 6.00 | 146.1 |
| 183 | 40 | 6.00 | 146.1 |
| 184 | 45 | 5.83 | 146.3 |
| 185 | 47 | 5.67 | 146.4 |
| 186 | 49 | 5.50 | 146.6 |
| 187 | 51 | 5.00 | 147.1 |
| 188 | 53 | 4.50 | 147.6 |
| 189 | 55 | 4.00 | 148.1 |
| 190 | 57 | 3.50 | 148.6 |
| 191 | 59 | 3.00 | 149.1 |
| 192 | 61 | 3.00 | 149.1 |
| 193 | 63 | 2.67 | 149.4 |
| 194 | 65 | 1.00 | 151.1 |
| 195 | 67 | 0.67 | 152.8 |
| 196 | 69 | 2.33 | 154.4 |
| 197 | 71 | 4.00 | 156.1 |
| 198 | 73 | 4.00 | 156.1 |
| 199 | 75 | 2.33 | 154.4 |
| 200 | 77 | 0.67 | 152.8 |
| 201 | 79 | 1.00 | 151.1 |
| 202 | 81 | 1.00 | 151.1 |
| 203 | 83 | 1.00 | 151.1 |
| 204 | 85 | 1.00 | 151.1 |
| 205 | 87 | 1.00 | 151.1 |
| 206 | 89 | 1.00 | 151.1 |
| 207 | 90 | 1.00 | 151.1 |
| 208 | 95 | 1.00 | 151.1 |
| 209 | 100 | 1.17 | 150.9 |
| 210 | 105 | 1.33 | 150.8 |
| 211 | 110 | 1.00 | 151.1 |
| 212 | 115 | 1.17 | 150.9 |
| 213 | 120 | 1.33 | 150.8 |
| 214 | 125 | 1.00 | 151.1 |
| 215 | 130 | 1.00 | 151.1 |
| 216 | 135 | 1.33 | 150.8 |
| 217 | 140 | 1.00 | 151.1 |
| 218 | 145 | 1.17 | 150.9 |
| 219 | 150 | 1.33 | 150.8 |
| 220 | 155 | 1.00 | 151.1 |
| 221 | 160 | 1.00 | 151.1 |
| 222 | 165 | 1.00 | 151.1 |
| 223 | 170 | 1.00 | 151.1 |
| 224 | 175 | 2.00 | 150.1 |

TABLE 9

| Latitude | Longitude Difference radians, Minimum earth sta elevation, deg: | | | Longitude Difference, degrees Minimum earth sta elevation, deg: | | |
|---|---|---|---|---|---|---|
| deg. | 15 | 10 | 5 | 15 | 10 | 5 |
| 0 | 1.163 | 1.247 | 1.332 | 66.6 | 71.4 | 76.3 |
| 10 | 1.156 | 1.242 | 1.329 | 66.2 | 71.1 | 76.1 |
| 20 | 1.135 | 1.225 | 1.317 | 65.0 | 70.2 | 75.4 |
| 30 | 1.095 | 1.195 | 1.295 | 62.7 | 68.4 | 74.2 |
| 40 | 1.026 | 1.142 | 1.258 | 58.8 | 65.5 | 72.1 |
| 50 | 0.905 | 1.053 | 1.195 | 51.9 | 60.3 | 68.5 |
| 60 | 0.653 | 0.881 | 1.079 | 37.4 | 50.5 | 61.8 |
| 70 | | 0.375 | 0.809 | | 21.5 | 46.3 |

TABLE 10

Calculation of 'AZ E'
Easternmost Az angle of Main Beam(deg)

| Latitude, deg. | Minimum earth station elevation, deg: 15 | 10 | 5 |
|---|---|---|---|
| 0 | 90.0 | 90.0 | 90.0 |
| 10 | 94.4 | 93.4 | 92.5 |
| 20 | 99.1 | 97.0 | 95.1 |
| 30 | 104.5 | 101.2 | 98.1 |
| 40 | 111.3 | 106.4 | 101.8 |
| 50 | 121.0 | 113.6 | 106.8 |
| 60 | 138.5 | 125.5 | 114.9 |
| 70 | | 157.3 | 131.9 |

TABLE 11

Calculation of Psi, great circle arc (radians)

| Latitude, deg. | Minimum earth station elevation, deg: 15 | 10 | 5 |
|---|---|---|---|
| 0 | 1.1626 | 1.2469 | 1.3325 |
| 10 | 1.1626 | 1.2469 | 1.3325 |
| 20 | 1.1626 | 1.2469 | 1.3325 |
| 30 | 1.1626 | 1.2469 | 1.3325 |
| 40 | 1.1626 | 1.2469 | 1.3325 |
| 50 | 1.1626 | 1.2469 | 1.3325 |
| 60 | 1.1626 | 1.2469 | 1.3325 |
| 70 | | 1.2469 | 1.3325 |

TABLE 12

Calculation of 'AZTE'.Degrees

| Latitude, deg. | 15 | 10 | 5 |
|---|---|---|---|
| 0 | 42.0 | 42.0 | 42.0 |
| 10 | 46.4 | 45.4 | 44.5 |
| 20 | 51.1 | 49.0 | 47.1 |
| 30 | 56.5 | 53.2 | 50.1 |
| 40 | 63.3 | 58.4 | 53.8 |
| 50 | 59.0 | 65.6 | 58.8 |
| 60 | 41.5 | 54.5 | 65.1 |
| 70 | | 22.7 | 48.1 |

TABLE 13

Calculation of 'AZTW'.Degrees

| Latitude, deg. | 15 | 10 | 5 |
|---|---|---|---|
| 0 | 318.0 | 318.0 | 318.0 |
| 10 | 313.6 | 314.6 | 315.5 |
| 20 | 308.9 | 311.0 | 312.9 |
| 30 | 303.5 | 306.8 | 309.9 |
| 40 | 296.7 | 301.6 | 306.2 |
| 50 | 301.0 | 294.4 | 301.2 |
| 60 | 318.5 | 305.5 | 294.9 |
| 70 | | 337.3 | 311.9 |

TABLE 14

| Latitude, deg. | Calculation, Approximate Size of Min Interference Zone Degrees | | |
|---|---|---|---|
| | 15 | 10 | 5 |
| 0 | 84.0 | 84.0 | 84.0 |
| 10 | 92.7 | 90.8 | 88.9 |
| 20 | 102.1 | 98.0 | 94.1 |
| 30 | 112.9 | 106.3 | 100.1 |
| 40 | 126.6 | 116.7 | 107.5 |
| 50 | 117.9 | 131.2 | 117.7 |
| 60 | 83.0 | 108.9 | 130.2 |
| 70 | | 45.5 | 96.3 |

What is claimed is:

1. A terrestrially-based transmission system, comprising:

at least one terrestrial transmitter transmitting information on at least one frequency simultaneously usable by at least one satellite transmitting to a satellite receive antenna having a sensitivity characterizable by a primary sensitive axis directed substantially at the satellite; and wherein the terrestrial transmitter is disposed at a location defining a vector angularly displaced away from the primary sensitive axis by an offset angle $\gamma$ of less than 90 degrees; and wherein the offset angle $\gamma$ is defined such that $\beta<\gamma<90°-\delta$, wherein $\beta$ is an angular extent of an effective beamwidth of the satellite receive antenna, and $\delta$ is an angle from due South to a vector from the satellite receive antenna to the satellite.

2. The apparatus of claim 1, wherein the satellite receive antenna further comprises at least one posterior secondary sensitive axis.

3. The apparatus of claim 1, wherein the satellite is disposed in a substantially geosynchronous orbit.

4. The apparatus of claim 1, wherein the satellite is disposed in a substantially geostationary orbit.

5. The apparatus of claim 1, wherein the offset angle $\gamma$ is definable by an elevation component $\gamma y_{el}\in(-(90°, 90°)$ and an azimuth component $\gamma_{az}\in(-90°-\delta), (90°-\delta))$, and wherein $|\gamma_{el}|>\beta$ and $-(90°-\delta)<\gamma_{az}<(90°-\delta)$.

6. The apparatus of claim 5, wherein $\gamma_{el}<-\beta$.

7. The apparatus of claim 1, wherein the transmitter is characterizable by an azimuthal gain characteristic substantially limited to between $AZ_{TW}$ and $AZ_{TE}$ wherein $AZ_{TW}$ is about 295° Northwest and $AZ_{TE}$ is about 65° Northeast.

8. The apparatus of claim 1, wherein the transmitter is characterizable by an azimuthal gain characteristic substantially limited an angle $\phi$ defined by $AZ_{TW}$ and $AZ_{TE}$, the angle $\phi$ determined according to a latitude of the satellite receive antenna and a minimum elevation angle of the primary sensitive axis $\epsilon_{min}$.

9. The apparatus of claim 8, wherein $\epsilon_{min}$ is about 10° and the latitude is between about 24° North and about 48° North, and the angle $\phi$ is between about 105° and 130°.

10. The apparatus of claim 8, wherein $\epsilon_{min}$ is about 15° and the latitude is between about 24° North and about 48° North, and the angle $\phi$ is between about 95° and 130°.

11. The apparatus of claim 8, wherein $\epsilon_{min}$ is about 5° and the latitude is between about 24° North and about 48° North, and the angle $\phi$ is between about 100° and 130°.

12. The apparatus of claim 1, further comprising a terrestrial receive antenna, for receiving the information transmitted from the terrestrial transmitter.

13. The apparatus of claim 1, wherein the terrestrial receive antenna is disposed proximate the satellite receive antenna.

14. A reception apparatus, comprising:

a terrestrial receive antenna for receiving a first signal from a terrestrial transmitter on a frequency usable by at least one satellite transmitting to a satellite receive antenna having a sensitivity characterizable by a satellite receive antenna primary sensitive axis directed substantially at the satellite, the terrestrial receive antenna having a terrestrial receive antenna primary sensitive axis angularly displaced away from the satellite receive antenna primary sensitive axis by an offset angle $\gamma$ of less than 90 degrees; and wherein the offset angle $\gamma$ is defined such that $\beta<\gamma<90°-\delta$, wherein $\beta$ is an angular extent of an effective beamwidth of the satellite receive antenna, and $\delta$ is an angle from due South to a vector from the satellite receive antenna to the satellite.

15. The apparatus of claim 14, wherein the satellite receive antenna further comprises at least one posterior secondary sensitive axis.

16. The apparatus of claim 14, wherein the satellite is disposed in a substantially geosynchronous orbit.

17. The apparatus of claim 14, wherein the satellite is disposed in a substantially geostationary orbit.

18. The apparatus of claim 14, wherein the offset angle $\gamma$ is definable by an elevation component $\gamma_{el}\in(-90°, 90°)$ and an azimuth component $\gamma_{az}\in(-(90°-\delta), (90°-\delta))$, and wherein $|\gamma_{el}|>\beta$ and $-(90°-\delta)<\gamma_{az}<(90°-\delta)$.

19. The apparatus of claim 18, wherein $\gamma_{el}<-\beta$.

20. The apparatus of claim 14, wherein the transmitter is characterizable by an azimuthal gain characteristic substantially limited to between $AZ_{TW}$ and $AZ_{TE}$ wherein $AZ_{TW}$ is about 295° Northwest and $AZ_{TE}$ is about 65° Northeast.

21. The apparatus of claim 14, wherein the transmitter is characterizable by an azimuthal gain characteristic substantially limited an angle $\phi$ defined by $AZ_{TW}$ and $AZ_{TE}$, the angle $\phi$ determined according to a latitude of the satellite receive antenna and a minimum elevation angle of the primary sensitive axis $\epsilon_{min}$.

22. The apparatus of claim 21, wherein $\epsilon_{min}$ is about 10° and the latitude is between about 24° North and about 48° North, and the angle $\phi$ is between about 105° and 130°.

23. The apparatus of claim 21, wherein $\epsilon_{min}$ is about 15° and the latitude is between about 24° North and about 48° North, and the angle $\phi$ is between about 95° and 130°.

24. The apparatus of claim 21, wherein $\epsilon_{min}$ is about 5° and the latitude is between about 24° North and about 48° North, and the angle $\phi$ is between about 100° and 130°.

25. The apparatus of claim 14, further comprising a terrestrial receive antenna, for receiving the information transmitted from the terrestrial transmitter.

26. The apparatus of claim 14, wherein the terrestrial receive antenna is disposed proximate the satellite receive antenna.

27. A method of transmitting information on at least one frequency simultaneously usable by at least one satellite transmitting to a satellite receive antenna having a sensitivity characterizable by a primary sensitive axis directed substantially at the satellite and a posterior secondary sensitive axis, comprising the step of:

transmitting information from a terrestrially-based transmitter to a terrestrial receive antenna from a location defining a vector angularly displaced away from the primary sensitive axis by an offset angle $\gamma$ of less than 90 degrees; and wherein the offset angle $\gamma$ is defined such that $\beta<\gamma<(90°-\delta)$, wherein $\beta$ is an angular extent of an effective beamwidth of the satellite receive antenna, and $\delta$ is an angle from due South to a vector from the satellite receive antenna to the satellite.

28. The method of claim 27, wherein the offset angle $\gamma$ is definable by an elevation component $\gamma_{el} \in (-90°, 90°)$ and an azimuth component $\gamma_{az} \in (-(90°-\delta), (90°-\delta))$, and wherein $|\gamma_{el}| > \beta$ and $-(90°-\delta) < |\gamma_{el}| < (90°-\delta)$.

29. The method of claim 27, wherein the transmitter is characterizable by an azimuthal gain characteristic substantially limited to between $AZ_{TW}$ and $AZ_{TE}$ wherein $AZ_{TW}$ is about 295° Northwest and $AZ_{TE}$ is about 65° Northeast.

30. The method of claim 27, wherein the transmitter is characterizable by an azimuthal gain characteristic substantially limited an angle $\phi$ defined by $AZ_{TW}$ and $AZ_{TE}$, the angle $\phi$ determined according to a latitude of the satellite receive antenna and a minimum elevation angle of the primary sensitive axis $\epsilon_{min}$.

31. The method of claim 30, wherein $\epsilon_{min}$ is about 10° and the latitude is between about 24° North and about 48° North, and the angle $\phi$ is between about 105° and 130°.

32. The method of claim 30, wherein $\epsilon_{min}$ is about 15° and the latitude is between about 24° North and about 48° North, and the angle $\phi$ is between about 95° and 130°.

33. The method of claim 30, wherein $\epsilon_{min}$ is about 5° and the latitude is between about 24° North and about 48° North, and the angle $\phi$ is between about 100° and 130°.

34. A method of receiving information on at least one frequency simultaneously usable by at least one satellite transmitting to a satellite receive antenna having a sensitivity characterizable by a primary sensitive axis directed substantially at the satellite and a posterior secondary sensitive axis, comprising the step of:

receiving information from a terrestrial-based transmitter to a terrestrial receive antenna from a location defining a vector angularly displaced away due South from the primary sensitive axis by an offset angle $\gamma$ of less than 90 degrees; and wherein the offset angle $\gamma$ is defined such that $\beta < \gamma < (90°-\delta)$, wherein $\beta$ is an angular extent of an effective beamwidth of the satellite receive antenna, and $\delta$ is an angle from due South to a vector from the satellite receive antenna to the satellite.

35. The method of claim 34, above, wherein the offset angle $\gamma$ is definable by an elevation component $\gamma_{el} \in (-90°, 90°)$ and an azimuth component $\gamma_{az} \in (-(90°-\delta), (90°-\delta))$, and wherein $|\gamma_{el}| > \beta$ and $-(90°-\delta) < \gamma_{el} < (90°-\delta)$.

36. The method of claim 34, wherein the transmitter is characterizable by an azimuthal gain characteristic substantially limited to between $AZ_{TW}$ and $AZ_{TE}$ wherein $AZ_{TW}$ is about 295° Northwest and $AZ_{TE}$ is about 65° Northeast.

37. The method of claim 34, wherein the transmitter is characterizable by an azimuthal gain characteristic substantially limited an angle $\phi$ defined by $AZ_{TW}$ and $AZ_{TE}$, the angle $\phi$ determined according to a latitude of the satellite receive antenna and a minimum elevation angle of the primary sensitive axis $\epsilon_{min}$.

38. The method of claim 37, wherein $\epsilon_{min}$ is about 10° and the latitude is between about 24° North and about 48° North, and the angle $\phi$ is between about 105° and 130°.

39. The method of claim 37, wherein $\epsilon_{min}$ is about 15° and the latitude is between about 24° North and about 48° North, and the angle $\phi$ is between about 95° and 130°.

40. The method of claim 37, wherein $\epsilon_{min}$ is about 5° and the latitude is between about 24° North and about 48° North, and the angle $\phi$ is between about 100° and 130°.

41. The method of claim 34, further comprising the steps of:

aligning an azimuth and elevation angle of the satellite receive antenna to direct the primary sensitive axis substantially at the satellite; and aligning an azimuth angle of the terrestrial receive antenna to direct a terrestrial receive antenna primary sensitive axis substantially at the terrestrial transmitter and substantially in the direction of the Equator.

42. A transmission network capable of simultaneously transmitting a first signal and a second signal to a location on a single transmission channel, comprising:

a satellite transmitter, for transmitting the first signal to the location substantially along a first axis;

a terrestrial transmitter, for transmitting the second signal to the location along a second axis within an offset angle $\gamma$ of at most 90 degrees of the first axis, wherein the offset angle $\gamma$ is defined such that $\beta < \gamma < (90°-\delta)$, wherein $\beta$ is an angular extent of an effective beamwidth of the satellite receive antenna, and $\delta$ is an angle from due South to a vector from the satellite receive antenna to the satellite;

a first antenna comprising a sensitive characteristic having a plurality of lobes and nulls therebetween, the plurality of lobes including a main lobe substantially aligned with the first axis, and a null substantially aligned with the second axis, and at least one sidelobe substantially aligned with a side lobe axis disposed at least 90 degrees away from the main lobe; and a second antenna having a main lobe substantially aligned with the second axis.

43. The apparatus of claim 42, wherein the second antenna further comprises at least one null substantially aligned with the first axis.

44. The apparatus of claim 42, wherein the offset angle is between approximately 10 and 90 degrees.

45. The apparatus of claim 42, wherein the offset angle comprises an azimuth component between about −90 and 90 degrees and an elevation component between about 10 and 90 degrees.

46. The apparatus of claim 42, wherein the side lobe axis is disposed between approximately 96 and 132 degrees away from the first axis.

* * * * *